(12) United States Patent
Schwabe et al.

(10) Patent No.: US 6,880,155 B2
(45) Date of Patent: Apr. 12, 2005

(54) TOKEN-BASED LINKING

(75) Inventors: Judith E. Schwabe, San Mateo, CA (US); Joshua B. Susser, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/243,108

(22) Filed: Feb. 2, 1999

(65) Prior Publication Data

US 2003/0028686 A1 Feb. 6, 2003

(51) Int. Cl.[7] ............................................. G06F 9/45
(52) U.S. Cl. ..................................................... 717/162
(58) Field of Search .................... 717/162, 10; 709/220

(56) References Cited

U.S. PATENT DOCUMENTS

| | | | |
|---|---|---|---|
| 5,367,685 A | 11/1994 | Gosling | 395/700 |
| 5,613,101 A | 3/1997 | Lillich | 709/230 |
| 5,615,137 A | 3/1997 | Holzmann et al. | 703/17 |
| 5,619,695 A * | 4/1997 | Arbabi et al. | 709/100 |
| 5,668,999 A | 9/1997 | Gosling | 717/126 |
| 5,701,408 A | 12/1997 | Cornell et al. | 714/38 |
| 5,734,822 A | 3/1998 | Houha et al. | |
| 5,748,964 A | 5/1998 | Gosling | 717/126 |
| 5,778,231 A | 7/1998 | van Hoff et al. | 717/143 |
| 5,778,234 A * | 7/1998 | Hecht et al. | 717/11 |
| 5,802,519 A | 9/1998 | De Jong | 707/100 |
| 5,841,866 A * | 11/1998 | Bruwer et al. | 380/23 |
| 5,889,992 A | 3/1999 | Koerber | 717/108 |
| 5,905,987 A | 5/1999 | Shutt et al. | 707/103 |
| 5,937,412 A * | 8/1999 | Kohli et al. | 707/104 |
| 5,966,702 A * | 10/1999 | Fresko et al. | 707/1 |
| 5,974,454 A * | 10/1999 | Apfel et al. | 709/221 |
| 6,005,942 A * | 12/1999 | Chan et al. | 380/25 |
| 6,038,551 A * | 3/2000 | Barlow et al. | 705/41 |
| 6,092,147 A | 7/2000 | Levy et al. | 711/6 |
| 6,131,159 A * | 10/2000 | Hecht et al. | 713/1 |
| 6,141,681 A * | 10/2000 | Kyle | 709/206 |
| 6,145,021 A * | 11/2000 | Dawson et al. | 710/8 |
| 6,163,811 A * | 12/2000 | Porter | 235/380 |
| 6,178,546 B1 * | 1/2001 | McIntyre | 717/3 |
| 6,226,744 B1 * | 5/2001 | Murphy et al. | 713/200 |
| 6,233,683 B1 * | 5/2001 | Chan et al. | 713/172 |
| 6,272,674 B1 | 8/2001 | Holiday, Jr. | 717/174 |
| 6,308,317 B1 * | 10/2001 | Wilkinson et al. | 717/139 |
| 6,349,344 B1 | 2/2002 | Sauntry et al. | 717/143 |
| 6,434,561 B1 * | 8/2002 | Durst et al. | 707/10 |
| 6,438,550 B1 * | 8/2002 | Doyle et al. | 707/9 |

(Continued)

FOREIGN PATENT DOCUMENTS

| | | | |
|---|---|---|---|
| EP | 0 292 248 | 5/1988 | G07F/7/10 |
| EP | 0 498 130 A2 | 12/1991 | G06F/9/44 |
| EP | 0 685 792 | 12/1995 | G06F/11/00 |
| EP | 0 778 520 | 11/1996 | G06F/9/45 |
| EP | 0 778 520 A2 | 11/1996 | G06F/9/45 |

(Continued)

OTHER PUBLICATIONS

Kermarrec et al., Introducing contrxtual objects . . . , Sep. 1998, p. 229–236.*

(Continued)

*Primary Examiner*—John Chavis
(74) *Attorney, Agent, or Firm*—Gunnison, McKay & Hodgson, L.L.P.

(57) ABSTRACT

A system links architecture neutral code downloaded to a resource constrained computer. The code may be separated into one or more packages having one or more referenceable items. The system maps the one or more referenceable items into corresponding one or more tokens; orders the tokens to correspond to a run-time mode; downloads the packages to the resource constrained computer; and links the packages into an executable code using the ordered tokens.

75 Claims, 29 Drawing Sheets

U.S. PATENT DOCUMENTS

| | | | |
|---|---|---|---|
| 6,470,494 B1 | 10/2002 | Chan et al. ................. | 717/166 |
| 6,477,702 B1 * | 11/2002 | Yellin et al. ................. | 717/126 |
| 6,481,632 B2 * | 11/2002 | Wentker et al. ............. | 235/492 |
| 6,519,767 B1 | 2/2003 | Carter et al. ................. | 717/140 |
| 6,557,032 B1 * | 4/2003 | Jones et al. ................. | 709/220 |
| 2002/0040936 A1 * | 4/2002 | Wentker et al. ............. | 235/492 |

FOREIGN PATENT DOCUMENTS

| | | | |
|---|---|---|---|
| EP | 0 748 135 B1 | 12/1996 | |
| EP | 0 778 522 A2 | 6/1997 | |
| EP | 0 865 217 A2 | 9/1998 | |
| WO | WO 94/30023 | 12/1994 | |
| WO | WO 98/19237 | 5/1998 | |
| WO | WO 98/521258 | 5/1998 | ............. G07F/7/10 |
| WO | 00/00890 | 1/2000 | ........... G06F/11/00 |
| WO | WO 00/25278 | 5/2000 | ............. G06F/7/10 |
| WO | WO 0/25278 | 5/2000 | ............. G07F/7/10 |
| WO | WO 00/46666 | 8/2000 | ............. G06F/9/00 |

OTHER PUBLICATIONS

Java Card 2.0 Language Subset and Virtual Machine Specification Revision 1.0 Final, Oct. 13, 1997, Sun Microsystems, Inc.

Basin, D. et al. "Java Bytecode Verification by Model Checking", CAV 99: 11*th* International Conference on Computer Aided Verification, vol. 1633 of LNCS, pp. 491–494 (1999).

Bowles et al., "A Comparison of Commercial Reliability Prediction Programs", *Proceedings Annual Reliability and Maintainability Symposium*, IEEE, pp. 450–455 (1990).

Cooper, Richard, "Persistent Languages Facilitate the Implementation of Software Version Management", *IEEE*, pp. 56–65 (1989).

Lindsay et al., "A Generic Model for Fine Grained Configuration Management Including Version Control and Traceability", *Proceedings of the Australian Software Engineering Conference (ASWEC'97)*, IEEE Computer Society, pp. 27–36 (1997).

Posegga, J. et al. "Byte Code Verification for Java Smart Cards Based on Model Checking", Sep. 16–18, 1998, Computer Sercurity–ESORICS 98, Proceedings of the 5th European Symposium on Research in Computer Security.

Cyberflex—Opening Page, printed from http://www.cyberflex.slb.com on Jan. 15, 1999.

"Java Developer's Journal Names Cyberflex Smart Card As Editor's Choice Finalist", Jan. 11, 1999, printed from http://www.slb.com/ir/news/sct–jdj0199.html on Jan. 15, 1999.

"Schlumberger Announces Cyberflex Access; Java™–Based Smart Card Combines Multiple Application and Cryptographic Features for Information Security Market", Dec. 8, 1998, printed from http://www.cyberflex.slb.com/Ac...ex$_{13}$ Access/cyberflex$_{13}$ access.html on Jan. 15, 1999.

"What is the EmbeddedJava™ Application Environment" printed from http://java.sun.com/products/embeddedjava/overview.html on Jan. 27, 1999.

International Preliminary Examination Report, PCT/US01/28687, International filing date Sep. 14, 2001, date Search Report mailed Jan. 5, 2004.

Suresh Subramanian, "*CRUISE: Using Interface Hierarchies to Support Software Evolution*", IEEE, 1988, pp. 132–142.

International Search Report, PCT/US 01/28579, International filing date Sep. 12, 2001, date Search Report mailed–Jan. 5, 2004.

International Search Report, PCT/US 01/28688, International filing date Sep. 14, 2001, date Search report mailed–Jan. 5, 2004.

* cited by examiner

Class Reference (imported class)

| 1 | package token | class token |
|---|---|---|
| 15 | 8 | 7 0 |

Field Reference (imported field)

| 1 | package token | class token | field token |
|---|---|---|---|
| 23 | 16 | 15 8 | 7 0 |

Method Reference (imported method)

| 1 | package token | class token | 0 | method token |
|---|---|---|---|---|
| 23 | 16 | 15 8 | 7 | 0 |

Instance Field Reference (internal field) — 192

| 0 | offset to class_info structure in Class Component | field token |
|---|---|---|
| 23 | 16 15 | 8 7 | 0 |

FIG. 7G

Virtual Method Reference to Public or Protected Method (internal method) — 194

| 0 | offset to class_info structure in Class Component | 0 | method token |
|---|---|---|---|
| 23 | 16 15 | 8 | 7 | 0 |

FIG. 7H

Virtual Method Reference to Package Visible Method (internal method) — 196

| 0 | offset to class_info structure in Class Component | 1 | method token |
|---|---|---|---|
| 23 | 16 15 | 8 | 7 | 0 |

FIG. 7I

TOKEN-BASED LINKING

CROSS REFERENCE TO RELATED APPLICATIONS

U.S. patent application Ser. No. 09/243,101, filed Feb. 2, 1999, in the names of inventors Judith E. Schwabe and Joshua Susser, entitled "Object-Oriented Instruction Set for Resource-Constrained Devices", commonly assigned herewith;

U.S. patent application Ser. No. 09/243,107, filed Feb. 2, 1999, in the names of inventors Judith E. Schwabe and Joshua Susser, entitled "Zero Overhead Exception Handling", commonly assigned herewith;

U.S. patent Ser. No. 10/664,216, entitled "Virtual Machine with Securely Distributed Bytecode Verification" by inventors Moshe Levy and Judith E, Schwabe, filed on Sep. 16, 2003, which is a continuation of U.S. patent Ser. No. 10/283,305, now U.S. Pat. No. 6,640,279, entitled "Virtual Machine with Securely Distributed Bytecode Verification" by inventors Moshe Levy and Judith E. Schwabe, filed on Oct. 30, 2002, which is a continuation of U.S. patent Ser. No. 09/547,225, now U.S. Pat. No. 6,546,454, entitled "Virtual Machine with Securely Distributed Bytecode Verification" by inventors Moshe Levy and Judith E. Schwabe, filed on Apr. 11, 2000, which is a continuation of parent application Ser. No. 08/839,621, now U.S. Pat. No. 6,092,147, filed Apr. 15, 1997 entitled "Virtual Machine with Securely Distributed Bytecode Verification" by inventors Moshe Levy and Judith E. Schwabe, commonly assigned herewith; and In addition, an Appendix A entitled "Java Card Virtual Machine Specification: Java Card™ Version 2.1" is attached to this application and forms a part of the present specification.

A portion of the disclosure of this patent document contains material which is subject to copyright protection. The copyright owner has no objection to the facsimile reproduction by anyone of the patent disclosure as it appears in the Patent and Trademark Office patent files or records, but otherwise reserves all copyright rights whatsoever.

BACKGROUND

The present invention relates, in general, to object-oriented, architecture-neutral programs for use with resource-constrained devices such as smart cards and the like.

A virtual machine is an abstract computing machine generated by a software application or sequence of instructions which is executed by a processor. The term "architecture-neutral" refers to programs, such as those written in the Java™ programming language, which can be executed by a virtual machine on a variety of computer platforms having a variety of different computer architectures. Thus, for example, a virtual machine being executed on a Windows™-based personal computer system will use the same set of instructions as a virtual machine being executed on a UNIX™-based computer system. The result of the platform-independent coding of a virtual machine's sequence of instructions is a stream of one or more bytecodes, each of which is, for example, a one-byte-long numerical code.

Use of the Java programming language has found many applications including, for example, those associated with Web browsers.

The Java programming language is object-oriented. In an object-oriented system, a "class" describes a collection of data and methods that operate on that data. Taken together, the data and methods describe the state of and behavior of an object.

The Java programming language also is verifiable such that, prior to execution of an application written in the Java programming language, a determination can be made as to whether any instruction sequence in the program will attempt to process data of an improper type for that bytecode or whether execution of bytecode instructions in the program will cause underflow or overflow of an operand stack.

A Java™ virtual machine executes virtual machine code written in the Java programming language and is designed for use with a 32-bit architecture. However, various resource-constrained devices, such as smart cards, have an 8-bit or 16-bit architecture.

Smart cards, also known as intelligent portable data-carrying cards, generally are made of plastic or metal and have an electronic chip that includes an embedded microprocessor to execute programs and memory to store programs and data. Such devices, which can be about the size of a credit card, typically have limited memory capacity. For example, some smart cards have less than one kilo-byte (1K) of random access memory (RAM) as well as limited read only memory (ROM), and/or non-volatile memory such as electrically erasable programmable read only memory (EEPROM).

Generally, programs running on a processor of a smart card determine the services offered by the card. As time passes, the programs on the card may need to be updated, for example in order to add a new function or to improve an existing function. To this end, the card should be able to accept new programs which may replace other programs.

Typically a virtual machine executing byte code (e.g., a full Java virtual machine) requires a sizable amount of memory in loading bytecode and resolving references. Particularly, in the Java virtual machine, symbolic references are used to refer to program elements such as the classes, methods and fields. A Reference to these program elements is resolved by locating the element using its symbolic name. Such operations require a relatively large random access memory (RAM). In an environment that has little RAM, this may not be feasible. Since smart cards are cost-sensitive, they rely on inexpensive, low performance processors and low capacity memory devices. Since cost and power reasons dictate that low-power and low-capacity processor and memory components be deployed in such resource constrained computers, the ability to operate the Java virtual machine on such resource constrained devices is both difficult and yet desirable.

SUMMARY

In one aspect, a method downloads code to a resource constrained computer. The code is separable into at least one package having at least one referenceable item. The method includes forming the package; forming a mapping of the referenceable item to a corresponding token; and providing the package and the mapping.

In a second aspect, a method links code downloaded to a resource constrained computer. The method includes receiving the package; receiving a mapping of the referenceable item to a corresponding token; and linking the package using the mapping.

Advantages of the invention may include one or more of the following. The invention efficiently uses resource on a resource limited device by using smaller storage spaces through unique token identifiers. Further, the invention can link and resolve references to exported items on the resource limited device. Through metadata files such as export files, the invention allows exported elements to be published. Such publication, however, can be done so as to not expose private or proprietary elements and details of the applets and associated libraries. Thereby, various separately developed applications can be loaded onto a resource limited device and share their components with each other without compromising private secure information.

Moreover, the advantages of an architecture neutral language such as Java can be realized on a resource limited device while preserving its semantics. The tokens may also be used for internal or private elements. Thus, tokens can be assigned to private and package visible instance fields as well as package visible virtual methods. The invention imposes few constraints in assigning tokens, and the token categories may be further defined or optimized for particular applications. As such, the invention supports portable, architecture neutral code that is written once and that runs everywhere, even on resource constrained devices such as smart cards with limited storage capacity.

DRAWINGS

FIGS. 7A–7I are diagrams illustrating various class, field and method references.

DESCRIPTION

A method is described for representing linking information for object-oriented programs in a compact, secure format. Utilizing this method, said programs can be downloaded, linked and executed on a resource-constrained device. Resource-constrained devices are generally considered to be those that are restricted in memory and/or computing power or speed. Although the particular implementation discussed below is described in reference to a smart card, the invention can be used with other resource-constrained devices including, but not limited to, cellular telephones, boundary scan devices, field programmable devices, personal data assistants (PDAs) and pagers, as well as other small or miniature devices. In some cases, the resource-constrained device may have as little as 1K of RAM or as little as 16K of ROM. Similarly, some resource-constrained devices are based on an architecture designed for fewer than 32 bits. For example, some of the resource-constrained devices which can be used with the invention are based on an 8-bit or 16-bit architecture, rather than a 32-bit architecture.

Figure 1:
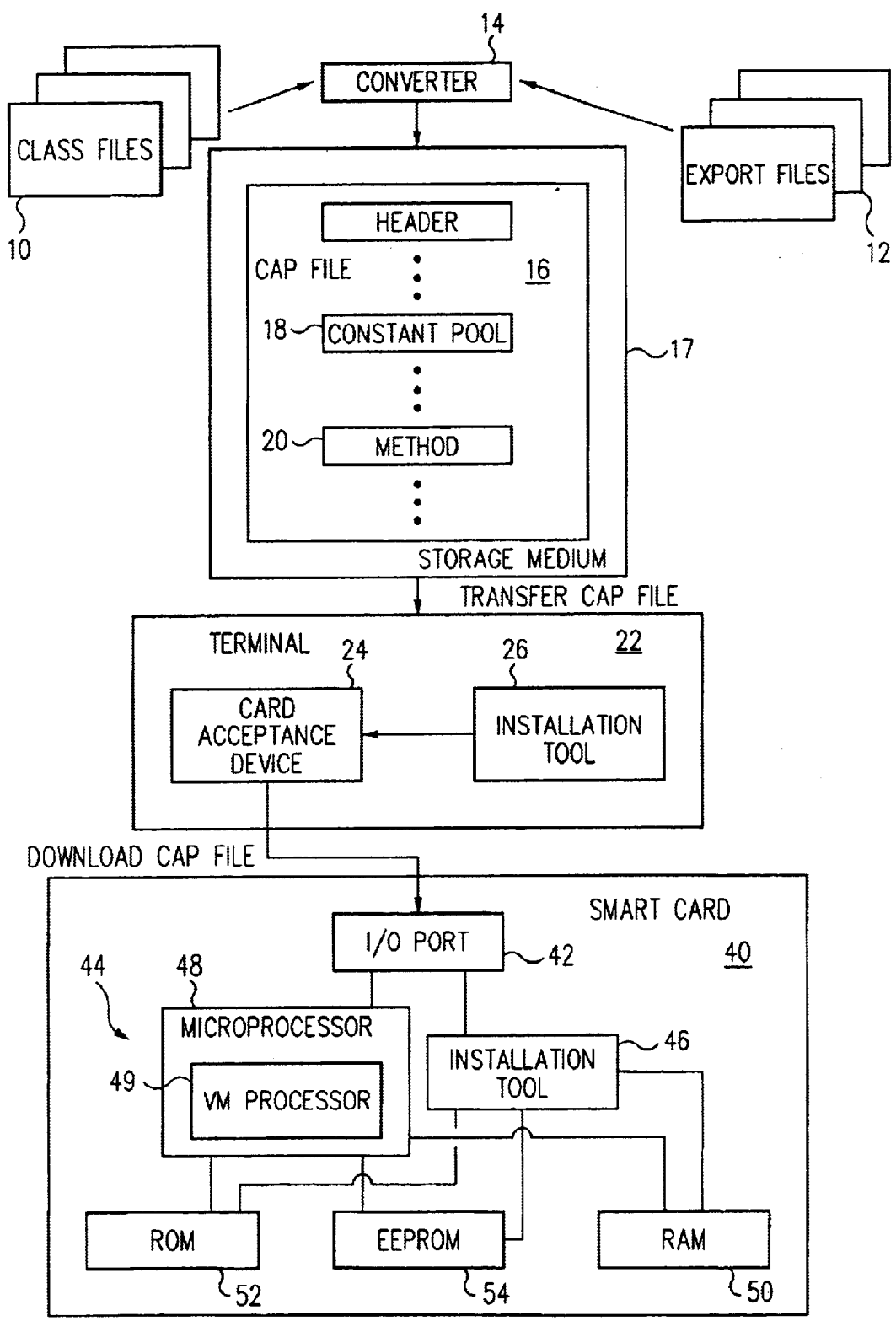
FIG. 1 illustrates the conversion and loading of hardware platform-independent code onto a smart card.

Referring to FIG. 1, development of an applet for a resource-constrained device, such as a smart card 40, begins in a manner similar to development of a Java program. In other words, a developer writes one or more Java classes and compiles the source code with a Java compiler to produce one or more class files 10. The applet can be run, tested and debugged, for example, on a workstation using simulation tools to emulate the environment on the card 40. When the applet is ready to be downloaded to the card 40, the class files 10 are converted to a converted applet (CAP) file 16 by a converter 14. The converter 14 can be a Java application being executed by a desktop computer. The converter 14 can accept as its input one or more export files 12 in addition to the class files 10 to be converted. An export file 12 contains naming or linking information for the contents of other packages that are imported by the classes being converted.

In general, the CAP file 16 includes all the classes and interfaces defined in a single Java package and is represented by a stream of 8-bit bytes. All 16-bit and 32-bit quantities are constructed by reading in two or four consecutive 8-bit bytes, respectively. Among other things, the CAP file 16 includes a constant pool component (or "constant pool") 18 which is packaged separately from a methods component 20. The constant pool 18 can include various types of constants including method and field references which are resolved either when the program is linked or downloaded to the smart card 40 or at the time of execution by the smart card. The methods component 20 specifies the application instructions to be downloaded to the smart card 40 and subsequently executed by the smart card. Further details of the structure of an exemplary CAP file 16 are discussed in the attached Appendix A at pages 53 through 94.

After conversion, the CAP file 16 can be stored on a computer-readable medium 17 such as a hard drive, a floppy disk, an optical storage medium, a flash device or some other suitable medium. Or the computer-readable medium can be in the form of a carrier wave, e.g., a network data transmission, or a radio frequency (RF) data link.

The CAP file 16 then can be copied or transferred to a terminal 22 such as a desktop computer with a peripheral card acceptance device (CAD) 24. The CAD 24 allows information to be written to and retrieved from the smart card 40. The CAD 24 includes a card port (not shown) into which the smart card 40 can be inserted. Once inserted, contacts from a connector press against the surface connection area on the smart card 40 to provide power and to permit communications with the smart card, although, in other implementations, contactless communications can be used. The terminal 22 also includes an installation tool 26 which loads the CAP file 16 for transmission to the card 40.

The smart card 40 has an input/output (I/O) port 42 which can include a set of contacts through which programs, data and other communications are provided. The card 40 also includes an installation tool 46 for receiving the contents of the CAP file 16 and preparing the applet for execution on the card 40. The installation tool 46 can be implemented, for example, as a Java program and can be executed on the card 40. The card 40 also has memory, including volatile memory such as RAM 50. The card 40 also has ROM 52 and non-volatile memory, such as EEPROM 54. The applet prepared by the controller 44 can be stored in the EEPROM 54.

In one particular implementation, the applet is executed by a virtual machine 49 running on a microprocessor 48. The virtual machine 49, which can be referred to as the Java Card virtual machine, need not load or manipulate the CAP file 16. Rather, the Java Card virtual machine 49 executes the applet code previously stored as part of the CAP file 16. The division of functionality between the Java Card virtual machine 49 and the installation tool 46 allows both the virtual machine and the installation tool to be kept relatively small.

In general, implementations and applets written for a resource-constrained platform such as the smart card 40 follow the standard rules for Java platform packages. The Java virtual machine and the Java programming language are described in T. Lindholm et al., The Java Virtual Machine Specification (1997), and K. Arnold et al., The Java Programming Language Second Edition, (1998), which are incorporated herein by reference in their entirety. Application programming interface (API) classes for the smart card platform can be written as Java source files which include package designations, where a package includes a number of compilation units and has a unique name. Package mechanisms are used to identify and control access to classes, fields and methods. The Java Card API allows applications written for one Java Card-enabled platform to run on any other Java Card-enabled platform. Additionally, the Java Card API is compatible with formal international standards such as ISO 7816, and industry-specific standards such as Europay/MasterCard/Visa (EMV).

Although a virtual machine 49 running on a microprocessor 48 has been described as one implementation for executing the bytecodes on the smart card 40, in alternative implementations, an application-specific integrated circuit (ASIC) or a combination of a hardware and firmware can be used instead.

Referring to FIG. 1, controller 44 uses an installation tool 46 for receiving the contents of the CAP file 16 and preparing the applet to be executed by a processor 48. The installation tool 46 can be implemented, for example, as a Java program which has been suitably converted to execute on the smart card 40. In the description below, it is assumed that the controller 44 comprises a virtual machine program 49 running on a microprocessor 48. The virtual machine 9 need not load or manipulate the CAP file 16. Rather, the virtual machine 49 executes the applet code in the CAP file 16. The division of functionality between the virtual machine 49 and the installation tool 46 allows both the virtual machine and the installation tool to be kept relatively small. In alternative implementations, the controller 44 can be hardwired, for example, as an application-specific integrated circuit (ASIC) or it can be implemented as a combination of a hardware and firmware.

The smart card platform, which can be used for other resource-constrained devices as well, supports dynamically created objects including both class instances and arrays. A class is implemented as an extension or subclass of a single existing class and its members are methods as well as variables referred to as fields. A method declares executable code that can be invoked and that passes a fixed number of values as arguments. Classes also can implement Java interfaces. An interface is a reference type whose members are constants and abstract methods. The virtual machine 49 may include an interpreter or native implementation which provides access to a runtime system which includes the Java Card API and supporting functionalities.

Figure 2:
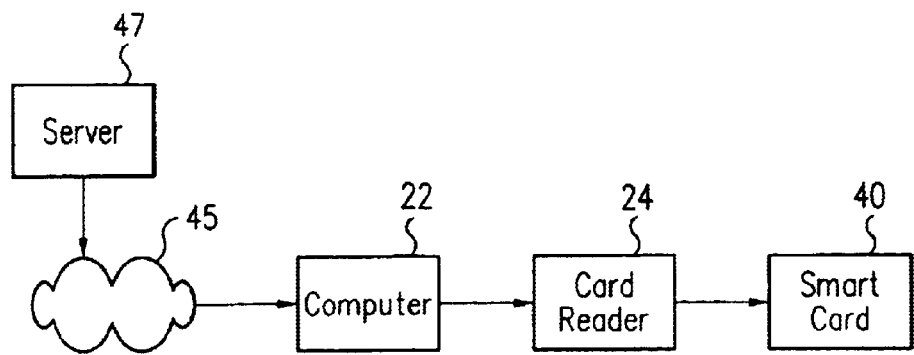
FIG. 2 shows a computer system which communicates with the smart card of FIG. 1.

As shown in FIG. 2, a computer 221 is equipped with a card acceptance device 24 for receiving the card 40 of FIG. 1. The computer 22 may be connected to a network 45 which communicates with a plurality of other computing devices, such as a server 47. It is possible to load data and software onto a smart card over the network 45 using card equipped devices. Downloads of this nature can include applets or other programs to be loaded onto a smart card as well as digital cash and other information used in accordance with a variety of electronic commerce and other applications. The instructions and data used to control processing elements of the card acceptance device and of the smart card may be stored in volatile or non-volatile memory or may be received directly over a communications link e.g., as a carrier wave containing the instructions and/or data. Further, for example, the network 45 can be a LAN or a WAN such as the Internet or other network.

Figure 3:
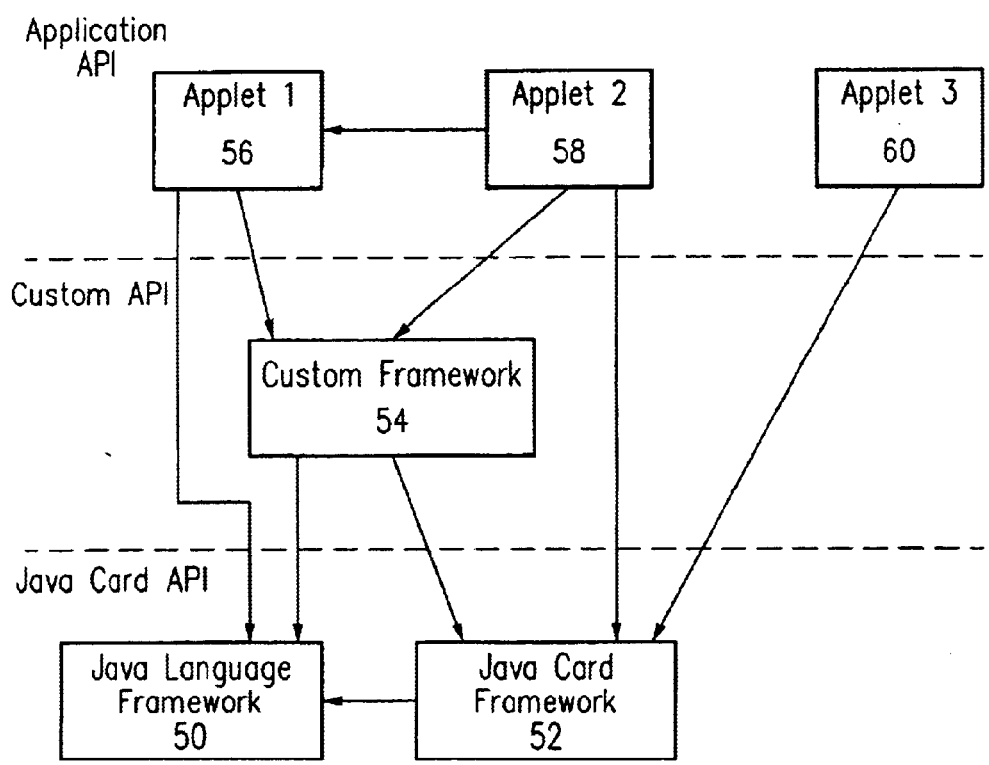
FIG. 3 shows a diagram illustrating inter-package dependencies.

FIG. 3 shows a diagram illustrating typical hierarchical dependencies among a group of program packages (including both Application Program Interfaces (APIs) and program applets) loaded onto a smart card 40. Applications may be loaded onto the smart card 40 incrementally and linked on-card for execution so that the functionality of the smart card 40 may be updated with additional capabilities in addition to factory-programmed functionalities. In the diagram, a Java language framework 50 and a Java Card framework 52 exist at a Java Card API level. Above the Java Card API level is a custom API level with one or more custom frameworks 54. The custom framework 54 may be supplied by one or more value added providers through various software development kits (SDKs) to extend an existing framework or other API. At the highest level is an application level where various applets 56, 58 and 60 reside.

As shown in FIG. 3, a package may depend on other packages at the same API level or from those packages in lower API levels. For example, the applet 58 may refer to program elements in the applet 58 and the Java Card framework 52 may have dependencies from the Java language framework 50. Moreover, the custom framework 54 at the custom API level and the applets 58 and 60 may have references that depend from the Java Card framework 52. In turn, the applets 56 and 58 may have references that depend from the custom framework 54. The applet 56 and the custom framework 54 may also depend from the Java language framework 50. Although the example of FIG. 3 shows linear dependencies, non-linear dependencies such as circular dependencies may be supported using a suitable converter 14 and installation tool 46.

The conversion of a set of class files from, e.g., a Java application, to a CAP file 74 can generally occur on a desktop computer in preparation for installation on a smart card 40. The desktop computer 22 is generally not as resource constrained as a typical smart card 40. Additionally, the converting operation may be conducted on other suitable platforms as well.

Figure 4A:
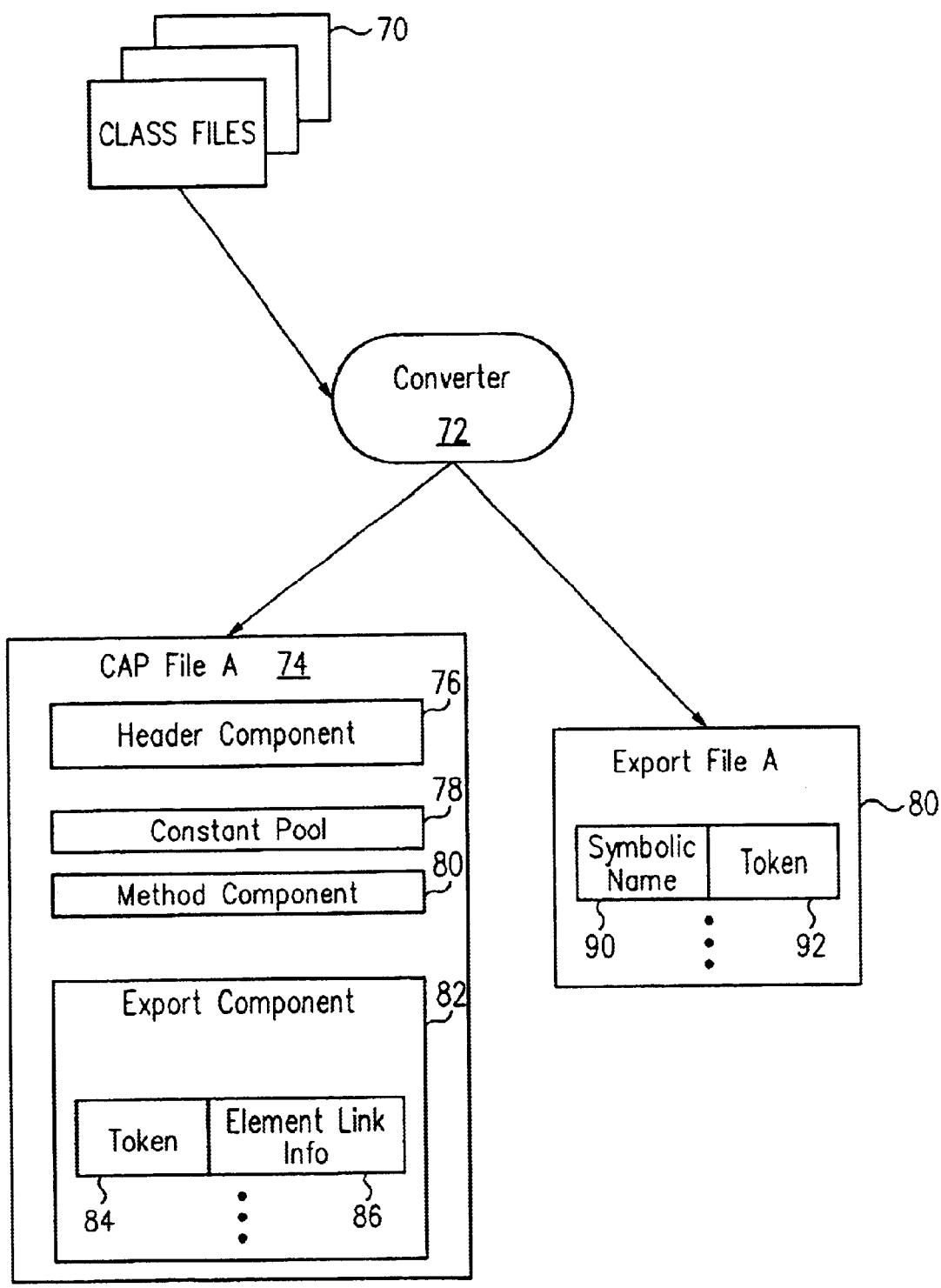
FIGS. 4A and 4B are diagrams illustrating two converter operations.

FIG. 4A shows a system for converting a package, which may define an applet or a library in preparation for downloading onto smart card 40. Converter 72 receives data input from one or more class files 70, which define the functionality of an applet. The converter 72 in turn generates a Java Card CAP file 74 suitable for downloading.

As discussed in greater detail below, the CAP file 74 contains an export component 82 for resolving references to elements in its package, where those elements may be referenced by other packages. The export component 82 contains entries for static items such as classes, methods and fields. References to dynamic items such as instance fields, virtual methods and interface methods are not required to be presented in the export component, but may be handled according to processes described below.

In resource constrained devices, the use of Unicode strings to represent items consumes memory and processor resources. In place of strings, the export component 82 maps tokens, or simple unique numerical values, to particular elements defined in other components in the CAP file 74. The token values used to represent these elements in the export component match those published in a corresponding Export File 80.

In more detail, CAP file 74 has, among others, a header component 76, a constant pool 78, a method component 80, and an export component 78. The constant pool 78 typically includes one or more class, field and method references so that generally references to program elements or items are made indirectly through the package's constant pool 78. Method component 80 contains all the methods implemented by the applet package represented by CAP file 74. Method references resolve to methods located in the method component. Class and static field references resolve to locations in class components and static field components, respectively. These are described further in Appendix A.

Export component 78 includes one or more entries with a token value 84 and corresponding program element link information 86 that describes where in the package defined in the CAP file A 74 a particular program element is to be found. The link information is specific to the content of the CAP file 74, not the internal representation on a particular card. This component, therefore, does not describe card-specific private or secure information.

Converter 72 can also generate an Export file 80 during conversion of class files into a CAP file 74. One Export file is generated for each CAP file. Export file 80 typically has one or more entries with a symbolic name 90 for a particular program element in CAP file 74 and its corresponding token value 92. Export file 80 provides information about each externally accessible program element of the package of class files and program information in CAP file 74 that may be referenced (imported) by a second package into a second CAP file (described further below). For example, Export file 80 contains references to all of the public classes and interfaces defined in one Java package, and all of the public and protected fields and methods defined in those classes and interfaces. The Export file 80 also contains a mapping of these program elements or items to tokens which can then be used to map names for imported items to tokens during package conversion. The export file does not expose private or proprietary details of the applets and associated libraries. Thereby, various separately developed applications can be loaded onto a resource limited device and share their components with each other without compromising private secure information. The Export file 80 does not expose private or proprietary elements and details of the applets and associated libraries, separately developed applications can be loaded onto the card 40 and share their exported elements with each other without compromising private secure information.

With reference to FIGS. 3 and 4A, if a number of class files 70 comprising javacard.framework API 52 were being converted, the Export file 80 generated during conversion would allow other applet programs, being converted separately, to know which tokens to use in order to externally reference items of the javacard.framework.API. For instance, if an applet references the framework class PIN, the Export file 80 for the javacard.framework contains an entry for class javacard.framework.PIN along with its respective token. Converter 72 would place this token in the constant pool of the CAP file of the new applet, to represent an unresolved reference to that class in the framework. As explained further below, during applet execution, the token can be used to locate the referenced item in the export component 78 of the framework API package to retrieve the element link information. For example, the link information of a method may provide information to locate the appropriate method contained in the method component 80 of that package.

Figure 4B:
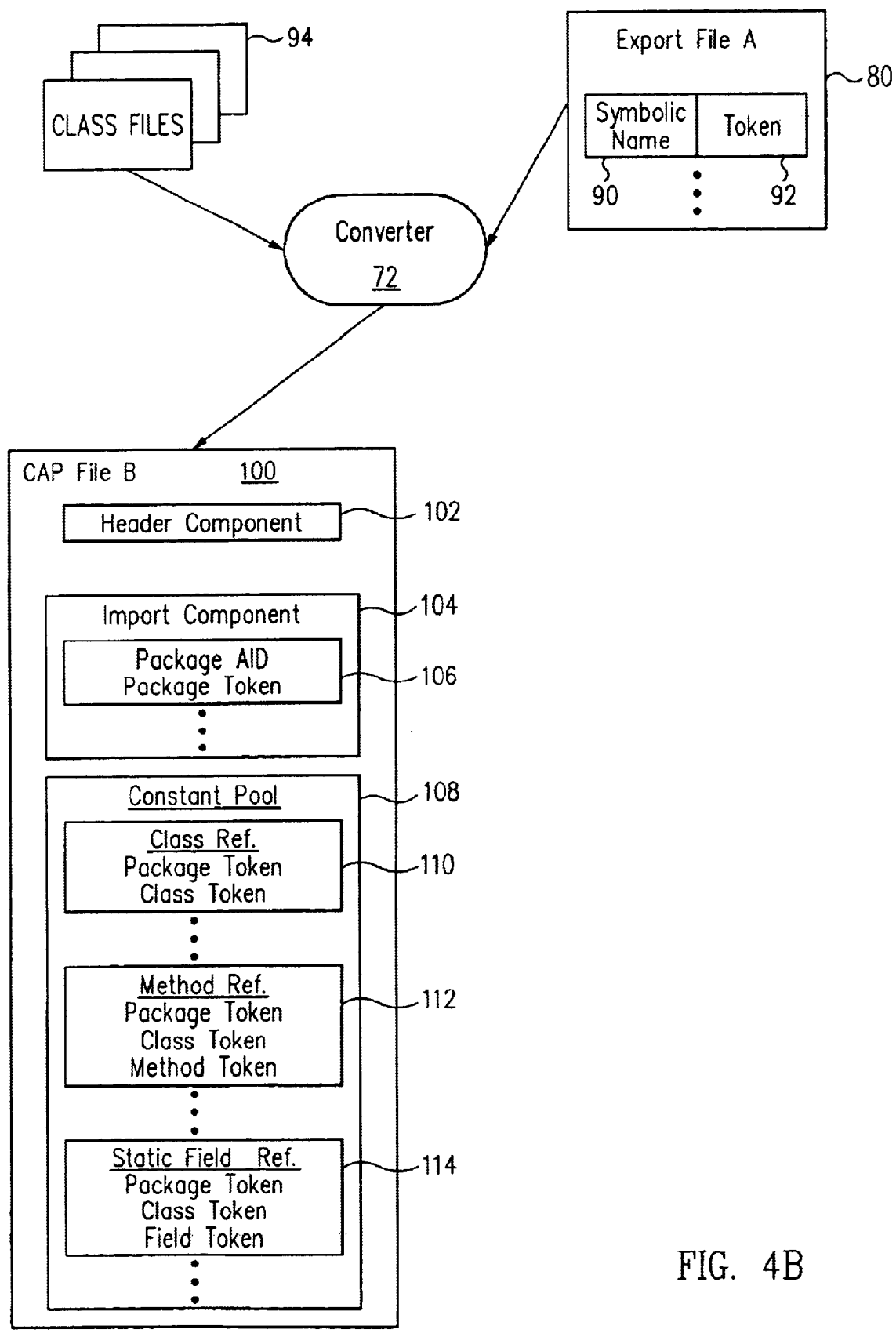

FIG. 4B shows converter 72 converting a second package of class files 94, where those class files 94 import elements from the class files from the first package 70 (FIG. 4A). For example, the second package can be a set of applet classes that rely upon certain classes contained, e.g., in a javacard-.framework library package, that has been previously converted (as described above with respect to FIG. 4A). Converter 72 receives data input from class files 94 and from one or more Export files 80 from previously converted packages. Converter 72 generates a CAP file 100 suitable for downloading onto, e.g., the smart card 40.

CAP file B 100 for the second package includes an import component 104 with a list of all packages referenced by the applet classes. Each such external package reference comprises a mapping 106 between an internal package token and an external unique Application Identifier (AID) for that package. Each package token is used in other components within CAP file 100 to identify a particular referenced external package in a concise manner, thereby reducing the footprint size of the representation of the applet.

The CAP file 100 also has, among others, a header component 102, an import component 104 and a constant pool 108. The constant pool 108 includes one or more class references 110, which map each class reference with corresponding package tokens, and class tokens, thereby mapping the specified class to its corresponding external package and class within that package. The use of these tokens is further described below. The constant pool 108 can also include one or more method references 112 which similarly map each method reference with corresponding package tokens, class tokens and method tokens. The constant pool 108 can also include one or more field references 114, each with its package token, class token, and field token, respectively.

Generally, references to program elements or items are made indirectly through the constant pool 108 of each package. References to items in other packages are called external, and are represented in terms of tokens. References to items in the same CAP file are called internal, and can be represented either in terms of tokens, or in a different internal format (such as pointers to locations within the CAP file). For example, the external reference 110 to a class is composed of a package token and a class token. Together those tokens specify a certain class in a certain external package. An internal reference to a class may be a pointer to the class structure's location within the CAP file. Alternatively, the external token system can be used internally as well. The external references 112–114 refer to a static class member, either a field or method, with a package token, a class token, and a token for the static field or static method. An internal reference to a static class member may be a pointer to the item's location in the CAP file, but can also use the token system. References to instance fields, virtual methods and interface methods consist of a class reference and a token of the appropriate type. The class reference indicates whether the reference is external or internal.

External references in a CAP file can be resolved on a card from token form into the internal representation used by the Java Card virtual machine. A token can only be resolved in the context of the package which defines it. Just as the export file maps from a package's externally visible names to tokens, there is a set of link information for each package on the card that maps from tokens to resolved references. In this manner, the converter 97 processes both the class files 92 and Export file 94, creating an image suitable for downloading the applet onto a resource limited device and resolving references (linking) to the first package.

Figure 5:
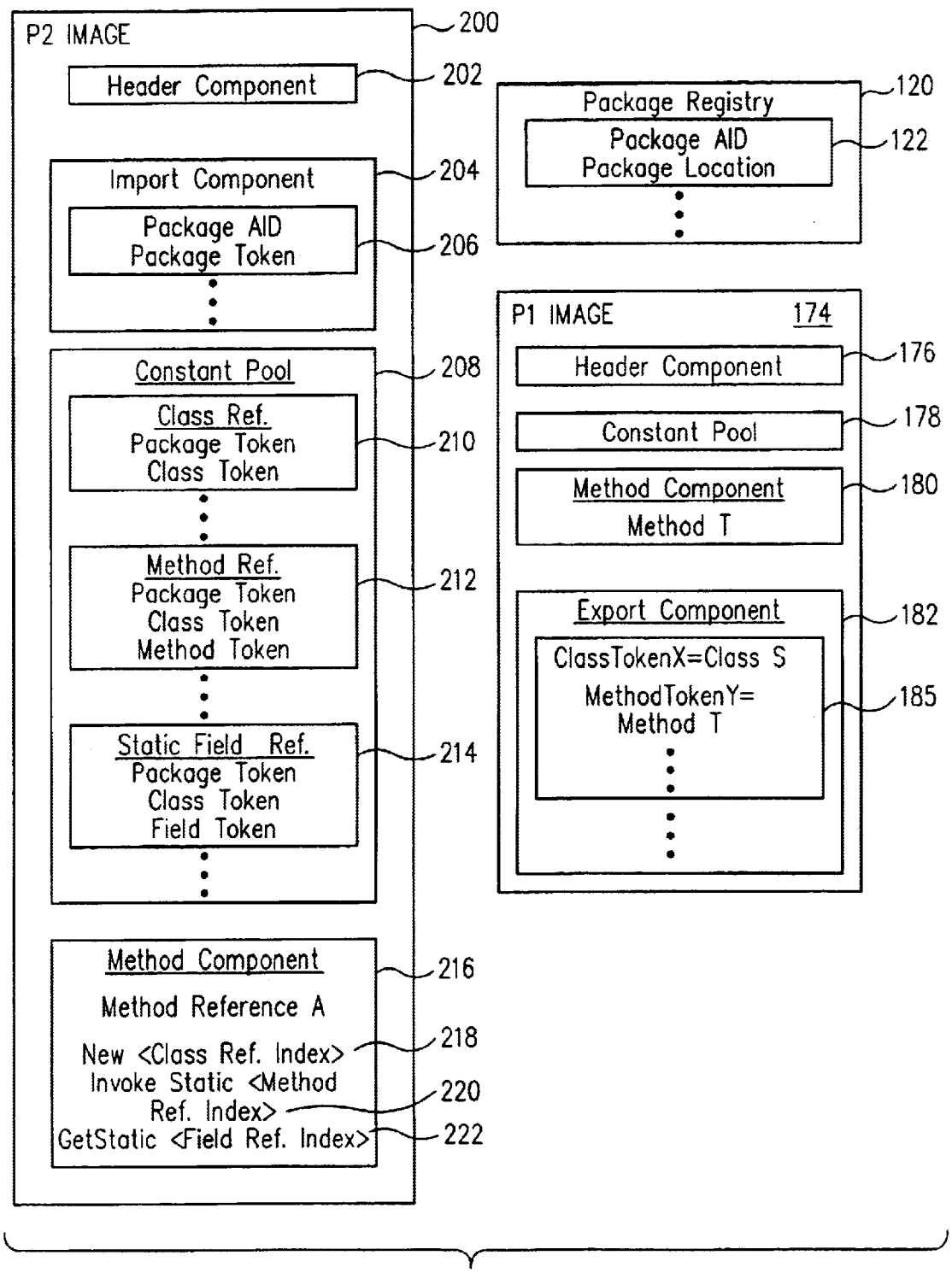
FIG. 5 is a diagram illustrating two packages and a package registry for resolving static references.
Figure 6:
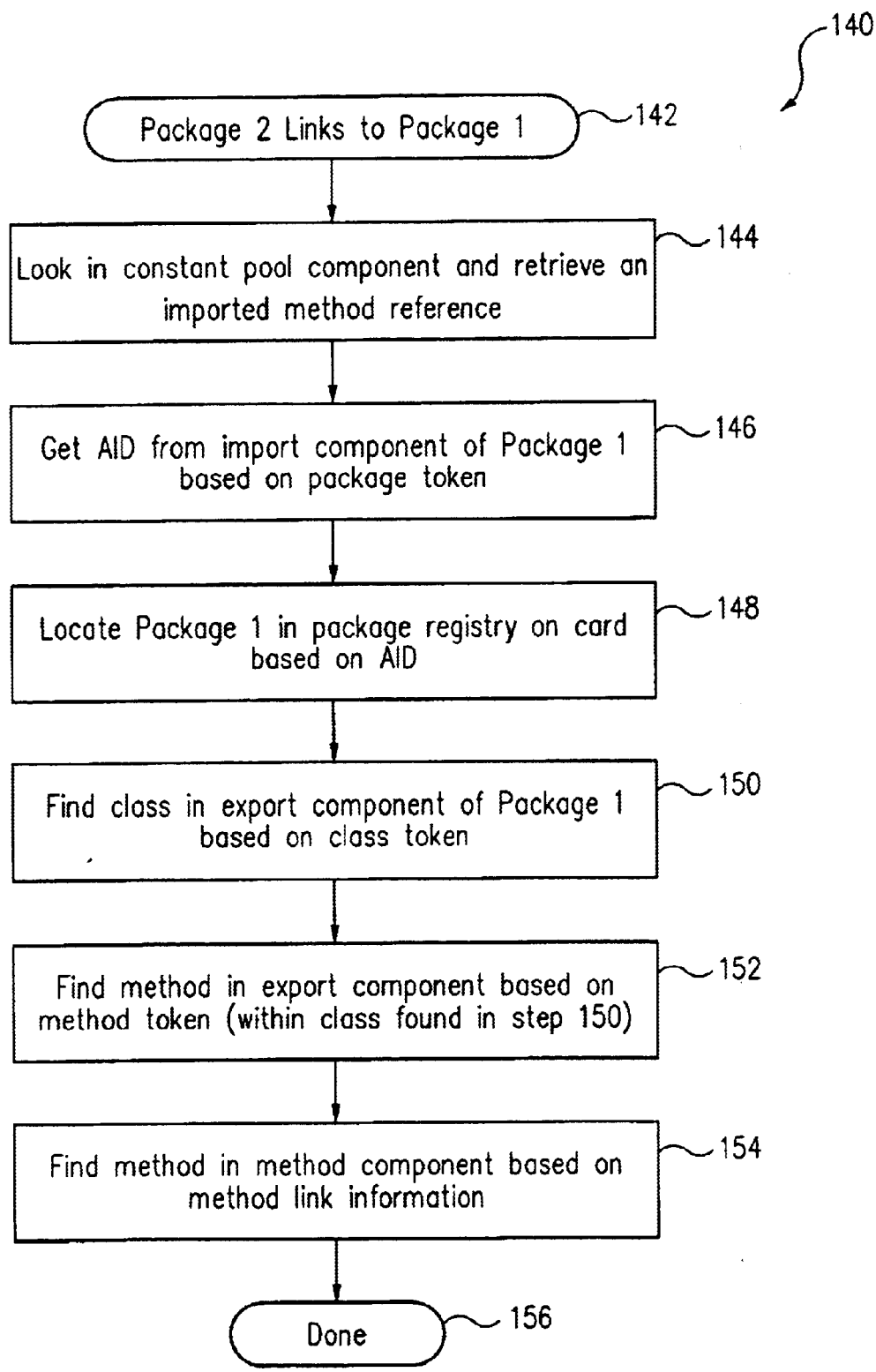
FIG. 6 is a flowchart illustrating a linking process in conjunction with the packages of FIG. 5.

After the pre-processing performed in FIGS. 4A and 4B, the CAP file of FIG. 4B may be downloaded to the smart card 40 or a resource constrained device that contains the CAP file of FIG. 4A. FIGS. 5 and 6 illustrate in greater detail how token-based linking is done for static elements on the smartcard 40 or a small device. The static elements include elements whose exact representations are identifiable by the converter during the conversion process.

In FIG. 5, an image 200 of a package P2 has been loaded from, e.g., CAP File B 100, onto card 40 and can be linked to a prior package P1 prior to or during execution. Program elements in package P2 200 may include references to methods and other data in external package P1 which already exists as an image 174 on card 40 (of CAP File A 74). The image 174 includes, among other things, a header component 176, a constant pool 178, a method component 180, and an export component 182 which contains a list of tokens for all exported static items 185. To aid the resolution of the reference to an external package, a package registry 120 is created on card 40 to provide information used to locate one or more external packages, including image 174 of package P1 which contains particular methods required by image 200 of the package P2.

The image 200 of the package P2 includes, among other things, a header component 202, an import component 204, a constant pool 208, and a method component 216, all corresponding to the respective components 102, 104, 108, and 116 in CAP file B 100. The general organization of these components is described above with respect to the CAP files and in Appendix A. Typically, the method component 216 will include program references such as "new" (218), "invokestatic" (220) and "getstatic_b" (222) along with their respective invoked class references, method references, and field references.

FIG. 6 shows a link process 140 for package P2 200 of FIG. 5. When an executing method in method component 216 invokes a particular method, e.g., Method T, in method component 180 that is located in an external package (package 1), linking is required (step 142). Using the index provided as an operand to the instruction, the process 140 locates and retrieves in constant pool 208 the matching method reference 212 (step 144). As described below, the method reference consists of a package token, class token, and method token which are used to locate that particular method in an external package. Next, process 140 examines the import component 204 to find the unique AID of external package P1 based on the retrieved package token (step 146). Package registry 120 is then examined to find the location of the package P1 based upon the AID (step 148). Once the image 174 for package P1 is found from package registry 120, export component 182 of image 174 is searched to locate the class with the specified class token (step 150). The program link information for the desired method, e.g., Method T, is then found by searching the list of methods associated with the particular class found in step 150, to locate the method with the specified method token (here method token Y corresponds to Method T of package P1 174) (step 152). Finally, the location of the specified method, e.g., Method T, in method component 180 is determined based on the link information provided for the method in the export component 182 (step 154).

Using the process of FIG. 6, a package may be downloaded onto a card and prepared for execution by a virtual machine. This process is called "installation." Various installation processes may be used which differ in the order of processing and linking operations (when the data is received on the card and when it is stored). These installation processes may be optimized based on available resources on the card. In one implementation, no linking occurs and as such, as data is received, it is immediately stored. During interpretation or execution of the code, resolution of external references occur. As such, this implementation is used in a larger (less constrained) small device because all temporary link information is stored permanently on this card.

As discussed above, instead of Unicode strings as are used in Java class files, tokens are used to identify items in a CAP file and to resolve references on the resource limited device. Tokens for an API are assigned by the API's developer and published in the package export file(s) for that API. Since the name-to-token mappings are published, an API developer may choose any order for tokens within constraints of the invention.

Together, FIGS. 5 and 6 describe resolution of references to static items, that is, classes, static fields, and static methods. The implementations of these items are fully locatable during compilation and conversion. In contrast, during compilation and conversion, references to instance fields, virtual methods and interface methods are not statically bound to particular implementations. Those items require additional information which is only available with reference to an instance at runtime. Reference resolution to these types are described in reference to FIGS. 9A–9C.

Token assignments for virtual methods preserve relationships within object oriented class hierarchies. Tokens for virtual methods and interface methods are used as indices into virtual method tables and interface method tables, respectively. A particular card platform can resolve tokens into an internal representation that is most useful for that implementation of a resource limited device VM.

Some tokens may be resolved to indices. For example, an instance field token may be resolved to an index into a class instance. In such cases, the token value can be distinct from and unrelated to the value of the resolved index.

Each kind of item in a package has its own independent scope for tokens of that kind. Sample token range and assignment rules for each kind of reference are listed below. Other ranges and assignments of tokens can be made.

| Token Type | Range | Type | Scope |
| --- | --- | --- | --- |
| Package | 0–127 | Private | CAP file |
| Class (Including Interfaces) | 0–255 | Public | Package |
| Static Field | 0–255 | Public | Class |
| Static Method | 0–255 | Public | Class |
| Instance Field | 0–255 | Public or Private | Class |
| Virtual Method | 0–127 | Public or Private | Class Hierarchy |
| Interface Method | 0–127 | Public | Class |

Figure 7D:
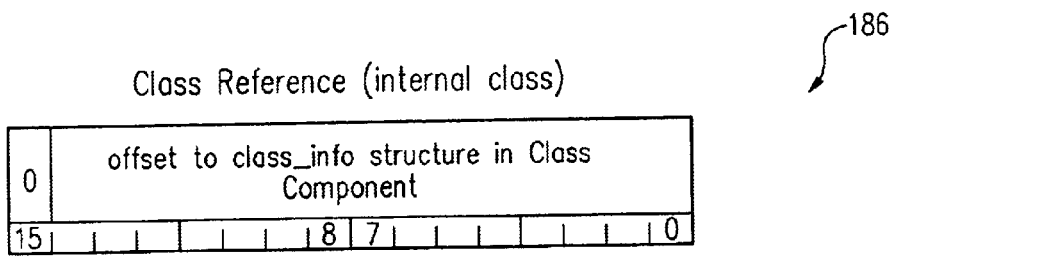

FIGS. 7A–7I are diagrams illustrating representations of references. FIGS. 7A–7C describe references to imported elements, while FIGS. 7D–7I describe references to internal items, some of which use tokens as well.

FIG. 7A shows a class reference to an external class 180. The class reference of FIG. 7A includes a package token and a class token. FIG. 7B shows a representation of an external field reference. The external field reference 182 includes a package token, a class token and a field token. FIG. 7C shows a representation of an external method reference 184. The external reference 184 includes a package token, a class token, and a method token. It is to be noted that, for virtual methods, the high bit of the method token is set to zero. The setting of the high bit indicates that the method is accessible outside of the defining package. The high bit may be the most significant bit such as the 7th bit of a byte, 15th bit of a word, or the 23rd bit of a three-byte unit.

The high bit of a package token is set to indicate an imported package. This is used to distinguish between external and internal references. As shown in FIGS. 7D–7I, references to internal elements have their high bits set to zero. The formats of FIGS. 7D–7I are examples of extending token usage, in selected cases, to internal items.

Figure 7E:
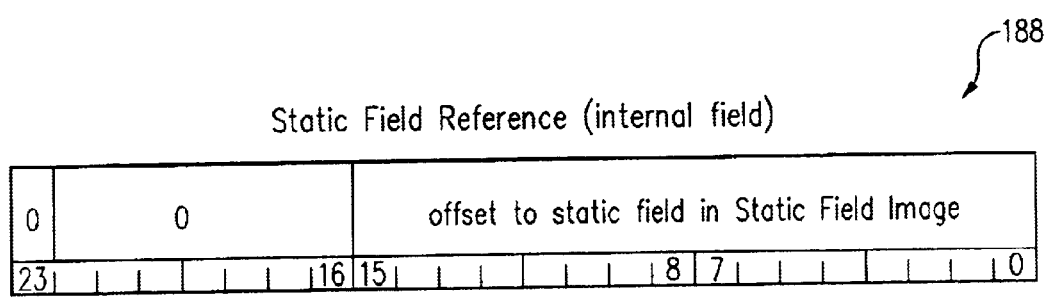
Figure 7F:
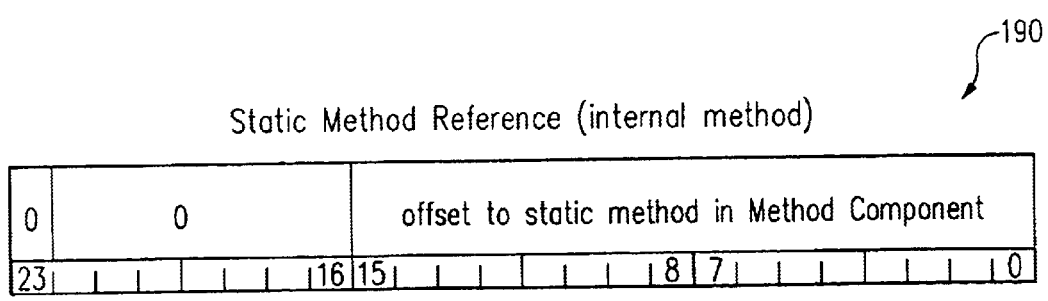

FIG. 7D shows a representation of an internal class reference 186. The internal class reference 186 includes an offset to a class information structure in the class component. FIG. 7E shows a representation of a static field reference 188 for an internal field. As such, the static field reference 188 has a field which is set to zero and a field for including an offset to a static field in the static field image. FIG. 7F is a representation of a static method reference 190 for internal methods. The static method reference 190 includes a field of padding, that is set to zero, to make the reference the same size as an imported method reference. The static method reference 190 also includes a field which provides information relating to an offset to a static method in the method component.

FIG. 7G shows a representation of an instance field reference 192 for an internal field. In FIG. 7G, the instance field reference 192 includes an offset to a class information structure in the class component, as well as a field token. FIG. 7H shows a virtual method reference 194 to a public or protected method for an internal method. The virtual method reference 194 includes an offset to a class information structure in the class component, a field which is cleared to indicate an externally accessible virtual method and to conform to the format in FIG. 7C. The virtual method reference 194 also includes a method token.

Finally, FIG. 7I shows a representation of a virtual method reference 196 to a package visible method for internal methods. The virtual method reference 196 includes an offset to the class information structure and the class component, a field which is set to one indicating that the reference's scope is internal to the package. The reference 196 also includes a method token.

Figure 8A:
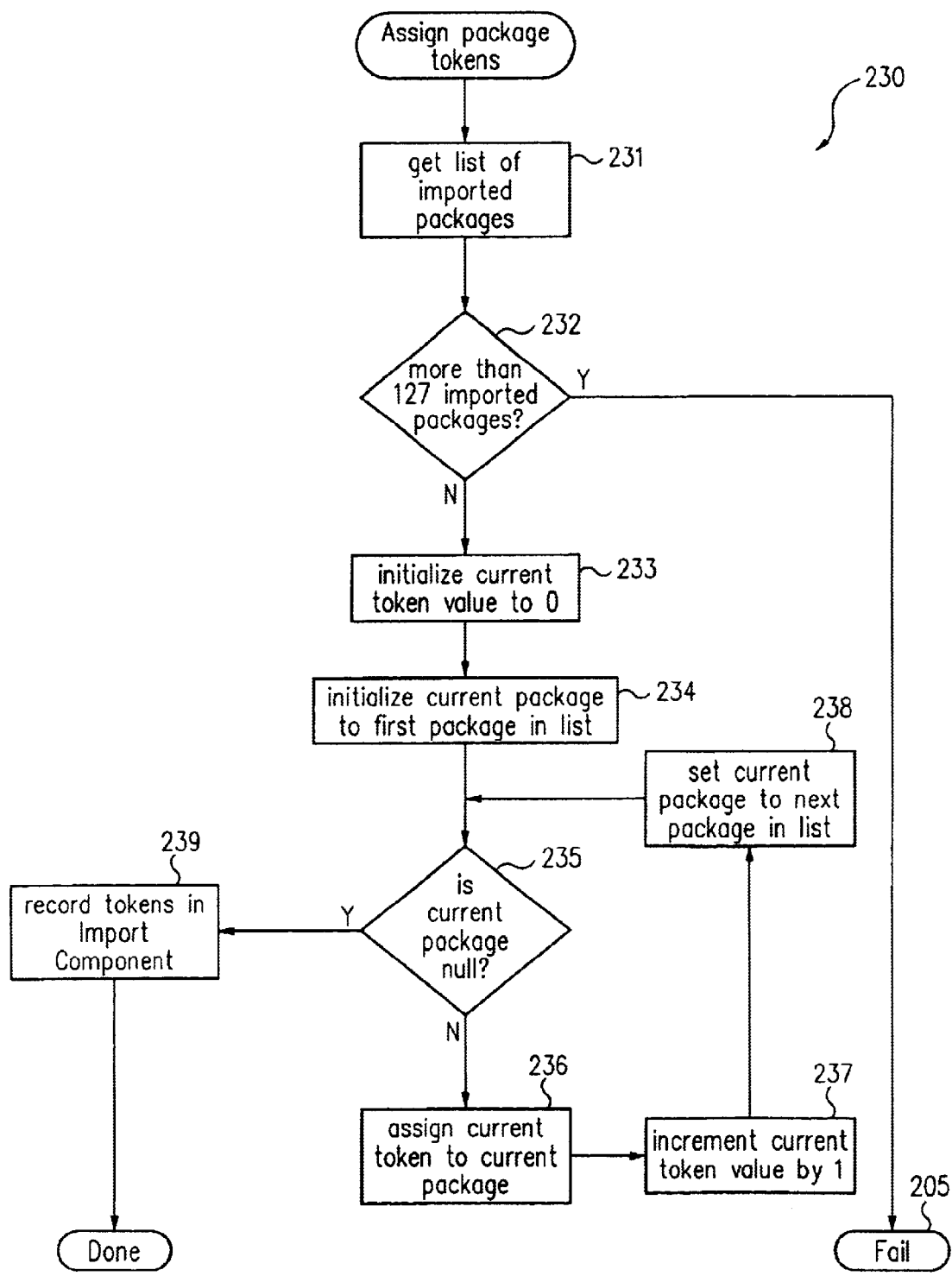
FIGS. 8A–8I are flowcharts illustrating processes for assigning tokens and supporting tables.

FIGS. 8A–8I are flowcharts illustrating processes for assigning tokens and constructing virtual method tables and interface method tables. These processes can be performed by a converter 72, as discussed above. Referring now to FIG. 8A, a process 230 for assigning package tokens is shown. Generally, package references from within a CAP file are assigned tokens which are used only in the CAP file.

The process 230 first obtains a list of imported packages (step 231). The list can be in any order. Next, the process 230 checks whether the number of packages being imported exceeds a predetermined threshold such as 127 (step 232). In this case, a limit of 127 is used in order to represent a package token in 8-bits, with the high bit reserved. If the number of imported packages exceeds the predetermined threshold such as 127, the process fails (step 205).

Alternatively, the process 230 initializes the current token value to zero (step 233). Next, the process 230 initializes the current package to the first package in the list (step 234). The process 230 then checks whether the current package is null (step 235). If not, the process 230 assigns the current token to the current package (step 236). Next, the process 230 increments the current token value by one (step 237), and sets the current package to the next package in the list (step 238).

From step 235, in the event that the current package is null, indicating there are no more imported packages, the process 230 records the token in an Import component (step 239) and exits. References to items in imported packages use token values recorded in the imports component.

Figure 8B:
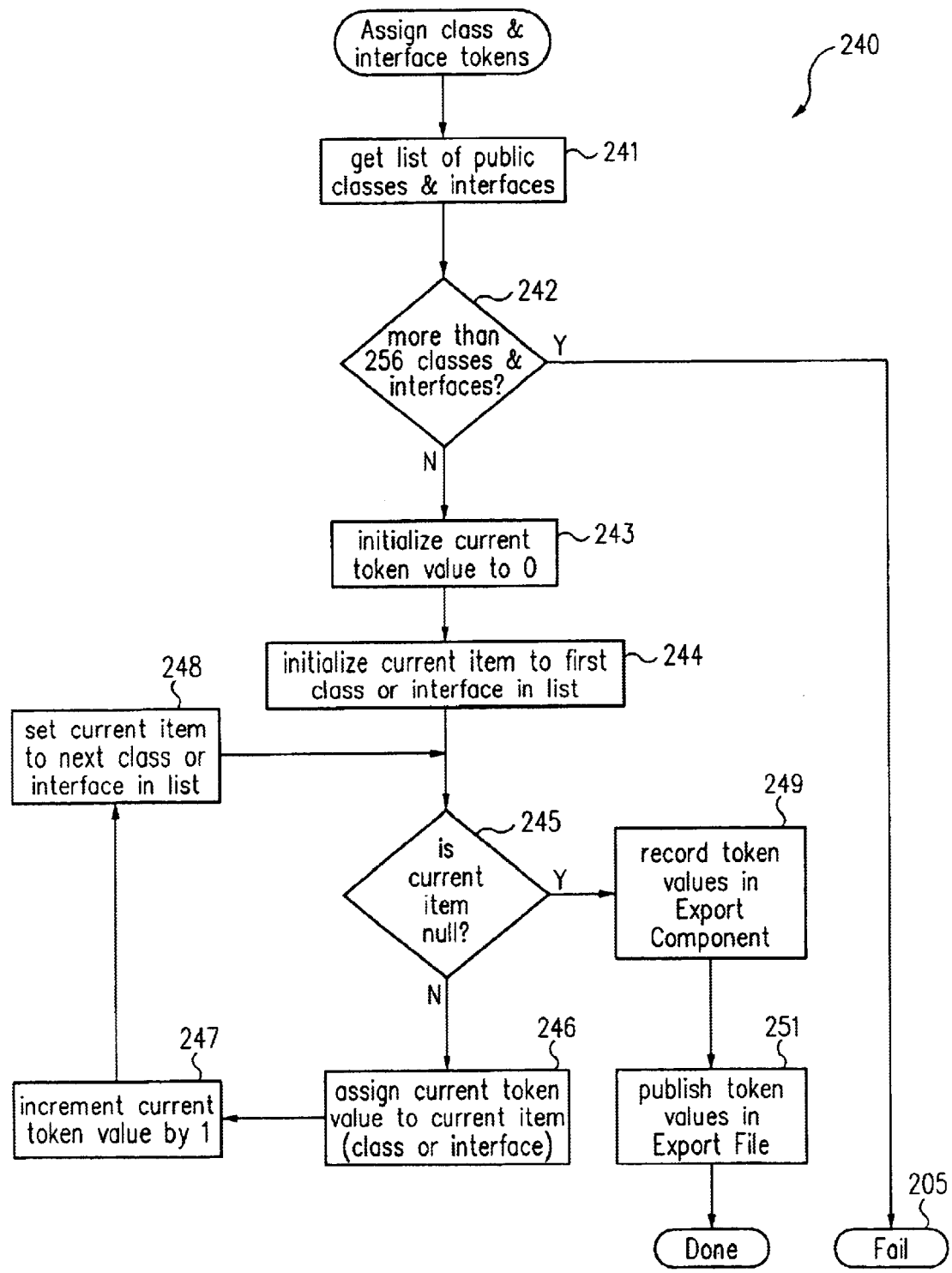

Turning now to FIG. 8B, a process 240 for assigning class and interface tokens is shown. The process 240 first obtains an arbitrarily ordered list of public class and interfaces (step 241). Next, it checks whether the number of classes and interfaces exceed a predetermined value such as 256 which is the maximum number of classes that can be represented in 8-bits (step 242). If so, the process 240 fails (step 205). Alternatively, the process 240 initializes the current token value to zero (step 243). It also initializes the current item to the first class or interface in the list obtained in step 241 (step 244). Next, the process 240 determines whether the current item is null which indicates that no more classes or interfaces remain in the list (step 245). If not, the process 240 assigns a current token value to the current item, which may be a class or an interface item (step 246). Next, the process 240 increments the current token value by one (step 247) and sets the current item to the next class or interface in the list (step 248) before looping back to step 245. From step 245, in the event that a current item is null, indicating no more classes or interfaces exist in the list, the process 240 records a token value in the Export component table (step 249). Additionally, the process 240 publishes the token values in the export file (step 251) and exits.

Figures 1, 8C:
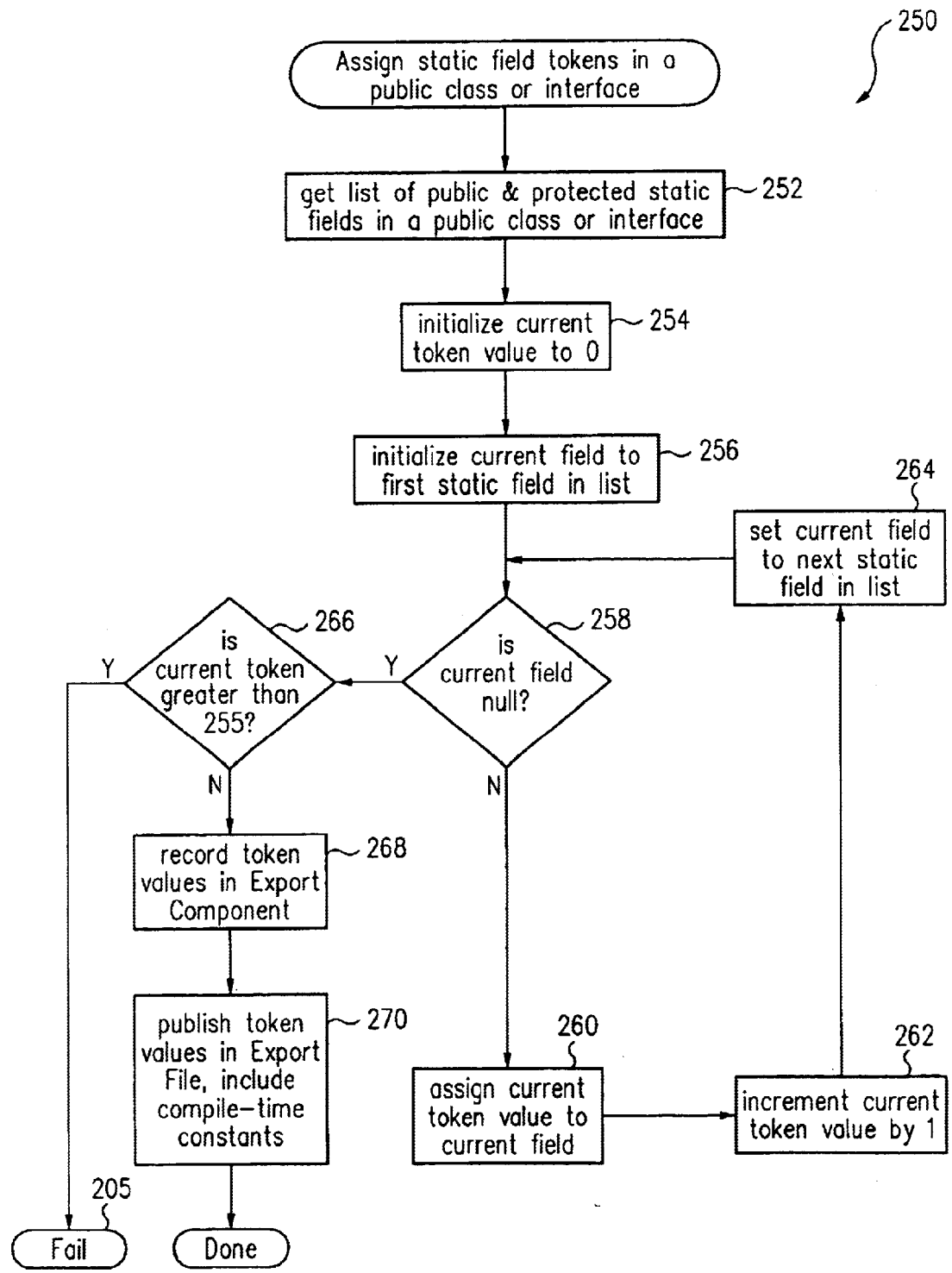
Figures 2, 8C:
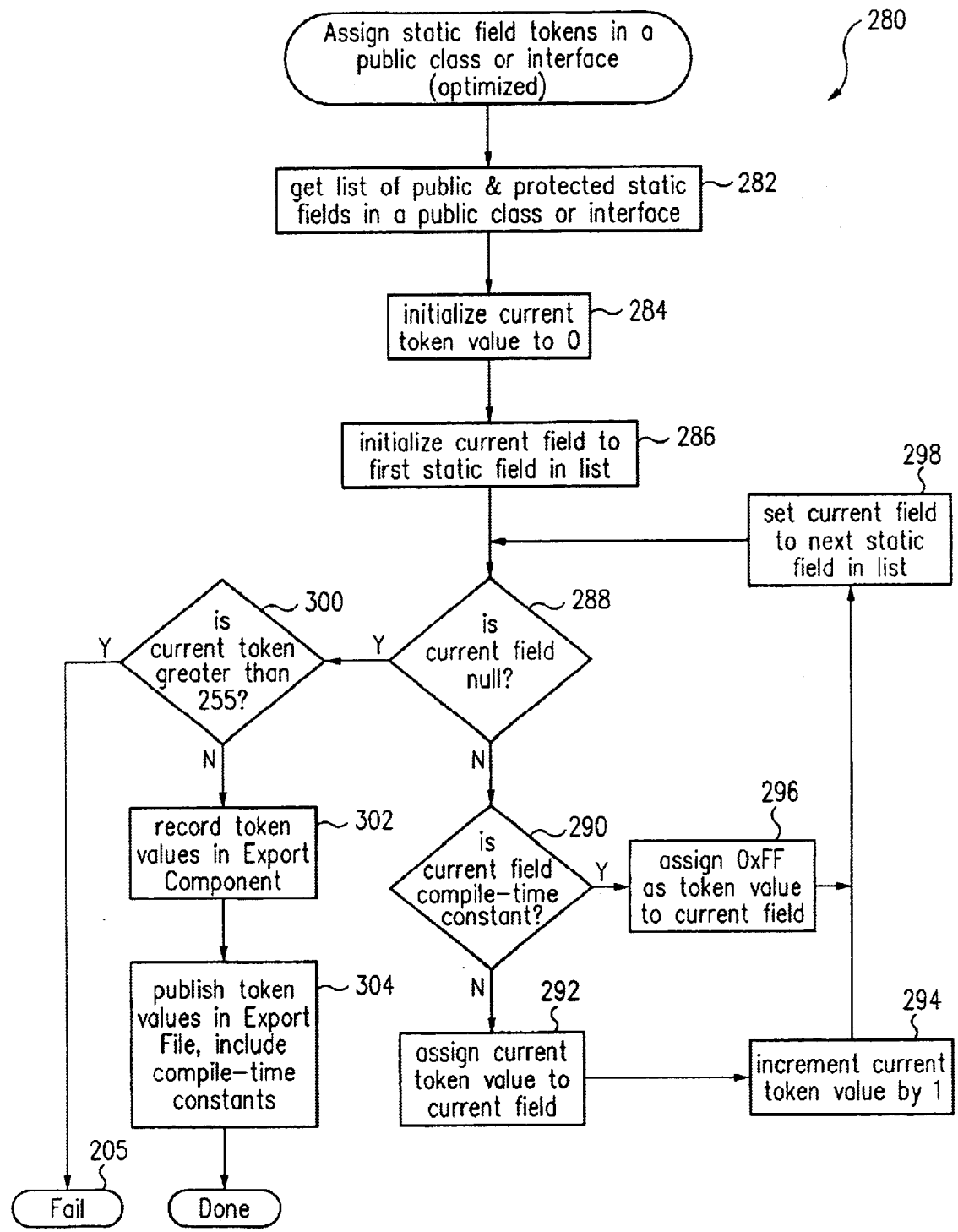

FIGS. 8C-1 and 8C-2 handle the static field tokens, with FIG. 8C-2 being an optimized version of FIG. 8C-1 by inlining compile-time constants. Externally visible static fields in a package are assigned public tokens. Package-visible and private static fields are not assigned tokens. FIG. 8C-2 describes a process 280 which is an optimization of process 250. In this optimization, tokens are not assigned for final static fields which are initialized to compile-time constants. In this case, the fields are not linked on-card.

Turning now to FIG. 8C-1, a process 250 is shown for assigning static-field tokens in a public class or interface. The process 250 first obtains an arbitrarily ordered list of public and protected static fields in the public class or interface (step 252). Then the process 250 sets the current token value to zero (step 254) and initializes the current field to the first static field in the list (step 256). The process 225 then determines whether the current field is null, indicating no more fields are left (step 258). If not, the process 250 assigns the current token value to the current field (step 260) and increments the current token value by one (step 262). The process 250 then sets the current field to the next static field in the list (step 264) before it loops back to step 258.

From step 258, in the event that the current field is null, indicating no more fields are left, the process 250 determines whether the current token is greater than a predetermined value such as 255 which is the maximum number of tokens that can be represented in 8-bits (step 266). If so, the process 250 fails (step 205). Alternatively, the process 250 records the token values in the export component table if the export component is to be generated (step 268). Finally, the process 250 publishes the token values in the export files (step 270).

Referring now to FIG. 8C-2, a process 280 which optimizes the assignment of static field tokens in a public class or interface is shown. The optimization reduces memory consumption by eliminating compile-time constants and replacing references to the constants inline in the bytecode. The process 280 obtains a list of public and protected static fields in a public class or interface (step 282). The process 280 then sets the current token value to zero (step 284) and initializes the current field to the first static field in the list (step 286). The process 280 then checks whether the current field is null (no more fields) (step 288). If not, the process 280 determines whether the current field is a compile-time constant (step 290). If so, the process 280 assigns a value such as 0xFF as a token value of the current field (step 296). Alternatively, if the current field is not a compile-time constant, the process 280 assigns a current token value to the current field (step 292) and increments the current token value by one (step 294). From step 294 and 296, the process 280 then sets the current field to the next static field in the list (step 298) before looping back to step 288 to continue processing the tokens.

From step 288, in the event a current field is null (no more fields), the process then checks whether the current token exceeds a predetermined threshold such as 255 which is the maximum numbers that can be represented using 8-bits (step 300). If so, the process 280 fails (step 205). Alternatively, if exporting, the process 280 records the token values in the export component (step 302). The process then publishes the token values in the Export file with the compiled time constants (step 304) so referencing packages can inline the respective values, before exiting.

Figure 8D:
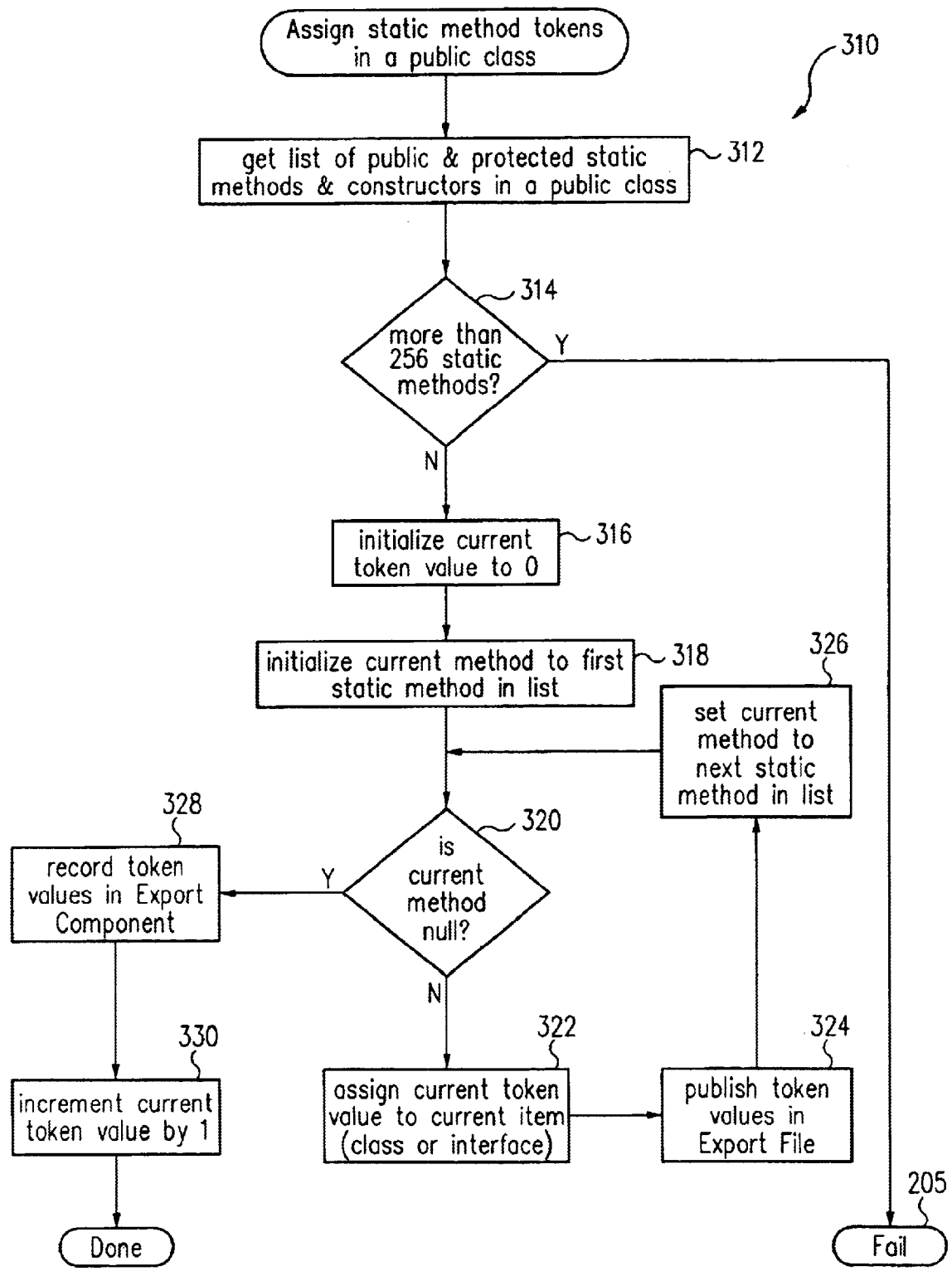

Turning now to FIG. 8D, a process 310 for assigning static method tokens in a public class is shown. The process 310 first obtains a list of public and protected static methods and constructors in a public class (step 312). The process 310 then checks whether the number of static methods exceed a predetermined value such as 256 (step 314). If not, the process sets the token value to zero (step 316) and initializes the current method to the first static method in the list (step 318). Next, the process 310 checks whether the current method is null (no more methods) (step 320). If not, the process 310 assigns a current token value to the current static method (step 322) and increments the current token value by one (step 324). The process 310 then sets the current method to the next static method in the list (step 326) before looping back to step 320.

From step 320, if the current method is null (no more methods) the process records the token value in the export component (step 328) and publishes the token values in the export file (step 330) before exiting.

Figures 1, 8E:
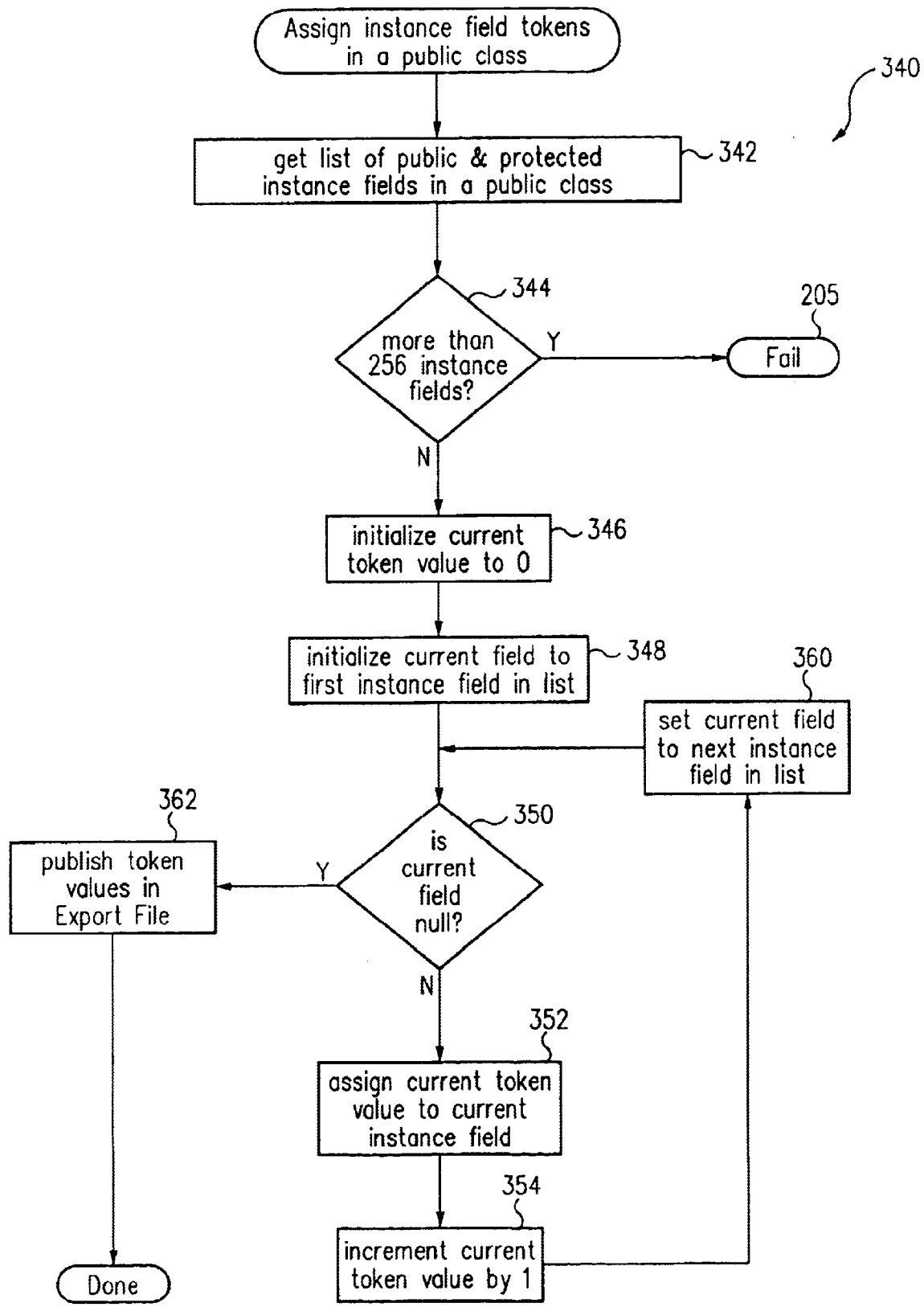
Figures 2, 8E:
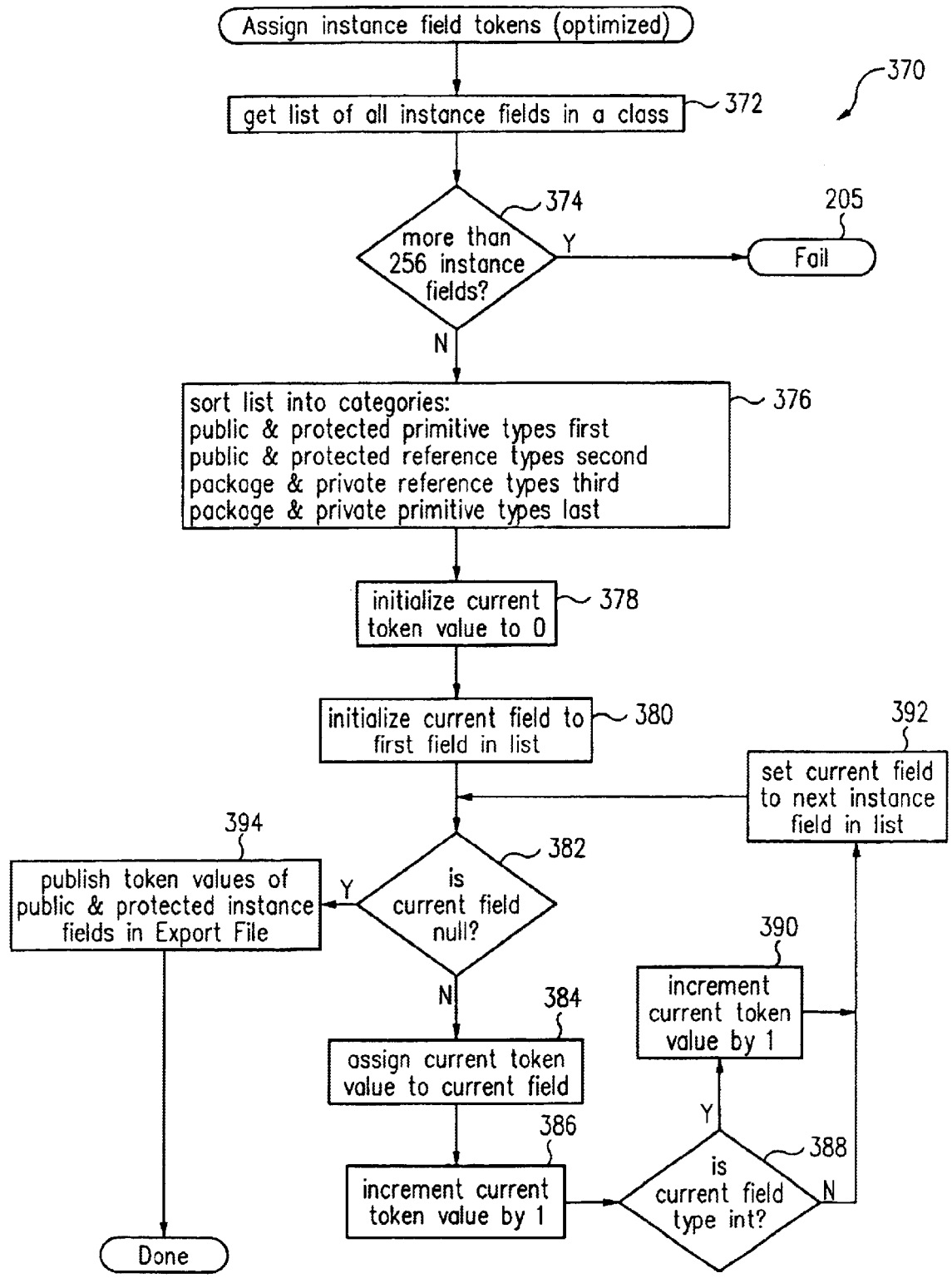

FIGS. 8E-1 and 8E-2 relate to instance field token assignment schemes. FIG. 8E-1 shows a general process for assigning field tokens, while FIG. 8E-2 is one optimized process which extends token assignments to internal (or package-visible and private) fields, groups fields of type reference and allows tokens to be easily mapped to offsets within instances.

Turning now to FIG. 8E-1, a process 340 for assigning instance field tokens in a public class is shown. First, the process 340 gets a list of public and protected instance fields in a public class (step 342). It then checks whether the number of instance fields exceeds a predetermined value such as 256 (step 344) and if so, fails (step 205). Alternatively, the process 340 sets the current token value to zero (step 346) and initializes a current field to the first field in the list (step 348). Next, the process 340 checks whether the current field is null (step 350). If not, the process 340 assigns a current token value to the current instance field (step 352) and increments the current token value by one (step 354). From step 354, the process sets the current field to the next instance field in the list (step 360) before looping back to step 350. From step 350, in the event that the current field is null, the process 340 publishes the token values in the export file (step 362) and exits.

Various factors may be considered in optimizing the general approach of FIG. 8E-1. Generally, the ordering of the tokens remains flexible so that the token arrangement can be adapted to specific implementations. FIG. 8E-2 describes a constrained assignment scheme as shown in the example below:

| Visibility | Category | Type | Token |
|---|---|---|---|
| public and protected = public tokens | primitive | boolean | 0 |
| | | byte | 1 |
| | | short | 2 |
| | references | byte [] | 3 |
| | | Applet | 4 |
| package and private = private tokens | references | short [] | 5 |
| | | Object | 6 |
| | primitive | int | 7 |
| | | short | 9 |

Referring now to FIG. 8E-2, a process 370 for optimizing the above assignment of instance field tokens is shown. As before, the process 370 gets a list of all instance fields in a class (step 372). Next, the process 370 checks whether the numbered instance fields exceeds a predetermined value such as 256 (step 374). If so, the process 370 fails (step 205) and if not, the process 370 sorts the list into categories including public and protected primitive types first, public and protected reference types second, package and private reference types third, and package and private primitive types last (step 376). The token value is set to zero (step 378) and the current field is initialized to the first instance field in the list (step 380). Next, the process 370 checks whether the current field is null (step 382). If not, the process assigns a current token value to the current field (step 384) and increments the current token value by one (step 386). The process 370 then determines whether the current field is an integer type (step 388). The integer type takes two slots to allow tokens to be easily mapped to instances. If so, the current token value is incremented by one (step 390). From step 388 or step 390, the process 370 sets the current field to the next instance field in the list (step 392) before looping back to step 382.

From step 382, if the current field is null, the process 370 publishes the token values of the public and protected instance fields in the export file (step 394) before exiting.

Figures 1, 8F:
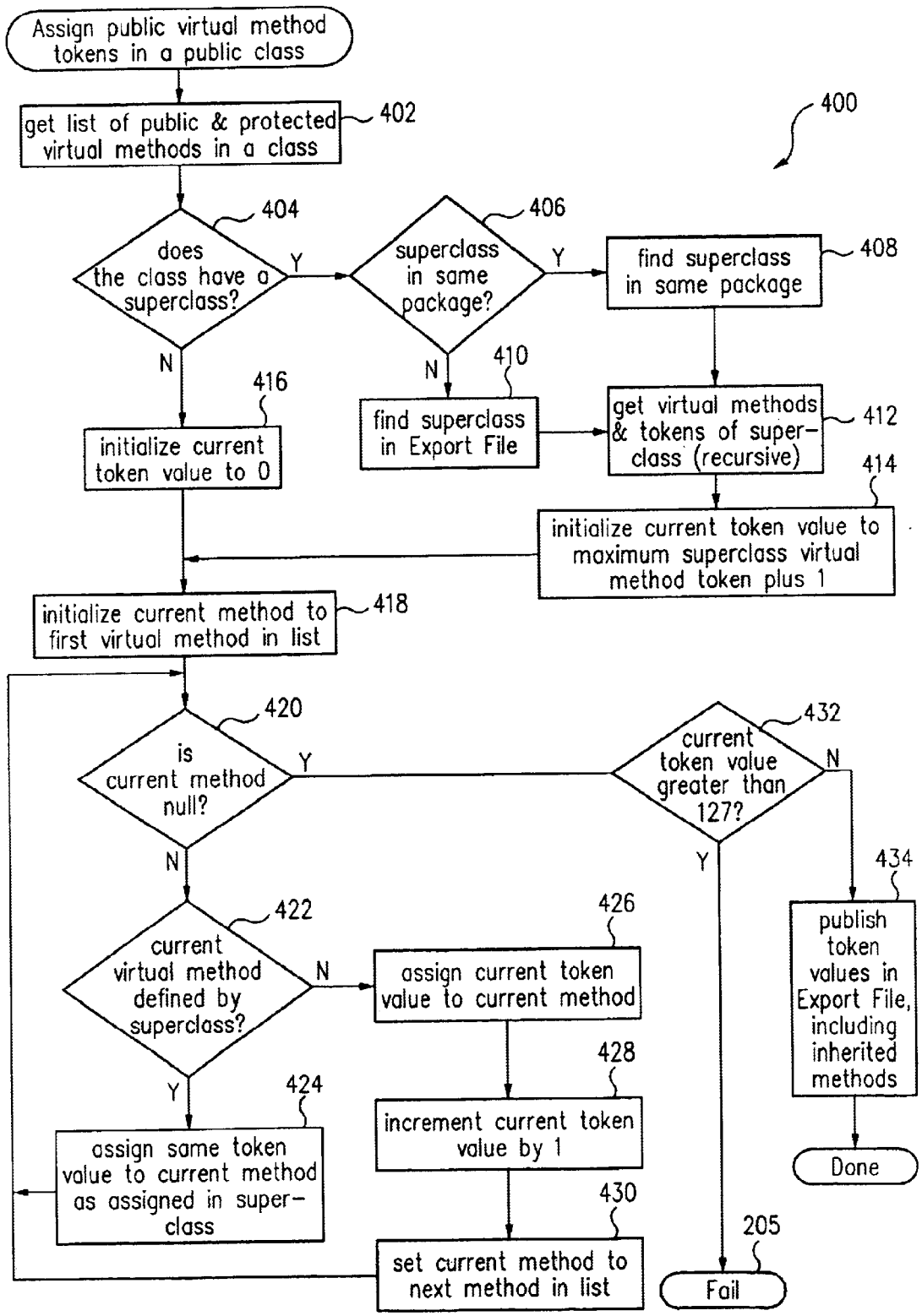
Figures 2, 8F:
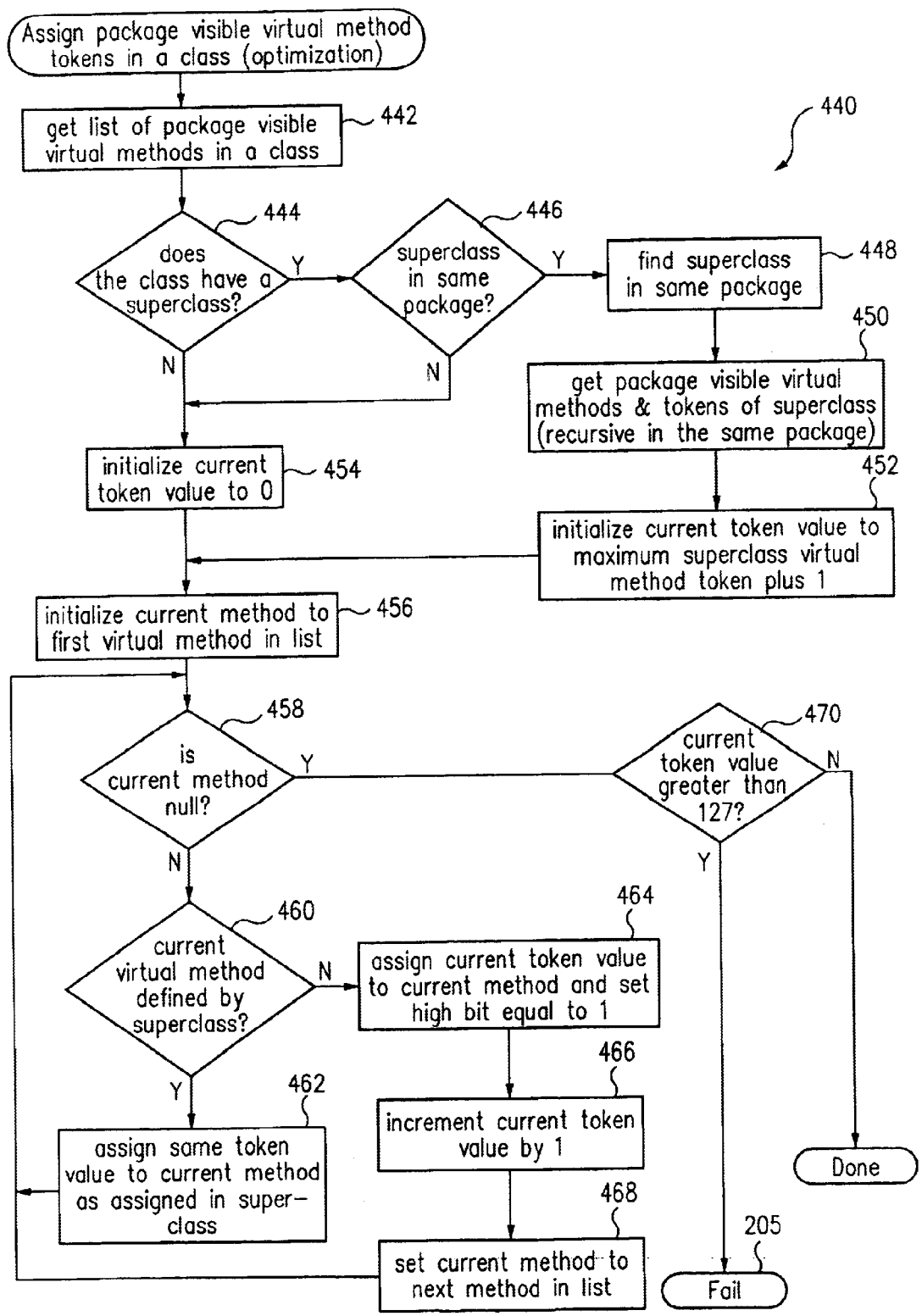

FIGS. 8F-1 and 8F-2 assign tokens for virtual methods. FIG. 8F-1 shows a general scheme for virtual method token assignment, while FIG. 8F-2 extends token assignment to package visible virtual methods.

Referring now to FIGS. 8F-1 and 8F-2, processes for assigning virtual method tokens are shown. Generally, virtual methods defined in a package are assigned either exportable or internal tokens. Exportable tokens are assigned to public and protected virtual methods; in this case, the high bit of the token is zero. Internal tokens are assigned to package visible virtual methods; in this case the high bit of the token is one. Since the high bit is reserved, these tokens range from 0 to 127, inclusive.

Exportable tokens for the externally visible introduced virtual methods in a class are numbered consecutively starting at one greater than the highest numbered exportable virtual method token of the class's superclass. If a method overrides a method implemented in the class's superclass, that method uses the same token number as the corresponding method in the superclass so that overridden methods may be identified as being related to the method they override.

Internal virtual method tokens are assigned differently from exportable virtual method tokens. If a class and its superclass are defined in the same package, the tokens for the package-visible introduced virtual methods in that class are numbered consecutively starting at one greater than the highest numbered internal virtual method token of the class's superclass. If the class and its superclass are defined in different packages, the tokens for the package-visible introduced virtual methods in that class are numbered consecutively starting at zero. If a method overrides a method implemented in the class's superclass, that method uses the same token number as the corresponding method in the superclass. For background information, the definition of the Java programming language specifies that overriding a package-visible virtual method is only possible if both the class and its superclass are defined in the same package. The high bit of the byte containing a virtual method token is always set to one, to indicate it is an internal token. The ordering of introduced package virtual method tokens in a class is not specified.

In FIG. 8F-1, the process 400 first gets a list of public and protected virtual methods in a class (step 402). The process 400 then checks whether the class has a superclass (step 404). If so, the process 400 further checks whether the superclass is in the same package (step 406). From step 406, in the event that the superclass is in the same package, the process finds the superclass (step 408) and obtains the virtual methods and tokens of the superclass (step 412). The set of virtual method includes those defined all of the superclasses of the superclass. From step 406, in the event of the superclass is not in the same package, the process 400 finds the superclass in the export file of the imported package (step 410) and then proceeds to step 412. From step 412, the process 400 initializes a current token value to the maximum superclass virtual method token and increments its value by one (step 414), ensuring that there will not be token collisions within the hierarchy.

From step 404, in the event that the class does not have a superclass, the process 400 initializes to zero the current token value (step 416). From step 414 or step 416, the process 400 initializes the current method to the first virtual method in the list (step 418). Next, the process 400 determines whether the current method is null (step 420). If not, the process then determines whether the current virtual method is defined by the superclass (step 422). If so, the method is an override method and the same token value is assigned to the current method as the one assigned to the overridden method in the superclass (step 424) before looping back to step 420.

From step 422, in the event that the current virtual method is not defined by the superclass, it is an introduced method. In that case, the process 400 assigns a current token value to the current method (step 426) and increments the current token value by one (step 428). The process 400 then sets the current method to the next method in the list (step 430) before looping back to step 420. From step 420, in the event that the current method is null, the process 400 checks whether the current token value exceeds a predetermined value such as 127 (step 432). If so, the process 400 fails (step 205). Alternatively, if the token value is not greater than 127, the process 400 publishes the token values in the export file along with the inherited methods and their token values (step 434) before exiting. The process of FIG. 8F-1 can also be used for assigning tokens to public and protected virtual methods in a package visible class as shown in FIG. 8F-2.

In FIG. 8F-2, a process 440 for extending token assignment to package visible virtual methods in a class is shown. The process 440 first gets a list of package visible virtual methods in the class (step 442). Next, it checks whether the class has a superclass (step 444). If so, the process then checks whether the superclass is in the same package (step 446). If so, the process 440 then finds a superclass in the same package (step 448), gets the package visible virtual methods and tokens of the superclass (step 450) and initializes the current token value to the maximum superclass virtual method token plus one (step 452) to avoid token collisions within the hierarchy that is scoped to the package. This ensures that token values previously assigned within superclasses are not reused for introduced methods. It is to be noted that step 450 may be recursive up to the superclasses in the same package.

From step 444, in the event a class does not have a superclass, or from step 446, in the event that the superclass is not in the same package, the process 440 sets the current token value to zero (step 454). Particularly, if the superclass is not in the same package, package visible virtual methods of that superclass are not accessible and thus not included in step 454. These potential methods are accounted for when resolving references to virtual methods as described above in FIGS. 9D-2 and 9D-3.

From step 452 or step 454, the process 440 initializes the current method to the first virtual method in a list (step 456). Next, the process 440 checks whether the current method is null (step 458). If not, the process 440 checks whether the current virtual method is defined by a superclass (step 460). In this case the method is an override method. If so, the process 440 then assigns the same token value to the current method as assigned to the overriden method in the superclass (step 462) before looping back to step 458.

From step 460, if the current virtual method is not defined by its superclass it is an introduced method. In this case, the process 440 assigns a current token value to the current method and sets the high bit to one (step 464). The high bit of the virtual method token is used to determine whether it is a public or private virtual method token. Next, the process 440 increments the current token value by one (step 466) and sets the current method to the next method in the list (step 468) before looping back to step 458.

In step 458, in the event that the current method is null, the process 440 determines whether the current token value exceeds a value such as 127 (which is the maximum number representable in 8-bits with the high bit reserved) in step 470. If so, the process 440 fails (step 205). Alternatively, in the event that the current token value is within range, the process 440 exits. Note that tokens for package visible virtual methods are used internally and are not exported.

Figures 1, 8G:
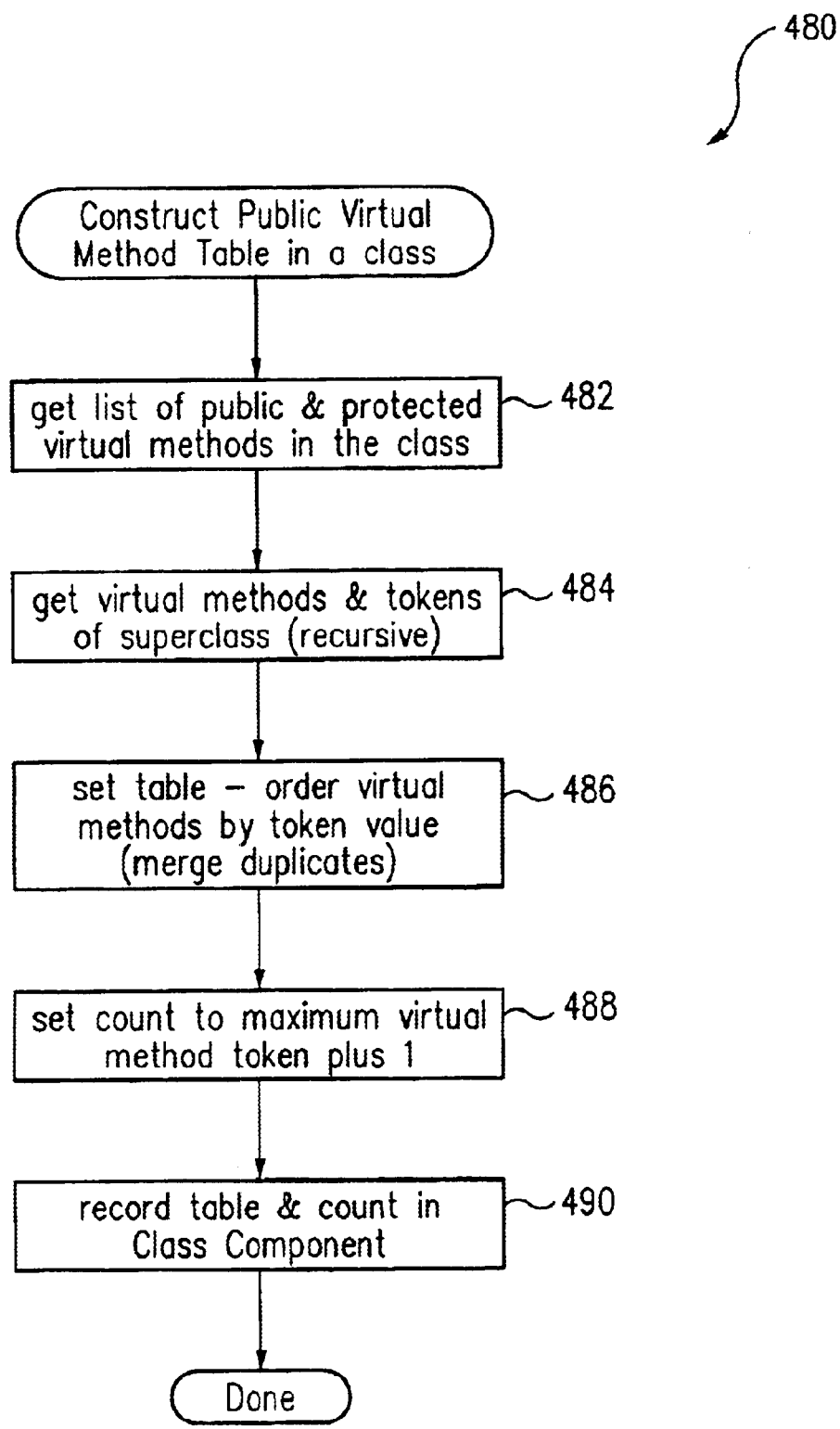
Figures 2, 8G:
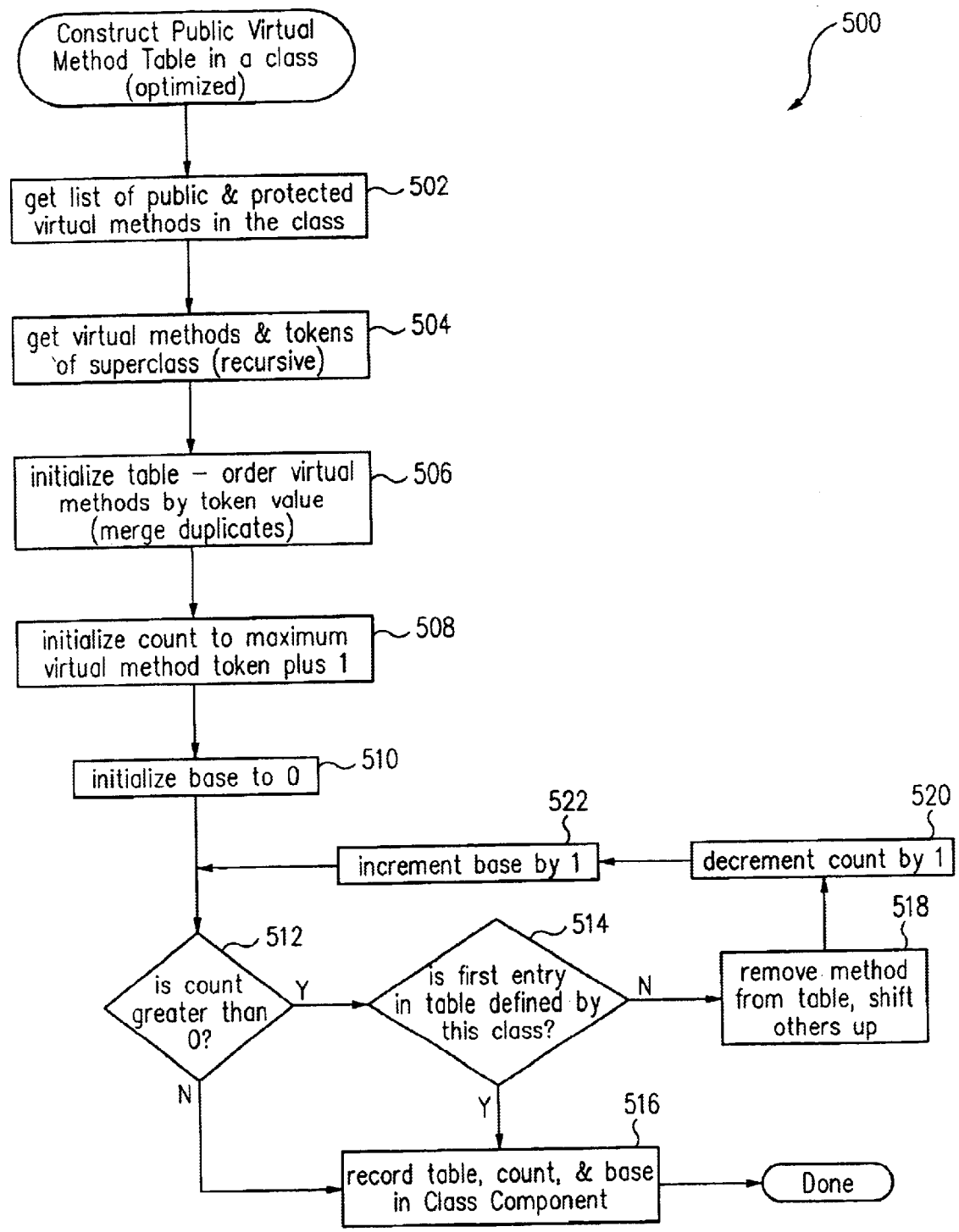

Virtual method references can only be resolved during execution. The virtual method table allows the card to determine which method to invoke based on the token as well as instances of the method's class. The token value is used as an index to the virtual method table. FIG. 8G-1 shows a process 480 for constructing public virtual method tables in a class. First, a list of public and protected virtual methods in the class is obtained (step 482). Next, the process 480 gets virtual methods and tokens of a superclass (step 484). Step 484 is recursive, including all of the superclasses of the class. The process 480 then creates a table, ordering virtual methods by token values (step 486) and eliminates duplicate virtual methods. Duplicates are generated for overridden methods. In this case, the method defined in the current class is represented in the method table instead of the one defined in a superclass. The process 480 then sets a count to a maximum virtual method token class in step 488 and records a table and count in the class component (step 490) before exiting.

Turning now to FIG. 8G-2, a process 500 which optimizes the construction of public virtual method tables in the class is shown. The process 500 decreases the size required for storing a virtual method table by removing overlapping elements in a superclass' virtual method table.

The process 500 first gets a list of public and protected virtual methods in a class (step 502). Next, the virtual methods and tokens of the superclass are obtained (step 504). Step 504 is recursive, including all of the superclasses of the class. Next, the process 500 initializes a table by ordering virtual methods obtained in steps 502 and 504 by token values (step 506). This process assumes the process has at least one entry. The process 500 then initializes a count to a maximum virtual method token plus one (step 508). The process 500 also sets the base count to zero (step 510). Next, process 500 checks whether the count is positive (step 512). If so, the process checks whether the first entry in the table is defined by the current class (step 514). If not, the process removes the method from the table and shifts the remaining methods up in the table (step 518). The process 500 then decrements the count by one (step 520) and increments the base count by one (step 522) before looping back to step 512.

From step 514, in the event that the first entry is defined in the current class, or in the event that the count is zero in step 512, the process 500 proceeds to record the table, count and base in the class component (step 516) before exiting.

Figures 1, 8H:
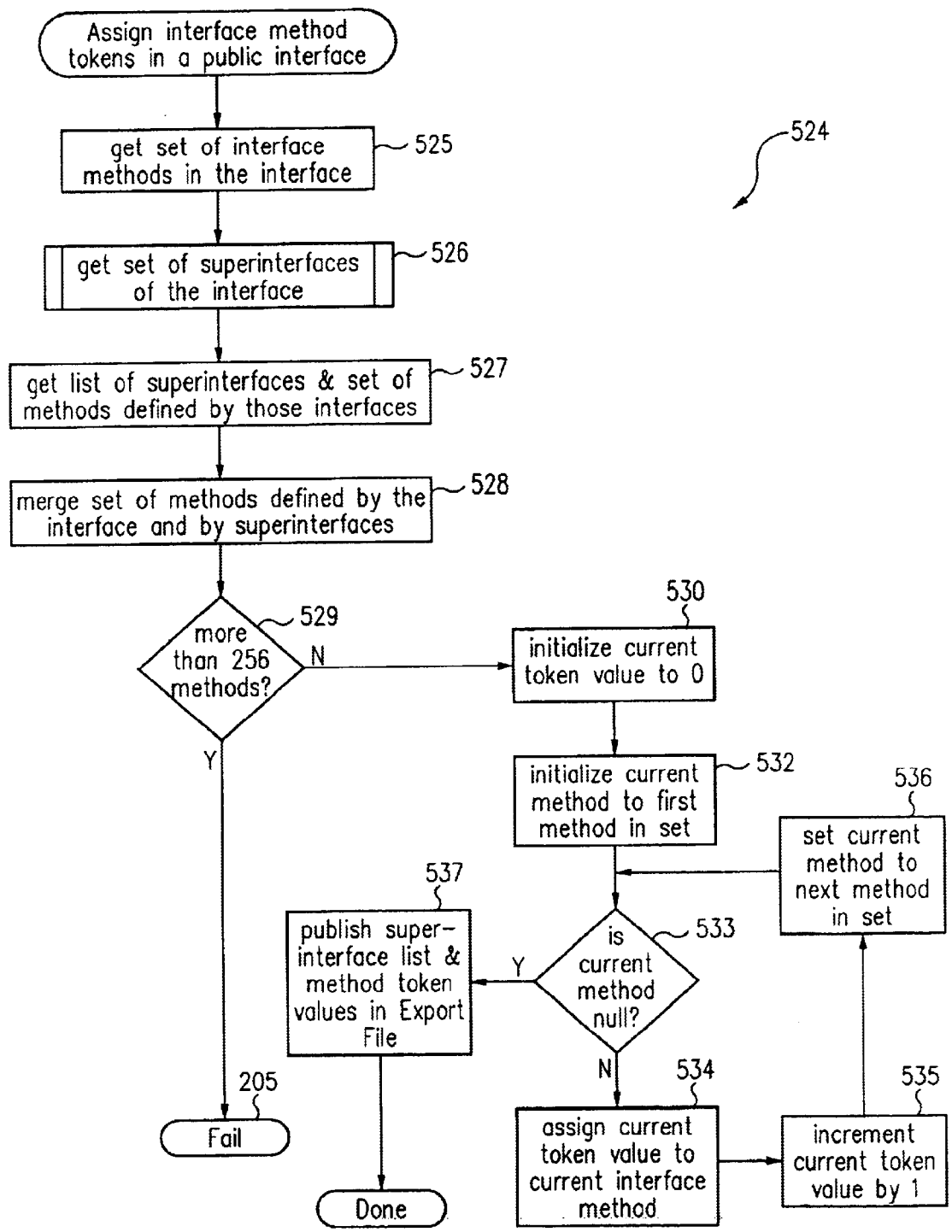
Figures 2, 8H:
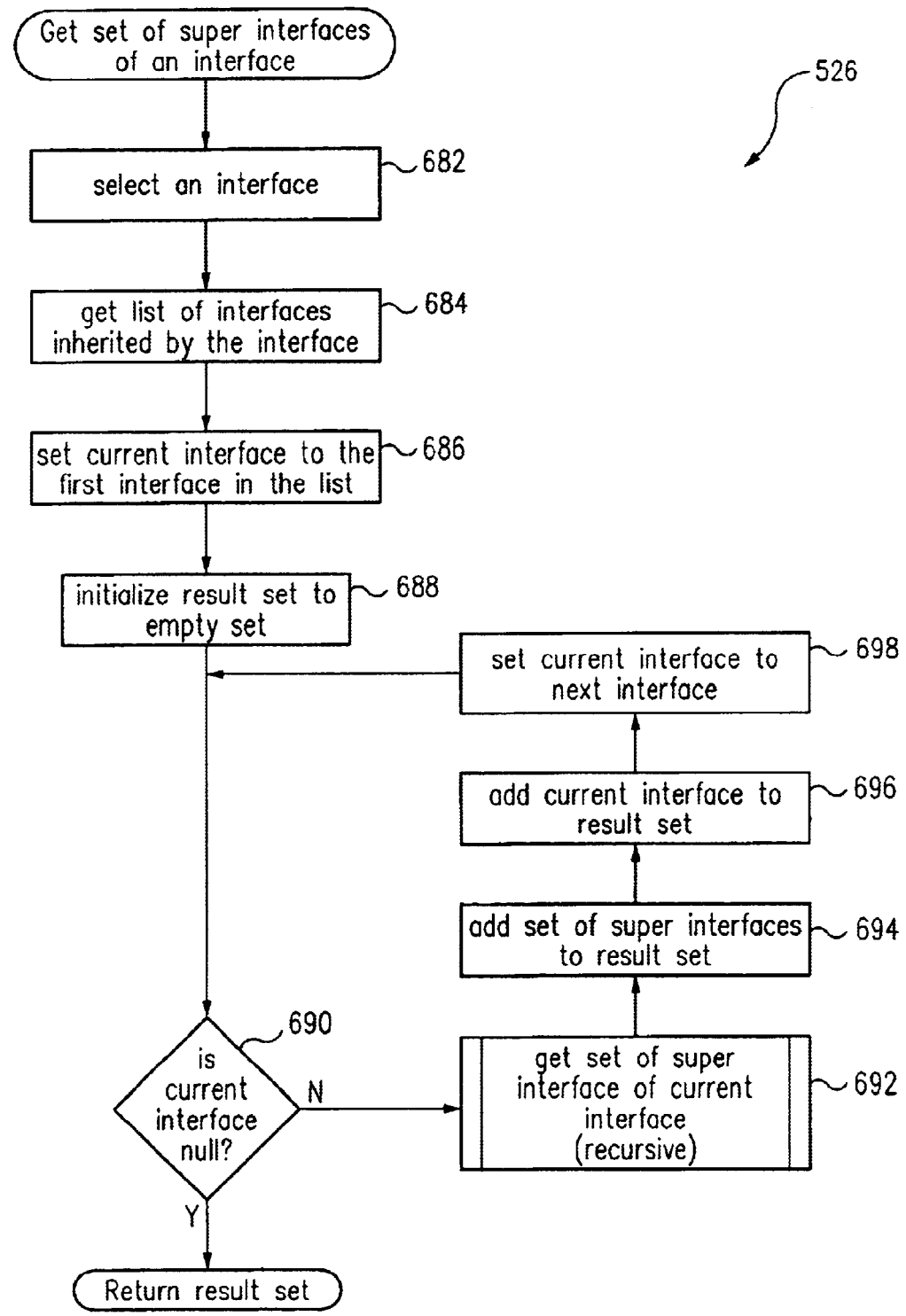

FIGS. 8H-1 and 8H-2 show a process 524 for assigning interface method tokens in a public interface. Particularly, FIG. 8H-2 shows in more detail step 526 of FIG. 8H-1.

Referring now to FIG. 8H-1, the process 524 assigns interface method tokens in a public interface. The process 524 initially obtains a set of interface methods in the public interface (step 525). Next, the process 524 obtains a list of superinterfaces of the interface (step 526). This operation is defined in more detail in FIG. 8H-2. The process 524 then merges the set of methods defined by the interface and by its superinterfaces (step 527). Next, the process 524 checks whether or not more than 256 methods exist (step 529). If so, the process 524 fails (step 205). Alternatively, if less than 256 methods exist, the process 524 sets the current token value to zero (step 530) and initializes the current method to the first method in the method of set of methods (step 532). Next, the process 524 checks whether the current method is null (step 533). If not, the process 524 assigns the current token value to the current interface method (step 534), increments the current token value by one (step 535), and sets the current method for the next method in the set (step 536) before looping back to step 533.

From step 533, if the current method is null, the process 524 publishes the superinterface list associated with the interface and the method token values in the export file (step 537) and exits.

Referring now to FIG. 8H-2, step 526 of FIG. 8H-1 is shown in more detail. First, the process of FIG. 8H-2 selects an interface (step 682). Next, it obtains a list of interfaces inherited by the interface (step 684) and sets the current interface to the first interface in the list (step 686). Next, the process of 8H-2 initializes the results set to an empty set (step 688). From step 688, the process of FIG. 8H-2 iteratively adds interfaces to a result set. This is done by first checking whether the current interface is null, indicating that no other interfaces need to be processed (step 690). If not, the process obtains a set of superinterface of the current interface (step 692). Step 692 invokes the process 526, recursively.

Upon completing step 692, the process of FIG. 8H-2 adds the set of superinterfaces to a result set (step 694) and the current interface to the result set (step 696). The process then sets the current interface to the next interface (step 698) and loops back to step 690 to continue processing all interfaces. From step 690, in the event that the current interface is null, the process of FIG. 8H-2 exits by returning the result set.

An interface table contains an entry for each interface directly implemented by a class, and for all superinterfaces of the directly implemented interfaces. Each entry in the interface table contains an identification of the interface and an interface method table. The table maps interface method declarations to implementations in the class.

Figures 1, 8I:
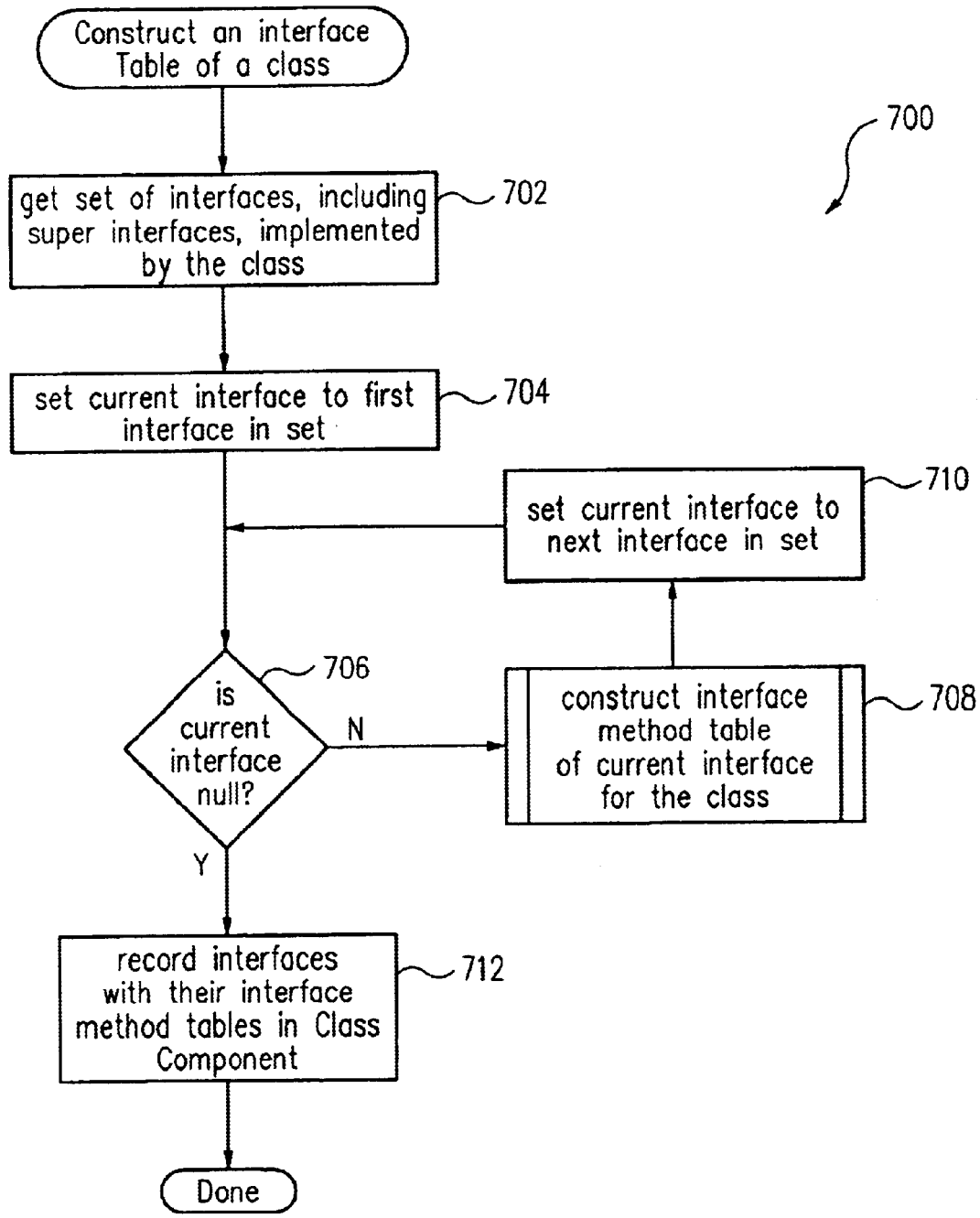
Figures 2, 8I:
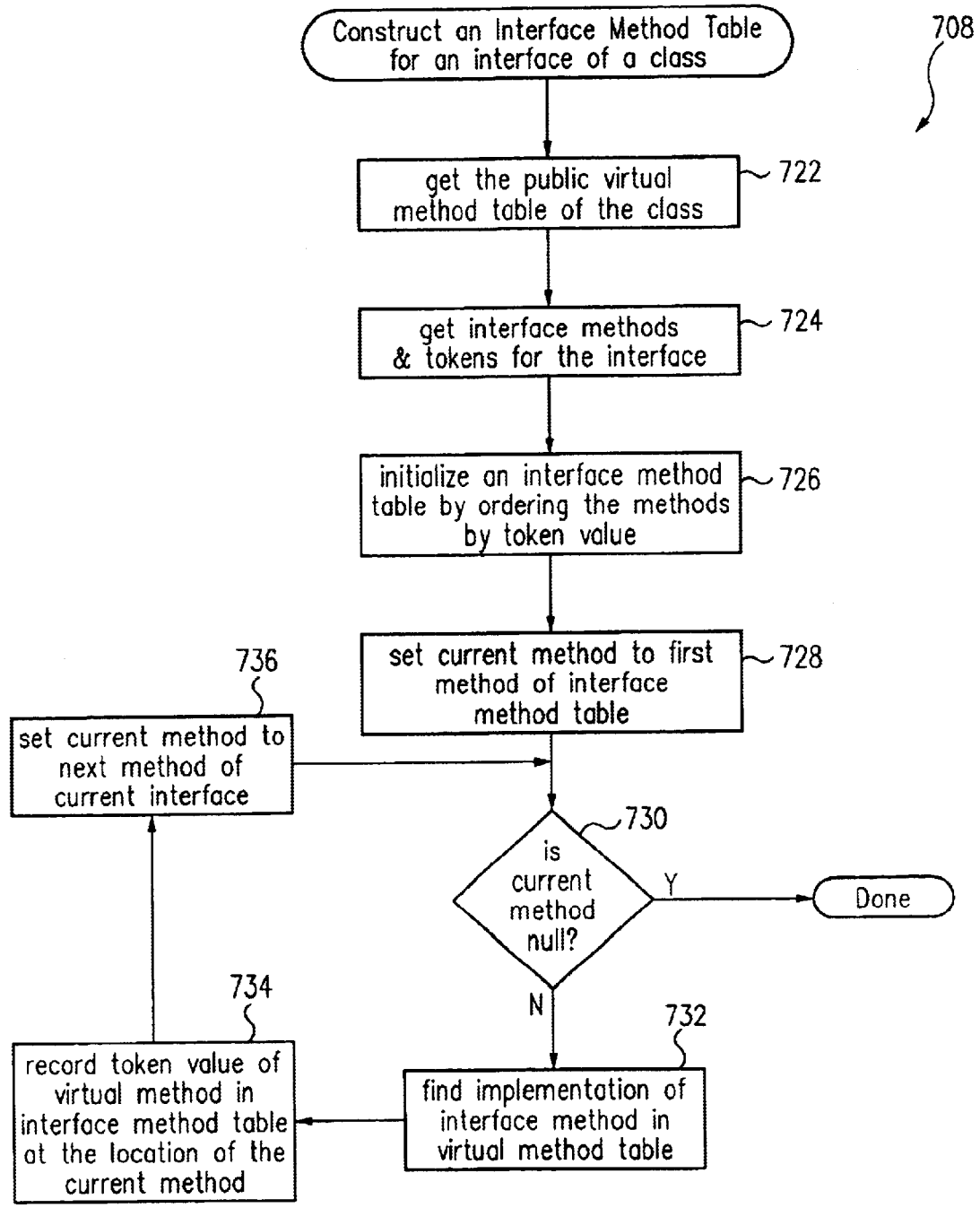

FIGS. 8I-1 and 8I-2 show a process 700 for constructing an interface table of a class. Particularly, a FIG. 8I-2 shows in more detail steps 708 of FIG. 8I-1.

Referring now to FIG. 8I-1, a process 700 for constructing interface tables is shown. First, the process 700 obtains a list of interfaces, including superinterfaces, (see process 526) that are implemented by the current class (step 702). Next, the process 700 sets the current interface to the first interface in this set (step 704). The process 700 then checks whether the current interface is null, indicating that it is finished (step 706). If not, the process 700 proceeds to construct an interface method table for the current interface for the class (step 708), as shown in more detail in FIG. 8I-2. Next, the process 700 sets a current interface to the next interface (step 710) before it loops back to step 706.

From step 706, in the event that the current interface is null, the process 700 records the interfaces with their interface method tables in the class component (step 712) before exiting.

Referring now to FIG. 8I-2, step 708 is shown in more detail. This process first gets the virtual method table for the class (step 722) and the interface methods and tokens for the interface, including inherited methods (step 724). Next, the process of FIG. 8I-2 initializes an interface method table by ordering the methods by their token value (step 726). Next, the process sets the current method to the first method of the interface method table (step 728). From step 728, the process checks whether the current method is null indicating that it is finished (step 730). If not, the process of FIG. 8I-2 finds an implementation of the interface method in the virtual method table (step 732). Next, the process records a token value of the virtual method in the interface method table at the location of the current method (step 734). It then sets the current method to the next method of the current interface (step 736) before looping back to step 730. From step 730, in the event that the current method is null, the process of FIG. 8I-2 exits.

The dynamic binding of elements during execution is discussed next in FIGS. 9A–9C which describe resolution of references to dynamic elements. During compilation, conversion and token assignment, references to instance fields, virtual methods and interfaces methods cannot be resolved to a particular implementation, but only to an abstract description of the item.

In the case of instance fields, tokens are assigned within the scope of the defining class. An instance of the class contains all of the fields defined not only by the class, but also by all of its superclasses. The tokens do not indicate the location of the field within the instance, since they cannot reflect a particular layout of the instance and cannot account for the location of private and package-visible fields defined by the superclass.

In the case of virtual methods, during compilation and conversion the name and type signature are known, as well as a class within a hierarchy that implements such a method. However, the exact implementation cannot be known until execution, when it is possible to determine the particular class of the instance on which the method is invoked. For example, both a class A and its superclass B implement a method definition M. It cannot be known until execution whether an invocation of the method M on an instance of compile-time type B will result in execution of the implementation of class A or of class B.

To provide a means for properly dispatching an invocation of a virtual method during execution, virtual method token assignment is scoped within a class hierarchy. That is, a method of a subclass that overrides a method previously introduced in a superclass inheritance chain must have the same token value as the method it overrides. Also, introduced methods (those methods that do not override methods defined in a superclass) must have token values that are unique within the inheritance chain. Virtual method tables are defined for each class to provide a means for mapping a virtual method token to a particular implementation.

Interface methods are similar to virtual methods in that the particular implementation cannot be known until execution time, but they differ in that interface methods can be inherited from multiple interfaces. Multiple inheritance of interface causes a problem with the way virtual method tokens are assigned. A method in a class which overrides a method introduced in more than one interface cannot necessarily have the same token value as the methods it overrides, as the multiple definitions may all have different values. Therefore each set of methods for a particular interface is assigned token values without regard to the token values of the methods of any other interface.

Because interfaces do not share token values, additional information is necessary to dispatch an interface method invocation to a particular method implementation. As interface method tokens are unique within the scope of an interface, both the interface method token and the identity of the interface are needed to determine the method implemented by the class of an instance at execution time. An interface table is defined for each class which maps an interface identity to an interface method table. The interface method table maps the interface method tokens for that interface to method implementations in that class.

Figure 9A:
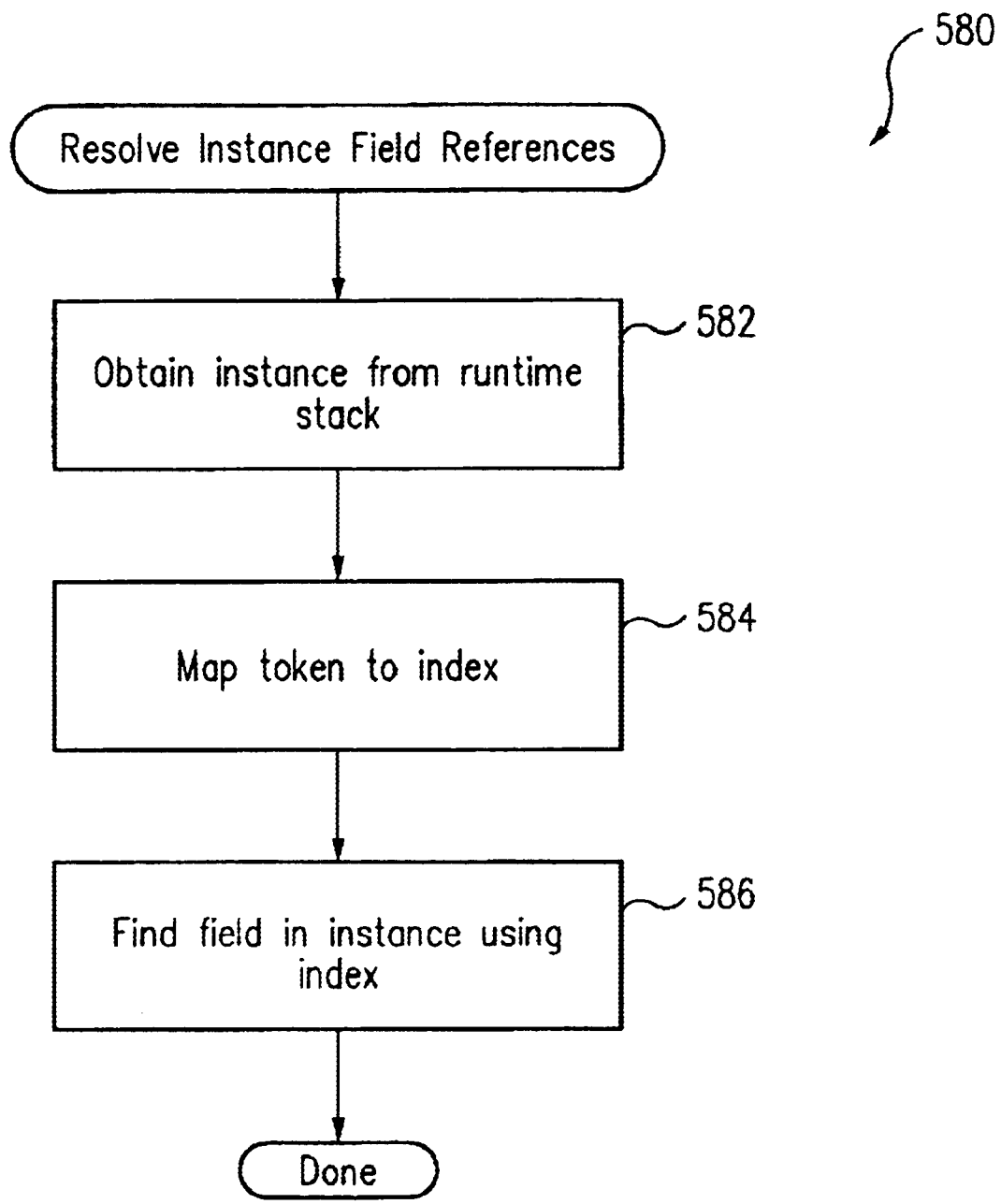
FIGS. 9A–9C are flowcharts illustrating processes for resolving tokens for instance fields and methods.
Figures 1, 9B:
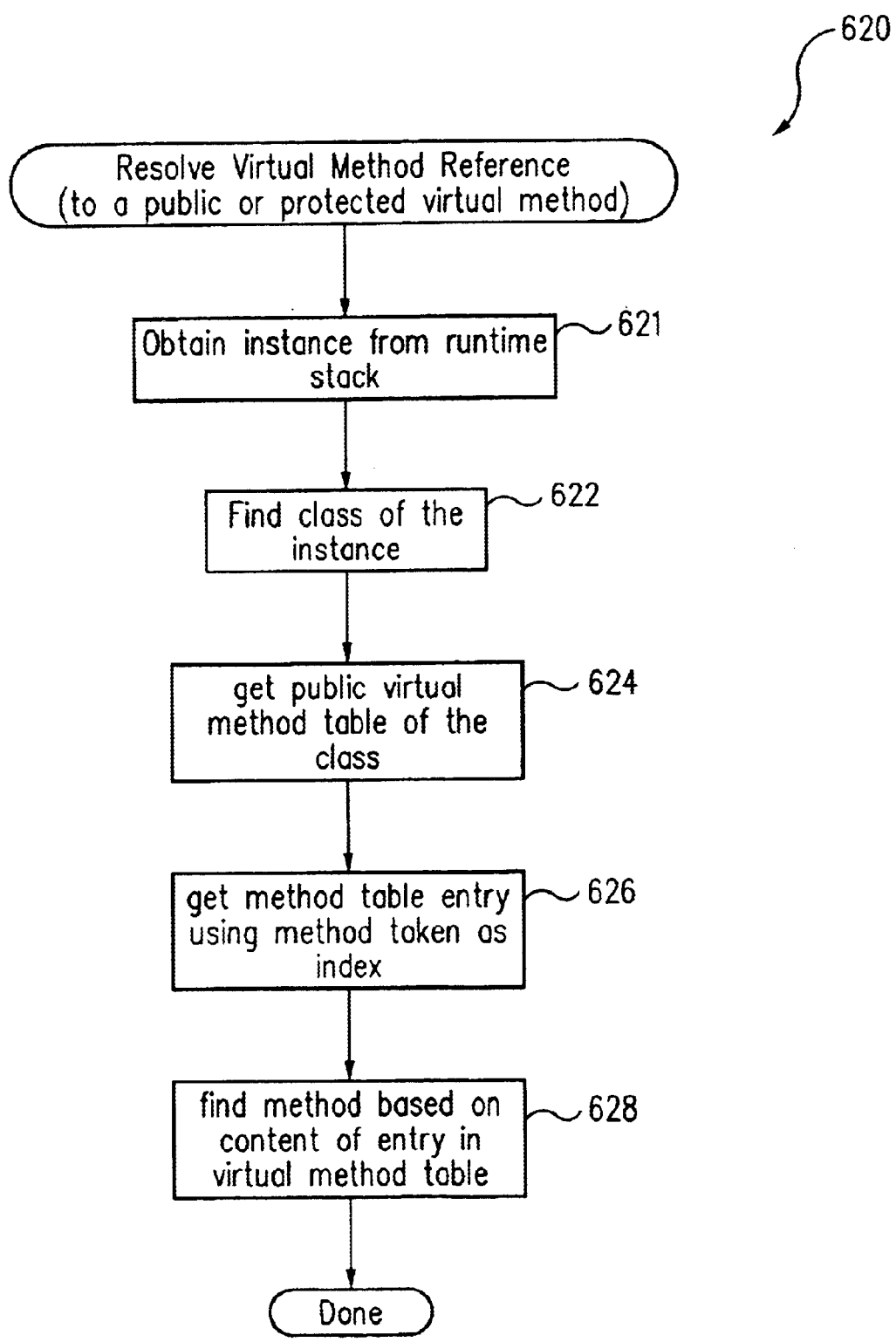
Figures 2, 9B:
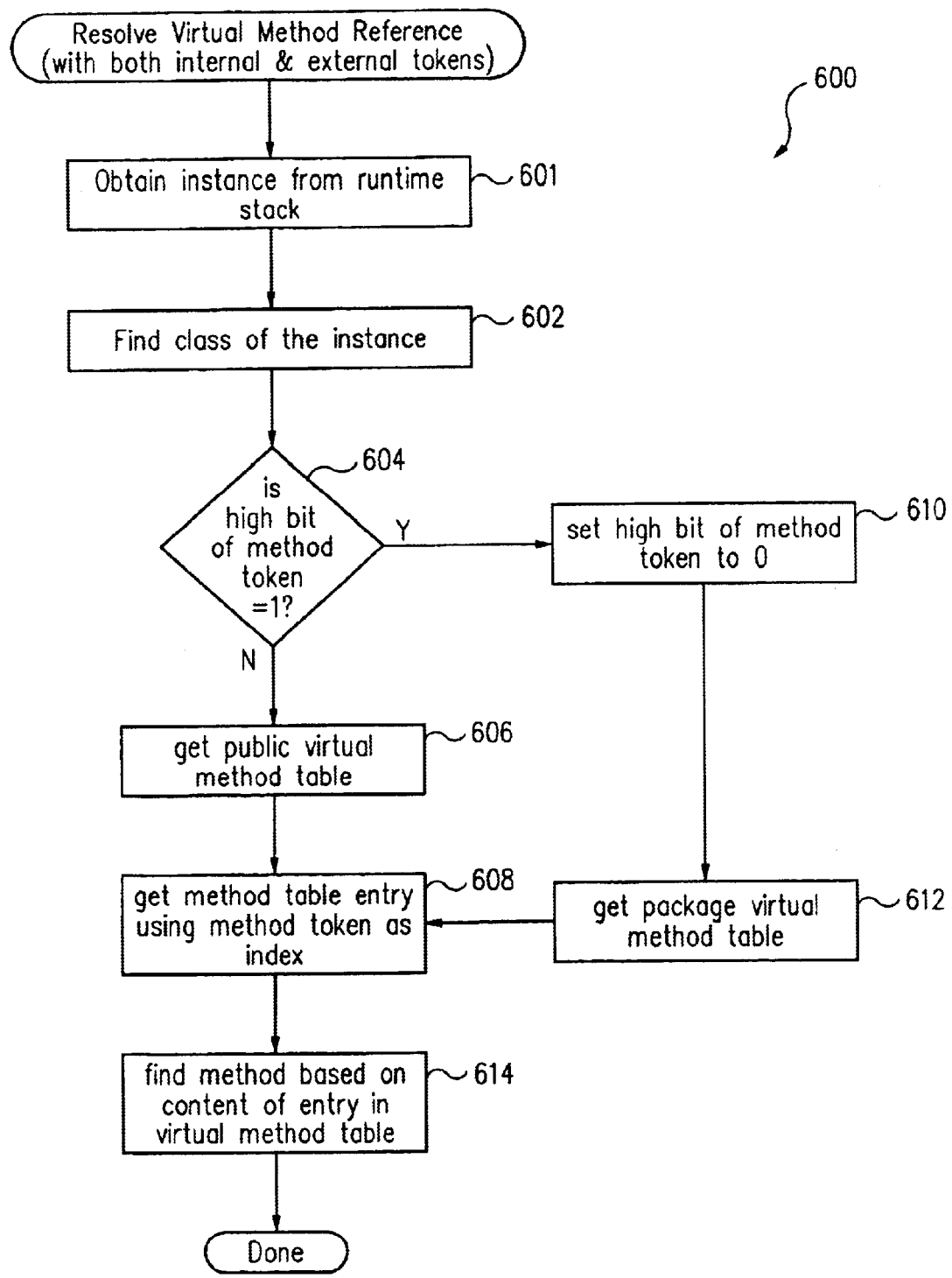
Figures 3, 9B:
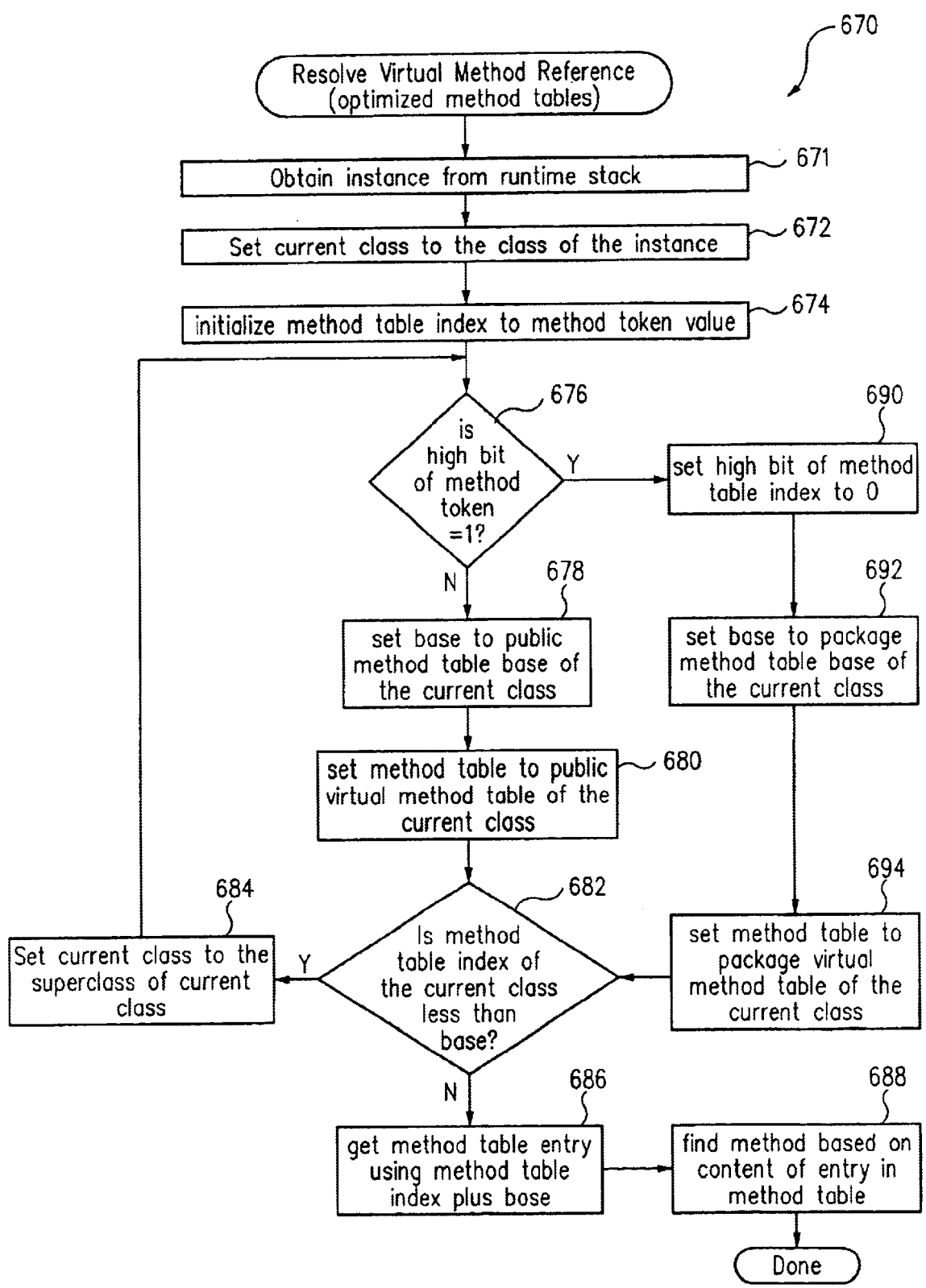
Figure 9C:
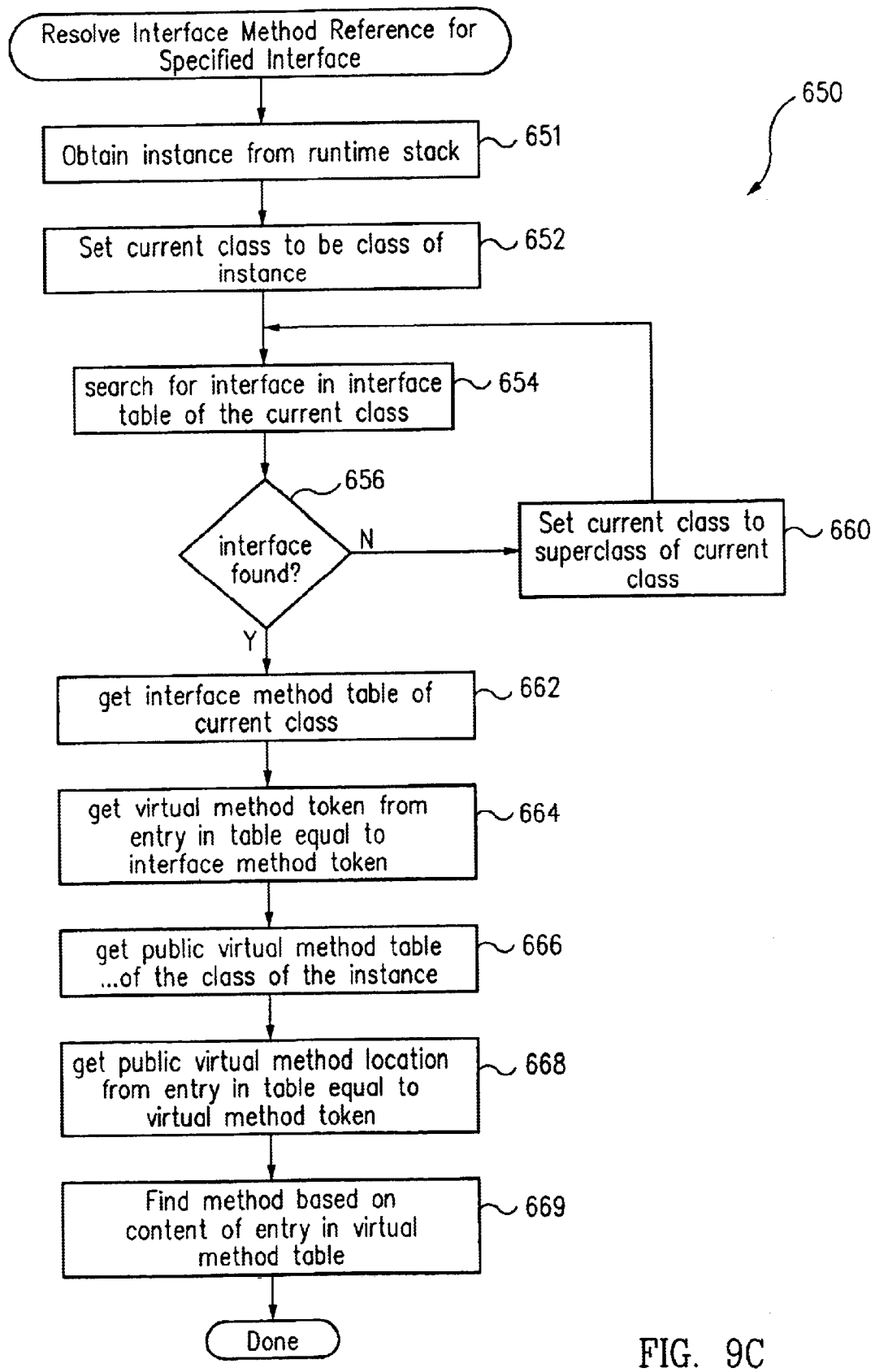

FIGS. 9A–9C are flowcharts illustrating processes for resolving tokens during the execution. Referring now to FIG. 9A, a process 580 for resolving instance field references is shown. First, the process 580 obtains an instance containing the field from a run-time stack (step 582). Next, the process 580 determines a token associated with the field and maps the token to an index (step 584). The mapping of the token to the index may require examining instance field type information. Moreover, the operation may require adjusting the token value by the size of the superclass's instance. Finally, the process 580 finds the representation of the field in the instance using the index (step 586) before exiting.

In FIG. 9B-1, a process 620 for resolving a reference to public or protected virtual method is shown. First, the process 620 obtains an instance of a class from the runtime stack (step 621) and determines the class of the instance (step 622). Next, the process 620 accesses the public virtual method table of the class (step 624) and obtains a method table entry using the method token as an index (step 626). Finally, the process 620 finds and executes the method based on the content of the entry in the virtual method table (step 628) and exits.

Turning now to FIG. 9B-2, a process 600 for resolving a reference to any virtual method (including package-visible) is shown. First, the process 600 obtains an instance of a class from the runtime stack (step 601) and determines the class of the instance (step 602). Next, the process 600 determines whether the high bit of the method token is set to one (step 604). If not, the process 600 gets a public virtual method table (step 606) and uses the method token as an index into the virtual method table (step 608). From step 604, in the event that the high bit of the method token equals one, the process 600 then sets the high bit to zero (step 610) and gets the package virtual method table (step 612) before proceeding to step 608. Finally, the process 600 finds and executes the method based on the content of the entry in the virtual method table (step 614) and exits.

FIG. 9B-3 shows an optimized process 670 for resolving a reference to any virtual method, using optimized virtual method tables as described in FIG. 8G-2. First, the process 670 obtains an instance of a class from the runtime stack (step 671) and sets the current class to be the class of the instance (step 672). A method table index is initialized to the method token value (step 674). The process 670 then determines whether the high bit of the method token equals one (step 676). If not, the process 670 sets a base value to the public method table's base of the current class (step 678). Next, the method table is set to the public virtual method table of the current class (step 680). The process 670 then checks whether the method table index is less than the base value (step 682) and if so, sets the current class to be the superclass of the current class (step 684). From step 684, the process 670 loops back to step 676 to continue processing.

In step 676, if the high bit equals one, the process 670 sets the high bit of the method table index to zero (step 690). It sets the base value to the package method table base of the current class (step 692) and sets the method table to the package virtual method table of the current class (step 694) before continuing to step 682.

From step 682, if the method table index is greater than the base, the process 670 obtains a method table entry using the method table index plus the base value (step 686). The process 670 then finds the method based on the content of the entry in the method table of the current class (step 688). Subsequently, the process 670 exits.

Referring now to FIG. 9C, a process 650 for resolving interface method reference is shown. First, the process 650 obtains an instance of a class from the runtime stack (step 651) and sets the current class to the class of the instance (step 652). Next, the process 650 searches for the specified interface in the interface table of the current class (step 654). The process then determines whether the interface has been found (step 656). If not, the process then sets current class to the superclass of the current class (step 660) before looping back to step 654.

From step 656, in the event that the specified interface is found, the process 650 obtains the corresponding interface method table in the current class (step 662). It then obtains the virtual method token from the entry in the table whose index is equal to the interface method token (step 664). The process 650 then obtains the public virtual method table of the class of the instance (step 666). The process 650 gets the virtual method location from the entry in the table associated with the virtual method token (step 668). The process 650 then locates the method based on the content of the entry in the virtual method table (step 669). Once this is done, the process 650 exits.

Although the invention has been illustrated with respect to a smart card implementation, the invention applies to other devices with a small footprint such as devices that are relatively restricted or limited in memory or in computing power or speed. Such resource constrained devices may include boundary scan devices, field programmable devices, pagers and cellular phones among many others. The invention may prove advantageous when using servlets if there is object sharing between them. Certain desktop systems may also utilize the techniques of the invention.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given. Further, it will be appreciated that a virtual machine consistent with the invention can provide functionality beyond that of earlier virtual machines, such as the virtual machines described in the Java™ Virtual Machine Specification.

While the Java™ programming language and platform are suitable for the invention, any language or platform having certain characteristics would be well suited for implementing the invention. These characteristics include type safety, pointer safety, object-oriented, dynamically linked, and virtual-machine based. Not all of these characteristics need to be present in a particular implementation. In some embodiments, languages or platforms lacking one or more of these characteristics may be utilized. A "virtual machine" could be implemented either in bits (virtual machine) or in silicon (real/physical machines/application specific integrated circuits). Also, although the invention has been illustrated showing object by object security, other approaches, such as class by class security could be utilized.

The system of the present invention may be implemented in hardware or in computer program. Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

The program is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

While the invention has been shown and described with reference to an embodiment thereof, those skilled in the art will understand that the above and other changes in form and detail may be made without departing from the spirit and scope of the following claims.

Other embodiments are within the scope of the following claims.

APPENDIX A

TITLE: TOKEN-BASED LINKING

APPLICANT: JUDITH E. SCHWABE AND JOSHUA B. SUSSER

ATTORNEY DOCKET NO: 08993/008001

CLIENT NO: P3730

Table of Contents and pages 1-222

"EXPRESS MAIL" Mailing Label Number EL110518251US

Date of Deposit February 2, 1999

Java Card Virtual Machine Specification
*Java Card Version 2.1*
*Draft 2a*
Sun Microsystems, Inc.
901 San Antonio Road
Palo Alto, CA 94303 USA
415 960-1300   fax 415 969-9131
Draft 2a, January 29, 1999

Copyright © 1998 Sun Microsystems, Inc.

901 San Antonio Road, Palo Alto, CA 94303 USA

All rights reserved. Copyright in this document is owned by Sun Microsystems, Inc.

Sun Microsystems, Inc. (SUN) hereby grants to you at no charge a nonexclusive, nontransferable, worldwide, limited license (without the right to sublicense) under SUN's intellectual property rights that are essential to practice the Java™ Card™ Virtual Machine 2.1 Specification ("Specification") to use the Specification for internal evaluation purposes only. Other than this limited license, you acquire no right, title, or interest in or to the Specification and you shall have no right to use the Specification for productive or commercial use.

RESTRICTED RIGHTS LEGEND

Use, duplication, or disclosure by the U.S. Government is subject to restrictions of FAR 52.227-14(g)(2)(6/87) and FAR 52.227-19(6/87), or DFAR 252.227-7015(b)(6/95) and DFAR 227.7202-1(a).

SUN MAKES NO REPRESENTATIONS OR WARRANTIES ABOUT THE SUITABILITY OF THE SOFTWARE, EITHER EXPRESS OR IMPLIED, INCLUDING BUT NOT LIMITED TO THE IMPLIED WARRANTIES OF MERCHANTABILITY, FITNESS FOR A PARTICULAR PURPOSE, OR NON-INFRINGEMENT. SUN SHALL NOT BE LIABLE FOR ANY DAMAGES SUFFERED BY LICENSEE AS A RESULT OF USING, MODIFYING OR DISTRIBUTING THIS SOFTWARE OR ITS DERIVATIVES.

TRADEMARKS

Sun, the Sun logo, Sun Microsystems, JavaSoft, JavaBeans, JDK, Java, Java Card, HotJava, HotJava Views, Visual Java, Solaris, NEO, Joe, Netra, NFS, ONC, ONC+, OpenWindows, PC-NFS, EmbeddedJava, PersonalJava, SNM, SunNet Manager, Solaris sunburst design, Solstice, SunCore, SolarNet, SunWeb, Sun Workstation, The Network Is The Computer, ToolTalk, Ultra, Ultracomputing, Ultraserver, Where The Network Is Going, Sun WorkShop, XView, Java WorkShop, the Java Coffee Cup logo, and Visual Java are trademarks or registered trademarks of Sun Microsystems, Inc. in the United States and other countries.

THIS PUBLICATION IS PROVIDED "AS IS" WITHOUT WARRANTY OF ANY KIND, EITHER EXPRESS OR IMPLIED, INCLUDING, BUT NOT LIMITED TO, THE IMPLIED WARRANTIES OF MERCHANTABILITY, FITNESS FOR A PARTICULAR PURPOSE, OR NON-INFRINGEMENT.

THIS PUBLICATION COULD INCLUDE TECHNICAL INACCURACIES OR TYPOGRAPHICAL ERRORS. CHANGES ARE PERIODICALLY ADDED TO THE INFORMATION HEREIN; THESE CHANGES WILL BE INCORPORATED IN NEW EDITIONS OF THE PUBLICATION. SUN MICROSYSTEMS, INC. MAY MAKE IMPROVEMENTS AND/OR CHANGES IN THE PRODUCT(S) AND/OR THE PROGRAM(S) DESCRIBED IN THIS PUBLICATION AT ANY TIME.

Please Recycle

Contents

Contents iii

Figures vii

Tables ix

1. Introduction 1
   1.1 Motivation 1
   1.2 The Java Card Virtual Machine 2
   1.3 Java Language Security 5
   1.4 Java Card Runtime Environment Security 6

2. A Subset of the Java Virtual Machine 7
   2.1 Why a Subset is Needed 7
   2.2 Java Card Language Subset 7
      2.2.1 Unsupported Items 8
      2.2.2 Supported Items 10
      2.2.3 Optionally Supported Items 12
      2.2.4 Limitations of the Java Card Virtual Machine 12
   2.3 Java Card VM Subset 14
      2.3.1 class File Subset 14
      2.3.2 Bytecode Subset 16

2.3.3 Exceptions 18

3. Structure of the Java Card Virtual Machine 23

3.1 Data Types and Values 23

3.2 Words 24

3.3 Runtime Data Areas 24

3.4 Applet Contexts 24

3.5 Frames 25

3.6 Representation of Objects 25

3.7 Special Initialization Methods 25

3.8 Exceptions 26

3.9 Binary File Formats 26

3.10 Instruction Set Summary 26

3.10.1 Types and the Java Card Virtual Machine 27

4. Java Card Naming 31

4.1 Overview of Token-based Linking 31

4.1.1 Externally Visible Items 31

4.1.2 Private Tokens 32

4.1.3 The Export File and Conversion 32

4.1.4 References – External and Internal 33

4.1.5 Installation and Linking 33

4.2 Token Assignment 33

4.2.1 Token Details 34

5. The Export File Format 37

5.1 Export File Name 38

5.2 Export File 38

5.3 Constant Pool 40

5.3.1 CONSTANT_Package 40

5.3.2 CONSTANT_Interfaceref 42

- 5.3.3 CONSTANT_Integer 43
- 5.3.4 CONSTANT_Utf8 43
- 5.4 Classes 44
- 5.5 Fields 47
- 5.6 Methods 49
- 5.7 Attributes 50
    - 5.7.1 ConstantValue Attribute 51

6. The Cap File Format 53
    - 6.1 Component Model 54
        - 6.1.1 Containment in a JAR File 55
        - 6.1.2 Defining New Components 55
    - 6.2 Header Component 56
    - 6.3 Directory Component 59
    - 6.4 Applet Component 61
    - 6.5 Imports Component 62
    - 6.6 Constant Pool Component 63
        - 6.6.1 CONSTANT_Classref 64
        - 6.6.2 CONSTANT_InstanceFieldref, CONSTANT_VirtualMethodref, and CONSTANT_SuperMethodref 66
        - 6.6.3 CONSTANT_StaticFieldref and CONSTANT_StaticMethodref 68
    - 6.7 Class Component 70
        - 6.7.1 interface_info and class_info 71
    - 6.8 Method Component 76
        - 6.8.1 exception_handler_info 77
        - 6.8.2 method_info 78
    - 6.9 Static Field Component 80
    - 6.10 Reference Location Component 83
    - 6.11 Export Component 85
    - 6.12 Descriptor Component 87
        - 6.12.1 class_descriptor_info 88

6.12.2 field_descriptor_info 89

6.12.3 method_descriptor_info 91

6.12.4 type_descriptor_info 93

7. Java Card Virtual Machine Instruction Set 95

7.1 Assumptions: The Meaning of "Must" 95

7.2 Reserved Opcodes 95

7.3 Virtual Machine Errors 96

7.4 Security Exceptions 96

7.5 The Java Card Virtual Machine Instruction Set 97

8. Tables of Instructions 217

Glossary 219

Figures

| | | |
|---|---|---|
| FIGURE 1-1 | Java Card Applet Conversion and Distribution | 3 |
| FIGURE 1-2 | Java Card Applet Distribution and Installation | 4 |
| FIGURE 6-1 | Static Field Order Map | 80 |
| FIGURE 7-1 | An example instruction page | 97 |

Tables

| | | |
|---|---|---|
| TABLE 2-1 | Unsupported constant pool tags | 14 |
| TABLE 2-2 | Supported constant pool tags. | 15 |
| TABLE 2-3 | Support of checked exceptions | 19 |
| TABLE 2-4 | Support of runtime exceptions | 20 |
| TABLE 2-5 | Support of errors | 20 |
| TABLE 3-1 | Type support in the Java Card Virtual Machine Instruction Set | 27 |
| TABLE 3-2 | Storage types and computational types | 29 |
| TABLE 4-1 | Token Range, Type and Scope | 34 |
| TABLE 5-1 | Constant Pool Tags | 40 |
| TABLE 5-2 | Package Flags | 41 |
| TABLE 5-3 | Class access and modifier flags | 45 |
| TABLE 5-4 | Field access and modifier flags | 48 |
| TABLE 5-5 | Method access and modifier flags | 50 |
| TABLE 6-1 | Component Tags | 54 |
| TABLE 6-2 | JAR File Names | 55 |
| TABLE 6-3 | Package Flags | 57 |
| TABLE 6-4 | Constant Pool Tags | 64 |
| TABLE 6-5 | Interface and Class Info Flags | 71 |
| TABLE 6-6 | Method flags | 79 |

| | | |
|---|---|---|
| TABLE 6-7 | Static Field Sizes | 81 |
| TABLE 6-8 | Array Types | 82 |
| TABLE 6-9 | One-byte Reference Location Example | 84 |
| TABLE 6-10 | Class Access and Modifier Flags | 88 |
| TABLE 6-11 | Field Access and Modifier Flags | 90 |
| TABLE 6-12 | Primitive Type Descriptor Values | 91 |
| TABLE 6-13 | Method Access and Modifier Flags | 92 |
| TABLE 6-14 | Type Descriptor Values | 94 |
| TABLE 8-1 | Instructions by Opcode Value | 217 |
| TABLE 8-2 | Instructions by Opcode Mnemonic | 218 |

Preface

Java™ Card™ technology combines a subset of the Java programming language with a runtime environment optimized for smart cards and similar small-memory embedded devices. The goal of Java Card technology is to bring many of the benefits of Java software programming to the resource-constrained world of devices like smart cards.

The Java Card *platform* is defined by three specifications: this *Java Card Virtual Machine Specification*, the *Java Card 2.1 Application Programming Interface*, and the *Java Card Runtime Environment (JCRE) 2.1 Specification*.

This specification describes the required behavior of the Java Card 2.1 Virtual Machine (VM) that developers should adhere to when creating an *implementation*. An implementation within the context of this document refers to a licensee's implementation of the Java Card Virtual Machine (VM), Application Programming Interface (API), Converter, or other component, based on the Java Card technology specifications. A Reference Implementation is an implementation produced by Sun Microsystems, Inc. Programs written for the Java Card platform are referred to as Java Card applets.

Who Should Use This Specification?

This document is for licensees of the Java Card technology to assist them in creating an implementation, developing a specification to extend the Java Card technology specifications, or in creating an extension to the Java Card Runtime Environment (JCRE). This document is also intended for Java Card applet developers who want a greater understanding of the Java Card technology specifications.

Before You Read This Specification

Before reading this document, you should be familiar with the Java programming language, the Java Card technology specifications, and smart card technology. A good resource for becoming familiar with Java technology and Java Card technology is the Sun Microsystems, Inc. website, located at: http://java.sun.com.

How This Book Is Organized

Chapter 1, "Introduction," provides an overview of the Java Card Virtual Machine architecture.

Chapter 2, "A Subset of the Java Virtual Machine," describes the subset of the Java programming language and Virtual Machine that is supported by the Java Card specification.

Chapter 3, "Structure of the Java Card Virtual Machine," describes the differences between the Java Virtual Machine and the Java Card Virtual Machine.

Chapter 4, "Java Card Naming," describes the basic uses and requirements of link tokens, and provides details of how tokens are used during software production and installation.

Chapter 5, "The Export File," describes the Converter export file used to link code against another package.

Chapter 6, "The Cap File Format," describes the format of the .cap file.

Chapter 7, "Instruction Set," describes the byte codes (opcodes) that comprise the Java Card Virtual Machine instruction set.

Chapter 8, "Tables of Instructions," summarizes the Java Card VM instructions in two different tables: one sorted by Opcode Value and the other sorted byMnemonic.

Glossary is a list of words and their definitions to assist you in using this book.

Prerequisites

This specification is not intended to stand on its own; rather it relies heavily on existing documentation of the Java platform. In particular, two books are required for the reader to understand the material presented here.

[1] Gosling, James, Bill Joy, and Guy Steele. *The Java™ Language Specification*. Addison-Wesley, 1996, ISBN 0-201-63451-1 – contains the definitive definition of the Java programming language. The Java Card 2.1 language subset defined here is based on the language specified in this book.

[2] Lindholm, Tim, and Frank Yellin. *The Java™ Virtual Machine Specification*. Addison-Wesley, 1996, ISBN 0-201-63452-X – defines the standard operation of the Java Virtual Machine. The Java Card virtual machine presented here is based on the definition specified in this book.

Related Documents

References to various documents or products are made in this manual. You should have the following documents available:

- *Java Card 2.1 Application Programming Interface*, Draft 2 Revision 1.4, Sun Microsystems, Inc.
- *Java Card Runtime Environment (JCRE) 2.1 Specification* Draft 1 Revision 1.2, Sun Microsystems, Inc.
- *Java Card Applet Developer's Guide*, Sun Microsystems, Inc.
- *The Java Language Specification* by James Gosling, Bill Joy, and Guy L. Steele. Addison-Wesley, 1996, ISBN 0-201-63451-1.
- *The Java Virtual Machine Specification* (Java Series) by Tim Lindholm and Frank Yellin. Addison-Wesley, 1996, ISBN 0-201-63452-X.
- *The Java Class Libraries: An Annotated Reference (Java Series)* by Patrick Chan and Rosanna Lee. Addison-Wesley, ISBN: 0201634589.
- ISO 7816 Specification Parts 1-6.
- EMV '96 Integrated Circuit Card Specification for Payment Systems.

Ordering Sun Documents

The SunDocs℠ program provides more than 250 manuals from Sun Microsystems, Inc. If you live in the United States, Canada, Europe, or Japan, you can purchase documentation sets or individual manuals using this program.

For a list of documents and how to order them, see the catalog section of the SunExpress™ Internet site at `http://www.sun.com/sunexpress`.

What Typographic Changes Mean

The following table describes the typographic changes used in this book.

TABLE P-1  Typographic Conventions

| Typeface or Symbol | Meaning | Example |
| --- | --- | --- |
| `AaBbCc123` | The names of commands, files, and directories; on-screen computer output | Edit your `.login` file.<br>Use `ls -a` to list all files.<br>`machine_name% You have mail.` |
| `AaBbCc123` | What you type, contrasted with on-screen computer output | `machine_name% su`<br>`Password:` |
| *AaBbCc123* | Command-line placeholder: replace with a real name or value | To delete a file, type `rm` *filename*. |
| *AaBbCc123* | Book titles, new words or terms, or words to be emphasized | Read Chapter 6 in *User's Guide*. These are called *class* options.<br>You *must* be root to do this. |

CHAPTER 1

Introduction

1.1 Motivation

Java Card technology enables programs written in the Java programming language to be run on smart cards and other small, resource-constrained devices. Developers can build and test programs using standard software development tools and environments, then convert them into a form that can be installed onto a Java Card enabled device. Application software for the Java Card platform is called an applet, or more specifically, a Java Card applet or card applet (to distinguish it from browser applets).

While Java Card technology enables programs written in the Java programming language to run on smart cards, such small devices are far too under-powered to support the full functionality of the Java platform. Therefore, the Java Card platform supports only a carefully chosen, customized subset of the features of the Java platform. This subset provides features that are well-suited for writing programs for small devices, and preserves most of the "feel" and all of the object-oriented capabilities of the Java programming language.

A simple approach to specifying a Java Card Virtual Machine would be to describe the subset of the features of the Java Virtual Machine that must be supported to allow for portability of source code across all Java Card enabled devices. Combining that subset specification and the information in the Java Virtual Machine Specification, smart card manufacturers could construct their own Java Card implementations. While that approach is feasible, it has a serious drawback. The resultant platform would be missing the important feature of binary portability of Java Card applets.

The standards that define the Java platform allow for binary portability of Java programs across all Java platform implementations. This "write once, run anywhere" quality of Java programs is perhaps the most significant feature of the platform. Part of the motivation for the creation of the Java Card platform was to bring just this kind of binary portability to the smart card industry. In a world with hundreds of millions or perhaps even billions of smart cards with varying processors and configurations, the costs of supporting multiple binary formats for software distribution could be overwhelming.

This Java Card Virtual Machine Specification is the key to providing binary portability. One way of understanding what this specification does is to compare it to its counterpart in the Java platform. The Java Virtual Machine Specification defines a Java Virtual Machine as an engine that loads Java class files and executes them with a particular set of semantics. The class file is a central piece of the Java architecture, and it is the standard for the binary compatibility of the Java platform. The Java Card Virtual Machine specification also defines a file format that is the standard for binary compatibility for the Java Card platform: the CAP file format is the form in which software is loaded onto Java Card enabled devices.

1.2 The Java Card Virtual Machine

The role of the Java Card Virtual Machine is best understood in the context of the process for production and deployment of Java Card software. There are several components that make up a Java Card system, including the Java Card Virtual Machine, the Java Card Converter, an off-card installation tool, and an on-card installation program, as shown in Figures 1-1 and 1-2.

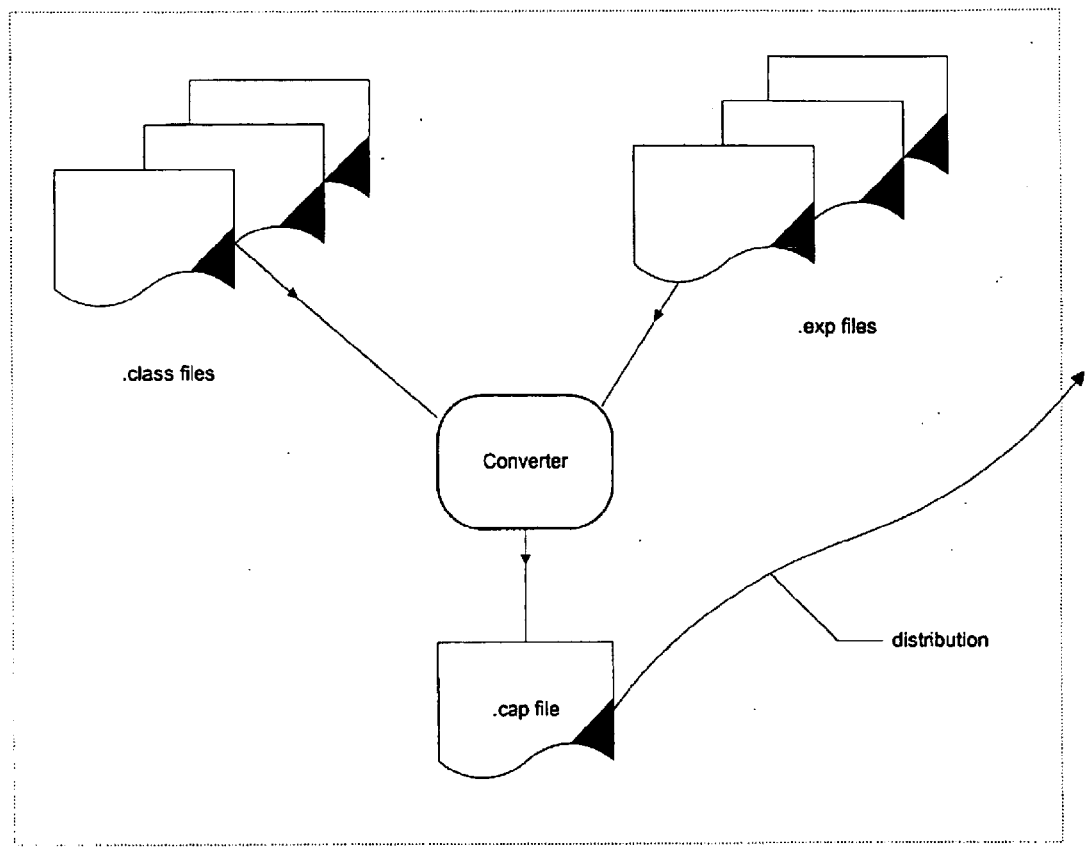

FIGURE 1-1  Java Card Applet Conversion and Distribution

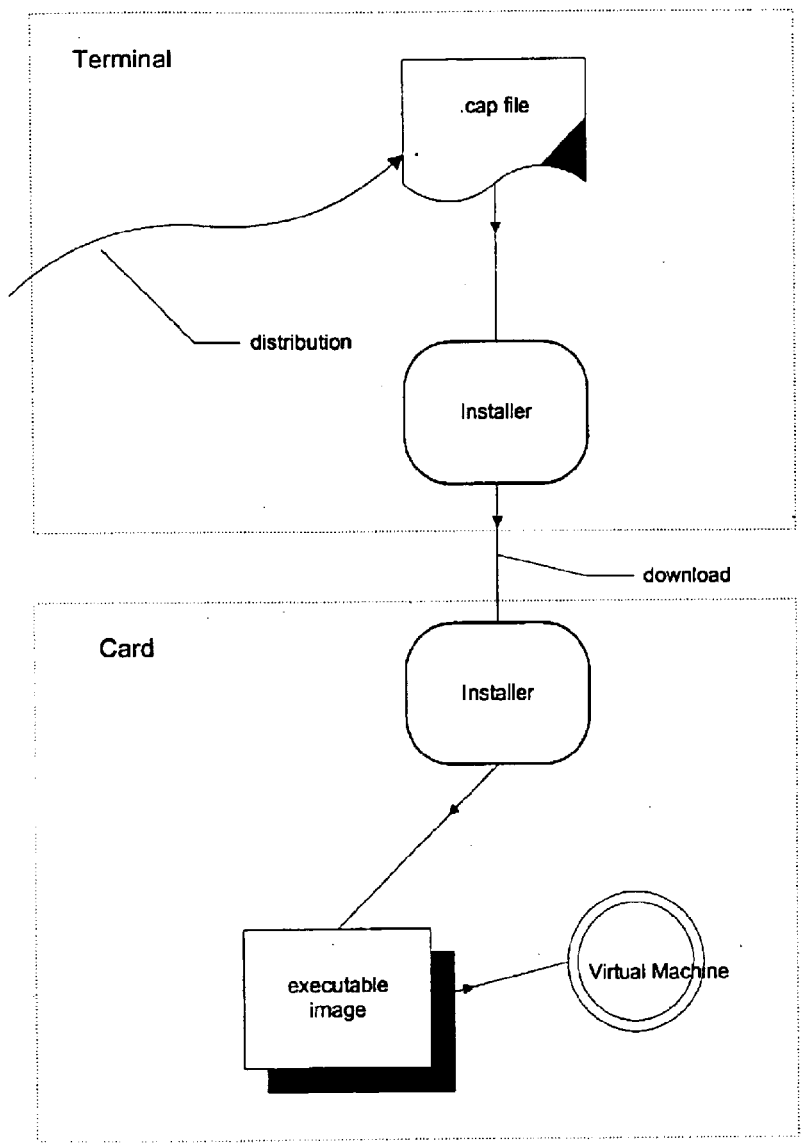

FIGURE 1-2  Java Card Applet Distribution and Installation

Development of a Java Card applet begins as with any other Java program: a developer writes one or more Java classes, and compiles the source code with a Java compiler, producing one or more class files. The applet is run, tested and debugged on a workstation using simulation tools to emulate the on-card environment. Then, when an applet is ready to be downloaded to a Java Card enabled device, the `class` files comprising the applet are converted to a CAP (converted applet) file using a Java Card Converter. The Java Card Converter takes as input not only the `class` files to be converted, but also one or more *export files*. An export file contains naming information for the contents of other packages that are imported by the classes being converted.

After conversion, the CAP file is copied to a card terminal, such as a desktop computer with a card reader peripheral. Then an installation tool on the terminal loads the CAP file and transmits it to the Java Card enabled device. An installation program on the Java Card enabled device receives the contents of the CAP file and prepares the applet to be run by the Java Card Virtual Machine. The virtual machine itself need not load or manipulate CAP files; it need only execute the applet code found in the CAP file that was loaded onto the card by the on-card installation program.

The division of functionality between the Java Card Virtual Machine and the on-card installation program keeps both the virtual machine and the installation program small. The installation program can be implemented as a Java program and executed on top of the Java Card Virtual Machine. Since Java Card instructions are denser than typical machine code, this reduces the size of the installer. The modularity also allows different installers to be used with a single Java Card Virtual Machine implementation.

1.3 Java Language Security

One of the fundamental features of the Java Virtual Machine is the strong security provided in part by the `class` file verifier. Many Java Card enabled devices may be too small to support on-card verification of CAP files. This consideration led to a design that enables on-card verification but does not rely on it. The data in a CAP file that is needed only for verification is packaged separately from the data needed for the actual execution of its applet. This allows for flexibility in how security is managed on a Java Card enabled device.

There are several options for providing language-level security on a Java Card enabled device. The conceptually simplest is to verify the contents of a CAP file on the card as it is downloaded or after it is downloaded. This option might only be feasible in the largest of Java Card enabled devices. However, some subset of verification might be possible even on smaller devices. Other options rely on some combination of one or more of: physical security of the installation terminal, a cryptographically enforced chain of trust from the source of the CAP file, and off-card verification of the contents of a CAP file.

The Java Card platform standards say as little as possible about CAP file installation and security policies. Since smart cards must serve as secure processors in many different systems with different security requirements, it is necessary to allow a great deal of flexibility to meet the needs of smart card issuers and users.

1.4 Java Card Runtime Environment Security

The standard runtime environment for the Java Card platform is the Java Card Runtime Environment (JCRE). The JCRE consists of the Java Card Virtual Machine along with the Java Card API classes. While the Java Card Virtual Machine has responsibility for ensuring Java language-level security, the JCRE imposes additional runtime security requirements on Java Card enabled devices which implement the JCRE, which results in a need for additional features on the Java Card Virtual Machine. Throughout this document, these additional features are designated as JCRE-specific, as shown in the example below.

The basic runtime security feature imposed by the JCRE enforces isolation of applets using what is called an *applet firewall*. The applet firewall prevents the objects that were created by one applet from being used by another applet. This prevents unauthorized access to both the fields and methods of class instances, as well as the length and contents of arrays.

Isolation of applets is an important security feature, but it requires a mechanism to allow applets to share objects in situations where there is a need to interoperate. The JCRE allows such sharing using the concept of *sharable interface objects*. These objects are the only way an applet can make its objects available for use by other applets. For more information about using sharable interface objects, see the description of the
javacard.framework.Sharable interface in the Java Card API Specification. Some descriptions of firewall-related features will make reference to the Sharable interface.

The applet firewall also protects from unauthorized use the objects owned by the JCRE itself. The JCRE can use mechanisms not reflected in the Java Card API to make its objects available for use by applets. A full description of the JCRE-related isolation and sharing features can be found in the *Java Card Runtime Environment Specification*.

CHAPTER 2

A Subset of the Java Virtual Machine

This chapter describes the subset of the Java virtual machine and language that is supported in the Java Card 2.1 platform.

2.1 Why a Subset is Needed

It would be ideal if programs for smart cards could be written using all of the Java programming language, but a full implementation of the Java virtual machine is far too large to fit on even the most advanced memory-constrained devices available today.

A typical memory-constrained device has less than 1K of RAM and 16K of ROM. The code for implementing string manipulation, single and double-precision floating point arithmetic, and thread management would be larger than the ROM space on such a device. Even if it could be made to fit, there would be no space left over for class libraries or application code. RAM resources are also very limited. The only workable option is to implement Java Card as a subset of the Java platform.

2.2 Java Card Language Subset

Implementations and applets written for the Java Card platform are written in the Java programming language. They are compiled using Java compilers. Java Card technology uses a subset of the Java language, and familiarity with the Java platform is required to understand the Java Card platform.

The items discussed in this section are not described to the level of a language specification. For complete documentation on the Java programming language, *The Java Language Specification*. (§1.1)

2.2.1 Unsupported Items

The items listed in this section are elements of the Java programming language and platform that are not supported by the Java Card platform.

2.2.1.1 Unsupported Features

Dynamic Class Loading

Dynamic class loading is not supported in the Java Card platform. An implementation of the Java Card platform is not able to load classes dynamically. Classes are either masked into the card during manufacturing or downloaded through an installation process after the card has been issued. Programs executing on the card may only refer to classes that already exist on the card, since there is no way to download classes during the normal execution of application code.

Security Manager

Security management in the Java Card platform differs significantly from that of the Java platform. In the Java platform, there is a Security Manager class (java.lang.SecurityManager) responsible for implementing security features. In the Java Card platform, language security policies are implemented by the Virtual Machine. There is no Security Manager class that makes policy decisions on whether to allow operations.

Garbage Collection & Finalization

Java Card does not require a garbage collector. Nor does Java Card allow explicit deallocation of objects, since this would break Java programming language's required pointer-safety. Therefore, application programmers may not assume that objects that are allocated are ever deallocated. Storage for unreachable objects will not necessarily be reclaimed.

Finalization is also not required. finalize() will not necessarily be called automatically by the Java Card virtual machine, and programmers should not rely on this behavior.

Threads

The Java Card virtual machine does not support multiple threads of control. Neither class Thread nor any of the thread-related keywords can be used in implementations of the Java Card platform.

*Cloning*

The Java Card platform does not support cloning of objects. Java Card API class Object does not implement a clone() method, and there is no Clonable interface provided.

*Access Control in Java Packages*

The Java Card language subset supports the package access control defined in the Java language. However, there are two cases that are not supported.

- If a class implements a method with package access visibility, a subclass may not override the method and change the access visibility of the method to protected or public.
- An interface that is defined with package access visibility may not be extended by an interface with public access visibility.

2.2.1.2 Keywords

The following keywords indicate unsupported options related to threads or memory management.

```
synchronized    transient    volatile
```

2.2.1.3 Unsupported Types

The Java Card platform does not support types char, double, float or long, or operations on those types. It also does not support arrays with more than one dimension.

2.2.1.4 Classes

In general, none of the Java classes are supported in the Java Card platform. Some classes from the java.lang package are supported (see Section 2.2.2.4, "Classes), but none of the rest are. For example, classes that are *not* supported are String, Thread (and all thread-related classes), wrapper classes such as Boolean and Integer, and class Class.

*System*

Class java.lang.System is not supported. Java Card supplies a class javacard.framework.JCSystem, which provides an interface to system behavior.

2.2.2 Supported Items

If a language feature is not explicitly described as unsupported, it is part of the supported subset. Notable supported features are described in this section.

2.2.2.1 Features

Packages

Implementations and applets written for the Java Card platform follow the standard rules for the Java platform packages. Java Card API classes are written as java source files, which include package designations. Package mechanisms are used to identify and control access to classes, static fields and static methods. Except as noted in "Access Control in Java Packages" on page 9, packages in the Java Card platform are used exactly the way they are in the Java platform.

Dynamic Object Creation

The Java Card platform programs supports dynamically created objects, both class instances and arrays. This is done, as usual, by using the new operator. Objects are allocated out of the heap.

As noted in "Garbage Collection & Finalization" on page 8, a Java Card Virtual Machine will not necessarily garbage collect objects. Any objects allocated on the card may continue to exist and consume resources even after they become unreachable.

Virtual Methods

Since Java Card objects are Java programming language objects, invoking virtual methods on objects in a program written for the Java Card platform is exactly the same as in a program written for the Java platform. Inheritance is supported, including the use of the super keyword.

Interfaces

Java Card classes may define or implement Interfaces as in the Java programming language. Invoking virtual methods on interface types works as expected. Type checking and the instanceof operator also work correctly with interfaces.

*Exceptions*

Java Card programs may define, throw and catch exceptions, as in Java programs. Class Throwable and its relevant subclasses are supported. (Some Exception and Error subclasses are omitted, since those exceptions cannot occur in the Java Card platform. See Section 2.3.3, "Exceptions" for specification of errors and exceptions.)

2.2.2.2 Keywords

The following keywords are supported. Their use is the same as in the Java programming language.

| abstract | default | If | package | switch |
| boolean | do | implements | private | this |
| break | else | import | protected | throw |
| byte | extends | instanceof | public | throws |
| case | final | int | return | try |
| catch | finally | interface | short | void |
| class | for | native | static | while |
| continue | goto | new | super | |

2.2.2.3 Types

Java programming language types boolean, byte, short, and int are supported. Objects (class instances and single-dimensional arrays) are also supported. Arrays can contain the supported primitive data types, objects, and other arrays.

Some Java Card implementations might not support use of the int data type. (Refer to Section 2.2.3.1, "int.")

2.2.2.4 Classes

Most of the classes in the java.lang package are not supported in Java Card. The following classes from java.lang are supported on the card in a limited form.

*Object*

Java Card classes descend from java.lang.Object, just as in the Java programming language. Most of the methods of Object are not available in the Java Card API, but the class itself exists to provide a root for the class hierarchy.

*Throwable*

Class Throwable and its subclasses are supported. Most of the methods of Throwable are not available in the Java Card API, but the class itself exists to provide a common ancestor for all exceptions.

2.2.3 Optionally Supported Items

This section describes what items are optionally supported. Optional means that a Java Card implementation is not required to support the specified items.

Optional features of the Java programming language are optional in the Java Card platform or not required for a Java Card compatible implementation. These features are described below.

2.2.3.1 int

The int keyword and 32-bit integer data types need not be supported in a Java Card implementation. A Java Card Virtual Machine that does not support the int data type will reject programs using that type.

2.2.4 Limitations of the Java Card Virtual Machine

The limitations of card hardware prevent Java Card programs from supporting the full range of functionality of certain Java platform features. The features in question are supported, but a particular virtual machine may limit the range of operation to less than that of the Java platform.

To ensure a level of portability for application code, this section establishes a minimum required level for partial support of these language features.

The limitations here are listed as maximums from the application programmer's perspective. Applets that do not violate these maximum values will be portable across all Java Card implementations. From the Java Card VM implementer's perspective, each maximum listed indicates a minimum level of support that will allow portability of applets.

2.2.4.1  Objects

Methods

A class can implement a maximum of 128 public or protected instance methods, and a maximum of 128 instance methods with package visibility. These limits include inherited methods.

Class Instances

Class instances can contain a maximum of 256 fields, where an int data type is counted as occupying two fields.

Arrays

Arrays can hold a maximum of 32767 fields.

2.2.4.2  Methods

The maximum size of a stack frame is 127 words, where an int data type is counted as occupying two words. This includes the parameters, locals, and operand stack.

2.2.4.3  Switch Statements

Java Card programs are limited to a maximum of 65536 cases in a switch statement.

2.2.4.4  Class Initialization

There is limited support for initialization of static field values in <clinit> methods. Static fields of applets may only be initialized to primitive compile-time constant values, or arrays of primitive compile-time constants. Static fields of user libraries may only be initialized to primitive compile-time constant values. Primitive constant data types include boolean, byte, short, and int.

2.3 Java Card VM Subset

Java Card technology uses a subset of the Java Virtual Machine, and familiarity with the Java platform is required to understand the Java Card Virtual Machine.

The items discussed in this section are not described to the level of a virtual machine specification. For complete documentation on the Java Virtual Machine, refer to §1.1 of *The Java™ Virtual Machine Specification*.

2.3.1 class File Subset

The Java Card Virtual Machine operates on standard Java platform class files. Since the Java Card Virtual Machine supports only a subset of the behavior of the Java Virtual Machine, it also supports only a subset of the standard class file format.

2.3.1.1 Not Supported in Class Files

*Field Descriptors*

Field descriptors may not contain *BaseType* characters C, D, F or L. *ArrayType* descriptors for arrays of more than one dimension may not be used.

*Constant Pool*

Constant pool table entry tags that indicate unsupported types are not supported.

TABLE 2-1  Unsupported constant pool tags

| Constant Type | Value |
|---|---|
| CONSTANT_String | 8 |
| CONSTANT_Float | 4 |
| CONSTANT_Long | 5 |
| CONSTANT_Double | 6 |

Constant pool structures for types CONSTANT_String_info, CONSTANT_Float_info, CONSTANT_Long_info and CONSTANT_Double_info are not supported.

Fields

In field_info structures, the access flags ACC_VOLATILE and ACC_TRANSIENT are not supported.

Methods

In method_info structures, the access flags ACC_SYNCHRONIZED and ACC_NATIVE are not supported.

2.3.1.2 Supported in Class Files

ClassFile

All items in the ClassFile structure are supported.

Field Descriptors

Field descriptors may contain *BaseType* characters B, I, S and Z, as well as any *ObjectType*. *ArrayType* descriptors for arrays of a single dimension may also be used.

Method Descriptors

All forms of method descriptors are supported.

Constant pool

Constant pool table entry tags for supported data types are supported.

TABLE 2-2 Supported constant pool tags.

| Constant Type | Value |
|---|---|
| CONSTANT_Class | 7 |
| CONSTANT_Fieldref | 9 |
| CONSTANT_Methodref | 10 |
| CONSTANT_InterfaceMethodref | 11 |
| CONSTANT_Integer | 3 |
| CONSTANT_NameAndType | 12 |
| CONSTANT_Utf8 | 1 |

Constant pool structures for types CONSTANT_Class_info, CONSTANT_Fieldref_info, CONSTANT_Methodref_info, CONSTANT_InterfaceMethodref_info, CONSTANT_Integer_info, CONSTANT_NameAndType_info and CONSTANT_Utf8_info are supported.

Fields

In field_info structures, the supported access flags are ACC_PUBLIC, ACC_PRIVATE, ACC_PROTECTED, ACC_STATIC and ACC_FINAL.

The remaining components of field_info structures are fully supported.

Methods

In method_info structures, the supported access flags are ACC_PUBLIC, ACC_PRIVATE, ACC_PROTECTED, ACC_STATIC, ACC_FINAL and ACC_ABSTRACT. The access flag ACC_NATIVE is supported for non-applet class files.

The remaining components of method_info structures are fully supported.

Attributes

The attribute_info structure is supported. The Code, ConstantValue, Exceptions and LocalVariableTable attributes are supported.

2.3.2 Bytecode Subset

The following sections detail the bytecodes that are either supported or unsupported in the Java Card platform. For more details, refer to Chapter 6, "Instruction Set."

2.3.2.1 Unsupported Bytecodes

| | | | |
|---|---|---|---|
| lconst_<l> | fconst_<f> | dconst_<d> | ldc2_w2 |
| lload | fload | dload | lload_<n> |
| fload_<n> | dload_<n> | laload | faload |
| daload | caload | lstore | fstore |
| dstore | lstore_<n> | fstore_<n> | dstore_<n> |
| lastore | fastore | dastore | castore |
| ladd | fadd | dadd | lsub |
| fsub | dsub | lmul | fmul |
| dmul | ldiv | fdiv | ddiv |
| lrem | frem | drem | lneg |
| fneg | dneg | lshl | lshr |
| lushr | land | lor | lxor |
| i2l | i2f | i2d | l2i |
| l2f | l2d | f2i | f2d |
| d2i | d2l | d2f | i2c |
| lcmp | fcmpl | fcmpg | dcmpl |
| dcmpg | lreturn | freturn | dreturn |
| monitorenter | monitorexit | multianewarray | goto_w |
| jsr_w | | | |

2.3.2.2 Supported Bytecodes

| | | | |
|---|---|---|---|
| nop | aconst_null | iconst_<i> | bipush |
| sipush | ldc | ldc_w | iload |
| aload | iload_<n> | aload_<n> | iaload |
| aaload | baload | saload | istore |
| astore | istore_<n> | astore_<n> | iastore |
| aastore | bastore | sastore | pop |
| pop2 | dup | dup_x1 | dup_x2 |
| dup2 | dup2_x1 | dup2_x2 | swap |
| iadd | isub | imul | idiv |
| irem | ineg | ior | ishl |
| ishr | iushr | iand | ixor |
| iinc | i2b | i2s | if<cond> |
| ificmp_<cond> | ifacmp_<cond> | goto | jsr |
| ret | tableswitch | lookupswitch | ireturn |
| areturn | return | getstatic | putstatic |
| getfield | putfield | invokevirtual | invokespecial |

| | | | |
|---|---|---|---|
| invokestatic | invokeinterface | new | newarray |
| anewarray | arraylength | athrow | checkcast |
| instanceof | wide | ifnull | ifnonnull |

2.3.2.3 Static Restrictions on Bytecodes

For it to be acceptable to a Java Card Virtual Machine, a class file must conform to the following restrictions on the static form of bytecodes.

*ldc, ldc_w*

The ldc and ldc_w bytecodes can only be used to load integer constants. The constant pool entry at *index* must be a CONSTANT_Integer entry.

*lookupswitch*

The value of the *npairs* operand must be less than 65536. The bytecode can contain at most 65535 cases.

*tableswitch*

The values of the *high* and *low* operands must both be less than 65536 (so they can fit in 16 bits). The bytecode can contain at most 65535 cases.

*wide*

The wide bytecode cannot be used to generate local indices greater than 127, and it cannot be used with any instructions other than iinc. It can only be used with an iinc bytecode to extend the range of the increment constant.

2.3.3 Exceptions

Java Card provides full support for the Java platform's exception mechanism. Users can define, throw and catch exceptions just as in the Java platform. Java Card also makes use of the exceptions and errors defined in *The Java Language Specification* [1]. An updated list of the Java platform's exceptions is provided in the JDK documentation.

Not all of the Java platform's exceptions are supported in Java Card. Exceptions related to unsupported features are naturally not supported. Class loader exceptions (the bulk of the checked exceptions) are not supported. And no exceptions or errors defined in packages other than java.lang are supported.

Note that some exceptions may be supported to the extent that their error conditions are detected correctly, but classes for those exceptions will not necessarily be present in the API.

The supported subset is described in the tables below.

2.3.3.1 Uncaught and Uncatchable Exceptions

In the Java platform, uncaught exceptions and errors will cause the virtual machine to report the error condition and exit. In Java Card, uncaught exceptions or errors should cause the Virtual Machine to halt. Optionally, an implementation can require the card to be muted or blocked from further use.

Throwing a runtime exception or error that cannot be caught should also cause the card to be muted. Cards may also optionally take stricter actions in response to throwing such an exception.

2.3.3.2 Checked Exceptions

TABLE 2-3 Support of checked exceptions

| Exception | Supported | Not Supported |
|---|---|---|
| ClassNotFoundException | | ● |
| CloneNotSupportedException | | ● |
| IllegalAccessException | | ● |
| InstantiationException | | ● |
| InterruptedException | | ● |
| NoSuchFieldException | | ● |
| NoSuchMethodException | | ● |

2.3.3.3 Runtime Exceptions

TABLE 2-4 Support of runtime exceptions

| Runtime Exception | Supported | Not Supported |
|---|---|---|
| ArithmeticException | ● | |
| ArrayStoreException | ● | |
| ClassCastException | ● | |
| IllegalArgumentException | ● | |
| IllegalThreadStateException | | ● |
| NumberFormatException | | ● |
| IllegalMonitorStateException | | ● |
| IllegalStateException | ● | |
| IndexOutOfBoundsException | ● | |
| ArrayIndexOutOfBoundsException | ● | |
| StringIndexOutOfBoundsException | | ● |
| NegativeArraySizeException | ● | |
| NullPointerException | ● | |
| SecurityException | ● | |

2.3.3.4 Errors

TABLE 2-5 Support of errors

| Error | Supported | Not Supported |
|---|---|---|
| LinkageError | ● | |
| ClassCircularityError | ● | |
| ClassFormatError | ● | |
| ExceptionInInitializerError | ● | |
| IncompatibleClassChangeError | ● | |
| AbstractMethodError | ● | |
| IllegalAccessError | ● | |
| InstantiationError | ● | |
| NoSuchFieldError | ● | |
| NoSuchMethodError | ● | |
| NoClassDefFoundError | ● | |
| UnsatisfiedLinkError | ● | |

| Error | Supported | Not Supported |
|---|---|---|
| VerifyError | ● | |
| ThreadDeath | | ● |
| VirtualMachineError | ● | |
| InternalError | ● | |
| OutOfMemoryError | ● | |
| StackOverflowError | ● | |
| UnknownError | ● | |

CHAPTER 3

Structure of the Java Card Virtual Machine

The specification of the Java Card Virtual Machine is in many ways quite similar to that of the Java Virtual Machine. This similarity is of course intentional, as the design of the Java Card Virtual Machine was based on that of the Java Virtual Machine. Rather than reiterate all the details of this specification which are shared with that of the Java Virtual Machine, this chapter will mainly refer to its counterpart in the *Java Virtual Machine Specification*, providing new information only where the Java Card Virtual Machine differs.

3.1  Data Types and Values

The Java Card Virtual Machine supports the same two kinds of data types as the Java Virtual Machine: *primitive types* and *reference types*. Likewise, the same two kinds of values are used: *primitive values* and *reference values*.

The primitive data types supported by the Java Card Virtual Machine are the *numeric types* and the returnAddress type. The numeric types consist only of the *integral types*:

- byte, whose values are 8-bit signed two's complement integers
- short, whose values are 16-bit signed two's complement integers Some Java Card Virtual Machine implementations may also support an additional integral type:

- int, whose values are 32-bit signed two's complement integers

Support for reference types is identical to that in the Java Virtual Machine.

3.2 Words

The Java Card Virtual Machine is defined in terms of an abstract storage unit called a *word*. This specification does not mandate the actual size in bits of a word on a specific platform. A word is large enough to hold a value of type `byte`, `short`, `reference` or `returnAddress`. Two words are large enough to hold a value of type `int`.

The actual storage used for values in an implementation is platform-specific. There is enough information present in the descriptor component of a CAP file to allow an implementation to optimize the storage used for values in variables and on the stack.

3.3 Runtime Data Areas

The Java Card Virtual Machine can support only a single thread of execution. Any runtime data area in the Java Virtual Machine which is duplicated on a per-thread basis will have only one global copy in the Java Card Virtual Machine.

The Java Card Virtual Machine's heap is not required to be garbage collected. Objects allocated from the heap will not necessarily be reclaimed.

This specification does not include support for `native` methods, so there are no native method stacks.

Otherwise, the runtime data areas are as documented for the Java Virtual Machine.

3.4 Applet Contexts

Each applet running on a Java Card Virtual Machine is associated with an execution context known as an *applet context*. The Java Card Virtual Machine uses the applet context of the current frame to enforce security policies for inter-applet operations.

There is a one-to-one mapping between applet contexts and packages in which applets are defined. An easy way to think of an applet context is as the runtime equivalent of a package, since Java packages are compile-time constructs and have no direct representation at runtime. As a consequence, all applets managed by applet instances of applet classes from the same package will share the same applet context.

The Java Card Runtime Environment also has its own applet context. Framework objects execute in this *JCRE context*.

The applet context of the currently executing method is known as the *current context*. When a method in one context successfully invokes a method in another context, the Java Card Virtual Machine performs an *applet context switch*. Afterwards the invoked method's applet context becomes the current context. When the invoked method returns, the current context is switched back to the previous context.

3.5 Frames

Java Card Virtual Machine *frames* are very similar to those defined for the Java Virtual Machine. Each frame has a set of local variables and an operand stack. Frames also contain a reference to a constant pool, but since all constant pools for all classes in a package are merged, the reference is to the constant pool for the current class' package.

Each frame also includes a reference to the applet context in which the current method is executing.

3.6 Representation of Objects

The Java Card Virtual Machine does not mandate a particular internal structure for objects or a particular layout of their contents. However, the core components in a CAP file are defined assuming a default structure for certain runtime structures (such as descriptions of classes), and a default layout for the contents of dynamically allocated objects. Information from the descriptor component of the CAP file can be used to format objects in whatever way an implementation requires.

3.7 Special Initialization Methods

The Java Card Virtual Machine supports *instance initialization methods* exactly as does the Java Virtual Machine.

The Java Card Virtual Machine includes only limited support for *class or interface initialization methods*. There is no general mechanism for executing <clinit> methods on a Java Card Virtual Machine. Instead, a CAP file includes information for initializing class data as defined in Chapter 2, "A Subset of the Java Virtual Machine."

3.8 Exceptions

Exception support in the Java Card Virtual Machine is identical to support for exceptions in the Java Virtual Machine.

3.9 Binary File Formats

This specification defines two binary file formats which enable platform-independent development, distribution and execution of Java Card software.

The CAP file format describes files that contain executable code and can be downloaded and installed onto a Java Card enabled device. A CAP file is produced by a Java Card Converter tool, and contains a converted form of an entire package of Java classes. This file format's relationship to the Java Card Virtual Machine is analogous to the relationship of the `class` file format to the Java Virtual Machine.

The export file format describes files that contain the public linking information of Java Card packages. A package's export file is used when converting client packages of that package.

3.10 Instruction Set Summary

The Java Card Virtual Machine instruction set is quite similar to the Java Virtual Machine instruction set. Individual instructions consist of a one-byte *opcode* and zero or more *operands*. The pseudo-code for the Java Card Virtual Machine's instruction fetch-decode-execute loop is the same. And multi-byte operand data is also encoded in *big-endian* order.

There are a number of ways in which the Java Card Virtual Machine instruction set diverges from that of the Java Virtual Machine. Most of the differences are due to the Java Card Virtual Machine's more limited support for data types. Another source of divergence is that the Java Card Virtual Machine is intended to run on 8-bit and 16-bit architectures, whereas the Java Virtual Machine was designed for a 32-bit architecture. The rest of the differences are all oriented in one way or another toward optimizing the size or performance of either the Java Card Virtual Machine or Java Card programs. These changes include inlining constant pool data directly in instruction opcodes or operands, adding multiple versions of a particular instruction to deal with different datatypes, and creating composite instructions for operations on the current object.

3.10.1 Types and the Java Card Virtual Machine

The Java Card Virtual Machine supports only a subset of the types supported by the Java Virtual Machine. This subset is described in Chapter 2, "A Subset of the Java Virtual Machine." Type support is reflected in the instruction set, as instructions encode the data types on which they operate.

Given that the Java Card Virtual Machine supports fewer types than the Java Virtual Machine, there is an opportunity for better support for smaller data types. Lack of support for large numeric data types frees up space in the instruction set. This extra instruction space has been used to directly support arithmetic operations on the short data type.

Some of the extra instruction space has also been used to optimize common operations. Type information is directly encoded in field access instructions, rather than being obtained from an entry in the constant pool.

TABLE 3-1 summarizes the type support in the instruction set of the Java Card Virtual Machine. Only instructions that exist for multiple types are listed. Wide and composite forms of instructions are not listed either. A specific instruction, with type information, is built by replacing the *T* in the instruction template in the opcode column by the letter representing the type in the type column. If the type column for some instruction is blank, then no instruction exists supporting that operation on that type. For instance, there is a load instruction for type short, *sload*, but there is no load instruction for type byte.

TABLE 3-1  Type support in the Java Card Virtual Machine Instruction Set

| opcode | byte | short | int | reference |
|--------|--------|--------|--------|-----------|
| Tspush | bspush | sspush |        |           |
| Tipush | bipush | sipush | iipush |           |
| Tconst |        | sconst | iconst | aconst    |
| Tload  |        | sload  | iload  | aload     |
| Tstore |        | sstore | istore | astore    |
| Tinc   |        | sinc   | iinc   |           |
| Taload | baload | saload | iaload | aaload    |
| Tastore| bastore| sastore| iastore| aastore   |
| Tadd   |        | sadd   | iadd   |           |
| Tsub   |        | ssub   | isub   |           |
| Tmul   |        | smul   | imul   |           |
| Tdiv   |        | sdiv   | idiv   |           |
| Trem   |        | srem   | irem   |           |
| Tneg   |        | sneg   | ineg   |           |

TABLE 3-1  Type support in the Java Card Virtual Machine Instruction Set

| opcode | byte | short | int | reference |
|---|---|---|---|---|
| Tshl | | sshl | ishl | |
| Tshr | | sshr | ishr | |
| Tushr | | sushr | iushr | |
| Tand | | sand | iand | |
| Tor | | sor | ior | |
| Txor | | sxor | ixor | |
| s2T | s2b | | s2i | |
| i2T | i2b | i2s | | |
| Tcmp | | | icmp | |
| if_TcmpOP | | if_scmpOP | | if_acmpOP |
| Tlookupswitch | | slookupswitch | ilookupswitch | |
| Ttableswitch | | stableswitch | itableswitch | |
| Treturn | | sreturn | ireturn | areturn |
| getstatic_T | getstatic_b | getstatic_s | getstatic_i | getstatic_a |
| putstatic_T | putstatic_b | putstatic_s | putstatic_i | putstatic_a |
| getfield_T | getfield_b | getfield_s | getfield_i | getfield_a |
| putfield_T | putfield_b | putfield_s | putfield_i | putfield_a |

The mapping between Java storage types and Java Card Virtual Machine computational types is summarized by the following table:

TABLE 3-2  Storage types and computational types

| Java (Storage) Type | Size in Bits | Computational Type |
|---|---|---|
| byte | 8 | short |
| short | 16 | short |
| int | 32 | int |

Chapter 7, "Java Card Virtual Machine Instruction Set," describes the Java Card Virtual Machine instruction set in detail.

CHAPTER 4

Java Card Naming

This chapter describes the mechanisms used for naming items in Java Card CAP files and Export files. Java class files use Unicode strings organized with a particular convention to name Java packages as well as items within those packages. As the Java Card platform does not include support for strings, alternative support for naming is provided.

This chapter describes a scheme that allows downloaded software to be linked against APIs on a Java Card enabled smart card. The scheme represents referenced items as opaque tokens, instead of Unicode strings as are used in Java class files. The two basic requirements of this linking scheme are that it allows linking on the card, and that it does not require internal implementation details of card APIs to be revealed to clients of those APIs. Secondary requirements are that the scheme be efficient in terms of resource use on the card, and have good performance for linking. And of course, it must preserve the semantics of the Java language.

4.1 Overview of Token-based Linking

This section provides an overview of tokens and their roles in the various stages of the production and installation of packages which implement applets and user libraries.

4.1.1 Externally Visible Items

Classes (including Interfaces) in Java packages may be declared with public or package visibility. A class's methods and fields may be declared with public, protected, package or private visibility. For purposes of this document, we define public classes, public or protected fields, and public or protected methods to be *externally visible* from the package. All externally visible items are described in a package's Export file.

Each externally visible item must have a token associated with it to enable references from other packages to the item to be resolved on-card. There are six kinds of items in a package that require external identification.

- Classes (including Interfaces)
- Static Fields
- Static Methods
- Instance Fields
- Virtual Methods
- Interface Methods

4.1.2 Private Tokens

Items which are not externally visible are *internally visible*. Internally visible items are not described in a package's export file, but some such items use *private tokens* to represent internal references. External references are represented by *public tokens*. There are two kinds of items which can be assigned private tokens.

- Instance Fields
- Virtual Methods

4.1.3 The Export File and Conversion

Each externally visible item in a package has an entry in the package's export file. Each entry holds the item's name and its token. Some entries may include additional information as well. For detailed information on the export file format, see Chapter 5, "The Export File Format."

The export file is used to map names for imported items to tokens during package conversion.

During the conversion of the class files of applet A, the export file of javacard.framework is used to find tokens for items in the API which are used by the applet. The Java Card converter uses these tokens to represent references to items in the API.

For instance, an applet creates a new instance of framework class PIN. The framework export file contains an entry for javacard.framework.PIN which holds the token for this class. The converter places this token in the CAP file's constant pool to represent an unresolved reference to the class. The token value is used to resolve the reference on a card.

4.1.4 References – External and Internal

In the context of a CAP file, references to items are made indirectly through a package's constant pool. References to items in other packages are called *external*, and are represented in terms of tokens. References to items in the same CAP file are called *internal*, and are represented either in terms of tokens, or in a different internal format.

An external reference to a class is composed of a package token and a class token. Together those tokens specify a certain class in a certain package. An internal reference to a class is a 15-bit value which is a pointer to the class structure's location within the CAP file.

An external reference to a static class member, either a field or method, consists of a package token, a class token, and a token for the static field or static method. An internal reference to a static class member is a 16-bit value which is a pointer to the item's location in the CAP file.

References to instance fields, virtual methods and interface methods consist of a class reference and a token of the appropriate type. The class reference determines whether the reference is external or internal.

4.1.5 Installation and Linking

External references in a CAP file can be resolved on a card from token form into the internal representation used by the card virtual machine.

A token can only be resolved in the context of the package which defines it. Just as the export file maps from a package's externally visible names to tokens, there is a set of link information for each package on the card that maps from tokens to resolved references.

4.2 Token Assignment

Tokens for an API are assigned by the API's developer and published in the package export file(s) for that API. Since the name-to-token mappings are published, an API developer may choose any order for tokens (subject to the constraints listed below).

A particular card platform can resolve tokens into whatever internal representation is most useful for that implementation of a Java Card VM. Some tokens may be resolved to indices. For example, an instance field token may be resolved to an index into a class instance's fields. In such cases, the token value is distinct from and unrelated to the value of the resolved index.

4.2.1 Token Details

Each kind of item in a package has its own independent scope for tokens of that kind. The token range and assignment rules for each kind are listed below.

TABLE 4-1 Token Range, Type and Scope

| Token Type | Range | Type | Scope |
|---|---|---|---|
| Package | 0 - 127 | Private | CAP File |
| Class | 0 - 255 | Public | Package |
| Static Field | 0 - 255 | Public | Class |
| Static Method | 0 - 255 | Public | Class |
| Instance Field | 0 - 255 | Public or Private | Class |
| Virtual Method | 0 - 127 | Public or Private | Class Hierarchy |
| Interface Method | 0 - 127 | Public | Class |

4.2.1.1 Package

All package references from within a CAP file are assigned private tokens; package tokens will never appear in an export file. Package token values must be in the range from 0 to 127, inclusive. The tokens for all the packages referenced from classes in a CAP file are numbered consecutively starting at zero. The ordering of package tokens is not specified.

4.2.1.2 Classes and Interfaces

All externally visible classes in a package are assigned public tokens. Package-visible classes are not assigned tokens. Class token values must be in the range from 0 to 255, inclusive. The tokens for all the public classes in a package are numbered consecutively starting at zero. The ordering of class tokens is not specified.

4.2.1.3 Static Fields

All externally visible static fields in a package are assigned public tokens. Package-visible and private static fields are not assigned tokens. No tokens are assigned for final static fields which are initialized to primitive, compile-time constants, as these fields are never linked on-card. Static fields token values must be in the range from 0 to 255, inclusive. The tokens for all other externally visible static fields in a class are numbered consecutively starting at zero. The ordering of static field tokens is not specified.

4.2.1.4 Static Methods

All externally visible static methods in a package are assigned public tokens, including statically bound instance methods such as constructors. Static method token values must be in the range from 0 to 255, inclusive. Package-visible and private static methods are not assigned tokens. The tokens for all the externally visible static methods in a class are numbered consecutively starting at zero. The ordering of static method tokens is not specified.

4.2.1.5 Instance Fields

All instance fields defined in a package are assigned either public or private tokens. Instance field token values must be in the range from 0 to 255, inclusive. Public and private tokens for instance fields are assigned from the same namespace. The tokens for all the instance fields in a class are numbered consecutively starting at zero, except that the token after an int field is skipped and the token for the following field is numbered two greater than the token of the int field. Tokens for externally visible fields must be numbered less than the tokens for package and private fields. For public tokens, the tokens for reference type fields must be numbered greater than the tokens for primitive type fields. For private tokens, the tokens for reference type fields must be numbered less than the tokens for primitive type fields. Beyond that the ordering of instance field tokens in a class is not specified.

| | primitive | boolean | 0 |
|---|---|---|---|
| public and protected = public tokens | | byte | 1 |
| | | short | 2 |
| | references | byte[] | 3 |
| | | Applet | 4 |
| package and private = private tokens | references | short[] | 5 |
| | | Object | 6 |
| | primitive | int | 7 |
| | | short | 9 |

4.2.1.6 Virtual Methods

All virtual methods defined in a package are assigned either public or private tokens. Virtual method token values must be in the range from 0 to 127, inclusive. Public and private tokens for virtual methods are assigned from different namespaces. The high bit of the byte containing a virtual method token is set to one if the token is a private token.

Public tokens for the externally visible introduced virtual methods in a class are numbered consecutively starting at one greater than the highest numbered public virtual method token of the class's superclass. If a method overrides a method implemented in the class's superclass, that method uses the same token number as the method in the superclass. The high bit of the byte containing a public virtual method token is always set to zero, to indicate it is a public token. The ordering of public virtual method tokens in a class is not specified.

Private virtual method tokens are assigned differently from public virtual method tokens. If a class and its superclass are defined in the same package, the tokens for the package-visible introduced virtual methods in that class are numbered consecutively starting at one greater than the highest numbered private virtual method token of the class's superclass. If the class and its superclass are defined in different packages, the tokens for the package-visible introduced virtual methods in that class are numbered consecutively starting at zero. If a method overrides a method implemented in the class's superclass, that method uses the same token number as the method in the superclass. The definition of the Java programming language specifies that overriding a package-visible virtual method is only possible if both the class and its superclass are defined in the same package. The high bit of the byte containing a virtual method token is always set to one, to indicate it is a private token. The ordering of private virtual method tokens in a class is not specified.

4.2.1.7 Interface Methods

All interface methods defined in a package are assigned public tokens, as interface methods are always public. Interface methods tokens values must be in the range from 0 to 127, inclusive. The tokens for all the interface methods defined in or inherited by an interface are numbered consecutively starting at zero. The token value for an interface method in a given interface is unrelated to the token values of that same method in any of the interface's superinterfaces. The high bit of the byte containing an interface method token is always set to zero, to indicate it is a public token. The ordering of interface method tokens is not specified.

CHAPTER 5

The Export File Format

This chapter describes the Java Card Virtual Machine Export file format. Compliant Java Card Virtual Machines must be capable of producing and consuming all Export files that conform to the specification provided in this book.

A Java Card Export file contains all of the public classes and interfaces defined in one Java package, and all of the public and protected fields and methods defined in those classes and interfaces. The Export File contains a mapping of these items to tokens (Chapter 3, "Java Card Naming"). Tokens are used to identify items in a CAP file (Chapter 5, "The Cap File Format") and resolve references on a Java Card. The Export file is used during conversion of a package and creation of a Java Card CAP file.

The format in the Export file is similar to the Java class file. Structures and data in Java class files that describe internal implementation details, like bytecodes and private methods, are not included. Information beyond that in a Java class file includes package identification details and tokens associated with each class, interface, field, and method.

Final static fields of primitive types are represented in the Export file, but are not assigned token values suitable for referencing on Java Cards. These fields are not represented in CAP files or on Java Cards. Instead Java Card Converters must replace bytecodes that reference final static fields of primitive types with bytecodes that load the constant value of the field. Having this information included in the Export file enables this Converter functionality.[1]

An Export file consists of a stream of 8-bit bytes. All 16-bit quantities are constructed by reading in two consecutive 8-bit bytes. Multibyte data items are always stored in big-endian order, where the high-order bytes come first.

This chapter defines its own set of data types representing Java Card Export file data: The types u1, and u2 represent an unsigned one-, and two-byte quantities, respectively.

---

1. Although Java compilers ordinarily replace references to final static fields of primitive types with primitive constants, this functionality is not required.

The Java Card Export file format is presented using pseudo structures written in a C-like structure notation. To avoid confusion with the fields of Java Card Virtual Machine classes and class instances, the contents of the structures describing the Java Card CAP file format are referred to as *items*. Unlike the fields of a C structure, successive items are stored in the Java Card file sequentially, without padding or alignment.

Variable-sized *tables*, consisting of variable-sized items, are used in several class file structures. Although we will use C-like array syntax to refer to table items, the fact that tables are streams of varying-sized structures means that it is not possible to directly translate a table index into a byte offset into the table.

A data structure that is referred to as an array, the elements are equal in size.

5.1 Export File Name

The name of a Export file must be the last portion of the package specification followed by the extension '.exp'. For example, the name of the Export file of the *javacard.framework* package must be *framework.exp*. Operating systems that impose limitations on file name lengths may transform an Export file's name according to its conventions.

CAP files are contained in a JAR file (Section 6.1.1, "Containment in a JAR File," on page 6-55). If an Export file is stored in a JAR file along with the CAP file, it must also be located in a directory called *javacard* that is a subdirectory package's directory. For example, the *framework.exp* file would be located in the subdirectory *javacard/framework/javacard*.

5.2 Export File

An Export file is defined by the following structure:

```
ExportFile {
        u4 magic
        u1 minor_version
        u1 major_version
        u2 constant_pool_count
        cp_info constant_pool[constant_pool_count]
        u2 this_package
        u2 export_class_count
        class_info classes[export_class_count]
}
```

The items in the ExportFile structure are as follows:

magic

> The magic item contains the magic number identifying the ExportFile format; it has the value 0x00FACADE.

minor_version, major_version

> The minor_version and major_version items are the minor and major version numbers of this Export file. An implementation of a Java Card Virtual Machine supports Export files having a given major version number and minor version numbers in the range 0 through some particular minor_version.
>
> If a Java Card Virtual Machine encounters a Export file with the supported major version but an unsupported minor version, the Java Card Virtual Machine must not attempt to interpret the content of the Export file. However, it will be feasible to upgrade a the Java Card Virtual Machine to support the newer minor version.
>
> A Java Card Virtual Machine must not attempt to interpret a Export file with a different major version. A change of the major version number indicates a major incompatibility change, one that requires a fundamentally different Java Card Virtual Machine.
>
> In this specification, the major version of the Export file has the value 2 and the minor version has the value 1. Only Sun Microsystems, Inc. may define the meaning and values of new Export file versions.

constant_pool_count

> The constant_pool_count item is a non-zero, positive value that indicates the number of constants in the constant pool.

constant_pool[]

> The constant_pool is a table of variable-length structures representing various string constants, class names, field names and other constants referred to within the ExportFile structure.
>
> Each of the constant_pool table entries, including entry zero, is a variable-length structure whose format is indicated by its first "tag" byte.

this_package

> The value of this_package must be a valid index into the constant_pool table. The constant_pool entry at that index must be a CONSTANT_Package_info structure representing the package defined by this ExportFile.

export_class_count

> The value of the export_class_count item gives the number of publicly accessible classes defined in this package.

classes[]

> Each value of the classes table must be a variable-length class_info structure giving the complete description of a publicly accessible class declared in this package.

5.3 Constant Pool

All constant_pool table entries have the following general format:

```
cp_info {
    u1 tag
    u1 info[]
}
```

Each item in the constant_pool must begin with a 1-byte tag indicating the kind of cp_info entry. The content of the info array varies with the value of tag. The valid tags and their values are listed in TABLE 5-1. Each tag byte must be followed by two or more bytes giving information about the specific constant. The format of the additional information varies with the tag value.

TABLE 5-1 Constant Pool Tags

| Constant Type | Value |
|---|---|
| CONSTANT_Package | 13 |
| CONSTANT_Interfaceref | 7 |
| CONSTANT_Integer | 3 |
| CONSTANT_Utf8 | 1 |

5.3.1 CONSTANT_Package

The CONSTANT_Package_info structure is used to represent a package:

```
CONSTANT_Package_info {
    u1 tag
    u1 flags
    u2 name_index
    u1 minor_version
    u1 major_version
    u1 aid_length
    u1 aid[aid_length]
}
```

The items of the CONSTANT_Package_info structure are the following:

tag

The tag item has the value of CONSTANT_Package (13).

flags

The flags item is a mask of modifiers that apply to this package. The flags modifiers are shown in the following table.

TABLE 5-2 Package Flags

| Flags | Value |
|---|---|
| ACC_LIBRARY | 0x01 |

The ACC_LIBRARY flag has the value of one if this package does not define and declare any applets. In this case it is called a *library package*. Otherwise ACC_LIBRARY has the value of 0.

If the package is not a library package this export file may only contain shareable interfaces. A shareable interface is either the *javacard.framework.Sharable* interface or extends that interface.

> Note — The restriction on exporting non-sharable items is imposed by the firewall defined in the *Java Card Runtime Environment 2.1* specifications.

All other flag values are reserved by the Java Card Virtual Machine. Their values must be zero.

name_index

The value of the name_index item must be a valid index into the constant_pool table. The constant_pool entry at that index must be a CONSTANT_Utf8_info structure representing a valid Java package name.

As in Java class files, ASCII periods ('.') that normally separate the identifiers in a package name are replaced by ASCII forward slashes ('/'). For example, the package name *javacard.framework* is represented in a CONSTANT_Utf8_info structure as *javacard/framework*.

minor_version, major_version

The minor_version and major_version items are the minor and major version numbers of this package. These values uniquely identify the particular implementation of this package and indicate the binary compatibility between packages. They are used to determine whether references between packages can be resolved, given the particular implementations.

A change in the minor version of a package represents an extension to the API and/or an update to the internal implementation that does not change the functionality of the API. It is guaranteed that two revisions of a package with the same major version and different minor versions have the same public token values assigned to the elements they have in common.

A change in the major version of a package represents an incompatibility with revisions of a lesser major version. This indicates that a portion of the API of the package has been deprecated and/or the implementation of the API is not functionally equivalent. Public tokens assigned to elements of the API that are defined in revisions of a package with different major versions are not required to have the same values.

A Java Card Virtual Machine may resolve references to an executable form of the package described in this Export file if the version associated with that executable has the same major version and a minor version that is less than or equal to this minor_version value.

The package provider is required to assign major and minor versions to different revisions of the package according to the constraints specified in this specification.

aid_length

The value of the aid_length item gives the number of bytes in the aid array. Valid values are between 5 and 16, inclusive.

aid[]

The aid array contains the ISO AID of the package. See ISO 7816-5 for a definition of an AID.

5.3.2 CONSTANT_Interfaceref

The CONSTANT_Interfaceref_info structure is used to represent an interface:

```
CONSTANT_Interfaceref_info {
    u1 tag
    u2 name_index
}
```

The items of the CONSTANT_Interfaceref_info structure are the following:

tag

The tag item has the value of CONSTANT_Interface (7).

name_index

> The value of the name_index item must be a valid index into the constant_pool table. The constant_pool entry at that index must be a CONSTANT_Utf8_info structure representing a valid fully qualified Java interface name. These names are fully qualified because they may be defined in a package other than the one described in the Export File.
>
> As in Java class files, ASCII periods ('.') that normally separate the identifiers in a class or interface name are replaced by ASCII forward slashes ('/'). For example, the interface name sun.jc.interface1 is represented in a CONSTANT_Utf8_info structure as sun/jc/interface1.

5.3.3 CONSTANT_Integer

The CONSTANT_Integer_info structure is used to represent four-byte numeric (int) constants:

```
CONSTANT_Integer_info {
    u1 tag
    u4 bytes
}
```

The items of the CONSTANT_Integer_info structure are the following:

tag

> The tag item has the value of CONSTANT_Integer (3).

bytes

> The bytes item of the CONSTANT_Integer_info structure contains the value of the *int* constant. The bytes of the value are stored in big-endian (high byte first) order.

5.3.4 CONSTANT_Utf8

The CONSTANT_Utf8_info structure is used to represent constant string values. UTF-8 strings are encoded in the same way as described in *The Java Virtual Machine Specification*, Section 4.4.7.

The CONSTANT_Utf8_info structure is:

```
CONSTANT_Utf8_info {
    u1 tag
    u2 length
    u1 bytes[length]
}
```

The items of the CONSTANT_Utf8_info structure are the following:

tag

> The tag item has the value of CONSTANT_Utf8 (1).

length

> The value of the length item gives the number of bytes in the bytes array (not the length of the resulting string). The strings in the CONSTANT_Utf8_info structure are not null-terminated.

bytes[]

> The bytes array contains the bytes of the string. No byte may have the value (byte)0 or (byte)0xF0-(byte)0xFF.

5.4 Classes

Each interface and class is described by a variable-length class_info structure. The format of this structure is:

```
class_info {
    u1 token
    u2 access_flags
    u2 name_index
    u2 export_interfaces_count
    u2 interfaces[export_interfaces_count]
    u2 export_fields_count
    field_info fields[export_fields_count]
    u2 export_methods_count
    method_info methods[export_methods_count]
}
```

The items of the class_info structure are as follows:

token

> The value of the token item is used to reference this class or interface on a Java Card. The tokens for all the public classes in a package are numbered consecutively starting at zero; beyond that the ordering of class tokens is not specified.

access_flags

The value of the access_flags item is a mask of modifiers used with class and interface declarations. The access_flags modifiers are shown in the following table.

TABLE 5-3 Class access and modifier flags

| Name | Value | Meaning | Used By |
|---|---|---|---|
| ACC_PUBLIC | 0x0001 | Is public; may be accessed from outside its package | Class, interface |
| ACC_FINAL | 0x0010 | Is final; no subclasses allowed. | Class |
| ACC_INTERFACE | 0x0200 | Is an interface | Interface |
| ACC_ABSTRACT | 0x0400 | Is abstract; may not be instantiated | Class, interface |
| ACC_SHAREABLE | 0x0800 | Is shareable, may be shared between Java Card applets. | Class, interface |

The ACC_SHAREABLE flag indicates whether this class or interface is shareable. A class is shareable if it implements (directly or indirectly) the javacard.framework.shareable interface. An interface is shareable if it is or implements (directly or indirectly) the *javacard.framework.Shareable* interface.

Note – The ACC_SHAREABLE flag is defined to enable Java Card Virtual Machines to implement the firewall restrictions defined by the *Java Card Runtime Environment 2.1* specifications.

All other class access and modifier flags are defined in the same way and with the same restrictions as described in *The Java Virtual Machine Specification*, Section 4.1.

The Java Card Virtual Machine reserves all other flag values. Their values must be zero.

name_index

The value of the name_index item must be a valid index into the constant_pool table. The constant_pool entry at that index must be a CONSTANT_Utf8_info structure representing a valid Java class name stored as a simple (not fully qualified) name, that is, as a Java identifier.[1]

---

1. In Java class files class names are fully qualified. In Java Card Export files all classes enumerated are defined in the package of the Export file making it unnecessary for class names to be fully qualified.

export_interfaces_count

> The value of the export_interface_count item indicates the number of externally accessible interfaces implemented by this class or interface. It does not include package visible interfaces. It does include all superinterfaces in the hierarchy of public interfaces implemented by this class or interface.

interfaces[]

> Each value in the interfaces array must be a valid index into the constant_pool table. The constant_pool entry at each value of interfaces[i], where 0 <= i < export_interfaces_count, must be a CONSTANT_Interfaceref_info structure representing an interface which is an externally accessible superinterface of this class or interface type, in the left-to-right order given in the source for the type and its superclasses or superinterfaces.

export_fields_count

> The value of the export_fields_count item gives the number of externally accessible fields declared by this class.

fields[]

> Each value in the fields table must be a variable-length field_info structure giving a description complete enough to link to the field in a Java Card. The field_info structures represent all publicly accessible fields, both class variables and instance variables, declared by this class. It does not include items representing fields that are inherited from superclasses.

export_methods_count

> The value of the export_methods_count item gives the number of externally accessible methods declared by this class.

methods[]

> Each value in the methods table must be a method_info structure giving a description complete enough to link to the method in a Java Card. The method_info structures represent all publicly accessible class (static) methods implemented by this class, and all publicly accessible instance methods implemented by this class or its superclasses, or defined by this interface or its superinterfaces.

5.5 Fields

Each field is described by a variable-length field_info structure. The format of this structure is:

```
field_info {
    u1 token
    u2 access_flags
    u2 name_index
    u2 descriptor_index
    u2 attributes_count
    attribute_info attributes[attributes_count]
}
```

The items of the field_info structure are as follows:

token

> The value of the token item is used to reference this field on a Java Card. There are three scopes for token values of fields: final static fields of primitives, other static fields, and instance fields.

> The value of the token item for all final static fields of primitive types (*boolean, byte, short*, and *int*) is 0xFFFF. Final static fields of primitive types are represented in the ExportFile structure, but are not assigned token values suitable for on-card referencing. These fields are not represented in a CAP file or on Java Cards. Instead converters must replace bytecodes that reference final static fields of primitive types with bytecodes that load the constant value of the field.

> The value of the token item for all other static fields in a class are numbered consecutively starting at zero, except that the token after an *int* field is skipped and the token for the following field is numbered two greater than the token of the *int* field. Beyond that the ordering of static field token assignment is not specified.

> The value of the token item for all the instance fields in a class are numbered consecutively starting at zero, except that the token after an *int* field is skipped and the token for the following field is numbered two greater than the token of the *int* field. The tokens for non-reference fields must be numbered less than the tokens for reference fields; beyond that the ordering of instance fields is not specified.

access_flags

> The value of the access_flags item is a mask of modifiers used with class and interface declarations. The access_flags modifiers are shown in the following table.

TABLE 5-4 Field access and modifier flags

| Name | Value | Meaning | Used By |
|---|---|---|---|
| ACC_PUBLIC | 0x0001 | Is public; may be accessed from outside its package. | Any field |
| ACC_PROTECTED | 0x0004 | Is protected; may be accessed within subclasses. | Class field |
| ACC_STATIC | 0x0008 | Is static. | Class field |
| ACC_FINAL | 0x0010 | Is final; no further overriding or assignment after initialization. | Any field |

Field access and modifier flags are defined in the same way and with the same restrictions as described in *The Java Virtual Machine Specification*, Section 4.5.

name_index

The value of the name_index item must be a valid index into the constant_pool table. The constant_pool entry at that index must be a CONSTANT_Utf8_info structure representing a valid Java field name stored as a simple (not fully qualified) name, that is, as a Java identifier.

descriptor_index

The value of the descriptor_index item must be a valid index into the constant_pool table. The constant_pool entry at that index must be a CONSTANT_Utf8_info structure representing a valid Java field descriptor.

Representation of a field descriptor in an Export File is the same as in a Java Class file. See the specification described in *The Java Virtual Machine Specification*, Section 4.3.2.

attributes_count

The value of the attributes_count item indicates the number of additional attributes of this field. For static final fields the value must be 1; that is, when both the ACC_STATIC and ACC_FINAL bits in the flags item are set an attribute must be present. For all other fields the value must be 0.

attributes[]

The only attribute defined for the attributes table of a field_info structure by this specification is the ConstantValue attribute. This must be defined for static final fields of primitives (*boolean*, *byte*, *short*, and *int*).

5.6 Methods

Each method is described by a variable-length method_info structure. The format of this structure is:

```
method_info {
    u1 token
    u2 access_flags
    u2 name_index
    u2 descriptor_index
}
```

The items of the method_info structure are as follows:

token

> The value of the token item is used to reference this method on a Java Card. There are two scopes for token values of methods: static methods, and instance methods.
>
> The static method scope includes constructors. The tokens for all the static methods and constructors in a class are numbered consecutively starting at zero. Beyond that ordering is not specified.
>
> The tokens for introduced instance methods in a class are numbered consecutively starting at one greater than the highest numbered instance method token of the class's superclass. If a method overrides a method implemented in the class's superclass, that method uses the same token number as the method in the superclass. Beyond that the ordering of instance methods is not specified.
>
> The maximum token value for an instance method is 127.

access_flags

> The value of the access_flags item is a mask of modifiers used with class and interface declarations. The access_flags modifiers are shown in the following table.

TABLE 5-5 Method access and modifier flags

| Name | Value | Meaning | Used By |
|---|---|---|---|
| ACC_PUBLIC | 0x0001 | Is public; may be accessed from outside its package. | Any method |
| ACC_PROTECTED | 0x0004 | Is protected; may be accessed within subclasses. | Class/instance method |
| ACC_STATIC | 0x0008 | Is static. | Class/instance method |
| ACC_FINAL | 0x0010 | Is final; no further overriding or assignment after initialization. | Class/instance method |
| ACC_ABSTRACT | 0x0400 | Is abstract; no implementation is provided | Any method |

Method access and modifier flags are defined in the same way and with the same restrictions as described in *The Java Virtual Machine Specification*, Section 4.6.

Unlike in Java class files, the ACC_NATIVE flag is not supported in Export files. Whether a method is native is an implementation detail that is not relevant to referencing packages.

name_index

The value of the name_index item must be a valid index into the constant_pool table. The constant_pool entry at that index must be a CONSTANT_Utf8_info structure representing either the special internal method name for constructors, <init>, or a valid Java method name stored as a simple (not fully qualified) name.

descriptor_index

The value of the descriptor_index item must be a valid index into the constant_pool table. The constant_pool entry at that index must be a CONSTANT_Utf8_info structure representing a valid Java method descriptor.

Representation of a method descriptor in an Export File is the same as in a Java Class file. See the specification described in *The Java Virtual Machine Specification*, Section 4.3.3.

5.7  Attributes

Attributes are used in the field_info structure of the Export File format. All attributes have the following general format:

```
attribute_info {
        u2 attribute_name_index
        u4 attribute_length
        u1 info[attribute_length]
}
```

5.7.1 ConstantValue Attribute

The ConstantValue attribute is a fixed-length attribute used in the attributes table of the field_info structures. A ConstantValue attribute represents the value of a constant field that must be final static; that is, both the ACC_STATIC and ACC_FINAL bits in the flags item of the field_info structure must be set. There can be no more than one ConstantValue attribute in the attributes table of a given field_info structure. The constant field represented by the field_info structure is assigned the value referenced by its ConstantValue attribute as part of its initialization.

The ConstantValue attribute has the format

```
ConstantValue_attribute {
        u2 attribute_name_index
        u4 attribute_length
        u2 constantvalue_index
}
```

The items of the ConstantValue_attribute structure are as follows:

attribute_name_index

> The value of the attribute_name_index item must be a valid index into the constant_pool table. The constant_pool entry at that index must be a CONSTANT_Utf8_info structure representing the string "ConstantValue".

attribute_length

> The value of the attribute_length item of a ConstantValue_attribute structure must be 2.

constantvalue_index

> The value of the constantvalue_index item must be a valid index into the constant_pool table. The constant_pool entry at that index must give the constant value represented by this attribute.

> The constant_pool entry must be of a type CONSTANT_Integer.

CHAPTER 6

The Cap File Format

This chapter describes the Java Card Virtual Machine CAP (Converted Applet) file format. Each CAP file contains all of the classes and interfaces defined in one Java package. Compliant Java Card Virtual Machines must be capable of producing and consuming all CAP files that conform to the specification provided in this book.

A CAP file consists of a stream of 8-bit bytes. All 16-bit and 32-bit quantities are constructed by reading in two and four consecutive 8-bit bytes, respectively. Multibyte data items are always stored in big-endian order, where the high-order bytes come first.

This chapter defines its own set of data types representing Java Card CAP file data: The types u1, and u2 represent an unsigned one-, and two-byte quantities, respectively. Some u1 types are represented as *bitfield* structures, consisting of arrays of bits. The zeroeth bit in each bit array represents the most significant bit.

The Java Card CAP file format is presented using pseudo structures written in a C-like structure notation. To avoid confusion with the fields of Java Card Virtual Machine classes and class instances, the contents of the structures describing the Java Card CAP file format are referred to as *items*. Unlike the fields of a C structure, successive items are stored in the Java Card file sequentially, without padding or alignment.

Variable-sized *tables*, consisting of variable-sized items, are used in several class file structures. Although we will use C-like array syntax to refer to table items, the fact that tables are streams of varying-sized structures means that it is not possible to directly translate a table index into a byte offset into the table.

A data structure that is referred to as an array, the elements are equal in size.

Note – Many elements in this CAP file specifications are assigned token values. The definitions of these tokens are given in Chapter 4, "Java Card Naming."

6.1 Component Model

A CAP file is represented as a set of components. A CAP file is not complete unless all of the components specified in this chapter are present, except the Applet and Export Components. The Applet Component ("Applet Component" on page 61) is required if the package defines one or more Java Card applets. The Export Component ("Export Component" on page 85) is required if the package is to be made available to other packages on a Java Card. All components have the following general format:

```
component {
    u1 tag
    u2 size
    u1 info[]
}
```

Each component begins with a 1-byte tag indicating the kind of component. Valid tags and their values are listed in the next table. The size item indicates the number of bytes in the info array of the component, not including the tag and size items. The content and format of the info array varies with the type of component.

TABLE 6-1 Component Tags

| Component Type | Value |
| --- | --- |
| COMPONENT_Header | 1 |
| COMPONENT_Directory | 2 |
| COMPONENT_Applet | 3 |
| COMPONENT_Imports | 4 |
| COMPONENT_ConstantPool | 5 |
| COMPONENT_Class | 6 |
| COMPONENT_Method | 7 |
| COMPONENT_StaticField | 8 |
| COMPONENT_ReferenceLocation | 9 |
| COMPONENT_Export | 10 |
| COMPONENT_Descriptor | 11 |

Sun may define additional components in future versions of the CAP file specification.

6.1.1 Containment in a JAR File

All CAP file components are represented in individual files stored in a JAR File. The JAR path/file names are enumerated in the following table. The names of each of the component files are not case sensitive. Operating systems that impose limitations on file name lengths may transform an component file names according to its conventions.

TABLE 6-2 JAR File Names

| Component Type | File Name |
| --- | --- |
| COMPONENT_Header | Header.cap |
| COMPONENT_Directory | Directory.cap |
| COMPONENT_Applet | Applet.cap |
| COMPONENT_Imports | Imports.cap |
| COMPONENT_ConstantPool | ConstantPool.cap |
| COMPONENT_Class | Class.cap |
| COMPONENT_Method | Method.cap |
| COMPONENT_StaticField | StaticField.cap |
| COMPONENT_ReferenceLocation | RefLocations.cap |
| COMPONENT_Export | Export.cap |
| COMPONENT_Descriptor | Descriptor.cap |

The location within a JAR file of the files that constitute a CAP file is in a directory called *javacard* that is a subdirectory representing the package's directory. For example, the CAP file component files for the package *javacard.framework* are located in the subdirectory *javacard/framework/javacard*.

The name of a JAR file containing a CAP file is not defined as part of this specification. Other files, including other CAP files, may also reside in the JAR file.

6.1.2 Defining New Components

Java Card CAP files are permitted to contain new components. All components not defined as part of this Java Card Virtual Machine specification must not affect the semantics of the content of the specified components, and Java Card Virtual Machines must be able to accept CAP files that do not contain new components. Java Card Virtual Machine implementations are required to ignore components they do not recognize.

New components are named in two ways. They are assigned both an ISO 7816-5 AID and a tag. Valid tag values are between 128 and 255, inclusive. The Directory Component ("Directory Component" on page 59) must contain an entry in the custom_component item specifying both the AID and associated tag. The new component must contain the tag value as its first item.

The JAR path/file names of custom components must follow the same restrictions as those specified in Section 6.1.1, "Containment in a JAR File." That is, they must be located in the <package_directory>/*javacard* subdirectory of the JAR file and must have the extension '.cap'.

6.2. Header Component

The Header Component is described by the following variable-length structure:

```
header_component {
    u1 tag
    u2 size
    u4 magic
    u1 minor_version
    u1 major_version
    u1 flags
    package_info this_package
}
```

The items in the header_component structure are as follows:

tag

> The tag item has the value COMPONENT_Header(1).

size

> The size item indicates the number of bytes in the header_component structure, excluding the tag and size items.

magic

> The magic item supplies the magic number identifying the Java Card CAP file format; it has the value 0xDECAFFED.

minor_version, major_version

> The minor_version and major_version items are the minor and major version numbers of this CAP file. An implementation of a Java Card Virtual Machine must support CAP files having a specific major version number and minor version numbers in the range of 0 through some particular minor_version.

If a Java Card Virtual Machine encounters a CAP file with the supported major version but an unsupported minor version, the Java Card Virtual Machine must not attempt to interpret the content of the CAP file. However, it will be feasible to upgrade a the Java Card Virtual Machine to support the newer minor version.

A Java Card Virtual Machine must not attempt to interpret a CAP file with a different major version. A change of the major version number indicates a major incompatibility change, one that requires a fundamentally different Java Card Virtual Machine.

In this specification, the major version of the CAP file has the value 2 and the minor version has the value 1. Only Sun Microsystems, Inc. may define the meaning and values of new CAP file versions.

flags

The flags item is a mask of modifiers that apply to this package. The flags modifiers are shown in the following table.

TABLE 6-3 Package Flags

| Flags | Value |
|---|---|
| ACC_INT | 0x01 |
| ACC_EXPORT | 0x02 |
| ACC_APPLET | 0x04 |

The ACC_INT flag has the value of one if the Java *int* type is present in this package. This includes fields defined as type int, fields defined as type int array, or instructions of type int. Otherwise the ACC_INT flag has the value of 0.

The ACC_EXPORT flag has the value of one if other packages may link to this package. Otherwise it has the value of 0. If the ACC_EXPORT flag has the value of one an Export Component ("Export Component" on page 85) must be defined in this CAP file. If the ACC_EXPORT flag has the value of zero an Export Component must not be defined in the CAP file.

The ACC_APPLET flag has the value of one if one or more Java Card applets are defined this package. Otherwise it has the value of 0. If the ACC_APPLET flag has the value of one an Applet Component ("Applet Component" on page 61) must be defined in this CAP file. If the ACC_APPLET flag has the value of zero an Applet Component must not be defined in the CAP file.

The Java Card Virtual Machine reserves all other flag values. Their values must be zero.

this_package

The this_package item describes the package defined in this CAP file. It is represented as a package_info structure:

```
package_info {
        u1 minor_version
        u1 major_version
        u1 AID_length
        u1 AID[AID_length]
}
``` minor_version, major_version

The minor_version and major_version items are the minor and major version numbers of this package. These values uniquely identify the particular implementation of this package and indicate the binary compatibility between packages. These versions are used when resolving references between packages in preparation for execution.

A change in the minor version of a package represents an extension to the API and/or an update to the internal implementation that does not change the functionality of the API. It is guarenteed that two revisions of a package with the same major version and differenct minor versions have the same public token values assigned to the elements they have in common.

A change in the major version of a package represents an incompatibility with revisions of a lesser major version. This indicates that a portion of the API of the package has been deprecated and/or the implementation of the API is not functionally equivalent. Public tokens assigned to elements of the API that are defined in revisions of a package with different major versions are not required to have the same values.

A Java Card Virtual Machine may link another package to this package if and only if the other package's CAP file has been constructed using a revision of this package that has the same major version and a minor version less than or equal to the minor version specified by the major_version and minor_version items. The Imports Component Section 6.5, "Imports Component," on page 6-62 in the CAP file of the referencing package contains both the Java Card name (AID) of the referenced package and its major and minor versions.

The package provider is required to assign major and minor versions to different revisions of the package according to the constraints specified in this specification.

AID_length

The AID_length item represents the length of the AID item. Valid values are between 5 and 16, inclusive.

AID[]

The AID item represents the Java Card name of the package. See ISO 7816-5 for the definition of an AID.

6.3 Directory Component

The Directory Component lists the size of each of the components defined in this CAP file. It is described by the following variable-length structure:

```
directory_component {
    u1 tag
    u2 size
    u1 basic_count
    u1 custom_count
    { u1 component_tag
      u2 size
    } basic_components[basic_count]
    { u1 component_tag
      u2 size
      u1 AID_length
      u1 AID[AID_length]
    } custom_components[custom_count]
}
```

The items in the directory_component structure are as follows:

tag

The tag item has the value COMPONENT_Directory(2).

size

The size item indicates the number of bytes in the directory_component structure, excluding the tag and size items.

basic_count

The basic_count item indicates the number of basic components defined in this CAP file. These components are defined in this specification. Valid values for the basic_count item are 9, 10 and 11, depending upon whether an Export Component and/or Applet Component are defined.

custom_count

> The custom_count item indicates the number of components defined in this CAP file that are not defined in this specification. Valid values are between 0 and 127, inclusive.

basic_components[]

> The basic_components item represents an array of structures, each representing a component defined in this CAP file. The items in the structure are:

> component_tag
>
> > The component_tag item represents the tag of the component. Valid values are defined in Table 6-1, "Component Tags," on page 54.

> size
>
> > Except in the case of the Static Field Component, the size item represents the size in bytes in the component, including the tag and size items.
> >
> > For the Static Field Component the size item represents the size in bytes of the Static Field Image. This value is equal to the byte_count item in the static_field_component structure. It does not include the number of bytes required to store the array instances defined in the Static Field Component.

custom_components[]

> The custom_components item represents an array of variable-length structures that name each of the components in this CAP file that are not defined by this standard. Each component is assigned an AID conforming to the ISO 7816-5 standard. The RID (first 5 bytes) of all of the custom component's AID must have the same value. In addition, the RID of the custom component's AID must have the same value as the RID of the package defined in this CAP file.

> The items in entries of the custom_component table are:

> component_tag
>
> > The component_tag item represents the tag of the component. Valid values are between 128 and 255, inclusive.

> size
>
> > The size item represents the size in bytes of the component.

> AID_length
>
> > The AID_length item represents the length of the AID item. Valid values are between 5 and 16, inclusive.

AID[]
> The AID item represents the Java Card name of the component. See ISO 7816-5 for the definition of an AID.

6.4 Applet Component

The Applet Component describes each of the applets defined in this package. It is described by the following variable-length structure

```
applet_component {
    u1 tag
    u2 size
    u1 count
    { u1 AID_length
      u1 AID[AID_length]
      u2 install_method_offset
    } applets[count]
}
```

The items in the applet_component structure are as follows:

tag
> The tag item has the value COMPONENT_Applet(3).

size
> The size item indicates the number of bytes in the applet_component structure, excluding the tag and size items.

count
> The count item indicates the number of applets defined in this package.

applets[]
> The applets item represents an array of structures that describe each of the applets defined in this package. Each applet is assigned an AID conforming to the ISO 7816-5 standard. The RID (first 5 bytes) of all of the applet's AID must have the same value. In addition, the RID of each applet's AID must have the same value as the RID of the package defined in this CAP file.

The items in the applets structure are defined as follows:

AID_length
> The AID_length item represents the length of the AID item. Valid values are between 5 and 16, inclusive.

AID[]

> The AID item represents the Java Card name of the applet.

install_method_offset

> The value of the install_method_offset item must be a 16-bit offset into the info item of the Method Component. The item at that offset must be a method_info structure that represents the static *install()* method of a class that extends *javacard.framework.applet*. This method is called to initialize the applet.

- Restrictions placed on the *install()* method of an applet are imposed by the *Java Card 2.1Runtime Environment Specification*.

6.5 Imports Component

The Imports Component enumerates the packages that are referenced by this package. It does not include the package defined in this CAP file. The Imports Component is represented by the following structure:

```
imports_component {
        u1 tag
        u2 size
        u1 count
        package_info packages[count]
}
```

The items in the imports_component structure are as follows:

tag

> The tag item has the value COMPONENT_Imports(4).

size

> The size item indicates the number of bytes in the imports_component structure, excluding the tag and size items.

count

> The count item indicates the number of items in the packages table. The value of the count item must be less than or equal to 127.

packages[]

> The packages item represents a table of variable-length package_info structures as defined for "this_package" on page 58. The table contains an entry for each of the packages referenced in the CAP file, not including the package defined.
>
> The major and minor versions specified in the package_info structure are equal to the major and minor versions specified in the referenced package's Export File. Java Card Virtual Machines must compare these values with the version associated with the executable image of the referenced package in order to determine whether the two are compatible. Compatibility rules are specifed in "minor_version, major_version" on page 58.
>
> The value of a package_token assigned to an imported package must be equal to the index into the packages table to the entry for that package.

6.6 Constant Pool Component

The Constant Pool Component describes the classes, methods, and fields referenced in the Method Component ("Method Component" on page 76) of this package. The component is described by the following structure:

```
constant_pool_component {
        u1 tag
        u2 size
        u2 count
        cp_info constant_pool[count]
}
```

The items in the constant_pool_component structure are as follows:

tag

> The tag item has the value COMPONENT_ConstantPool(5).

size

> The size item indicates the number of bytes in the constant_pool_component structure, excluding the tag and size items.

count

> The count item represents the number entries in the constants array.

constant_pool

The constant_pool item represents a table of cp_info structures:

```
cp_info {
        u1 tag
        u1 info[]
}
```

Each item in the constant_pool table represents a 4-byte structure. Each structure must begin with a 1-byte tag indicating the kind of cp_info entry. The content of the info array varies with the value of the tag. The valid tags and their values are listed in the following table. The format of the additional information varies with the tag value.

TABLE 6-4 Constant Pool Tags

| Constant Type | Tag |
|---|---|
| CONSTANT_Classref | 1 |
| CONSTANT_InstanceFieldref | 2 |
| CONSTANT_VirtualMethodref | 3 |
| CONSTANT_SuperMethodref | 4 |
| CONSTANT_StaticFieldref | 5 |
| CONSTANT_StaticMethodref | 6 |

Java Card constant types are more specific than those in Java class files. The categories are based not only on the type of the item references but also on the manner in which it is referenced and located in other CAP file components. For example virtual methods invoked using the Java *super* keyword are located through the virtual method tables in a class_info structure (Section 6.7.1, "interface_info and class_info," on page 6-71), but unlike virtual method references can be resolved to direct references on a Java Card.

There are no ordering constraints on constant pool entries. It is recommended, however, that CONSTANT_InstanceFieldref constants occur first.

6.6.1 CONSTANT_Classref

The CONSTANT_Classref_info structure is used to represent a reference to a class or an interface:

```
CONSTANT_Classref_info {
        u1 tag
        union {
                u2 internal_class_ref
                { u1 package_token
                  u1 class_token
```

```
            } external_class_ref
        } class_ref
        u1 padding
}
```

The items in the CONSTANT_Classref_info structure are the following:

tag

> The tag item has the value CONSTANT_Classref(1).

class_ref

> The class_ref item represents a reference to a class or interface. If the class or interface is defined in this package the structure represents an internal_class_ref and the high bit of the structure is zero. If the class or interface is defined in another package the structure represents an external_class_ref and the high bit of the structure is one.
>
> The value of the class_ref item must not be 0xFFFF. This value is reserved to indicate a null class reference in the super_class_ref item of class_info structures.
>
> internal_class_ref
>
>> The internal_class_ref structure represents a 16-bit offset into the info item of the Class Component to the interface_info or class_info structure of this class or interface. This value must be less than or equal to 32767, inclusive, making the high bit equal to zero.
>
> external_class_ref
>
>> The external_class_ref structure represents a reference to a class or interface defined in another package. The high bit of this structure is one.
>>
>> package_token
>>
>>> The package_token item represents an 8-bit package token scoped to the CAP file. The value of this token must be equal to the index into the set of packages listed in the Imports Component to the definition of the reference package. The value of the package_token item must be less than or equal to 127.
>>>
>>> The high bit of the package_token item must be one.
>>
>> class_token
>>
>>> The class_token item represents the token of the class or interface in the referenced package.

padding

>The padding item has the value zero. It is present to make the size of a CONSTANT_Classref_info structure the same as all other constants in the constant_pool.

6.6.2 CONSTANT_InstanceFieldref, CONSTANT_VirtualMethodref, and CONSTANT_SuperMethodref References to instance fields, and virtual methods are represented by similar structures:

```
CONSTANT_InstanceFieldref_info {
    u1 tag
    class_ref class
    u1 instance_field_token
}

CONSTANT_VirtualMethodref_info {
    u1 tag
    class_ref class
    u1 virtual_method_token
}

CONSTANT_SuperMethodref_info {
    u1 tag
    class_ref class
    u1 virtual_method_token
}
```

The items in these structures are as follows:

tag

>The tag item of a CONSTANT_InstanceFieldref_info structure has the value CONSTANT_InstanceFieldref(2).

>The tag item of a CONSTANT_VirtualMethodref_info structure has the value CONSTANT_VirtualMethodref(3).

>The tag item of a CONSTANT_SuperMethodref_info structure has the value CONSTANT_SuperMethodref(4).

class

> The class item represents a class_ref structure (Section 6.6.1, "CONSTANT_Classref," on page 6-64). If the referenced class is defined in another package the high bit of this structure has the value one. If the referenced class is defined in this package the high bit of this structure has the value of zero.
>
> The class referenced in the CONSTANT_InstanceField_info structure must represent the class that contains a declaration of the field.
>
> The class referenced in the CONSTANT_VirtualMethodref_info structure must represent a class that contains a declaration or definition of the method.
>
> The class referenced in the CONSTANT_SuperMethodref_info structure must represent the class that contains the super invocation.

token

> The token item in the CONSTANT_InstanceFieldref_info structure represents an instance field token, within the scope the referenced class.
>
> The token item of the CONSTANT_VirtualMethodref_info structure represents a virtual method token within the scope of the referenced class. If the token item represents a public or protected virtual method the high bit is zero. If the token item represents a package-visible virtual method the high bit is one. In this case the class item must represent a reference to a class defined in this package.
>
> The token item of the CONSTANT_SuperMethodref_info structure represents a virtual method token. Unlike in the CONSTANT_VirtualMethodref_info structure, this item represents the token of the virtual method in the scope of the superclass of the class indicated by the class item. If the token item represents a public or protected virtual method the high bit is zero. If the token item represents a package-visible virtual method the high bit is one. In this case the class item must represent a reference to a class defined in this package and the immediate superclass of the class item must also be defined in this package.

6.6.3 CONSTANT_StaticFieldref and CONSTANT_StaticMethodref

References to static fields and methods are represented by similar structures:

```
CONSTANT_StaticFieldref_info {
        u1 tag
        union {
                { u1 padding
                  u2 offset
                } internal_ref
                { u1 package_token
                  u1 class_token
                  u1 token
                } external_ref
        } static_field_ref
}

CONSTANT_StaticMethodref_info {
        u1 tag
        union {
                { u1 padding
                  u2 offset
                } internal_ref
                { u1 package_token
                  u1 class_token
                  u1 token
                } external_ref
        } static_method_ref
}
```

The items in these structures are as follows:

tag

> The tag item of a CONSTANT_StaticFieldref_info structure has the value CONSTANT_StaticFieldref(6).
>
> The tag item of a CONSTANT_StaticMethodref_info structure has the value CONSTANT_StaticMethodref(7).

static_field_ref and static_method_ref

> The static_field_ref and static_method_ref item represents a reference to a static field or static method, respectively. Static method references include references to static methods, constructors, and private instance methods.
>
> If the referenced item is defined in this package the structure represents an internal_ref and the high bit of the structure is zero. If the referenced item is defined in another package the structure represents an external_ref and the high bit of the structure is one.

internal_ref

> The internal_ref item represents a reference to a static or method defined in this package. The items in the structure are:
>
> padding
>> The padding item is equal to 0.
>
> offset
>> The offset item of a CONSTANT_StaticFieldref_info structure represents a 16-bit offset into the Static Field Image to this static field.
>>
>> The offset item of a CONSTANT_StaticMethodref_info structure represents a 16-bit offset into the info item of the Method Component to a method_info structure. The method_info structure must represent the referenced method.

external_ref

> The external_ref item represents a reference to a static field or method defined in another package. The items in the structure are:
>
> package_token
>> The package_token item represents an 8-bit package token scoped to the CAP file. The value of this token must be equal to the index into the set of packages listed in the Imports Component to the definition of the referenced package. The value of the package_token item must be less than or equal to 127.
>>
>> The high bit of the package_token item must be one.
>
> class_token
>> The class_token item represents the token of the class in the referenced package.
>
> token
>> The token item of a CONSTANT_StaticFieldref_info structure represents a static field token. It is the token of the static field in the referenced package.
>>
>> The token item of a CONSTANT_StaticMethodref_info structure represents a static method token. It is the token of the static method in the referenced package.

6.7 Class Component

The Class Component describes each of the classes and interfaces defined in this package. The information included for each interface is sufficent to uniquely identify the interface and to test whether or not a cast is valid.

The information included for each class is sufficient to resolve operations associated with instances of a class. The operations include creating an instance, testing whether or not a cast is valid, dispatching virtual method invocations, and dispatching interface method invocations. Also included is sufficient information to locate instance fields of type reference.

The Class Component is represented by the following structure:

```
class_component {
        u1 tag
        u2 size
        interface_info interfaces[]
        class_info classes[]
}
```

The items in the class_component structure are as follows:

tag

>The tag item has the value COMPONENT_Class(6).

size

>The size item indicates the number of bytes in the class_component structure, excluding the tag and size items.

interfaces[]

>The interfaces item represents an array of variable-length interface_info structures. Each interface defined in this packages is represented in the array. The entries are ordered based on hierarchy such that a superinterface has a lower index than any of its subinterfaces.

classes[]

>The classes item represents an array of variable-length class_info structures. Each class defined in this package is represented in the array. The entries are ordered based on hierarchy such that a superclass has a lower index than any of its subclasses.

6.7.1 interface_info and class_info

The interface_info and class_info structures represent interfaces and classes, respectively. The interface_info structure is a strict subset of the class_info structure. The two are differentiated by the value of the first bit in the structure. The structures are defined as follows:

```
interface_info {
        u1 bitfield {
            bit[4] flags
            bit[4] reserved
        }
} class_info {
        u1 bitfield {
            bit[4] flags
            bit[4] interface_count
        }
        class_ref super_class_ref
        u1 declared_instance_size
        u1 first_reference_index
        u1 reference_count
        u1 public_method_table_base
        u1 public_method_table_count
        u1 package_method_table_base
        u1 package_method_table_count
        u2 public_virtual_method_table[public_method_table_count]
        u2 package_virtual_method_table[package_method_table_count]
        implemented_interface_info interfaces[interface_count]
}
```

The items of the interface_info and class_info structure are as follows:

flags[]

The flags item is a mask of modifiers used to describe this interface or class. Valid values are shown in the following table:

TABLE 6-5 Interface and Class Info Flags

| Name | Value |
| --- | --- |
| ACC_INTERFACE | 0x8 |
| ACC_SHAREABLE | 0x4 |

The ACC_INTERFACE flag indicates whether this interface_info or class_info structure represents an interface or a class. The value must be 1 if it represents an interface_info structure and 0 if a class_info structure.

The ACC_SHAREABLE flag in an interface_info structure indicates whether this interface is shareable. The value of this flag must be one if and only if the interface is *javacard.framework.Shareable* interface or implements that interface directly or indirectly.

The ACC_SHAREABLE flag in an class_info structure indicates whether this class is shareable. The value of this flag must be one if and only if this class or any of its superclasses implements an interface that is shareable.

---

Note — A Java Card Virtual Machine uses the ACC_SHAREABLE flag to implement the firewall restrictions defined by the *Java Card Runtime Environment 2.1* specifications.

---

The Java Card Virtual Machine reserves all other flag values. Their values must be zero.

reserved

The reserved item of the interface_info structure has the value of zero.

interface_count[]

The interface_count item of the class_info structure indicates the number of entries in the interfaces table item.

super_class_ref

The super_class_ref item of the class_info structure is a class_ref structure representing the superclass of this class. The class_ref structure is defined as part of the CONSTANT_Classref_info structure (Section 6.6.1, "CONSTANT_Classref," on page 6-64).

If this class does not have a superclass, the value of the super_class_ref item must be 0xFFFF.

declared_instance_size

The declared_instance_size item of the class_info structure represents the number of 16-bit cells required to represent the instance fields declared by this class. It does not include instance fields declared by superclasses of this class.

Instance fields of type *int* are represented in two 16-bit cells, while all other field types are represented in one 16-bit cell.

first_reference_token

The first_reference_token item of the class_info structure represents the token value of the first reference-type instance field defined by this class. It does not include instance fields defined by superclasses of this class.

reference_count

> The reference_count item of the class_info structure represents the number of reference-type instance field defined by this class. It does not include reference-type instance fields defined by superclasses of this class.

public_method_table_base

> The public_method_table_base item of the class_info structure must be equal to the token value of the first method in the public_virtual_method_table array.

public_method_table_count

> The public_method_table_count item of the class_info structure indicates the number of entries in the public_virtual_method_table array.

> If this class does not define any public or protected override methods, the minimum valid value of public_method_table_count item is the number of public and protected virtual methods declared by this class. If this class defines one or more public or protected override methods, the minimum valid value of public_method_table_count item is the value of the largest public or protected virtual method token, minus the value of the smallest public or protected virtual method token, plus one.

> The maximum valid value of the public_method_table_count item is the value of the largest public or protected virtual method token, plus one.

> Any value for the public_method_table_count item between the minimum and maximum specified here are valid. However, the value must correspond to the number of entries in the public_virtual_method_table.

package_method_table_base

> The package_method_table_base item of the class_info structure must be equal to the token value of the first entry in the package_virtual_method_table array.

package_method_table_count

> The package_method_table_count item of the class_info structure indicates the number of entries in the package_virtual_method_table array.

> If this class does not define any override methods, the minimum valid value of package_method_table_count item is the number of package visible virtual methods declared by this class. If this class defines one or more package visible override methods, the minimum valid value of package_method_table_count item is the value of the largest package visible virtual method token, minus the value of the smallest package visible virtual method token, plus one.

> The maximum valid value of the package_method_table_count item is the value of the largest package visible method token, plus one.

Any value for the package_method_table_count item between the minimum and maximum specified here are valid. However, the value must correspond to the number of entries in the package_virtual_method_table.

public_virtual_method_table

The public_virtual_method_table item of the class_info structure represents an array of public and protected virtual methods that can be invoked on an instance of this class. It includes methods declared or defined by this class. It may also include methods declared or defined by any or all of its superclasses. The value of an index into this table must be equal to the value of the virtual method token of the indicated method minus the value of the public_method_table_base item.

Entries in the public_virtual_method_table array that represent methods defined or declared in this package contain offsets into the info item of the Method Component (Section 6.8, "Method Component," on page 6-76) to the method_info structure representing the method. Entries that represent methods defined or declared in another package contain the value 0xFFFF.

Entries for methods that are declared abstract, not including those defined by interfaces, are represented in the public_virtual_method_table array in the same way as non-abstract methods.

package_virtual_method_table

The package_virtual_method_table item of the class_info structure represents an array of package virtual methods that can be invoked on an instance of this class. It includes methods declared or defined by this class. It may also include methods declared or defined by any or all of its superclasses that are defined in this package. The value of an index into this table must be equal to the value of the virtual method token of the indicated method & 0x7F, minus the value of the package_method_table_base item.

All entries in the package_virtual_method_table array represent methods defined or declared in this package. They contain offsets into the info item of the Method Component ("Method Component" on page 76) to the method_info structure representing the method.

Entries for methods that are declared abstract, not including those defined by interfaces, are represented in the package_virtual_method_table array in the same way as non-abstract methods.

interfaces[]

The interfaces item of the class_info structure represents a table of implemented_interface_info structures. The table must contain an entry for each of the interfaces indicated in the declaration of this class and each of the interfaces in the hierarchies of those interfaces. Interfaces that occur more than once are represented by a single entry. Interfaces implemented by superclasses of this class may optionally be represented.

Given the declarations below, the number of entries for class c0 is 1 and the entry in the interfaces array is i0. The minimum number of entries for class c1 is 3 and the entries in the interfaces array are i1, i2, and i3. The entries class c1 may also include interface i0, which is implemented by the superclass of c1.

```
interface i0 {}
interface i1 {}
interface i2 extends i1 {}
interface i3 {}
class c0 implements i0 {}
class c1 extends c0 implements i2, i3
{}
```

The implemented_interface_info structure is defined as follows:

```
implemented_interface_info {
        class_ref interface
        u1 count
        u1 index[count]
}
``` interface

> The interface item has the form of a class_ref structure. The class_ref structure is defined as part of the CONSTANT_Classref_info structure ("CONSTANT_Classref" on page 64). The interface_info structure referenced by the interface item represents an interface implemented by this class.

count

> The count item indicates the number of entries in the index array.

index

> The index item is an array that maps declarations of interface methods to the implementations in this class. It is a representation of a all of the methods declared by the interface and its superinterfaces. Entries in the index array must be ordered such that the token of the declared interface method is equal to the index. The token value is that assigned to the method within the scope of the interface definition and its superinterfaces, not within the scope of this class.

The values in the index array represent the tokens of the implementation of the interface method. This token value is in the scope of this class.

6.8 Method Component

The Method Component describes each of the methods declared in this package, except <*clinit*> methods and interface method declarations. The exception handlers associated with each method are also described. The Method Component is represented by the following structure:

```
method_component {
    u1 tag
    u2 size
    u1 handlers_count
    exception_handler_info exception_handlers[handlers_count]
    method_info methods[]
}
```

The items in the method_component structure are as follows:

tag

> The tag item has the value COMPONENT_Method(7).

size

> The size item indicates the number of bytes in the method_component structure, excluding the tag and size items.

handlers_count

> The handlers_count item represents the number of entries in the exception_handlers array.

exception_handlers[]

> The exception_handlers item represents an array of 8-byte exception_handler_info structures. Each exception_handler_info structure represents a *catch or finally* block defined in a method of this package.

> Entries in the exception_handlers array are sorted in ascending order by the distance between the beginning of the Method Component to the endpoint of each active exception handler range in the methods item.

methods[]

> The methods item represents an array of variable-length method_info structures.

Each entry represents a method declared in a class or interface of this package. <*clinit*> methods and interface method declaration are not included; all other abstract methods are.

6.8.1 exception_handler_info

The exception_handler_info structure is defined as follows:

```
exception_handler_info {
    u2 start_offset
    u2 active_length
    u2 handler_offset
    u2 catch_type_index
}
```

The items in the exception_handler_info structure are as follows:

start_offset, active_length

> The active_length item is encoded to indicate whether the active range of this exception handler is nested within another exception handler. The high bit of the active_length is equal to 1 if the active range is not contained within another exception handler, and this exception handler is the last handler applicable to the active range. The high bit is equal to 0 if the active range is contained within the active range of another exception handler, or there are successive handlers applicable to the same active range.

> *end_offset* is defined as start_offset plus active_length & 0x7FFF.

> The start_offset item and *end_offset* are byte offsets into the info item of the Method Component. They indicate the ranges in a bytecode array at which the exception handler is active. The value of the start_offset must be a valid offset into a bytecode array to the opcode of an instruction. The value of the *end_offset* either must be a valid offset into a code array of the opcode of an instruction or must be equal to a method's bytecode count, the length of the code array. The value of the start_offset must be less than the value of the *end_offset*.

> The start_offset is inclusive and the *end_offset* is exclusive; that is, the exception handler must be active while the execution address is within the interval (start_offset, *end_offset*).

handler_offset

> The handler_offset item represents a byte offset into the info item of the Method Component. It indicates the start of the exception handler. The value of the item must be a valid offset into a method's bytecode array to an opcode of an instruction, and must be less than the value of the method's bytecode count.

catch_type_index

If the value of the catch_type_index item is non-zero, it must be a valid index into the constant_pool table. The constant_pool entry at that index must be a CONSTANT_Classref_info structure, representing the class of the exception caught by this exception_handlers table entry.

If the exception_handlers table entry represents a finally block, the value of the catch_type_index item is zero. In this case the exception handler is called for all exceptions that are thrown within the start_offset and *end_offset* range.

6.8.2 method_info

The method_info structure is defined as follows:

```
method_info {
        method_header_info method_header
        u1 bytecodes[]
}
```

The items in the method_info structure are as follows:

method_header

The method_header item represents either a method_header_info or extended_method_header_info structure:

```
method_header_info {
        u1 bitfield {
                bit[4] flags
                bit[4] max_stack
        }
        u1 bitfield {
                bit[4] nargs
                bit[4] max_locals
        }
} extended_method_header_info {
        u1 bitfield {
                bit[4] flags
                bit[4] padding
        }
        u1 max_stack
```

```
        u1 nargs
        u1 max_locals
}
```

The items of the method_header_info and extended_method_header_info structures are as follows:

flags

> The flags item is a mask of modifiers defined for the method. Valid flag values are shown in the following table.

TABLE 6-6 Method flags

| Flags | Values |
|---|---|
| ACC_EXTENDED | 0x8 |
| ACC_ABSTRACT | 0x4 |

> The value of the ACC_EXTENDED flag must be one if the method_header is represented by an extended_method_header_info structure. Otherwise the value must be zero.

> The value of the ACC_ABSTRACT flag must be one if this method is defined as abstract. In this case the bytecodes array must be empty. If the method is not abstract the value of the ACC_ABSTRACT flag must be zero.

> The Java Card Virtual Machine reserves all other flag values. Their values must be zero.

padding

> The padding item has the value of zero. This item is only defined for the extended_method_header_info structure.

max_stack

> The max_stack item indicates the maximum number of 16-bit cells required on the operand stack during execution of this method.

> Stack entries of type *int* are represented in two 16-bit cells, while all others are represented in one 16-bit cell.

nargs

> The nargs item indicates the number of 16-bit cells required to represent the parameters passed to this method, including the *this* pointer for non-static methods.

> Parameters of type *int* are represented in two 16-bit cells, while all others are represented in one 16-bit cell.

max_locals

> The max_locals item indicates the number of 16-bit cells required to the local variables declared by this method, not including the parameters passed to the method on invocation.

> Note – Unlike in Java Card CAP files, in Java class files max_locals includes both the local variables declared in a method and the parameters passed to a method.

> Local variables of type *int* are represented in two 16-bit cells, while all others are represented in one 16-bit cell. The number of cells required for overloaded local variables is two if one or more of the overloaded variables is of type int.

code[]

> The code item represents an array of Java Card bytecodes that implement the method.

6.9 Static Field Component

The Static Field Component contains all of the information required to create and initialize an image of the static fields defined in this package. Final static fields of primitive types are not represented in this component. Instead these compile-time constants occur inline in Java Card instructions.

The ordering constraints associated with the static field image are as shown in the following figure. Reference-types occur first in the image. Arrays initialized through Java <clinit> methods occur first, and primitive types initialized to non-default values occur last.

| reference types | arrays of primitive types initialized by <clinit> methods |
| --- | --- |
| | reference types initialized to null |
| primitive types | primitive types initialized to default values |
| | primitive types initialized to non-default values |

FIGURE 6-1 Static Field Order Map

The number of bytes used to represent each field type in the static field image is shown in the following table.

TABLE 6-7 Static Field Sizes

| Type | Bytes |
|---|---|
| boolean | 1 |
| byte | 1 |
| short | 2 |
| int | 4 |
| reference | 2 |

The static_field_component structure is defined as:
```
static_field_component {
    u1 tag
    u2 size
    u2 byte_count
    u2 reference_count
    u2 array_init_count
    array_init_info array_init[array_init_count]
    u2 default_value_count
    u2 non_default_value_count
    u1 non_default_values[non_default_values_count]
}
```

The items in the static_field_component structure are as follows:

tag

The tag item has the value COMPONENT_StaticField(8).

size

The size item indicates the number of bytes in the static_field_component structure, excluding the tag and size items.

byte_count

The byte_count item indicates the number of bytes required to represent the image of the static fields defined in this package. The number of bytes required to represent each type is shown in the previous table.

The value of the byte_count item does not include the number of bytes require to represent the array instances defined in the Static Field Component.

reference_count

The reference_count item indicates the number of reference-type static fields defined in this package.

array_init_count

> The array_init_count item indicates the number of elements in the array_init array. In CAP files that define a library package the value of array_init_count must be zero.

array_init[]

> The array_init item represents an array of array_init_info structures that specify the initial array values of final static fields of arrays of primitive types. These initial values are indicated in Java <clinit> methods. The array_init_info structure is defined as:
>
> ```
> array_init_info {
>     u1 type
>     u2 count
>     u1 values[count]
> }
> ```
>
> The type item represents the type of the primitive array. Valid values are shown in the following table.

TABLE 6-8 Array Types

| Type | Value |
|---|---|
| boolean | 0 |
| byte | 1 |
| short | 2 |
| int | 4 |

> The count item represents the number of elements in the values array.
>
> This value of the count item is not the same as the number of elements in the array of the final static field. The number of elements in the array is equal to the count item divided by the number of bytes required to represent the static field type (TABLE 6-7) indicated by the type item.
>
> The values array represents a byte array representing the initial values of the static field array.

default_value_count

> The default_value_count item indicates the number of bytes required to initialize the set of static fields that are to be initialized to default values. The number of bytes require for each static field type is equal to the size in bytes of the type is shown in TABLE 6-7.

non_default_value_count

> The non_default_value_count item represents the number elements in the non_default_values array.
>
> of bytes of initial values primitive-type static fields initialized to non-default values. This value is number of elements in the non_default_values array item.

non_default_values[]

> The non_default_values item represents an array of bytes of non-default initial values. The number of entries in the array for each static field type is equal to the size in bytes of the type as shown in TABLE 6-7.

6.10 Reference Location Component

The Reference Location Component represents lists of offsets into the Method Component to operands that contain indices into the constant_pool table. Some of the indices are represented in one-byte values while other are represented in two-byte values. The structure is defined as:

```
reference_location_component {
    u1 tag
    u2 size
    u2 byte_index_count
    u1 offsets_to_byte_indices[byte_index_count]
    u2 byte2_index_count
    u1 offsets_to_byte2_indices[byte2_index_count]
}
```

The items of the reference_location_component structure are as follows:

tag

> The tag item has the value COMPONENT_ReferenceLocation(9).

size

> The size item indicates the number of bytes in the reference_location_component structure, excluding the tag and size items.

byte_index_count

> The byte_index_count item represents the number of elements in the offsets_to_byte_indices array.

offsets_to_byte_indices[]

The offsets_to_byte_indices item represents an array of 1-byte jump offsets into the info item of the Method Component to each 1-byte constant_pool table index. Each entry represents the number of bytes (or *distance*) between the previous index to the next. If the distance is greater than or equal to 255 then there are n entries equal of 255 in the array, where n is equal to the distance divided by 255. The nth entry of 255 is followed by an entry containing the value of distance modulo 255. An example of the jump offsets in an offsets_to_byte_indices array, given a set of offsets to 1-byte contant pool references, is shown in Table 6-9, "One-byte Reference Location Example".

TABLE 6-9 One-byte Reference Location Example

| Instruction | Offset to Operand | Jump Offset |
|---|---|---|
| getfield_a 0 | 10 | 10 |
| putfield_b 2 | 65 | 55 |
|  |  | 255 |
|  |  | 255 |
| getfield_s 1 | 580 | 5 |
|  |  | 255 |
| putfield_a 0 | 835 | 0 |
| getfield_i 3 | 843 | 8 |

All one-byte constant_pool table indices in the Method Component must be represented in offsets_to_byte_indices array.

byte2_index_count

The byte2_index_count item represents the number of elements in the offsets_to_byte2_indices array.

offsets_to_byte2_indices[]

The offsets_to_byte2_indices item represents an array of 1-byte jump offsets into the info item of the Method Component to each 2-byte constant_pool table index. Each entry represents the number of bytes (or *distance*) between the previous index to the next. If the distance is greater than or equal to 255 then there are n entries equal of 255 in the array where n is equal to the distance divided by 255. The nth entry of 255 is followed by an entry containing the value of distance modulo 255.

An example of the jump offsets in an offsets_to_byte_indices array, given a set of offsets to 1-byte contant pool references, is shown in Table 6-9, "One-byte Reference Location Example". The same example applies to the 84  Java Card Virtual Machine 2.1 Specification • January 29, 1999 offsets_to_byte2_indices table if the instructions are changed to those with 2-byte constant pool indices.

All two-byte constant_pool table indices in the Method Component must be represented in offsets_to_byte2_indices array, including those represented in catch_type_index items of the exception_handler_info table.

6.11 Export Component

The Export Component describes all elements in this package that other packages may reference directly. If this CAP file does not contain an Applet Component, the Export Component includes entries for all public classes. Furthermore, for each public class it includes entries for all public and protected static methods, and all public and protected static fields. The set of static fields does not include primitive final static fields (compile-time constants). Packages that reference instance fields and non-special virtual methods in this package do so indirectly through class references and field or method tokens, and are therefore not represented in the Export Component.

If CAP file contains an Applet Component, the Export Component includes only entries for all public interfaces that are shareable. An interface is sharable if and only if it is the *javacard.framework.Sharable* interface or implements (directly or indirectly) that interface.

Note — The restriction on exportable functionality is imposed by the firewall as defined in the *Java Card Runtime Environment 2.1* specifications.

The Export Component is represented by the following structure:

```
export_component {
        u1 tag
        u2 size
        u2 class_count
        class_export_info {
                u2 class_offset
                u1 static_field_count
                u1 static_method_count
                u2 static_field_offsets[static_field_count]
                u2 static_method_offsets[static_method_count]
        } class_exports[class_count]
}
```

The items of the export_component structure are as follows:

tag

> The tag item has the value COMPONENT_Export(10).

size

> The size item indicates the number of bytes in the export_component structure, excluding the tag and size items.

class_count

> The class_count item represents the number of public classes in this package. It indicates the number of elements in the class_exports array.

class_exports[]

> The class_exports item represents a variable-length table of class_export_info structures. The table contains an entry for each of the public classes defined in this package. An index into the table to a particular element must be equal to the token value of the class.
>
> The items in the class_export_info structure are:

class_offset

> The class_offset item represents a byte offset into the info item of the Class Component to a class_info structure. The class_info structure at that offset must represent the exported class.

static_field_count

> The static_field_count item represents the number of elements in the static_field_offsets array. This value indicates the number of public and protected static fields defined in this class, excluding final static fields of primitive types.

static_method_count

> The static_method_count item represents the number of elements in the static_method_offsets array. This value indicates the number of public and protected static methods and constructors defined in this class.

static_field_offsets[]

> The static_field_offset item represents an array of 2-byte offsets to a static field in the static field image defined by the Static Field Component. The static field defined at each offset must represent the exported field with the token value equal to the index to the entry in the static_field_offsets array.

static_method_offsets[]

> The static_method_offset item represents a table of 2-byte offsets into the info item of the Method Component to a method_info structure. The method_info structure at each offset must represent the exported method with the token value equal to the index to the entry in the static_method_offsets array.

6.12 Descriptor Component

The Descriptor Component provides sufficient information to parse and verify all elements of the CAP file. The Descriptor Component is represented by the following structure:

```
descriptor_component {
    u1 tag
    u2 size
    u2 class_count
    class_descriptor_info classes[class_count]
    type_descriptor_info types
}
```

The items of the descriptor_component structure are as follows:

tag

> The tag item has the value COMPONENT_Descriptor(11).

size

> The size item indicates the number of bytes in the descriptor_component structure, excluding the tag and size items.

class_count

> The class_count item represents the number of class_descriptor_info structures in the classes array.

classes[]

> The classes item represents a table of variable-length class_descriptor_info structures. Each class and interface defined in this package is represented in the table.

types

> The types item represents a type_descriptor_info structure.

6.12.1 class_descriptor_info

The class_descriptor_info structure is used to describe a Java class or interface:

```
class_descriptor_info {
    u1 token
    u1 access_flags
    class_ref this_class_ref
    u1 interface_count
    u2 field_count
    u2 method_count
    class_ref interfaces[interface_count]
    field_descriptor_info fields[field_count]
    method_descriptor_info methods[method_count]
}
```

The items of the class_descriptor_info structure are as follows:

token

> The token item represents the class token of this class or interface. If this class is private or package-visible it does not have a token assigned. In this case the value of the token item must be 0xFF.

access_flags

> The access_flags item is a mask of modifiers used to describe the access permission to and properties of this class. The access_flags modifiers for classes are shown in the following table.

TABLE 6-10 Class Access and Modifier Flags

| Name | Value |
| --- | --- |
| ACC_PUBLIC | 0x01 |
| ACC_FINAL | 0x10 |
| ACC_INTERFACE | 0x40 |
| ACC_ABSTRACT | 0x80 |

> The Java Card Virtual Machine reserves all other flag values. Their values must be zero.

this_class_ref

> The this_class_ref item is a class_ref structure indicating the location of the class_info structure in the Class Component ("Class Component" on page 70). The class_ref structure is defined as part of the CONSTANT_Classref_info structure ("CONSTANT_Classref" on page 64).

interface_count

> The interface_count item is represents the number of interfaces implemented by this class.

field_count

> The field_count item represents the number of field_descriptor_info structures in the fields array. It is the number of fields defined in this class.

method_count

> The method_count item represents the number of method_descriptor_info structures in the methods array. It is the number of methods declared or defined in this class or interface.

interfaces []

> The interface_refs item represents an array of interfaces implemented by this class. The elements in the array are class_ref structures indicating the location of the class_info structure in the Class Component ("Class Component" on page 70). The class_ref structure is defined as part of the CONSTANT_Classref_info structure ("CONSTANT_Classref" on page 64).

fields[]

> The fields item represents a table of variable-length field_descriptor_info structures.

methods[]

> The methods item represents a table of variable_length method_descriptor_info structures.

6.12.2 field_descriptor_info

The field_descriptor_info structure is used to describe a Java field:

```
field_descriptor_info {
        u1 token
        u1 access_flags
        union {
                static_field_ref static_field
                instance_field_ref instance_field
        } field_ref
        union {
                u2 primitive_type
                u2 type_offset
        } type
}
```

The items of the field_descriptor_info structure is as follows:

token

> The token item represents the token of this field. If this field is private or package-visible static field it does not have a token assigned. In this case the value of the token item must be 0xFF.

access_flags

> The access_flags item is a mask of modifiers used to describe the access permission to and properties of the field. The access_flags modifiers for instance fields are shown in the following table.

TABLE 6-11 Field Access and Modifier Flags

| Name | Value |
|---|---|
| ACC_PUBLIC | 0x01 |
| ACC_PRIVATE | 0x02 |
| ACC_PROTECTED | 0x04 |
| ACC_STATIC | 0x08 |
| ACC_FINAL | 0x10 |

> All of the access flags are the same as those defined in a Java class file.
>
> The Java Card Virtual Machine reserves all other flag values. Their values must be zero.

field_ref

> The field_ref item represents a reference to the field. If the ACC_STATIC flag is equal to 1, this item represents a static_field_ref as defined in the CONSTANT_StaticFieldref structure ("CONSTANT_StaticFieldref and CONSTANT_StaticMethodref" on page 68). If the ACC_STATIC flag is equal to 0, this item represents an instance_field_ref as defined in the CONSTANT_InstanceFieldref structure ("CONSTANT_InstanceFieldref, CONSTANT_VirtualMethodref, and CONSTANT_SuperMethodref" on page 66).

type

> The type item represents the type of the field, directly or indirectly. If the field is a primitive type (*boolean, byte, short, or int*) the high bit of this item is set and the type is specified using the values in the following table. Otherwise the type item represents a 15-bit offset into the type_descriptor table. The item at the offset in the type_descriptor table must represent the type of the field.

TABLE 6-12 Primitive Type Descriptor Values

| Data Type | Value |
|---|---|
| boolean | 0x02 |
| byte | 0x03 |
| short | 0x04 |
| integer | 0x05 |

6.12.3 method_descriptor_info

The method_descriptor_info structure is used to describe a Java method:

```
method_descriptor_info {
        u1 token
        u1 access_flags
        u2 method_offset
        u2 type_offset
        u2 bytecode_count
        u2 exception_handler_count
        u2 exception_handler_index
}
```

The items of the method_descriptor_info structure are as follows:

token

> The token item represents the token of this method. If this method is a private or package-visible static or constructor method, or private virtual method it does not have a token assigned. In this case the value of the token item must be 0xFF.

access_flags

> The access_flags item is a mask of modifiers used to describe the access permission to and properties of the method. The access_flags modifiers for methods are shown in the following table.

TABLE 6-13 Method Access and Modifier Flags

| Name | Value |
|---|---|
| ACC_PUBLIC | 0x01 |
| ACC_PRIVATE | 0x02 |
| ACC_PROTECTED | 0x04 |
| ACC_STATIC | 0x08 |
| ACC_FINAL | 0x10 |
| ACC_ABSTRACT | 0x40 |
| ACC_INIT | 0x80 |

All of the access flags are the same as those defined in a Java class file except the ACC_INIT flag.

The ACC_INIT flag is set if the method descriptor identifies a constructor methods. In Java a constructor method is recognize by the class file verifier by its name, <init>, but in Java Card the name is replaced by a token. These methods require special checks by a verifier.

The Java Card Virtual Machine reserves all other flag values. Their values must be zero.

method_offset

The method_offset item represents a byte offset into the info item of the Method Component ("Method Component" on page 76) to a method_info structure. The method_info structure must represent this method.

If the class_descriptor_info structure that contains this method_descriptor_info structure represents an interface, the value of the method_offset item must be zero.

type_offset

The type_offset item must be a valid offset into the type_descriptor_info array. The type described at that offset represents the signature of the method.

bytecode_count

The bytecode_count item represents the number of bytecodes in the method.

exception_handler_count

The exception_handler_count item represents the number of exception handler implemented by this method.

exception_handler_index

The exception_handler_index item represents the index to the first exception_handlers table entry of the method_info structure that is implemented by this method. Succeeding exception_handlers table entries, up to the value of the exception_handler_count item, are also exception handlers implemented by this method.

6.12.4 type_descriptor_info

The type_descriptor_info structure represents the types of fields and signatures of methods as follows:

```
type_descriptor_info {
    u2 cp_count
    u2 constant_types[cp_types]
    { u1 nibble_count;
      u1 type[(nibble_count+1) / 2];
    } type_desc[]
}
```

The structure type_descriptor_info structure contains the following elements:

cp_count

The cp_count value represents the number of entries in the constant_pool table.

constant_types[]

The constant_types item represents an array of offsets to type_descriptor structures corresponding to the parallel entries in the constant_pool table. If the corresponding constant_pool table entry does not have an associated type, the value of the entry in the constant_types array item is 0xFFFF.

type_desc[]

The type_desc item represents an array of variable-length type descriptor structures. These descriptors represent the types of fields and signatures of methods. The elements in the structure are:

nibble_count

The nibble_count value represents the number of nibbles in the type array.

type[]

The type array contains an encoded description of the type composed of individual nibbles. If nibble_count item is an odd number, the last nibble must be 0x0. The values of the type descriptor nibbles are defined in the following table.

TABLE 6-14 Type Descriptor Values

| Type | Value |
|---|---|
| void | 0x1 |
| boolean | 0x2 |
| byte | 0x3 |
| short | 0x4 |
| int | 0x5 |
| objectref | 0x6 |
| array of boolean | 0xA |
| array of byte | 0xB |
| array of short | 0xC |
| array of int | 0xD |
| array of objectref | 0xE |

Class reference types are described using the class nibble 0x6, followed by a 2-byte (4-nibble) class_ref structure. The class_ref structure is defined as part of the CONSTANT_Classref_info structure ("CONSTANT_Classref" on page 64). For example, a field of type reference to p1.c1 in a CAP file defining package p0 is described as:

| 0x6 | <p1> | <c1> | 0x0 |
|---|---|---|---|
| objectref | package token (high bit on) | class token | padding |

The following are examples of the array-types:

| byte[] | 0xB | 0x0 | | |
|---|---|---|---|---|
| | array of byte | padding | | |
| p1.c1[] | 0xE | <p1> | <c1> | 0x0 |
| | array of objectref | package token (high bit on) | class token | padding |

Method signatures are encoded in the same way, with the last nibble indicating the return type of the method, for example:

| ()V | 0x1 | 0x0 | | |
|---|---|---|---|---|
| | void | padding | | |
| (Lp1.c1;)S | 0x6 | <p1> | <c1> | 0x4 |
| | objectref | package token (high bit on) | class token | short |

CHAPTER 7

Java Card Virtual Machine Instruction Set

A Java Card Virtual Machine instruction consists of an opcode specifying the operation to be performed, followed by zero or more operands embodying values to be operated upon. This chapter gives details about the format of each Java Card Virtual Machine instruction and the operation it performs.

7.1 Assumptions: The Meaning of "Must"

The description of each instruction is always given in the context of Java Card Virtual Machine code that satisfies the static and structural constraints of Chapter 6, "The Cap File Format."

In the description of individual Java Card Virtual Machine instructions, we frequently state that some situation "must" or "must not" be the case: "The *value2* must be of type int." The constraints of Chapter 6, "The Cap File Format" guarantee that all such expectations will in fact be met. If some constraint (a "must" or "must not") in an instruction description is not satisfied at run time, the behavior of the Java Card Virtual Machine is undefined.

7.2 Reserved Opcodes

In addition to the opcodes of the instructions specified later this chapter, which are used in Java Card CAP files (see Chapter 5, "The Cap File Format"), two opcodes are reserved for internal use by a Java Card Virtual Machine implementation. If Sun extends the instruction set of the Java Card Virtual Machine in the future, these reserved opcodes are guaranteed not to be used.

The two reserved opcodes, numbers 254 (0xfe) and 255 (0xff), have the mnemonics *impdep1* and *impdep2*, respectively. These instructions are intended to provide "back doors" or traps to implementation-specific functionality implemented in software and hardware, respectively.

Although these opcodes have been reserved, they may only be used inside a Java Card Virtual Machine implementation. They cannot appear in valid CAP files.

7.3 Virtual Machine Errors

A Java Card Virtual Machine throws an object that is an instance of a subclass of the class VirtualMachineError when an internal error or resource limitation prevents it from implementing the semantics of the Java Language. The Java Card Virtual Machine specification cannot predict where resource limitations or internal errors may be encountered and does not mandate precisely when they can be reported. Thus, any of the virtual machine errors listed as subclasses of VirtualMachineError in Section 2.3.3.4, "Errors," on page 2-20 may be thrown at any time during the operation of the Java Card Virtual Machine.

7.4 Security Exceptions

Instructions of the Java Card Virtual Machine throw an instance of the class SecurityException when a security violation has been detected. The Java Card Virtual Machine does not mandate the complete set of security violations which can or will result in an exception being thrown. However, there is a minimum set which must be supported.

In the general case, any instruction which de-references an object reference must throw a SecurityException if the applet context in which the instruction is executing is different than the owning applet context of the referenced object. The list of instructions includes the instance field get and put instructions, the array load and store instructions, as well as the *arraylength, invokeinterface, invokespecial, invokevirtual, checkcast, instanceof* and *athrow* instructions.

There are several exceptions to this general rule that allow cross-context use of objects or arrays. These exceptions are detailed in Chapter 6 of the *Java Card Runtime Environment Specification*. An important detail to note is that any cross-context method invocation will result in a context switch.

The Java Card Virtual Machine may also throw a SecurityException if an instruction violates any of the static constraints of Chapter 6, "The Cap File Format." The Java Card Virtual Machine specification does not mandate which instructions must implement these additional security checks, or to what level. Therefore, a SecurityException may be thrown at any time during the operation of the Java Card Virtual Machine.

7.5 The Java Card Virtual Machine Instruction Set

Java Virtual Machine instructions are represented in this chapter by entries of the form shown in the figure below, an example instruction page, in alphabetical order and each beginning on a new page.

--- mnemonic

Short description of the instruction

Format

*mnemonic*
*operand1*
*operand2*
...

Forms

*mnemonic* = opcode

Stack

..., *value1*, *value2* ⇒
..., *value3*

Description

A longer description detailing constraints on operand stack contents or constant pool entries, the operation performed, the type of the results, etc.

Runtime Exceptions

If any runtime exceptions can be thrown by the execution of an instruction they are set off one to a line, in the order in which they must be thrown.

Other than the runtime exceptions, if any, listed for an instruction, that instruction must not throw any runtime exceptions except for instances of VirtualMachineError or its subclasses.

Notes

Comments not strictly part of the specification of an instruction are set aside as notes at the end of the description.

---

FIGURE 7-1   An example instruction page

Each cell in the instruction format diagram represents a single 8-bit byte. The instruction's *mnemonic* is its name. Its opcode is its numeric representation and is given in both decimal and hexadecimal forms. Only the numeric representation is actually present in the Java Card Virtual Machine code in a CAP file.

Keep in mind that there are "operands" generated at compile time and embedded within Java Card Virtual Machine instructions, as well as "operands" calculated at run time and supplied on the operand stack. Although they are supplied from several different areas, all these operands represent the same thing: values to be operated upon by the Java Card Virtual Machine instruction being executed. By implicitly taking many of its operands from its operand stack, rather than representing them explicitly in its compiled code as additional operand bytes, register numbers, etc., the Java Card Virtual Machine's code stays compact.

Some instructions are presented as members of a family of related instructions sharing a single description, format, and operand stack diagram. As such, a family of instructions includes several opcodes and opcode mnemonics; only the family mnemonic appears in the instruction format diagram, and a separate forms line lists all member mnemonics and opcodes. For example, the forms line for the *sconst_<s>* family of instructions, giving mnemonic and opcode information for the two instructions in that family (*sconst_0* and *sconst_1*), is

Forms  *sconst_0* = 3 (0x3),
  *sconst_1* = 4 (0x4)

In the description of the Java Card Virtual Machine instructions, the effect of an instruction's execution on the operand stack of the current frame is represented textually, with the stack growing from left to right and each word represented separately. Thus,

Stack..., *value1*, *value2* ⇒
..., *result* shows an operation that begins by having a one-word *value2* on top of the operand stack with a one-word *value1* just beneath it. As a result of the execution of the instruction, *value1* and *value2* are popped from the operand stack and replaced by a one-word *result*, which has been calculated by the instruction. The remainder of the operand stack, represented by an ellipsis (...), is unaffected by the instruction's execution.

The type int takes two words on the operand stack. In the operand stack representation, each word is represented separately using a dot notation:

Stack..., *value1.word1*, *value1.word2*, *value2.word1*, *value2.word2* ⇒
..., *result.word1*, *result.word2*

The Java Card Virtual Machine specification does not mandate how the two words are used to represent the 32-bit int value; it only requires that a particular implementation be internally consistent.

aaload

Load reference from array

Format

| aaload |
|---|

Forms

*aaload* = 36 (0x24)

Stack

..., *arrayref, index* ⇒
..., *value*

Description

The *arrayref* must be of type reference and must refer to an array whose components are of type reference. The *index* must be of type short. Both *arrayref* and *index* are popped from the operand stack. The reference *value* in the component of the array at *index* is retrieved and pushed onto the top of the operand stack.

Runtime Exceptions

If *arrayref* is null, *aaload* throws a NullPointerException.

Otherwise, if *index* is not within the bounds of the array referenced by *arrayref*, the *aaload* instruction throws an ArrayIndexOutOfBoundsException.

aastore

Store into reference array

Format

| aastore |
|---|

Forms aastore = 55 (0x37)

Stack

..., arrayref, index, value ⇒
...

Description

The *arrayref* must be of type reference and must refer to an array whose components are of type reference. The *index* must be of type short and the *value* must be of type reference. The *arrayref*, *index* and *value* are popped from the operand stack. The reference *value* is stored as the component of the array at *index*.

The type of value must be assignment compatible with the type of the components of the array referenced by arrayref. Assignment of a value of reference type S (source) to a variable of reference type T (target) is allowed only when the type S supports all of the operations defined on type T. The detailed rules follow:

- If S is a class type, then:
  - If T is a class type, then S must be the same class as T, or S must be a subclass of T;
  - If T is an interface type, S must implement interface T.
- If S is an array type, namely the type SC[], that is, an array of components of type SC, then:
  - If T is a class type, T must be Object, or:
    - If T is an array type, namely the type TC[], an array of components of type TC, then either TC and SC must be the same primitive type, or
    - TC and SC must both be reference types with type SC assignable to TC, by these rules.

S cannot be an interface type, because there are no instances of interfaces, only instances of classes and arrays.

Runtime Exceptions

If *arrayref* is null, *aastore* throws a NullPointerException.

Otherwise, if *index* is not within the bounds of the array referenced by *arrayref*, the *aastore* instruction throws an ArrayIndexOutOfBoundsException.

Otherwise, if *arrayref* is not null and the actual type of *value* is not assignment compatible with the actual type of the component of the array, *aastore* throws an ArrayStoreException.

aconst_null

Push null

Format

| aconst_null |
|---|

Forms

*aconst_null* = 1 (0x1)

Stack

... ⇒
..., *null*

Description

Push the null object reference onto the operand stack.

aload

Load reference from local variable

Format

| aload |
|-------|
| index |

Forms

*aload* = 21 (0x15)

Stack

... ⇒

..., *objectref*

Description

The *index* is an unsigned byte that must be a valid index into the local variables of the current frame. The local variable at *index* must contain a reference. The *objectref* in the local variable at *index* is pushed onto the operand stack.

Notes

The *aload* instruction cannot be used to load a value of type returnAddress from a local variable onto the operand stack. This asymmetry with the *astore* instruction is intentional.

aload_<n>

Load reference from local variable

Format

| aload_<n> |
|---|

Forms

*aload_0* = 24 (0x18)
*aload_1* = 25 (0x19)
*aload_2* = 26 (0x1a)
*aload_3* = 27 (0x1b)

Stack

... ⇒
..., *objectref*

Description

The <n> must be a valid index into the local variables of the current frame. The local variable at <n> must contain a reference. The *objectref* in the local variable at <n> is pushed onto the operand stack.

Notes

An *aload_<n>* instruction cannot be used to load a value of type returnAddress from a local variable onto the operand stack. This asymmetry with the corresponding *astore_<n>* instruction is intentional.

Each of the *aload_<n>* instructions is the same as *aload* with an *index* of <n>, except that the operand <n> is implicit.

anewarray

Create new array of reference

Format

| anewarray |
|---|
| indexbyte1 |
| indexbyte2 |

Forms

*anewarray* = 145 (0x91)

Stack

..., *count* ⇒
..., *arrayref*

Description

The *count* must be of type short. It is popped off the operand stack. The *count* represents the number of components of the array to be created. The unsigned *indexbyte1* and *indexbyte2* are used to construct an index into the constant pool of the current package, where the value of the index is (*indexbyte1* << 8) | *indexbyte2*. The item at that index in the constant pool must be of type CONSTANT_Classref, a reference to a class or interface type. The reference is resolved. A new array with components of that type, of length *count*, is allocated from the heap, and a reference *arrayref* to this new array object is pushed onto the operand stack. All components of the new array are initialized to null, the default value for reference types.

Runtime Exception

If *count* is less than zero, the *anewarray* instruction throws a NegativeArraySizeException.

areturn

Return reference from method

Format

| areturn |
|---|

Forms

*areturn* = 119 (0x77)

Stack

..., *objectref* ⇒
[empty]

Description

The *objectref* must be of type reference. The *objectref* is popped from the operand stack of the current frame and pushed onto the operand stack of the frame of the invoker. Any other values on the operand stack of the current method are discarded.

The virtual machine then reinstates the frame of the invoker and returns control to the invoker.

arraylength

Get length of array

Format

> arraylength

Forms arraylength = 146 (0x92)

Stack

..., arrayref ⇒
..., length

Description

The *arrayref* must be of type reference and must refer to an array. It is popped from the operand stack. The *length* of the array it references is determined. That *length* is pushed onto the top of the operand stack as a short.

Runtime Exception

If *arrayref* is null, the *arraylength* instruction throws a NullPointerException.

astore

Store reference into local variable

Format

| astore |
|--------|
| index  |

Forms

*astore* = 40 (0x28)

Stack

..., *objectref* ⇒
...

Description

The *index* is an unsigned byte that must be a valid index into the local variables of the current frame. The *objectref* on the top of the operand stack must be of type returnAddress or of type reference. The *objectref* is popped from the operand stack, and the value of the local variable at *index* is set to *objectref*.

Notes

The *astore* instruction is used with an *objectref* of type returnAddress when implementing Java's finally keyword. The *aload* instruction cannot be used to load a value of type returnAddress from a local variable onto the operand stack. This asymmetry with the *astore* instruction is intentional.

astore_<n>

Store reference into local variable

Format

| astore_<n> |
|---|

Forms astore_0 = 43 (0x2b)
astore_1 = 44 (0x2c)
astore_2 = 45 (0x2d)
astore_3 = 46 (0x2e)

Stack

..., objectref ⇒

...

Description

The <n> must be a valid index into the local variables of the current frame. The *objectref* on the top of the operand stack must be of type returnAddress or of type reference. It is popped from the operand stack, and the value of the local variable at <n> is set to *objectref*.

Notes

An *astore_<n>* instruction is used with an *objectref* of type returnAddress when implementing Java's finally keyword. An *aload_<n>* instruction cannot be used to load a value of type returnAddress from a local variable onto the operand stack. This asymmetry with the corresponding *astore_<n>* instruction is intentional.

Each of the *aload_<n>* instructions is the same as *aload* with an *index* of <n>, except that the operand <n> is implicit.

athrow

Throw exception or error

Format

| athrow |
|---|

Forms

*athrow* = 147 (0x93)

Stack

..., *objectref* ⇒
*objectref*

Description

The *objectref* must be of type reference and must refer to an object which is an instance of class Throwable or of a subclass of Throwable. It is popped from the operand stack. The *objectref* is then thrown by searching the current frame for the most recent catch clause that catches the class of *objectref* or one of its superclasses.

If a catch clause is found, it contains the location of the code intended to handle this exception. The pc register is reset to that location, the operand stack of the current frame is cleared, *objectref* is pushed back onto the operand stack, and execution continues. If no appropriate clause is found in the current frame, that frame is popped, the frame of its invoker is reinstated, and the *objectref* is rethrown.

If no catch clause is found that handles this exception, the virtual machine exits.

Runtime Exception

If *objectref* is null, *athrow* throws a NullPointerException instead of *objectref*.

baload

Load byte or boolean from array

Format

| baload |
|---|

Forms

*baload* = 37 (0x25)

Stack

..., *arrayref, index* ⇒
..., *value*

Description

The *arrayref* must be of type reference and must refer to an array whose components are of type byte or of type boolean. The *index* must be of type short. Both *arrayref* and *index* are popped from the operand stack. The byte *value* in the component of the array at *index* is retrieved, sign-extended to a short *value*, and pushed onto the top of the operand stack.

Runtime Exceptions

If *arrayref* is null, *aaload* throws a NullPointerException.

Otherwise, if *index* is not within the bounds of the array referenced by *arrayref*, the *aaload* instruction throws an ArrayIndexOutOfBoundsException.

bastore

Store into byte or boolean array

Format

| bastore |
|---|

Forms

*bastore* = 56 (0x38)

Stack

..., *arrayref*, *index*, *value* ⇒
...

Description

The *arrayref* must be of type reference and must refer to an array whose components are of type byte or of type boolean. The *index* and *value* must both be of type short. The *arrayref*, *index* and *value* are popped from the operand stack. The short *value* is truncated to a byte and stored as the component of the array indexed by *index*.

Runtime Exceptions

If *arrayref* is null, *bastore* throws a NullPointerException.

Otherwise, if *index* is not within the bounds of the array referenced by *arrayref*, the *bastore* instruction throws an ArrayIndexOutOfBoundsException.

bipush

Push byte

Format

| bipush |
|--------|
| byte   |

Forms

*bipush* = 18 (0x12)

Stack

... ⇒
..., value.word1, value.word2

Description

The immediate *byte* is sign-extended to an int, and the resulting *value* is pushed onto the operand stack.

Notes

If a virtual machine does not support the int data type, the *bipush* instruction will not be available.

bspush

Push byte

Format

| bspush |
|--------|
| byte   |

Forms

*bspush* = 16 (0x10)

Stack

... ⇒

..., *value*

Description

The immediate *byte* is sign-extended to a short, and the resulting *value* is pushed onto the operand stack.

checkcast

Check whether object is of given type

Format

| checkcast |
|---|
| atype |
| indexbyte1 |
| indexbyte2 |

Forms checkcast = 148 (0x94)

Stack

..., objectref ⇒
..., objectref

Description

The unsigned byte *atype* is a code that indicates if the type against which the object is being checked is an array type or a class type. It must take one of the following values or zero:

| Array Type | atype |
|---|---|
| T_BOOLEAN | 10 |
| T_BYTE | 11 |
| T_SHORT | 12 |
| T_INT | 13 |
| T_REFERENCE | 14 |

If the value of *atype* is 10, 11, 12, or 13, the values of the *indexbyte1* and *indexbyte2* must be zero, and the value of *atype* indicates the array type against which to check the object. Otherwise the unsigned *indexbyte1* and *indexbyte2* are used to construct an index into the constant pool of the current package, where the value of the index is (*indexbyte1* << 8) | *indexbyte2*. The item at that index in the constant pool must be of type CONSTANT_Classref, a reference to a class or interface type. The reference is resolved. If the value of *atype* is 14, the object is checked against an array type which is an array of object references of the type of the resolved class. If the value of *atype* is zero, the object is checked against a class or interface type which is the resolved class.

The *objectref* must be of type reference. If *objectref* is null or can be cast to the specified array type or the resolved class or interface type, the operand stack is unchanged; otherwise the *checkcast* instruction throws a ClassCastException.

The following rules are used to determine whether an *objectref* that is not null can be cast to the resolved type: if S is the class of the object referred to by *objectref* and T is the resolved class, array or interface type, *checkcast* determines whether *objectref* can be cast to type T as follows:

- If S is an ordinary (non-array) class, then:
  - If T is a class type, then S must be the same class as T, or a subclass of T.
  - If T is an interface type, S must implement interface T.

- If S is a class representing the array type SC[], that is, an array of components of type SC, then:
  - If T is a class type, then T must be Object.
  - If T is an array type TC[], that is, an array of components of type TC, then one of the following must be true:
    - TC and type SC are the same primitive type.
    - TC and SC are reference types, and type SC can be cast to TC by these runtime rules.

S cannot be an interface type, because there are no instances of interfaces, only instances of classes and arrays.

Runtime Exception

If *objectref* cannot be cast to the resolved class, array, or interface type, the *checkcast* instruction throws a `ClassCastException`.

Notes

The *checkcast* instruction is fundamentally very similar to the *instanceof* instruction. It differs in its treatment of null, its behavior when its test fails (*checkcast* throws an exception, *instanceof* pushes a result code), and its effect on the operand stack.

If a virtual machine does not support the int data type, the value of *atype* may not be 13 (array type = T_INT).

dup

Duplicate top operand stack word

Format

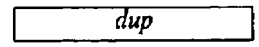

Forms

*dup* = 61 (0x3d)

Stack

..., *word* ⇒
..., *word*, *word*

Description

The top word on the operand stack is duplicated and pushed onto the operand stack.

The *dup* instruction must not be used unless *word* contains a 16-bit data type.

Notes

Except for restrictions preserving the integrity of 32-bit data types, the *dup* instruction operates on an untyped word, ignoring the type of data it contains.

dup_x

Duplicate top operand stack words and insert below

Format

```
dup_x
mn
```

Forms

*dup_x* = 63 (0x3f)

Stack

..., wordN, ..., wordM, ..., word1 ⇒
..., wordM, ..., word1, wordN, ..., wordM, ..., word1

Description

The unsigned byte *mn* is used to construct two parameter values. The high nybble, (*mn* & 0xf0) >> 4, is used as the value *m*. The low nybble, (*mn* & 0xf), is used as the value *n*. Permissible values for *m* are 1 through 4. Permissible values for *n* are 0 and *m* through *m*+4.

For positive values of *n*, the top *m* words on the operand stack are duplicated and the copied words are inserted *n* words down in the operand stack. When *n* equals 0, the top *m* words are copied and placed on top of the stack.

The *dup_x* instruction must not be used unless the ranges of words 1 through *m* and words *m*+1 through *n* each contain either a 16-bit data type, two 16-bit data types, a 32-bit data type, a 16-bit data type and a 32-bit data type (in either order), or two 32-bit data types.

Notes

Except for restrictions preserving the integrity of 32-bit data types, the *dup_x* instruction operates on untyped words, ignoring the types of data they contain.

If a virtual machine does not support the int data type, the permissible values for *m* are 1 or 2, and permissible values for *n* are 0 and *m* through *m*+2.

dup2

Duplicate top two operand stack words

Format

| dup2 |
|------|

Forms

*dup2* = 62 (0x3e)

Stack

..., word2, word1 ⇒
..., word2, word1, word2, word1

Description

The top two words on the operand stack are duplicated and pushed onto the operand stack, in the original order.

The *dup2* instruction must not be used unless each of *word1* and *word2* is a word that contains a 16-bit data type or both together are the two words of a single 32-bit datum.

Notes

Except for restrictions preserving the integrity of 32-bit data types, the *dup2* instruction operates on untyped words, ignoring the types of data they contain.

getfield_<t>

Fetch field from object

Format

| getfield_<t> |
|---|
| index |

Forms getfield_a = 131 (0x83)
getfield_b = 132 (0x84)
getfield_s = 133 (0x85)
getfield_i = 134 (0x86)

Stack

..., objectref ⇒
..., value

OR

..., objectref ⇒
..., value.word1, value.word2

Description

The *objectref*, which must be of type reference, is popped from the operand stack. The unsigned *index* is used as an index into the constant pool of the current package. The constant pool item at the index must be of type CONSTANT_InstanceFieldref, a reference to a class and a field token. If the field is protected, then it must be either a member of the current class or a member of a superclass of the current class, and the class of *objectref* must be either the current class or a subclass of the current class.

The item must resolve to a field with a type that matches *t*, as follows:

- *a* field must be of type reference
- *b* field must be of type byte or type boolean
- *s* field must be of type short
- *i* field must be of type int The width of a field in a class instance is determined by the field type specified in the instruction. The item is resolved, determining the field offset. The *value* at that offset into the class instance referenced by *objectref* is fetched. If the *value* is of type byte or type boolean, it is sign-extended to a short. The *value* is pushed onto the operand stack.

Runtime Exception

If *objectref* is null, the *getfield_<t>* instruction throws a NullPointerException.

Notes

If a virtual machine does not support the int data type, the *getfield_i* instruction will not be available.

getfield_<t>_this

Fetch field from current object

Format

| getfield_<t>_this |
|---|
| index |

Forms getfield_a_this = 173 (0xad)
getfield_b_this = 174 (0xae)
getfield_s_this = 175 (0xaf)
getfield_i_this = 176 (0xb0)

Stack

... ⇒
..., value

OR

... ⇒
..., value.word1, value.word2

Description

The currently executing method must be an instance method. The local variable at index 0 must contain a reference *objectref* to the currently executing method's this parameter. The unsigned *index* is used as an index into the constant pool of the current package. The constant pool item at the index must be of type CONSTANT_InstanceFieldref, a reference to a class and a field token. If the field is protected, then it must be either a member of the current class or a member of a superclass of the current class, and the class of *objectref* must be either the current class or a subclass of the current class.

The item must resolve to a field with a type that matches *t*, as follows:

- *a* field must be of type reference
- *b* field must be of type byte or type boolean
- *s* field must be of type short
- *i* field must be of type int The width of a field in a class instance is determined by the field type specified in the instruction. The item is resolved, determining the field offset. The *value* at that offset into the class instance referenced by *objectref* is fetched. If the *value* is of type byte or type boolean, it is sign-extended to a short. The *value* is pushed onto the operand stack.

Runtime Exception

If *objectref* is null, the *getfield_<t>_this* instruction throws a NullPointerException.

Notes

If a virtual machine does not support the int data type, the *getfield_i_this* instruction will not be available.

getfield_<t>_w

Fetch field from object (wide index)

Format

| getfield_<t>_w |
|---|
| indexbyte1 |
| indexbyte2 |

Forms

*getfield_a_w* = 169 (0xa9)
*getfield_b_w* = 170 (0xaa)
*getfield_s_w* = 171 (0xab)
*getfield_i_w* = 172 (0xac)

Stack

..., *objectref* ⇒
..., *value*

OR

..., *objectref* ⇒
..., *value.word1*, *value.word2*

Description

The *objectref*, which must be of type reference, is popped from the operand stack. The unsigned *indexbyte1* and *indexbyte2* are used to construct an index into the constant pool of the current package, where the value of the index is (*indexbyte1* << 8) | *indexbyte2*. The constant pool item at the index must be of type CONSTANT_InstanceFieldref, a reference to a class and a field token. The item must resolve to a field of type reference. If the field is protected, then it must be either a member of the current class or a member of a superclass of the current class, and the class of *objectref* must be either the current class or a subclass of the current class.

The item must resolve to a field with a type that matches *t*, as follows:

- *a* field must be of type reference
- *b* field must be of type byte or type boolean
- *s* field must be of type short
- *i* field must be of type int The width of a field in a class instance is determined by the field type specified in the instruction. The item is resolved, determining the field offset. The *value* at that offset into the class instance referenced by *objectref* is fetched. If the *value* is of type byte or type boolean, it is sign-extended to a short. The *value* is pushed onto the operand stack.

Runtime Exception

If *objectref* is null, the *getfield_<t>_w* instruction throws a NullPointerException.

Notes

If a virtual machine does not support the int data type, the *getfield_i_w* instruction will not be available.

getstatic_<t>

Get static field from class

Format

| getstatic_<t> |
|---|
| indexbyte1 |
| indexbyte2 |

Forms

*getstatic_a* = 123 (0x7b)
*getstatic_b* = 124 (0x7c)
*getstatic_s* = 125 (0x7d)
*getstatic_i* = 126 (0x7e)

Stack

... ⇒
..., *value*

OR

... ⇒
..., *value.word1, value.word2*

Description

The unsigned *indexbyte1* and *indexbyte2* are used to construct an index into the constant pool of the current package, where the value of the index is (*indexbyte1* << 8) | *indexbyte2*. The constant pool item at the index must be of type CONSTANT_StaticFieldref, a reference to a static field. If the field is protected, then it must be either a member of the current class or a member of a superclass of the current class.

The item must resolve to a field with a type that matches *t*, as follows:

- *a* field must be of type reference
- *b* field must be of type byte or type boolean
- *s* field must be of type short
- *i* field must be of type int The width of a class field is determined by the field type specified in the instruction. The item is resolved, determining the field offset. The item is resolved, determining the class field. The *value* of the class field is fetched. If the *value* is of type byte or type boolean, it is sign-extended to a short. The *value* is pushed onto the operand stack.

Notes

If a virtual machine does not support the int data type, the *getstatic_i* instruction will not be available.

goto

Branch always

Format

| goto |
|------|
| branch |

Forms

*goto* = 112 (0x70)

Stack

No change

Description

The value *branch* is used as a signed 8-bit offset. Execution proceeds at that offset from the address of the opcode of this *goto* instruction. The target address must be that of an opcode of an instruction within the method that contains this *goto* instruction.

goto_w

Branch always (wide index)

Format

| |
|---|
| *goto_w* |
| *branchbyte1* |
| *branchbyte2* |

Forms

*goto_w* = 168 (0xa8)

Stack

No change

Description

The unsigned bytes *branchbyte1* and *branchbyte2* are used to construct a signed 16-bit *branchoffset*, where *branchoffset* is (*branchbyte1* << 8) | *branchbyte2*. Execution proceeds at that offset from the address of the opcode of this *goto* instruction. The target address must be that of an opcode of an instruction within the method that contains this *goto* instruction.

i2b

Convert int to byte

Format

| i2b |
|---|

Forms

*i2b* = 93 (0x5d)

Stack

..., *value.word1*, *value.word2* ⇒
..., *result*

Description

The *value* on top of the operand stack must be of type int. It is popped from the operand stack and converted to a byte *result* by taking the low-order 16 bits of the int value, and discarding the high-order 16 bits. The low-order word is truncated to a byte, then sign-extended to a short *result*. The *result* is pushed onto the operand stack.

Notes

The *i2b* instruction performs a narrowing primitive conversion. It may lose information about the overall magnitude of *value*. The *result* may also not have the same sign as *value*.

If a virtual machine does not support the int data type, the *i2b* instruction will not be available.

i2s

Convert int to short

Format

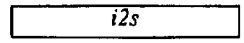

Forms

*i2s* = 94 (0x5e)

Stack

..., *value.word1*, *value.word2* ⇒
..., *result*

Description

The *value* on top of the operand stack must be of type int. It is popped from the operand stack and converted to a short *result* by taking the low-order 16 bits of the int value and discarding the high-order 16 bits. The *result* is pushed onto the operand stack.

Notes

The *i2s* instruction performs a narrowing primitive conversion. It may lose information about the overall magnitude of *value*. The *result* may also not have the same sign as *value*.

If a virtual machine does not support the int data type, the *i2s* instruction will not be available.

iadd

Add int

Format

| iadd |
|------|

Forms iadd = 66 (0x42)

Stack

..., value1.word1, value1.word2, value2.word1, value2.word2 ⇒
..., result.word1, result.word2

Description

Both *value1* and *value2* must be of type int. The values are popped from the operand stack. The int *result* is *value1* + *value2*. The *result* is pushed onto the operand stack.

If an i*add* instruction overflows, then the result is the low-order bits of the true mathematical result in a sufficiently wide two's-complement format. If overflow occurs, then the sign of the result may not be the same as the sign of the mathematical sum of the two values.

Notes

If a virtual machine does not support the int data type, the *iadd* instruction will not be available.

iaload

Load int from array

Format

Forms

*iaload* = 39 (0x27)

Stack

..., *arrayref*, *index* ⇒
..., *value.word1*, *value.word2*

Description

The *arrayref* must be of type reference and must refer to an array whose components are of type int. The *index* must be of type short. Both *arrayref* and *index* are popped from the operand stack. The int *value* in the component of the array at *index* is retrieved and pushed onto the top of the operand stack.

Runtime Exceptions

If *arrayref* is null, *aaload* throws a NullPointerException.

Otherwise, if *index* is not within the bounds of the array referenced by *arrayref*, the *aaload* instruction throws an ArrayIndexOutOfBoundsException.

Notes

If a virtual machine does not support the int data type, the *iaload* instruction will not be available.

iand

Boolean AND int

Format

```
iand
```

Forms

*iand* = 84 (0x54)

Stack

..., *value1.word1*, *value1.word2*, *value2.word1*, *value2.word2* ⇒
..., *result.word1*, *result.word2*

Description

Both *value1* and *value2* must be of type `int`. They are popped from the operand stack. An `int` *result* is calculated by taking the bitwise AND (conjunction) of *value1* and *value2*. The *result* is pushed onto the operand stack.

Notes

If a virtual machine does not support the `int` data type, the *iand* instruction will not be available.

iastore

Store into int array

Format

| iastore |
|---|

Forms

*iastore* = 58 (0x3a)

Stack

..., *arrayref, index, value.word1, value.word2* ⇒

...

Description

The *arrayref* must be of type reference and must refer to an array whose components are of type int. The *index* must be of type short and *value* must be of type int. The *arrayref*, *index* and *value* are popped from the operand stack. The int *value* is stored as the component of the array indexed by *index*.

Runtime Exception

If *arrayref* is null, *sastore* throws a NullPointerException.

Otherwise, if *index* is not within the bounds of the array referenced by *arrayref*, the *sastore* instruction throws an ArrayIndexOutOfBoundsException.

Notes

If a virtual machine does not support the int data type, the *iastore* instruction will not be available.

icmp

Compare int

Format

| icmp |
|------|

Forms

*icmp* = 95 (0x5f)

Stack

..., *value1.word1*, *value1.word2*, *value2.word1*, *value2.word2* ⇒
..., *result*

Description

Both *value1* and *value2* must be of type int. They are both popped from the operand stack, and a signed integer comparison is performed. If *value1* is greater than *value2*, the short value 1 is pushed onto the operand stack. If *value1* is equal to *value2*, the short value 0 is pushed onto the operand stack. If *value1* is less than *value2*, the short value −1 is pushed onto the operand stack.

Notes

If a virtual machine does not support the int data type, the *icmp* instruction will not be available.

iconst_<i>

Push int constant

Format

| iconst_<i> |
|---|

Forms

*iconst_m1* = 10 (0x09)
*iconst_0* = 11 (0xa)
*iconst_1* = 12 (0xb)
*iconst_2* = 13 (0xc)
*iconst_3* = 14 (0xd)
*iconst_4* = 15 (0xe)
*iconst_5* = 16 (0xf)

Stack

... ⇒
..., <i>.word1, <i>.word2

Description

Push the int constant <i> (-1, 0, 1, 2, 3, 4, or 5) onto the operand stack.

Notes

If a virtual machine does not support the int data type, the *iconst_<i>* instruction will not be available.

idiv

Divide int

Format

| idiv |
|------|

Forms idiv = 72 (0x48)

Stack

..., value1.word1, value1.word2, value2.word1, value2.word2 ⇒
..., result.word1, result.word2

Description

Both *value1* and *value2* must be of type int. The values are popped from the operand stack. The int *result* is the value of the Java expression *value1 / value2*. The *result* is pushed onto the operand stack.

An int division rounds towards 0; that is, the quotient produced for int values in *n/d* is an int value *q* whose magnitude is as large as possible while satisfying $|d \cdot q| = |n|$. Moreover, *q* is a positive when $|n| = |d|$ and *n* and *d* have the same sign, but *q* is negative when $|n| = |d|$ and *n* and *d* have opposite signs.

There is one special case that does not satisfy this rule: if the dividend is the negative integer of the largest possible magnitude for the int type, and the divisor is *–1*, then overflow occurs, and the result is equal to the dividend. Despite the overflow, no exception is thrown in this case.

Runtime Exception

If the value of the divisor in an int division is 0, *idiv* throws an ArithmeticException.

Notes

If a virtual machine does not support the int data type, the *idiv* instruction will not be available.

if_acmp<cond>

Branch if reference comparison succeeds

Format

| if_acmp<cond> |
|---|
| branch |

Forms if_acmpeq = 104 (0x68)
if_acmpne = 105 (0x69)

Stack

..., value1, value2 ⇒
...

Description

Both *value1* and *value2* must be of type reference. They are both popped from the operand stack and compared. The results of the comparisons are as follows:

- *eq* succeeds if and only if *value1* = *value2*

- *ne* succeeds if and only if *value1* ? *value2*

If the comparison succeeds, *branch* is used as signed 8-bit offset, and execution proceeds at that offset from the address of the opcode of this *if_acmp<cond>* instruction. The target address must be that of an opcode of an instruction within the method that contains this *if_acmp<cond>* instruction.

Otherwise, execution proceeds at the address of the instruction following this *if_acmp<cond>* instruction.

if_acmp<cond>_w

Branch if reference comparison succeeds (wide index)

Format

| if_acmp<cond>_w |
|---|
| branchbyte1 |
| branchbyte2 |

Forms if_acmpeq_w = 160 (0xa0)
if_acmpne_w = 161 (0xa1)

Stack

..., value1, value2 ⇒
...

Description

Both *value1* and *value2* must be of type reference. They are both popped from the operand stack and compared. The results of the comparisons are as follows:

- *eq* succeeds if and only if *value1* = *value2*

- *ne* succeeds if and only if *value1* ? *value2*

If the comparison succeeds, the unsigned bytes *branchbyte1* and *branchbyte2* are used to construct a signed 16-bit *branchoffset*, where *branchoffset* is (*branchbyte1* << 8) | *branchbyte2*. Execution proceeds at that offset from the address of the opcode of this *if_acmp<cond>_w* instruction. The target address must be that of an opcode of an instruction within the method that contains this *if_acmp<cond>_w* instruction.

Otherwise, execution proceeds at the address of the instruction following this *if_acmp<cond>_w* instruction.

if_scmp<cond>

Branch if short comparison succeeds

Format

| if_scmp<cond> |
|---|
| branch |

Forms if_scmpeq = 106 (0x6a)
if_scmpne = 107 (0x6b)
if_scmplt = 108 (0x6c)
if_scmpge = 109 (0x6d)
if_scmpgt = 110 (0x6e)
if_scmple = 111 (0x6f)

Stack

..., value1, value2 ⇒
...

Description

Both *value1* and *value2* must be of type short. They are both popped from the operand stack and compared. All comparisons are signed. The results of the comparisons are as follows:

- *eq* succeeds if and only if *value1* = *value2*
- *ne* succeeds if and only if *value1* ? *value2*
- *lt* succeeds if and only if *value1* < *value2*
- *le* succeeds if and only if *value1* = *value2*
- *gt* succeeds if and only if *value1* > *value2*
- *ge* succeeds if and only if *value1* = *value2*

If the comparison succeeds, *branch* is used as signed 8-bit offset, and execution proceeds at that offset from the address of the opcode of this *if_scmp<cond>* instruction. The target address must be that of an opcode of an instruction within the method that contains this *if_scmp<cond>* instruction.

Otherwise, execution proceeds at the address of the instruction following this *if_scmp<cond>* instruction.

if_scmp<cond>_w

Branch if short comparison succeeds (wide index)

Format

| if_scmp<cond>_w |
|---|
| branchbyte1 |
| branchbyte2 |

Forms if_scmpeq_w = 162 (0xa2)
if_scmpne_w = 163 (0xa3)
if_scmplt_w = 164 (0xa4)
if_scmpge_w = 165 (0xa5)
if_scmpgt_w = 166 (0xa6)
if_scmple_w = 167 (0xa7)

Stack

..., value1, value2 =>
...

Description

Both *value1* and *value2* must be of type short. They are both popped from the operand stack and compared. All comparisons are signed. The results of the comparisons are as follows:

- *eq* succeeds if and only if *value1* = *value2*
- *ne* succeeds if and only if *value1* ? *value2*
- *lt* succeeds if and only if *value1* < *value2*
- *le* succeeds if and only if *value1* = *value2*
- *gt* succeeds if and only if *value1* > *value2*
- *ge* succeeds if and only if *value1* = *value2*

If the comparison succeeds, the unsigned bytes *branchbyte1* and *branchbyte2* are used to construct a signed 16-bit *branchoffset*, where *branchoffset* is (*branchbyte1* << 8) | *branchbyte2*. Execution proceeds at that offset from the address of the opcode of this *if_scmp<cond>_w* instruction. The target address must be that of an opcode of an instruction within the method that contains this *if_scmp<cond>_w* instruction.

Otherwise, execution proceeds at the address of the instruction following this *if_scmp<cond>_w* instruction.

if<cond>

Branch if short comparison with zero succeeds

Format

| if<cond> |
|---|
| branch |

Forms

*ifeq* = 96 (0x60)
*ifne* = 97 (0x61)
*iflt* = 98 (0x62)
*ifge* = 99 (0x63)
*ifgt* = 100 (0x64)
*ifle* = 101 (0x65)

Stack

..., value ⇒
...

Description

The *value* must be of type short. It is popped from the operand stack and compared against zero. All comparisons are signed. The results of the comparisons are as follows:

- *eq* succeeds if and only if *value* = 0
- *ne* succeeds if and only if *value* ? 0
- *lt* succeeds if and only if *value* < 0
- *le* succeeds if and only if *value* = 0
- *gt* succeeds if and only if *value* > 0
- *ge* succeeds if and only if *value* = 0

If the comparison succeeds, *branch* is used as signed 8-bit offset, and execution proceeds at that offset from the address of the opcode of this *if<cond>* instruction. The target address must be that of an opcode of an instruction within the method that contains this *if<cond>* instruction.

Otherwise, execution proceeds at the address of the instruction following this *if<cond>* instruction.

if<cond>_w

Branch if short comparison with zero succeeds (wide index)

Format

| if<cond>_w |
|---|
| branchbyte1 |
| branchbyte2 |

Forms ifeq_w = 152 (0x98)
ifne_w = 153 (0x99)
iflt_w = 154 (0x9a)
ifge_w = 155 (0x9b)
ifgt_w = 156 (0x9c)
ifle_w = 157 (0x9d)

Stack

..., value ⇒
...

Description

The *value* must be of type short. It is popped from the operand stack and compared against zero. All comparisons are signed. The results of the comparisons are as follows:

- *eq* succeeds if and only if *value* = 0
- *ne* succeeds if and only if *value* ? 0
- *lt* succeeds if and only if *value* < 0
- *le* succeeds if and only if *value* = 0
- *gt* succeeds if and only if *value* > 0
- *ge* succeeds if and only if *value* = 0

If the comparison succeeds, the unsigned bytes *branchbyte1* and *branchbyte2* are used to construct a signed 16-bit *branchoffset*, where *branchoffset* is (*branchbyte1* << 8) | *branchbyte2*. Execution proceeds at that offset from the address of the opcode of this *if<cond>_w* instruction. The target address must be that of an opcode of an instruction within the method that contains this *if<cond>_w* instruction.

Otherwise, execution proceeds at the address of the instruction following this *if<cond>_w* instruction.

ifnonnull

Branch if reference not null

Format

| ifnonnull |
|---|
| branch |

Forms

*ifnonnull* = 103 (0x67)

Stack

..., value ⇒
...

Description

The *value* must be of type reference. It is popped from the operand stack. If the *value* is not null, *branch* is used as signed 8-bit offset, and execution proceeds at that offset from the address of the opcode of this *ifnonnull* instruction. The target address must be that of an opcode of an instruction within the method that contains this *ifnonnull* instruction.

Otherwise, execution proceeds at the address of the instruction following this *ifnonnull* instruction.

ifnonnull_w

Branch if reference not null (wide index)

Format

| ifnonnull_w |
|---|
| branchbyte1 |
| branchbyte2 |

Forms ifnonnull_w = 159 (0x9f)

Stack

..., value ⇒

...

Description

The *value* must be of type reference. It is popped from the operand stack. If the *value* is not null, the unsigned bytes *branchbyte1* and *branchbyte2* are used to construct a signed 16-bit *branchoffset*, where *branchoffset* is (*branchbyte1* << 8) | *branchbyte2*. Execution proceeds at that offset from the address of the opcode of this *ifnonnull_w* instruction. The target address must be that of an opcode of an instruction within the method that contains this *ifnonnull_w* instruction.

Otherwise, execution proceeds at the address of the instruction following this *ifnonnull_w* instruction.

ifnull

Branch if reference is null

Format

| ifnull |
|--------|
| branch |

Forms

*ifnull* = 102 (0x66)

Stack

..., value ⇒

...

Description

The *value* must be of type reference. It is popped from the operand stack. If the *value* is null, *branch* is used as signed 8-bit offset, and execution proceeds at that offset from the address of the opcode of this *ifnull* instruction. The target address must be that of an opcode of an instruction within the method that contains this *ifnull* instruction.

Otherwise, execution proceeds at the address of the instruction following this *ifnull* instruction.

ifnull_w

Branch if reference is null (wide index)

Format

| ifnull_w |
|---|
| branchbyte1 |
| branchbyte2 |

Forms

*ifnull_w* = 158 (0x9e)

Stack

..., value ⇒

...

Description

The *value* must be of type reference. It is popped from the operand stack. If the *value* is null, the unsigned bytes *branchbyte1* and *branchbyte2* are used to construct a signed 16-bit *branchoffset*, where *branchoffset* is (*branchbyte1* << 8) | *branchbyte2*. Execution proceeds at that offset from the address of the opcode of this *ifnull_w* instruction. The target address must be that of an opcode of an instruction within the method that contains this *ifnull_w* instruction.

Otherwise, execution proceeds at the address of the instruction following this *ifnull_w* instruction.

iinc

Increment local int variable by constant

Format

| |
|---|
| *iinc* |
| *index* |
| *const* |

Forms

*iinc* = 90 (0x5a)

Stack

No change

Description

The *index* is an unsigned byte. Both *index* and *index* + 1 must be valid indices into the local variables of the current frame. The local variables at *index* and *index* + 1 together must contain an int. The *const* is an immediate signed byte. The value *const* is first sign-extended to an int, then the int contained in the local variables at *index* and *index* + 1 is incremented by that amount.

Notes

If a virtual machine does not support the int data type, the *iinc* instruction will not be available.

iinc_w

Increment local int variable by constant

Format

| |
|---|
| *iinc_w* |
| *index* |
| *byte1* |
| *byte2* |

Forms

*iinc_w* = 151 (0x97)

Stack

No change

Description

The *index* is an unsigned byte. Both *index* and *index* + 1 must be valid indices into the local variables of the current frame. The local variables at *index* and *index* + 1 together must contain an int. The immediate unsigned *byte1* and *byte2* values are assembled into an intermediate short where the value of the short is (*byte1* << 8) | *byte2*. The intermediate value is then sign-extended to an int *const*. The int contained in the local variables at *index* and *index* + 1 is incremented by *const*.

Notes

If a virtual machine does not support the int data type, the *iinc_w* instruction will not be available.

iipush

Push int

Format

| |
|---|
| *iipush* |
| *byte1* |
| *byte2* |
| *byte3* |
| *byte4* |

Forms

*iipush* = 20 (0x14)

Stack

... ⇒

..., *value1.word1*, *value1.word2*

Description

The immediate unsigned *byte1*, *byte2*, *byte3*, and *byte4* values are assembled into a signed int where the value of the int is (*byte1* << 24) | (*byte2* << 16) | (*byte3* << 8) | *byte4*. The resulting *value* is pushed onto the operand stack.

Notes

If a virtual machine does not support the int data type, the *iipush* instruction will not be available.

iload

Load int from local variable

Format

| iload |
|-------|
| index |

Forms

*iload* = 23 (0x17)

Stack

... ⇒

..., value1.word1, value1.word2

Description

The *index* is an unsigned byte. Both *index* and *index* + 1 must be valid indices into the local variables of the current frame. The local variables at *index* and *index* + 1 together must contain an int. The *value* of the local variables at *index* and *index* + 1 is pushed onto the operand stack.

Notes

If a virtual machine does not support the int data type, the *iload* instruction will not be available.

iload_<n>

Load int from local variable

Format

> iload_<n>

Forms iload_0 = 32 (0x20)
iload_1 = 33 (0x21)
iload_2 = 34 (0x22)
iload_3 = 35 (0x23)

Stack

... ⇒

..., value1.word1, value1.word2

Description

Both <n> and <n> + 1 must be a valid indices into the local variables of the current frame. The local variables at <n> and <n> + 1 together must contain an int. The *value* of the local variables at <n> and <n> + 1 is pushed onto the operand stack.

Notes

Each of the *iload_<n>* instructions is the same as *iload* with an *index* of <n>, except that the operand <n> is implicit.

If a virtual machine does not support the int data type, the *iload_<n>* instruction will not be available.

ilookupswitch

Access jump table by key match and jump

Format

| ilookupswitch |
| --- |
| defaultbyte1 |
| defaultbyte2 |
| npairs1 |
| npairs2 |
| match-offset pairs... |

Pair Format

| matchbyte1 |
| --- |
| matchbyte2 |
| matchbyte3 |
| matchbyte4 |
| offsetbyte1 |
| offsetbyte2 |

Forms ilookupswitch = 118 (0x76)

Stack

..., key.word1, key.word2 ⇒
...

Description

An *ilookupswitch* instruction is a variable-length instruction. Immediately after the *ilookupswitch* opcode follow a signed 16-bit value *default*, an unsigned 16-bit value *npairs*, and then *npairs* pairs. Each pair consists of an int *match* and a signed 16-bit *offset*. Each *match* is constructed from four unsigned bytes as (*matchbyte1* << 24) | (*matchbyte2* << 16) | (*matchbyte3* << 8) | *matchbyte4*. Each *offset* is constructed from two unsigned bytes as (*offsetbyte1* << 8) | *offsetbyte2*.

The table *match-offset* pairs of the *ilookupswitch* instruction must be sorted in increasing numerical order by *match*.

The *key* must be of type int and is popped from the operand stack and compared against the *match* values. If it is equal to one of them, then a target address is calculated by adding the corresponding *offset* to the address of the opcode of this *ilookupswitch* instruction. If the *key* does not match any of the *match* values, the target address is calculated by adding *default* to the address of the opcode of this *ilookupswitch* instruction. Execution then continues at the target address.

The target address that can be calculated from the offset of each *match-offset* pair, as well as the one calculated from *default*, must be the address of an opcode of an instruction within the method that contains this *ilookupswitch* instruction.

Notes

The *match-offset* pairs are sorted to support lookup routines that are quicker than linear search.

If a virtual machine does not support the int data type, the *ilookupswitch* instruction will not be available.

```
imul
```

Multiply int

Format

| imul |
|---|

Forms

*imul* = 70 (0x46)

Stack

..., *value1.word1*, *value1.word2*, *value2.word1*, *value2.word2* ⇒
..., *result.word1*, *result.word2*

Description

Both *value1* and *value2* must be of type int. The values are popped from the operand stack. The int *result* is *value1* * *value2*. The *result* is pushed onto the operand stack.

If an *imul* instruction overflows, then the result is the low-order bits of the mathematical product as an int. If overflow occurs, then the sign of the result may not be the same as the sign of the mathematical product of the two values.

Notes

If a virtual machine does not support the int data type, the *imul* instruction will not be available.

ineg

Negate int

Format

| ineg |
|---|

Forms

*ineg* = 76 (0x4c)

Stack

..., *value.word1, value.word2* ⇒
..., *result.word1, result.word2*

Description

The *value* must be of type int. It is popped from the operand stack. The int *result* is the arithmetic negation of *value*, -*value*. The *result* is pushed onto the operand stack.

For int values, negation is the same as subtraction from zero. Because the Java Card Virtual Machine uses two's-complement representation for integers and the range of two's-complement values is not symmetric, the negation of the maximum negative int results in that same maximum negative number. Despite the fact that overflow has occurred, no exception is thrown.

For all int values x, -x equals (~x) + 1.

Notes

If a virtual machine does not support the int data type, the *imul* instruction will not be available.

instanceof

Determine if object is of given type

Format

| instanceof |
|---|
| atype |
| indexbyte1 |
| indexbyte2 |

Forms

*instanceof* = 149 (0x95)

Stack

..., *objectref* ⇒
..., *result*

Description

The unsigned byte *atype* is a code that indicates if the type against which the object is being checked is an array type or a class type. It must take one of the following values or zero:

| Array Type | atype |
|---|---|
| T_BOOLEAN | 10 |
| T_BYTE | 11 |
| T_SHORT | 12 |
| T_INT | 13 |
| T_REFERENCE | 14 |

If the value of *atype* is 10, 11, 12, or 13, the values of the *indexbyte1* and *indexbyte2* must be zero, and the value of *atype* indicates the array type against which to check the object. Otherwise the unsigned *indexbyte1* and *indexbyte2* are used to construct an index into the constant pool of the current package, where the value of the index is (*indexbyte1* << 8) | *indexbyte2*. The item at that index in the constant pool must be of type CONSTANT_Classref, a reference to a class or interface type. The reference is resolved. If the value of *atype* is 14, the object is checked against an array type which is an array of object references of the type of the resolved class. If the value of *atype* is zero, the object is checked against a class or interface type which is the resolved class.

The *objectref* must be of type reference. It is popped from the operand stack. If *objectref* is not null and is an instance of the resolved class, array or interface, the *instanceof* instruction pushes a short *result* of *1* on the operand stack. Otherwise it pushes a short *result* of *0*.

The following rules are used to determine whether an *objectref* that is not null is an instance of the resolved type: if S is the class of the object referred to by *objectref* and T is the resolved class, array or interface type, *instanceof* determines whether *objectref* is an instance of T as follows:

- If S is an ordinary (non-array) class, then:
  - If T is a class type, then S must be the same class as T, or a subclass of T.

- If T is an interface type, S must implement interface T.
- If S is a class representing the array type SC[], that is, an array of components of type SC, then:
  - If T is a class type, then T must be Object.
  - If T is an array type TC[], that is, an array of components of type TC, then one of the following must be true:
    - TC and type SC are the same primitive type.
    - TC and SC are reference types, and type SC can be cast to TC by these runtime rules.

S cannot be an interface type, because there are no instances of interfaces, only instances of classes and arrays.

Notes

The *instanceof* instruction is fundamentally very similar to the *checkcast* instruction. It differs in its treatment of null, its behavior when its test fails (*checkcast* throws an exception, *instanceof* pushes a result code), and its effect on the operand stack.

If a virtual machine does not support the int data type, the value of *atype* may not be 13 (array type = T_INT).

invokeinterface

Invoke interface method

Format

| invokeinterface |
|---|
| nargs |
| indexbyte1 |
| indexbyte2 |
| method |

Forms

*invokeinterface* = 142 (0x8e)

Stack

..., *objectref*, [*arg1*, [*arg2* ...]] ⇒
...

Description

The unsigned *indexbyte1* and *indexbyte2* are used to construct an index into the constant pool of the current package, where the value of the index is (*indexbyte1* << 8) | *indexbyte2*. The constant pool item at that index must be of type CONSTANT_Classref, a reference to an interface class. The specified method is resolved. The interface method must not be <init>, an instance initialization method, or <clinit>, a class or interface initialization method.

The *nargs* operand is an unsigned byte which must not be zero. The *method* operand is an unsigned byte which is the interface method token for the method to be invoked. The *objectref* must be of type reference and must be followed on the operand stack by *nargs* – 1 words of arguments. The number of words of arguments and the type and order of the values they represent must be consistent with those of the selected interface method.

The interface table of the class of the type of *objectref* is determined. If *objectref* is an array type, then the interface table of class Object is used. The interface table is searched for the resolved interface. The result of the search is a table which is used to map the *method* token to a *index*.

The *index* is an unsigned byte which is used as an index into the method table of the class of the type of *objectref*. If the *objectref* is an array type, then the method table of class Object is used. The table entry at that index includes a direct reference to the method's code and modifier information.

The *nargs* – 1 words of arguments and *objectref* are popped from the operand stack. A new stack frame is created for the method being invoked, and *objectref* and the arguments are made the values of its first *nargs* words of local variables, with *arg1* in local variable at index 0, *arg1* in local variable at offset 2, *arg2* immediately following that, and so on. The new stack frame is then made current, and the Java Card Virtual Machine pc is set to the opcode of the first instruction of the method to be invoked. Execution continues with the first instruction of the method.

Runtime Exception

If *objectref* is null, the *invokeinterface* instruction throws a NullPointerException.

invokespecial

Invoke instance method; special handling for superclass, private, and instance initialization method invocations

Format

| invokespecial |
|---|
| indexbyte1 |
| indexbyte2 |

Forms invokespecial = 140 (0x8c)

Stack

..., objectref, [arg1, [arg2 ...]] ⇒
...

Description

The unsigned *indexbyte1* and *indexbyte2* are used to construct an index into the constant pool of the current package, where the value of the index is (*indexbyte1* << 8) | *indexbyte2*. The constant pool item at that index must be of type CONSTANT_StaticMethodref, a reference to a statically linked instance method, or of type CONSTANT_SuperMethodref, a reference to an instance method of a specified class. The reference is resolved. The resolved method must not be <clinit>, a class or interface initialization method. If the method is <init>, an instance initialization method, then the method must only be invoked once on an uninitialized object, and before the first backward branch following the execution of the *new* instruction that allocated the object. Finally, if the method is protected, then it must be either a member of the current class or a member of a superclass of the current class, and the class of *objectref* must be either the current class or a subclass of the current class.

The resolved method includes the code for the method, an unsigned byte *nargs* that must not be zero, and the method's modifier information.

The *objectref* must be of type reference, and must be followed on the operand stack by *nargs* – 1 words of arguments, where the number of words of arguments and the type and order of the values they represent must be consistent with those of the selected instance method.

The *nargs* – 1 words of arguments and *objectref* are popped from the operand stack. A new stack frame is created for the method being invoked, and *objectref* and the arguments are made the values of its first *nargs* words of local variables, with *objectref* in local variable *0*, *arg1* in local variable *1*, and so on. The new stack frame is then made current, and the Java Card Virtual Machine pc is set to the opcode of the first instruction of the method to be invoked. Execution continues with the first instruction of the method.

Runtime Exception

If *objectref* is null, the *invokespecial* instruction throws a NullPointerException.

invokestatic

Invoke a class (static) method

Format

| invokestatic |
|---|
| indexbyte1 |
| indexbyte2 |

Forms

*invokestatic* = 141 (0x8d)

Stack

..., [*arg1*, [*arg2* ...]] ⇒
...

Description

The unsigned *indexbyte1* and *indexbyte2* are used to construct an index into the constant pool of the current package, where the value of the index is (*indexbyte1* << 8) | *indexbyte2*. The constant pool item at that index must be of type CONSTANT_StaticMethodref, a reference to a static method. The method must not be <init>, an instance initialization method, or <clinit>, a class or interface initialization method. It must be static, and therefore cannot be abstract. Finally, if the method is protected, then it must be either a member of the current class or a member of a superclass of the current class.

The resolved method includes the code for the method, an unsigned byte *nargs* that may be zero, and the method's modifier information.

The operand stack must contain *nargs* words of arguments, where the number of words of arguments and the type and order of the values they represent must be consistent with those of the resolved method.

The *nargs* words of arguments are popped from the operand stack. A new stack frame is created for the method being invoked, and the words of arguments are made the values of its first *nargs* words of local variables, with *arg1* in local variable *0*, *arg2* in local variable *1*, and so on. The new stack frame is then made current, and the Java Card Virtual Machine pc is set to the opcode of the first instruction of the method to be invoked. Execution continues with the first instruction of the method.

invokevirtual

Invoke instance method; dispatch based on class

Format

| invokevirtual |
| --- |
| indexbyte1 |
| indexbyte2 |

Forms

*invokevirtual* = 139 (0x8b)

Stack

..., *objectref*, [*arg1*, [*arg2* ...]] ⇒
...

Description

The unsigned *indexbyte1* and *indexbyte2* are used to construct an index into the constant pool of the current package, where the value of the index is (*indexbyte1* << 8) | *indexbyte2*. The constant pool item at that index must be of type CONSTANT_VirtualMethodref, a reference to a class and a virtual method token. The specified method is resolved. The method must not be <init>, an instance initialization method, or <clinit>, a class or interface initialization method. If the method is protected, then it must be either a member of the current class or a member of a superclass of the current class, and the class of *objectref* must be either the current class or a subclass of the current class.

The resolved method reference includes an unsigned *index* into the method table of the resolved class and an unsigned byte *nargs* that must not be zero.

The *objectref* must be of type reference. The *index* is an unsigned byte which is used as an index into the method table of the class of the type of *objectref*. If the *objectref* is an array type, then the method table of class Object is used. The table entry at that index includes a direct reference to the method's code and modifier information.

The *objectref* must be followed on the operand stack by *nargs* − 1 words of arguments, where the number of words of arguments and the type and order of the values they represent must be consistent with those of the selected instance method.

The *nargs* − 1 words of arguments and *objectref* are popped from the operand stack. A new stack frame is created for the method being invoked, and *objectref* and the arguments are made the values of its first *nargs* words of local variables, with *objectref* in local variable *0*, *arg1* in local variable *1*, and so on. The new stack frame is then made current, and the Java Card Virtual Machine pc is set to the opcode of the first instruction of the method to be invoked. Execution continues with the first instruction of the method.

Runtime Exception

If *objectref* is null, the *invokevirtual* instruction throws a NullPointerException.

ior

Boolean OR int

Format

```
   ior
```

Forms

*ior* = 86 (0x56)

Stack

..., *value1.word1*, *value1.word2*, *value2.word1*, *value2.word2* ⇒
..., *result.word1*, *result.word2*

Description

Both *value1* and *value2* must be of type `int`. The values are popped from the operand stack. An `int` *result* is calculated by taking the bitwise inclusive OR of *value1* and *value2*. The *result* is pushed onto the operand stack.

Notes

If a virtual machine does not support the `int` data type, the *ior* instruction will not be available.

irem

Remainder int

Format

| irem |
|------|

Forms

*irem* = 74 (0x4a)

Stack

..., *value1*.word1, *value1*.word2, *value2*.word1, *value2*.word2 ⇒
..., *result*.word1, *result*.word2

Description

Both *value1* and *value2* must be of type int. The values are popped from the operand stack. The int *result* is the value of the Java expression *value1* – (*value1* / *value2*) * *value2*. The *result* is pushed onto the operand stack.

The result of the *irem* instruction is such that (a/b)*b + (a%b) is equal to a. This identity holds even in the special case that the dividend is the negative int of largest possible magnitude for its type and the divisor is –1 (the remainder is 0). It follows from this rule that the result of the remainder operation can be negative only if the dividend is negative and can be positive only if the dividend is positive. Moreover, the magnitude of the result is always less than the magnitude of the divisor.

Runtime Exception

If the value of the divisor for a short remainder operator is 0, *irem* throws an ArithmeticException.

Notes

If a virtual machine does not support the int data type, the *irem* instruction will not be available.

ireturn

Return int from method

Format

| ireturn |
|---|

Forms

*ireturn* = 121 (0x79)

Stack

..., *value.word1*, *value.word2* ⇒
[empty]

Description

The *value* must be of type int. It is popped from the operand stack of the current frame and pushed onto the operand stack of the frame of the invoker. Any other values on the operand stack of the current method are discarded.

The virtual machine then reinstates the frame of the invoker and returns control to the invoker.

Notes

If a virtual machine does not support the int data type, the *ireturn* instruction will not be available.

ishl

Shift left int

Format

| ishl |
|------|

Forms

*ishl* = 78 (0x4e)

Stack

..., *value1.word1*, *value1.word2*, *value2.word1*, *value2.word2* ⇒
..., *result.word1*, *result.word2*

Description

Both *value1* and *value2* must be of type int. The values are popped from the operand stack. An int *result* is calculated by shifting *value1* left by *s* bit positions, where *s* is the value of the low five bits of *value2*. The *result* is pushed onto the operand stack.

Notes

This is equivalent (even if overflow occurs) to multiplication by 2 to the power *s*. The shift distance actually used is always in the range 0 to 31, inclusive, as if *value2* were subjected to a bitwise logical AND with the mask value 0x1f.

If a virtual machine does not support the int data type, the *ishl* instruction will not be available.

ishr

Arithmetic shift right int

Format

| ishr |
|------|

Forms

*ishr* = 80 (0x50)

Stack

..., *value1.word1*, *value1.word2*, *value2.word1*, *value2.word2* ⇒
..., *result.word1*, *result.word2*

Description

Both *value1* and *value2* must be of type int. The values are popped from the operand stack. An int *result* is calculated by shifting *value1* right by *s* bit positions, with sign extension, where *s* is the value of the low five bits of *value2*. The *result* is pushed onto the operand stack.

Notes

The resulting value is $\lfloor (value1) / 2^s \rfloor$, where *s* is *value2* & 0x1f. For nonnegative *value1*, this is equivalent (even if overflow occurs) to truncating int division by 2 to the power *s*. The shift distance actually used is always in the range 0 to 31, inclusive, as if *value2* were subjected to a bitwise logical AND with the mask value 0x1f.

Notes

If a virtual machine does not support the int data type, the *ishr* instruction will not be available.

`istore`

Store int into local variable

Format

| istore |
|--------|
| index  |

Forms

*istore* = 42 (0x2a)

Stack

..., *value.word1*, *value.word2* ⇒
...

Description

The *index* is an unsigned byte. Both *index* and *index* + 1 must be a valid index into the local variables of the current frame. The *value* on top of the operand stack must be of type int. It is popped from the operand stack, and the local variables at *index* and *index* + 1 are set to *value*.

Notes

If a virtual machine does not support the int data type, the *istore* instruction will not be available.

istore_<n>

Store int into local variable

Format

| istore_<n> |
|---|

Forms

*istore_0* = 51 (0x33)
*istore_1* = 52 (0x34)
*istore_2* = 53 (0x35)
*istore_3* = 54 (0x36)

Stack

..., value.word1, value.word2 ⇒
...

Description

Both <*n*> and <*n*> + 1 must be a valid indices into the local variables of the current frame. The *value* on top of the operand stack must be of type int. It is popped from the operand stack, and the local variables at *index* and *index* + 1 are set to *value*.

Notes

If a virtual machine does not support the int data type, the *istore_*<*n*> instruction will not be available.

isub

Subtract int

Format

| isub |
|------|

Forms

*isub* = 68 (0x44)

Stack

..., *value1.word1*, *value1.word2*, *value2.word1*, *value2.word2* ⇒
..., *result.word1*, *result.word2*

Description

Both *value1* and *value2* must be of type int. The values are popped from the operand stack. The int *result* is *value1* - *value2*. The *result* is pushed onto the operand stack.

For int subtraction, a − b produces the same result as a + (-b). For int values, subtraction from zeros is the same as negation.

Despite the fact that overflow or underflow may occur, in which case the *result* may have a different sign than the true mathematical result, execution of an *isub* instruction never throws a runtime exception.

Notes

If a virtual machine does not support the int data type, the *isub* instruction will not be available.

itableswitch

Access jump table by int index and jump

Format

| itableswitch |
|---|
| defaultbyte1 |
| defaultbyte2 |
| lowbyte1 |
| lowbyte2 |
| lowbyte3 |
| lowbyte4 |
| highbyte1 |
| highbyte2 |
| highbyte3 |
| highbyte4 |
| jump offsets... |

Offset Format

| offsetbyte1 |
|---|
| offsetbyte2 |

Forms

*itableswitch* = 116 (0x74)

Stack

..., index ⇒

...

Description

An *itableswitch* instruction is a variable-length instruction. Immediately after the *itableswitch* opcode follow a signed 16-bit value *default*, a signed 32-bit value *low*, a signed 32-bit value *high*, and then *high* – *low* + 1 further signed 16-bit offsets. The value *low* must be less than or equal to *high*. The *high* – *low* + 1 signed 16-bit offsets are treated as a 0-based jump table. Each of the signed 16-bit values is constructed from two unsigned bytes as (*byte1* << 8) | *byte2*. Each of the signed 32-bit values is constructed from four unsigned bytes as (*byte1* << 24) | (*byte2* << 16) | (*byte3* << 8) | *byte4*.

The *index* must be of type int and is popped from the stack. If *index* is less than *low* or *index* is greater than *high*, then a target address is calculated by adding *default* to the address of the opcode of this *itableswitch* instruction. Otherwise, the offset at position *index* – *low* of the jump table is extracted. The target address is calculated by adding that offset to the address of the opcode of this *itableswitch* instruction. Execution then continues at the target address.

The target addresses which can be calculated from each jump table offset, as well as the one calculated from *default*, must be the address of an opcode of an instruction within the method that contains this *itableswitch* instruction.

Notes

If a virtual machine does not support the int data type, the *itableswitch* instruction will not be available.

iushr

Logical shift right `int`

Format

| iushr |
|---|

Forms

*iushr* = 82 (0x52)

Stack

..., *value1.word1*, *value1.word2*, *value2.word1*, *value2.word2* ⇒
..., *result.word1*, *result.word2*

Description

Both *value1* and *value2* must be of type `int`. The values are popped from the operand stack. An `int` *result* is calculated by shifting the result right by *s* bit positions, with zero extension, where *s* is the value of the low five bits of *value2*. The *result* is pushed onto the operand stack.

Notes

If *value1* is positive and *s* is *value2* & 0x1f, the result is the same as that of *value1* >> *s*; if *value1* is negative, the result is equal to the value of the expression (*value1* >> *s*) + (2 << ~*s*). The addition of the (2 << ~*s*) term cancels out the propagated sign bit. The shift distance actually used is always in the range 0 to 31, inclusive, as if *value2* were subjected to a bitwise logical AND with the mask value 0x1f.

If a virtual machine does not support the `int` data type, the *iushr* instruction will not be available.

ixor

Boolean XOR int

Format

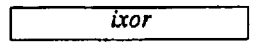

Forms ixor = 88 (0x58)

Stack

..., value1.word1, value1.word2, value2.word1, value2.word2 ⇒
..., result.word1, result.word2

Description

Both *value1* and *value2* must be of type int. The values are popped from the operand stack. An int *result* is calculated by taking the bitwise exclusive OR of *value1* and *value2*. The *result* is pushed onto the operand stack.

Notes

If a virtual machine does not support the int data type, the *ixor* instruction will not be available.

jsr

Jump subroutine

Format

| jsr |
|---|
| branchbyte1 |
| branchbyte2 |

Forms

*jsr* = 113 (0x71)

Stack

... ⇒
..., address

Description

The *address* of the opcode of the instruction immediately following this *jsr* instruction is pushed onto the operand stack as a value of type returnAddress. The unsigned *branchbyte1* and *branchbyte2* are used to construct a signed 16-bit offset, where the offset is (*branchbyte1* << 8) | *branchbyte2*. Execution proceeds at that offset from the address of this *jsr* instruction. The target address must be that of an opcode of an instruction within the method that contains this *jsr* instruction.

Notes

The *jsr* instruction is used with the *ret* instruction in the implementation of the finally clause of the Java language. Note that *jsr* pushes the address onto the stack and *ret* gets it out of a local variable. This asymmetry is intentional.

new

Create new object

Format

| |
|---|
| new |
| indexbyte1 |
| indexbyte2 |

Forms new = 143 (0x8f)

Stack

... ⇒
..., *objectref*

Description

The unsigned *indexbyte1* and *indexbyte2* are used to construct an index into the constant pool of the current package, where the value of the index is (*indexbyte1* << 8) | *indexbyte2*. The item at that index in the constant pool must be of type CONSTANT_Classref, a reference to a class or interface type. The reference is resolved and must result in a class type (it must not result in an interface type). Memory for a new instance of that class is allocated from the heap, and the instance variables of the new object are initialized to their default initial values. The *objectref*, a reference to the instance, is pushed onto the operand stack.

Notes

The *new* instruction does not completely create a new instance; instance creation is not completed until an instance initialization method has been invoked on the uninitialized instance.

newarray

Create new array

Format

| newarray |
|---|
| atype |

Forms newarray = 144 (0x90)

Stack

..., count ⇒
..., arrayref

Description

The *count* must be of type short. It is popped off the operand stack. The *count* represents the number of elements in the array to be created.

The unsigned byte *atype* is a code that indicates the type of array to create. It must take one of the following values:

| Array Type | atype |
|---|---|
| T_BOOLEAN | 10 |
| T_BYTE | 11 |
| T_SHORT | 12 |
| T_INT | 13 |

A new array whose components are of type *atype*, of length *count*, is allocated from the heap. A reference *arrayref* to this new array object is pushed onto the operand stack. All of the elements of the new array are initialized to the default initial value for its type.

Runtime Exception

If *count* is less than zero, the *newarray* instruction throws a NegativeArraySizeException.

Notes

If a virtual machine does not support the int data type, the value of *atype* may not be 13 (array type = T_INT).

nop
Do nothing
Format
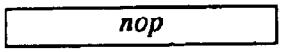
Forms
*nop* = 0 (0x0)
Stack
No change
Description
Do nothing.

pop

Pop top operand stack word

Format

| *pop* |
|---|

Forms

*pop* = 59 (0x3b)

Stack

..., *word* ⇒
...

Description

The top word is popped from the operand stack.

Notes

The *pop* instruction operates on an untyped word, ignoring the type of data it contains.

pop2

Pop top two operand stack words

Format

| pop2 |
|------|

Forms

*pop2* = 60 (0x3c)

Stack

..., word2, word1 ⇒
...

Description

The top two words are popped from the operand stack.

The *pop2* instruction must not be used unless each of *word1* and *word2* is a word that contains a 16-bit data type or both together are the two words of a single 32-bit datum.

Notes

Except for restrictions preserving the integrity of 32-bit data types, the *pop2* instruction operates on an untyped word, ignoring the type of data it contains.

putfield_<t>

Set field in object

Format

| putfield_<t> |
|---|
| index |

Forms putfield_a = 135 (0x87)
putfield_b = 136 (0x88)
putfield_s = 137 (0x89)
putfield_i = 138 (0x8a)

Stack

..., objectref, value ⇒
...

OR

..., objectref, value.word1, value.word2 ⇒
...

Description

The unsigned *index* is used as an index into the constant pool of the current package. The constant pool item at the index must be of type CONSTANT_InstanceFieldref, a reference to a class and a field token. If the field is protected, then it must be either a member of the current class or a member of a superclass of the current class, and the class of *objectref* must be either the current class or a subclass of the current class.

The item must resolve to a field with a type that matches *t*, as follows:

- *a*  field must be of type reference
- *b*  field must be of type byte or type boolean
- *s*  field must be of type short
- *i*  field must be of type int The width of a field in a class instance is determined by the field type specified in the instruction. The item is resolved, determining the field offset. The *objectref*, which must be of type reference, and the *value* are popped from the operand stack. If the field is of type byte or type boolean, the *value* is truncated to a byte. The field at the offset from the start of the object referenced by *objectref* is set to the *value*.

Runtime Exception

If *objectref* is null, the *putfield_<t>* instruction throws a NullPointerException.

Notes

If a virtual machine does not support the int data type, the *putfield_i* instruction will not be available.

putfield_<t>_this

Set field in current object

Format

| putfield_<t>_this |
|---|
| index |

Forms putfield_a_this = 181 (0xb5)
putfield_b_this = 182 (0xb6)
putfield_s_this = 183 (0xb7)
putfield_i_this = 184 (0xb8)

Stack

..., value ⇒
...

OR

..., value.word1, value.word2 ⇒
...

Description

The currently executing method must be an instance method which was invoked using the *invokevirtual*, *invokeinterface* or *invokespecial* instruction. The local variable at index 0 must contain a reference *objectref* to the currently executing method's this parameter. The unsigned *index* is used as an index into the constant pool of the current package. The constant pool item at the index must be of type CONSTANT_InstanceFieldref, a reference to a class and a field token. If the field is protected, then it must be either a member of the current class or a member of a superclass of the current class, and the class of *objectref* must be either the current class or a subclass of the current class.

The item must resolve to a field with a type that matches *t*, as follows:

- *a* field must be of type reference
- *b* field must be of type byte or type boolean
- *s* field must be of type short
- *i* field must be of type int The width of a field in a class instance is determined by the field type specified in the instruction. The item is resolved, determining the field offset. The *value* is popped from the operand stack. If the field is of type byte or type boolean, the *value* is truncated to a byte. The field at the offset from the start of the object referenced by *objectref* is set to the *value*.

Runtime Exception

If *objectref* is null, the *putfield_<t>_this* instruction throws a NullPointerException.

Notes

If a virtual machine does not support the int data type, the *putfield_i_this* instruction will 180  Java Card Virtual Machine 2.1 Specification • January 29, 1999 not be available.

putfield_<t>_w

Set field in object (wide index)

Format

| putfield<t>_w |
|---|
| indexbyte1 |
| indexbyte2 |

Forms

*putfield_a_w* = 177 (0xb1)
*putfield_b_w* = 178 (0xb2)
*putfield_s_w* = 179 (0xb3)
*putfield_i_w* = 180 (0xb4)

Stack

..., *objectref, value* ⇒

...

OR

..., *objectref, value.word1, value.word2* ⇒

...

Description

The unsigned *indexbyte1* and *indexbyte2* are used to construct an index into the constant pool of the current package, where the value of the index is (*indexbyte1* << 8) | *indexbyte2*. The constant pool item at the index must be of type CONSTANT_InstanceFieldref, a reference to a class and a field token. If the field is protected, then it must be either a member of the current class or a member of a superclass of the current class, and the class of *objectref* must be either the current class or a subclass of the current class.

The item must resolve to a field with a type that matches *t*, as follows:

- *a*  field must be of type reference
- *b*  field must be of type byte or type boolean
- *s*  field must be of type short
- *i*  field must be of type int The width of a field in a class instance is determined by the field type specified in the instruction. The item is resolved, determining the field offset. The *objectref*, which must be of type reference, and the *value* are popped from the operand stack. If the field is of type byte or type boolean, the *value* is truncated to a byte. The field at the offset from the start of the object referenced by *objectref* is set to the *value*.

Runtime Exception

If *objectref* is null, the *putfield_<t>_w* instruction throws a NullPointerException.

Notes

If a virtual machine does not support the int data type, the *putfield_i_w* instruction will not be available.

putstatic_<t>

Set static field in class

Format

| putstatic_<t> |
|---|
| indexbyte1 |
| indexbyte2 |

Forms

*putstatic_a* = 127 (0x7f)
*putstatic_b* = 128 (0x80)
*putstatic_s* = 129 (0x81)
*putstatic_i* = 130 (0x82)

Stack

..., *value* ⇒
...

OR

..., *value.word1*, *value.word2* ⇒
...

Description

The unsigned *indexbyte1* and *indexbyte2* are used to construct an index into the constant pool of the current package, where the value of the index is (*indexbyte1* << 8) | *indexbyte2*. The constant pool item at the index must be of type CONSTANT_StaticFieldref, a reference to a static field. If the field is protected, then it must be either a member of the current class or a member of a superclass of the current class.

The item must resolve to a field with a type that matches *t*, as follows:

- *a*  field must be of type reference
- *b*  field must be of type byte or type boolean
- *s*  field must be of type short
- *i*  field must be of type int The width of a class field is determined by the field type specified in the instruction. The item is resolved, determining the class field. The *value* is popped from the operand stack. If the field is of type byte or type boolean, the *value* is truncated to a byte. The field is set to the *value*.

Notes

If a virtual machine does not support the int data type, the *putstatic* instruction will not be available.

ret

Return from subroutine

Format

| ret |
|-----|
| index |

Forms

*ret* = 114 (0x72)

Stack

No change

Description

The *index* is an unsigned byte that must be a valid index into the local variables of the current frame. The local variable at *index* must contain a value of type returnAddress. The contents of the local variable are written into the Java Card Virtual Machine's pc register, and execution continues there.

Notes

The *ret* instruction is used with the *jsr* instruction in the implementation of the finally keyword of the Java language. Note that *jsr* pushes the address onto the stack and *ret* gets it out of a local variable. This asymmetry is intentional.

The *ret* instruction should not be confused with the *return* instruction. A *return* instruction returns control from a Java method to its invoker, without passing any value back to the invoker.

return

Return void from method

Format

```
return
```

Forms

*return* = 122 (0x7a)

Stack

... ⇒
[empty]

Description

Any values on the operand stack of the current method are discarded. The virtual machine then reinstates the frame of the invoker and returns control to the invoker.

s2b

Convert short to byte

Format

| s2b |
|-----|

Forms

*s2b* = 91 (0x5b)

Stack

..., *value* ⇒
..., *result*

Description

The *value* on top of the operand stack must be of type short. It is popped from the top of the operand stack, truncated to a byte *result*, then sign-extended to a short *result*. The *result* is pushed onto the operand stack.

Notes

The *s2b* instruction performs a narrowing primitive conversion. It may lose information about the overall magnitude of *value*. The *result* may also not have the same sign as *value*.

s2i

Convert short to int

Format

| s2i |
|---|

Forms s2i = 92 (0x5c)

Stack

..., value ⇒
..., result.word1, result.word2

Description

The *value* on top of the operand stack must be of type short. It is popped from the operand stack and sign-extended to an int *result*. The *result* is pushed onto the operand stack.

Notes

The *s2i* instruction performs a widening primitive conversion. Because all values of type short are exactly representable by type int, the conversion is exact.

If a virtual machine does not support the int data type, the *s2i* instruction will not be available.

sadd

Add short

Format

| sadd |
|------|

Forms

*sadd* = 65 (0x41)

Stack

..., *value1*, *value2* ⇒
..., *result*

Description

Both *value1* and *value2* must be of type short. The values are popped from the operand stack. The short *result* is *value1* + *value2*. The *result* is pushed onto the operand stack.

If a *sadd* instruction overflows, then the result is the low-order bits of the true mathematical result in a sufficiently wide two's-complement format. If overflow occurs, then the sign of the result may not be the same as the sign of the mathematical sum of the two values.

saload

Load short from array

Format

| saload |
|---|

Forms

*saload* = 38 (0x46)

Stack

..., *arrayref, index* ⇒
..., *value*

Description

The *arrayref* must be of type reference and must refer to an array whose components are of type short. The *index* must be of type short. Both *arrayref* and *index* are popped from the operand stack. The short *value* in the component of the array at *index* is retrieved and pushed onto the top of the operand stack.

Runtime Exceptions

If *arrayref* is null, *saload* throws a NullPointerException.

Otherwise, if *index* is not within the bounds of the array referenced by *arrayref*, the *saload* instruction throws an ArrayIndexOutOfBoundsException.

sand

Boolean AND short

Format

| sand |

Forms

*sand* = 83 (0x53)

Stack

..., *value1*, *value2* ⇒
..., *result*

Description

Both *value1* and *value2* are popped from the operand stack. A short *result* is calculated by taking the bitwise AND (conjunction) of *value1* and *value2*. The *result* is pushed onto the operand stack.

sastore

Store into short array

Format

| sastore |
|---|

Forms

*sastore* = 57 (0x39)

Stack

..., *arrayref, index, value* ⇒

...

Description

The *arrayref* must be of type reference and must refer to an array whose components are of type short. The *index* and *value* must both be of type short. The *arrayref, index* and *value* are popped from the operand stack. The short *value* is stored as the component of the array indexed by *index*.

Runtime Exception

If *arrayref* is null, *sastore* throws a NullPointerException.

Otherwise, if *index* is not within the bounds of the array referenced by *arrayref*, the *sastore* instruction throws an ArrayIndexOutOfBoundsException.

sconst_<s>

Push short constant

Format

| sconst_<s> |

Forms sconst_m1 = 2 (0x2)
sconst_0 = 3 (0x3)
sconst_1 = 4 (0x4)
sconst_2 = 5 (0x5)
sconst_3 = 6 (0x6)
sconst_4 = 7 (0x7)
sconst_5 = 8 (0x8)

Stack

... ⇒
..., <s>

Description

Push the short constant <s> (-1, 0, 1, 2, 3, 4, or 5) onto the operand stack.

sdiv

Divide short

Format

| sdiv |
|---|

Forms

*sdiv* = 71 (0x47)

Stack

..., *value1*, *value2* ⇒
..., *result*

Description

Both *value1* and *value2* must be of type short. The values are popped from the operand stack. The short *result* is the value of the Java expression *value1* / *value2*. The *result* is pushed onto the operand stack.

A short division rounds towards 0; that is, the quotient produced for short values in *n/d* is a short value $q$ whose magnitude is as large as possible while satisfying $|d \cdot q| = |n|$. Moreover, $q$ is a positive when $|n| = |d|$ and $n$ and $d$ have the same sign, but $q$ is negative when $|n| = |d|$ and $n$ and $d$ have opposite signs.

There is one special case that does not satisfy this rule: if the dividend is the negative integer of the largest possible magnitude for the short type, and the divisor is $-1$, then overflow occurs, and the result is equal to the dividend. Despite the overflow, no exception is thrown in this case.

Runtime Exception

If the value of the divisor in a short division is 0, *sdiv* throws an ArithmeticException.

sinc

Increment local short variable by constant

Format

| |
|---|
| sinc |
| index |
| const |

Forms

*sinc* = 89 (0x59)

Stack

No change

Description

The *index* is an unsigned byte that must be a valid index into the local variable of the current frame. The *const* is an immediate signed byte. The local variable at *index* must contain a short. The value *const* is first sign-extended to a short, then the local variable at *index* is incremented by that amount.

sinc_w

Increment local short variable by constant

Format

| sinc_w |
|--------|
| index  |
| byte1  |
| byte2  |

Forms

*sinc_w* = 150 (0x96)

Stack

No change

Description

The *index* is an unsigned byte that must be a valid index into the local variable of the current frame. The immediate unsigned *byte1* and *byte2* values are assembled into a short *const* where the value of *const* is (*byte1* << 8) | *byte2*. The local variable at *index*, which must contain a short, is incremented by *const*.

sipush

Push short

Format

| sipush |
|--------|
| byte1  |
| byte2  |

Forms sipush = 19 (0x13)

Stack

..., ⇒
..., value1.word1, value1.word2

Description

The immediate unsigned *byte1* and *byte2* values are assembled into a signed short where the value of the short is (*byte1* << 8) | *byte2*. The intermediate value is then sign-extended to an int, and the resulting *value* is pushed onto the operand stack.

Notes

If a virtual machine does not support the int data type, the *sipush* instruction will not be available.

sload

Load short from local variable

Format

| sload |
|-------|
| index |

Forms

*sload* = 22 (0x16)

Stack

... ⇒
..., *value*

Description

The *index* is an unsigned byte that must be a valid index into the local variables of the current frame. The local variable at *index* must contain a short. The *value* in the local variable at *index* is pushed onto the operand stack.

sload_<n>

Load short from local variable

Format

| sload_<n> |

Forms

*sload_0* = 28 (0x1c)
*sload_1* = 29 (0x1d)
*sload_2* = 30 (0x1e)
*sload_3* = 31 (0x1f)

Stack

... ⇒
..., *value*

Description

The <*n*> must be a valid index into the local variables of the current frame. The local variable at <*n*> must contain a short. The *value* in the local variable at <*n*> is pushed onto the operand stack.

Notes

Each of the *sload_*<*n*> instructions is the same as *sload* with an *index* of <*n*>, except that the operand <*n*> is implicit.

`slookupswitch`

Access jump table by key match and jump

Format

| |
|---|
| slookupswitch |
| defaultbyte1 |
| defaultbyte2 |
| npairs1 |
| npairs2 |
| match-offset pairs... |

Pair Format

| |
|---|
| matchbyte1 |
| matchbyte2 |
| offsetbyte1 |
| offsetbyte2 |

Forms

*slookupswitch* = 117 (0x75)

Stack

..., key ⇒
...

Description

A *slookupswitch* instruction is a variable-length instruction. Immediately after the *slookupswitch* opcode follow a signed 16-bit value *default*, an unsigned 16-bit value *npairs*, and then *npairs* pairs. Each pair consists of a short *match* and a signed 16-bit *offset*. Each of the signed 16-bit values is constructed from two unsigned bytes as (*byte1* << 8) | *byte2*.

The table *match-offset* pairs of the *slookupswitch* instruction must be sorted in increasing numerical order by *match*.

The *key* must be of type short and is popped from the operand stack and compared against the *match* values. If it is equal to one of them, then a target address is calculated by adding the corresponding *offset* to the address of the opcode of this *slookupswitch* instruction. If the *key* does not match any of the *match* values, the target address is calculated by adding *default* to the address of the opcode of this *slookupswitch* instruction. Execution then continues at the target address.

The target address that can be calculated from the offset of each *match-offset* pair, as well as the one calculated from *default*, must be the address of an opcode of an instruction within the method that contains this *slookupswitch* instruction.

Notes

The *match-offset* pairs are sorted to support lookup routines that are quicker than linear search.

smul

Multiply short

Format

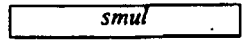

Forms smul = 69 (0x45)

Stack

..., value1, value2 ⇒
..., result

Description

Both *value1* and *value2* must be of type short. The values are popped from the operand stack. The short *result* is *value1* * *value2*. The *result* is pushed onto the operand stack.

If a *smul* instruction overflows, then the result is the low-order bits of the mathematical product as a short. If overflow occurs, then the sign of the result may not be the same as the sign of the mathematical product of the two values.

sneg

Negate short

Format

| sneg |
|------|

Forms

*sneg* = 72 (0x4b)

Stack

..., *value* ⇒
..., *result*

Description

The *value* must be of type short. It is popped from the operand stack. The short *result* is the arithmetic negation of *value*, *-value*. The *result* is pushed onto the operand stack.

For short values, negation is the same as subtraction from zero. Because the Java Card Virtual Machine uses two's-complement representation for integers and the range of two's-complement values is not symmetric, the negation of the maximum negative short results in that same maximum negative number. Despite the fact that overflow has occurred, no exception is thrown.

For all short values x, -x equals (~x) + 1.

sor

Boolean OR short

Format

| sor |
|---|

Forms

*sor* = 85 (0x55)

Stack

..., *value1*, *value2* ⇒
..., *result*

Description

Both *value1* and *value2* must be of type short. The values are popped from the operand stack. A short *result* is calculated by taking the bitwise inclusive OR of *value1* and *value2*. The *result* is pushed onto the operand stack.

srem

Remainder short

Format

| srem |

Forms

*srem* = 73 (0x49)

Stack

..., *value1*, *value2* ⇒
..., *result*

Description

Both *value1* and *value2* must be of type short. The values are popped from the operand stack. The short *result* is the value of the Java expression *value1* – (*value1* / *value2*) * *value2*. The *result* is pushed onto the operand stack.

The result of the *irem* instruction is such that (a/b)*b + (a%b) is equal to a. This identity holds even in the special case that the dividend is the negative short of largest possible magnitude for its type and the divisor is –1 (the remainder is 0). It follows from this rule that the result of the remainder operation can be negative only if the dividend is negative and can be positive only if the dividend is positive. Moreover, the magnitude of the result is always less than the magnitude of the divisor.

Runtime Exception

If the value of the divisor for a short remainder operator is 0, *srem* throws an ArithmeticException.

sreturn

Return short from method

Format

| *sreturn* |
|---|

Forms

*sreturn* = 120 (0x78)

Stack

..., *value* ⇒
[empty]

Description

The *value* must be of type short. It is popped from the operand stack of the current frame and pushed onto the operand stack of the frame of the invoker. Any other values on the operand stack of the current method are discarded.

The virtual machine then reinstates the frame of the invoker and returns control to the invoker.

sshl

Shift left short

Format

| sshl |
|------|

Forms

*sshl* = 77 (0x4d)

Stack

..., *value1*, *value2* ⇒
..., *result*

Description

Both *value1* and *value2* must be of type short. The values are popped from the operand stack. A short *result* is calculated by shifting *value1* left by *s* bit positions, where *s* is the value of the low five bits of *value2*. The *result* is pushed onto the operand stack.

Notes

This is equivalent (even if overflow occurs) to multiplication by 2 to the power *s*. The shift distance actually used is always in the range 0 to 31, inclusive, as if *value2* were subjected to a bitwise logical AND with the mask value 0x1f.

sshr

Arithmetic shift right short

Format

| sshr |
|------|

Forms

*sshr* = 79 (0x4f)

Stack

..., *value1*, *value2* ⇒
..., *result*

Description

Both *value1* and *value2* must be of type short. The values are popped from the operand stack. A short *result* is calculated by shifting *value1* right by *s* bit positions, with sign extension, where *s* is the value of the low five bits of *value2*. The *result* is pushed onto the operand stack.

Notes

The resulting value is $\lfloor (value1) / 2s \rfloor$, where *s* is *value2* & 0x1f. For nonnegative *value1*, this is equivalent (even if overflow occurs) to truncating short division by 2 to the power *s*. The shift distance actually used is always in the range 0 to 31, inclusive, as if *value2* were subjected to a bitwise logical AND with the mask value 0x1f.

sspush

Push short

Format

| sspush |
|--------|
| byte1  |
| byte2  |

Forms

*sspush* = 17 (0x11)

Stack

... ⇒
..., *value*

Description

The immediate unsigned *byte1* and *byte2* values are assembled into a signed short where the value of the short is (*byte1* << 8) | *byte2*. The resulting *value* is pushed onto the operand stack.

sstore

Store short into local variable

Format

| sstore |
|--------|
| index  |

Forms

*sstore* = 41 (0x29)

Stack

..., *value* ⇒
...

Description

The *index* is an unsigned byte that must be a valid index into the local variables of the current frame. The *value* on top of the operand stack must be of type short. It is popped from the operand stack, and the value of the local variable at *index* is set to *value*.

sstore_<n>

Store short into local variable

Format

| sstore_<n> |
|---|

Forms

*sstore_0* = 47 (0x2f)
*sstore_1* = 48 (0x30)
*sstore_2* = 49 (0x31)
*sstore_3* = 50 (0x32)

Stack

..., *value* ⇒

...

Description

The <*n*> must be a valid index into the local variables of the current frame. The *value* on top of the operand stack must be of type short. It is popped from the operand stack, and the value of the local variable at <*n*> is set to *value*.

ssub

Subtract short

Format

| ssub |
|---|

Forms

*ssub* = 67 (0x43)

Stack

..., *value1*, *value2* ⇒
..., *result*

Description

Both *value1* and *value2* must be of type short. The values are popped from the operand stack. The short *result* is *value1* - *value2*. The *result* is pushed onto the operand stack.

For short subtraction, a - b produces the same result as a + (-b). For short values, subtraction from zeros is the same as negation.

Despite the fact that overflow or underflow may occur, in which case the *result* may have a different sign than the true mathematical result, execution of a *ssub* instruction never throws a runtime exception.

stableswitch

Access jump table by short index and jump

Format

| |
|---|
| stableswitch |
| defaultbyte1 |
| defaultbyte2 |
| lowbyte1 |
| lowbyte2 |
| highbyte1 |
| highbyte2 |
| jump offsets... |

Offset Format

| |
|---|
| offsetbyte1 |
| offsetbyte2 |

Forms stableswitch = 115 (0x73)

Stack

..., index ⇒
...

Description

A *stableswitch* instruction is a variable-length instruction. Immediately after the *stableswitch* opcode follow a signed 16-bit value *default*, a signed 16-bit value *low*, a signed 16-bit value *high*, and then *high* − *low* + 1 further signed 16-bit offsets. The value *low* must be less than or equal to *high*. The *high* − *low* + 1 signed 16-bit offsets are treated as a 0-based jump table. Each of the signed 16-bit values is constructed from two unsigned bytes as (*byte1* << 8) | *byte2*.

The *index* must be of type short and is popped from the stack. If *index* is less than *low* or *index* is greater than *high*, than a target address is calculated by adding *default* to the address of the opcode of this *stableswitch* instruction. Otherwise, the offset at position *index* − *low* of the jump table is extracted. The target address is calculated by adding that offset to the address of the opcode of this *stableswitch* instruction. Execution then continues at the target address.

The target addresses which can be calculated from each jump table offset, as well as the one calculated from *default*, must be the address of an opcode of an instruction within the method that contains this *stableswitch* instruction.

sushr

Logical shift right short

Format

Forms

*sushr* = 81 (0x51)

Stack

..., *value1*, *value2* ⇒
..., *result*

Description

Both *value1* and *value2* must be of type short. The values are popped from the operand stack. A short *result* is calculated by sign-extending *value1* to 32 bits and shifting the result right by *s* bit positions, with zero extension, where *s* is the value of the low five bits of *value2*. The *result* is pushed onto the operand stack.

Notes

If *value1* is positive and *s* is *value2* & 0x1f, the result is the same as that of *value1* >> *s*; if *value1* is negative, the result is equal to the value of the expression (*value1* >> *s*) + (2 << ~*s*). The addition of the (2 << ~*s*) term cancels out the propagated sign bit. The shift distance actually used is always in the range 0 to 31, inclusive, as if *value2* were subjected to a bitwise logical AND with the mask value 0x1f.

swap_x

Swap top two operand stack words

Format

| swap_x |
|--------|
| mn     |

Forms swap_x = 64 (0x40)

Stack

..., wordM+N, ..., wordM+1, wordM, ..., word1 ⇒
..., wordM, ..., word1, wordM+N, ..., wordM+1

Description

The unsigned byte *mn* is used to construct two parameter values. The high nybble, (*mn* & 0xf0) >> 4, is used as the value *m*. The low nybble, (*mn* & 0xf), is used as the value *n*. Permissible values for both *m* and *n* are 1-4.

The top *m* words on the operand stack are swapped with the *n* words immediately below.

The *swap_x* instruction must not be used unless the ranges of words 1 through *m* and words *m*+1 through *n* each contain either a 16-bit data type, two 16-bit data types, a 32-bit data type, a 16-bit data type and a 32-bit data type (in either order), or two 32-bit data types.

Notes

Except for restrictions preserving the integrity of 32-bit data types, the *swap_x* instruction operates on untyped words, ignoring the types of data they contain.

If a virtual machine does not support the int data type, the permissible values for both *m* and *n* are 1 or 2.

sxor
Boolean XOR short
Format
```
    sxor
```
Forms
*sxor* = 87 (0x57)
Stack
..., *value1*, *value2* ⇒
..., *result*
Description
Both *value1* and *value2* must be of type short. The values are popped from the operand stack. A short *result* is calculated by taking the bitwise exclusive OR of *value1* and *value2*. The *result* is pushed onto the operand stack.

CHAPTER 8

Tables of Instructions

TABLE 8-1 Instructions by Opcode Value

| | | | | | | | |
|---|---|---|---|---|---|---|---|
| 0 | nop | 47 | sstore_0 | 94 | i2s | 141 | invokestatic |
| 1 | aconst_null | 48 | sstore_1 | 95 | icmp | 142 | invokeinterface |
| 2 | sconst_m1 | 49 | sstore_2 | 96 | ifeq | 143 | new |
| 3 | sconst_0 | 50 | sstore_3 | 97 | ifne | 144 | newarray |
| 4 | sconst_1 | 51 | istore_0 | 98 | iflt | 145 | anewarray |
| 5 | sconst_2 | 52 | istore_1 | 99 | ifge | 146 | arraylength |
| 6 | sconst_3 | 53 | istore_2 | 100 | ifgt | 147 | athrow |
| 7 | sconst_4 | 54 | istore_3 | 101 | ifle | 148 | checkcast |
| 8 | sconst_5 | 55 | aastore | 102 | ifnull | 149 | instanceof |
| 9 | iconst_m1 | 56 | bastore | 103 | ifnonnull | 150 | sinc_w |
| 10 | iconst_0 | 57 | sastore | 104 | if_acmpeq | 151 | iinc_w |
| 11 | iconst_1 | 58 | iastore | 105 | if_acmpne | 152 | ifeq_w |
| 12 | iconst_2 | 59 | pop | 106 | if_scmpeq | 153 | ifne_w |
| 13 | iconst_3 | 60 | pop2 | 107 | if_scmpne | 154 | iflt_w |
| 14 | iconst_4 | 61 | dup | 108 | if_scmplt | 155 | ifge_w |
| 15 | iconst_5 | 62 | dup2 | 109 | if_scmpge | 156 | ifgt_w |
| 16 | bspush | 63 | dup_x | 110 | if_scmpgt | 157 | ifle_w |
| 17 | sspush | 64 | swap_x | 111 | if_scmple | 158 | ifnull_w |
| 18 | bipush | 65 | sadd | 112 | goto | 159 | ifnonnull_w |
| 19 | sipush | 66 | iadd | 113 | jsr | 160 | if_acmpeq_w |
| 20 | iipush | 67 | ssub | 114 | ret | 161 | if_acmpne_w |
| 21 | aload | 68 | isub | 115 | stableswitch | 162 | if_scmpeq_w |
| 22 | sload | 69 | smul | 116 | itableswitch | 163 | if_scmpne_w |
| 23 | iload | 70 | imul | 117 | slookupswitch | 164 | if_scmplt_w |
| 24 | aload_0 | 71 | sdiv | 118 | ilookupswitch | 165 | if_scmpge_w |
| 25 | aload_1 | 72 | idiv | 119 | areturn | 166 | if_scmpgt_w |
| 26 | aload_2 | 73 | srem | 120 | sreturn | 167 | if_scmple_w |
| 27 | aload_3 | 74 | irem | 121 | ireturn | 168 | goto_w |
| 28 | sload_0 | 75 | sneg | 122 | return | 169 | getfield_a_w |
| 29 | sload_1 | 76 | ineg | 123 | getstatic_a | 170 | getfield_b_w |
| 30 | sload_2 | 77 | sshl | 124 | getstatic_b | 171 | getfield_s_w |
| 31 | sload_3 | 78 | ishl | 125 | getstatic_s | 172 | getfield_i_w |
| 32 | iload_0 | 79 | sshr | 126 | getstatic_i | 173 | getfield_a_this |
| 33 | iload_1 | 80 | ishr | 127 | putstatic_a | 174 | getfield_b_this |
| 34 | iload_2 | 81 | sushr | 128 | putstatic_b | 175 | getfield_s_this |
| 35 | iload_3 | 82 | iushr | 129 | putstatic_s | 176 | getfield_i_this |
| 36 | aaload | 83 | sand | 130 | putstatic_i | 177 | putfield_a_w |
| 37 | baload | 84 | iand | 131 | getfield_a | 178 | putfield_b_w |
| 38 | saload | 85 | sor | 132 | getfield_b | 179 | putfield_s_w |
| 39 | iaload | 86 | ior | 133 | getfield_s | 180 | putfield_i_w |
| 40 | astore | 87 | sxor | 134 | getfield_i | 181 | putfield_a_this |
| 41 | sstore | 88 | ixor | 135 | putfield_a | 182 | putfield_b_this |
| 42 | istore | 89 | sinc | 136 | putfield_b | 183 | putfield_s_this |
| 43 | astore_0 | 90 | iinc | 137 | putfield_s | 184 | putfield_i_this |
| 44 | astore_1 | 91 | s2b | 138 | putfield_i | | ... |
| 45 | astore_2 | 92 | s2i | 139 | invokevirtual | 254 | impdep1 |
| 46 | astore_3 | 93 | i2b | 140 | invokespecial | 255 | impdep2 |

TABLE 8-2  Instructions by Opcode Mnemonic

| Mnemonic | Opcode | Mnemonic | Opcode | Mnemonic | Opcode | Mnemonic | Opcode |
|---|---|---|---|---|---|---|---|
| aaload | 36 | iand | 84 | iload_0 | 32 | putstatic_s | 129 |
| aastore | 55 | iastore | 58 | iload_1 | 33 | ret | 114 |
| aconst_null | 1 | icmp | 95 | iload_2 | 34 | return | 122 |
| aload | 21 | iconst_0 | 10 | iload_3 | 35 | s2b | 91 |
| aload_0 | 24 | iconst_1 | 11 | ilookupswitch | 118 | s2i | 92 |
| aload_1 | 25 | iconst_2 | 12 | imul | 70 | sadd | 65 |
| aload_2 | 26 | iconst_3 | 13 | ineg | 76 | saload | 38 |
| aload_3 | 27 | iconst_4 | 14 | instanceof | 149 | sand | 83 |
| anewarray | 145 | iconst_5 | 15 | invokeinterface | 142 | sastore | 57 |
| areturn | 119 | iconst_m1 | 9 | invokespecial | 140 | sconst_0 | 3 |
| arraylength | 146 | idiv | 72 | invokestatic | 141 | sconst_1 | 4 |
| astore | 40 | if_acmpeq | 104 | invokevirtual | 139 | sconst_2 | 5 |
| astore_0 | 43 | if_acmpeq_w | 160 | ior | 86 | sconst_3 | 6 |
| astore_1 | 44 | if_acmpne | 105 | irem | 74 | sconst_4 | 7 |
| astore_2 | 45 | if_acmpne_w | 161 | ireturn | 121 | sconst_5 | 8 |
| astore_3 | 46 | if_scmpeq | 106 | ishl | 78 | sconst_m1 | 2 |
| athrow | 147 | if_scmpeq_w | 162 | ishr | 80 | sdiv | 71 |
| baload | 37 | if_scmpge | 109 | istore | 42 | sinc | 89 |
| bastore | 56 | if_scmpge_w | 165 | istore_0 | 51 | sinc_w | 150 |
| bipush | 18 | if_scmpgt | 110 | istore_1 | 52 | sipush | 19 |
| bspush | 16 | if_scmpgt_w | 166 | istore_2 | 53 | sload | 22 |
| checkcast | 148 | if_scmple | 111 | istore_3 | 54 | sload_0 | 28 |
| dup | 61 | if_scmple_w | 167 | isub | 68 | sload_1 | 29 |
| dup_x | 63 | if_scmplt | 108 | itableswitch | 116 | sload_2 | 30 |
| dup2 | 62 | if_scmplt_w | 164 | iushr | 82 | sload_3 | 31 |
| getfield_a | 131 | if_scmpne | 107 | ixor | 88 | slookupswitch | 117 |
| getfield_a_this | 173 | if_scmpne_w | 163 | jsr | 113 | smul | 69 |
| getfield_a_w | 169 | ifeq | 96 | new | 143 | sneg | 75 |
| getfield_b | 132 | ifeq_w | 152 | newarray | 144 | sor | 85 |
| getfield_b_this | 174 | ifge | 99 | nop | 0 | srem | 73 |
| getfield_b_w | 170 | ifge_w | 155 | pop | 59 | sreturn | 120 |
| getfield_i | 134 | ifgt | 100 | pop2 | 60 | sshl | 77 |
| getfield_i_this | 176 | ifgt_w | 156 | putfield_a | 135 | sshr | 79 |
| getfield_i_w | 172 | ifle | 101 | putfield_a_this | 181 | sspush | 17 |
| getfield_s | 133 | ifle_w | 157 | putfield_a_w | 177 | sstore | 41 |
| getfield_s_this | 175 | iflt | 98 | putfield_b | 136 | sstore_0 | 47 |
| getfield_s_w | 171 | iflt_w | 154 | putfield_b_this | 182 | sstore_1 | 48 |
| getstatic_a | 123 | ifne | 97 | putfield_b_w | 178 | sstore_2 | 49 |
| getstatic_b | 124 | ifne_w | 153 | putfield_i | 138 | sstore_3 | 50 |
| getstatic_i | 126 | ifnonnull | 103 | putfield_i_this | 184 | ssub | 67 |
| getstatic_s | 125 | ifnonnull_w | 159 | putfield_i_w | 180 | stableswitch | 115 |
| goto | 112 | ifnull | 102 | putfield_s | 137 | sushr | 81 |
| goto_w | 168 | ifnull_w | 158 | putfield_s_this | 183 | swap_x | 64 |
| i2b | 93 | iinc | 90 | putfield_s_w | 179 | sxor | 87 |
| i2s | 94 | iinc_w | 151 | putstatic_a | 127 | | |
| iadd | 66 | iipush | 20 | putstatic_b | 128 | | |
| iaload | 39 | iload | 23 | putstatic_i | 130 | | |

Glossary

AID is an acronym for Application IDentifier as defined in ISO 7816-5.

APDU is an acronym for Application Protocol Data Unit as defined in ISO 7816-4.

API is an acronym for Application Programming Interface. The API defines calling conventions by which an application program accesses the operating system and other services.

Applet the basic unit of selection, context, functionality, and security in Java Card technology.

Applet developer refers to a person creating a Java Card applet using the Java Card technology specifications.

Applet context. The JCRE keeps track of the currently selected Java Card applet as well as the currently active Java Card applet. The currently active Java Card applet value is referred to as the Java Card applet context. When an instance method is invoked on an object, the Java Card applet execution context is changed to correspond to the Java Card applet that owns that object. When that method returns, the previous context is restored. Invocations of static methods have no effect on the Java Card applet execution context. The Java Card applet context and sharing status of an object together determine if access to an object is permissible.

Atomic operation is an operation that either completes in its entirety (if the operation succeeds) or no part of the operation completes at all (if the operation fails).

Atomicity refers to whether a particular operation is atomic or not and is necessary for proper data recovery in cases where power is lost or the card is unexpectedly removed from the CAD.

ATR is an acronym for Answer to Reset. An ATR is a string of bytes sent by the Java Card after a reset condition.

CAD is an acronym for Card Acceptance Device. The CAD is the device in which the card is inserted.

Cast is the explicit conversion from one data type to another.

cJCK is a test suite to verify the compliance of the implementation of the Java Card Technology specifications. The cJCK uses the JavaTest tool to run the test suite.

Class is the prototype for an object in an object-oriented language. A class may also be considered a set of objects which share a common structure and behavior. The structure of a class is determined by the class variables which represent the state of an object of that class and the behavior is given by a set of methods associated with the class.

Classes are related in a class hierarchy. One class may be a specialization (a "subclass") of another (one of its "superclasses"), it may be composed of other classes, or it may use other classes in a client-server relationship.

EEPROM is an acronym for Electrically Erasable, Programmable Read Only Memory.

EMV is an acronym for Europay, MasterCard, and Visa. EMV is used to refer to the ICC specifications for payment systems.

Framework is the set of classes which implement the API. This includes core and extension packages. Responsibilities include dispatching of APDUs, applet selection, managing atomicity, and installing applets.

Garbage collection is the process by which dynamically allocated storage is automatically reclaimed during the execution of a program.

GUI is an acronym for Graphical User Interface. The GUI provides application control through the use of graphic images.

ICC is an acronym for Integrated Circuit Card.

IDE acronym for Interactive Development Environment. An IDE is a system for supporting the process of writing software which may include a syntax-directed editor, graphical tools for program entry, and integrated support for compiling the program and relating compilation errors back to the source.

Instance variables, also known as fields, represent a portion of an object's internal state. Each object has its own set of instance variables. Objects of the same class will have the same instance variables, but each object can have different values.

Instantiation, in object-oriented programming, means to produce a particular object from its class template. This involves allocation of a data structure with the types specified by the template, and initialization of instance variables with either default values or those provided by the class's constructor function.

JAR is an acronym for Java Archive. JAR is a platform-independent file format that combines many files into one.

Java Card Runtime Environment (JCRE) consists of the Java Card Virtual Machine, the framework, and the associated native methods.

JC20RI is an acronym for the Java Card 2.0 Reference Implementation.

JCRE Implementer refers to a person creating a vendor-specific framework using the Java Card 2.0 API.

JCVM is an acronym for the Java Card Virtual Machine. The JCVM is the foundation of the OP card architecture. The JCVM executes byte code and manages classes and objects. It enforces separation between applications (firewalls) and enables secure data sharing.

JDK is an acronym for Java Development Kit. The JDK is a Sun Microsystems, Inc. product which provides the environment required for programming in Java. The JDK is available for a variety of platforms, but most notably Sun Solaris and Microsoft Windows®.

MAC is an acronym for Message Authentication Code. MAC is an encryption of data for security purposes.

Method is the name given to a procedure or routine, associated with one or more classes, in object-oriented languages.

Namespace is a set of names in which all names are unique.

Object-Oriented is a programming methodology based on the concept of an "object" which is a data structure encapsulated with a set of routines, called "methods," which operate on the data.

Objects, in object-oriented programming, are unique instances of a data structure defined according to the template provided by its class. Each object has its own values for the variables belonging to its class and can respond to the messages (methods) defined by its class.

Package is a namespace within the Java programming language and can have classes and interfaces. A package is the smallest unit within the Java programming language.

Persistent object. Persistent objects and their values persist from one CAD session to the next, indefinitely. Objects are persistent by default. Persistent object values are updated atomically using transactions. The term persistent does not mean there is an object-oriented database on the card or that objects are serialized/deserialized, just that the objects are not lost when the card loses power.

PSE is an acronym for Payment System Environment as described by the EMV specification.

System configuration refers to the combination of operating system platform and Java programming language tools.

TCL is an acronym for Tool Command Language. For more information on TCL, access the following URL: http2.brunel.ac.uk:8080/~csstddm/TCL2/TCL2.html.

Transaction is an atomic operation where the developer defines the extent of the operation by indicating in the program code the beginning and end of the transaction.

Transient object. The values of transient objects do not persist from one CAD session to the next, and are reset to a default state at specified intervals. Updates to the values of transient objects are not atomic and are not effected by transactions.

What is claimed is:

1. A method for downloading code to a resource constrained computer, the code being separable into at least one package having at least one referenceable item, comprising:

forming the package;

forming a mapping of the referenceable item to a corresponding token having a token type, tokens belonging to the same token type representing the same kind of referenceable item, each kind of referenceable item in said package having its own independent scope of limited capacity for tokens of the corresponding token type; and providing the package and the mapping.

2. A method for linking code downloaded to a resource constrained computer, the code being separable into at least one package having at least one referenceable item, comprising:

receiving the package;

receiving a mapping of the referenceable item to a corresponding token having a token type, tokens belonging to the same token type representing the same kind of referenceable item, each kind of referenceable item in said package having its own independent scope of limited capacity for tokens of the corresponding token type; and linking the package using the mapping.

3. A method for linking code downloaded to a computer, the computer comprising a first package that includes a mapping of tokens to externally referenceable items, the method comprising:

receiving a second package comprising at least one reference to an item in said first package, wherein said reference is represented by one or more tokens having a token type, tokens belonging to the same token type representing the same kind of referenceable item, each kind of referenceable item in said package having its own independent scope of limited capacity for tokens of the corresponding token type; and linking said second package to said first package by resolving said one or more tokens.

4. A method for constructing an image of a first package of code on a computer, the code being separable into at least one package having at least one reference to an item in a second package of code, the method comprising:

receiving a mapping of said item to at least one corresponding token having a token type, tokens belonging to the same token type representing the same kind of referenceable item, each kind of referenceable item in said package having its own independent scope of limited capacity for tokens of the corresponding token type;

replacing said at least one reference with said at least one corresponding token; and forming said package.

5. A method for constructing an image of a first package of code comprising at least one internally referenceable item, the method comprising:

forming a mapping of said at least one internally referenceable item to an optimized numeric value having a type, optimized numeric values belonging to the same type representing the same kind of referenceable item, each kind of referenceable item in said package having its own independent scope of limited capacity for optimized numeric values of the corresponding type;

replacing references to said at least one internally referenceable item with the corresponding numeric value; and forming the package.

6. The method of claim 1, further comprising recording in an image of said package a mapping between said token and said referenceable item.

7. The method of claim 1 wherein said referenceable item comprises a class and said reference comprises a package token and a class token.

8. The method of claim 1 wherein said referenceable item comprises a field and said reference comprises a package token, a class token, and a field token.

9. The method of claim 1 wherein said referenceable item comprises a method and said reference comprises a package token, a class token, and a method token.

10. The method of claim 3, further comprising recording in an image of said package a mapping between said token and said referenceable item.

11. The method of claim 3 wherein said referenceable item comprises a class and said reference comprises a package token and a class token.

12. The method of claim 3 wherein said referenceable item comprises a field and said reference comprises a package token, a class token, and a field token.

13. The method of claim 3 wherein said referenceable item comprises a method and said reference comprises a package token, a class token, and a method token.

14. The method of claim 1 wherein
said package further comprises interfaces and interface method definitions; and
said method further comprises constructing at least one interface method table for a class.

15. The method of claim 14 wherein said constructing comprises:
obtaining said interfaces;
constructing an ordered table of methods for each interface; and
recording an indication of the implementation of the interface method for each table entry.

16. The method of claim 15 wherein said ordered interface method table entries correspond to token values assigned to interface methods within the scope of said class.

17. The method of claim 16 wherein said indication of said implementation of said interface method comprises an index into a virtual method table.

18. The method of claim 3, further comprising resolving interface method references during execution using interface method tables, said resolving comprising:
obtaining an associated instance;
obtaining a class description of said instance;
locating an interface table of said interface method in said class description;
locating an interface method entry within an interface table of a referenced method; and
locating the implementation of said interface method based on the table entry content.

19. The method of claim 18 wherein an indication of said implementation of said interface method comprises an index into a virtual method table.

20. The method of claim 5 wherein said package further comprises at least one reference to an internal item.

21. The method of claim 20 wherein said internal item comprises a class and said reference comprises an offset within said package to a class record associated with said class.

22. The method of claim 20 wherein said internal item comprises a static field and said reference comprises an offset within said package to a value for said static field.

23. The method of claim 20 wherein said internal item comprises a static method and said reference comprises an offset within said package to code associated with said static method.

24. The method of claim 20 wherein said internal item comprises an instance field and said reference comprises an offset within said package to a class record of said instance field and a field token.

25. The method of claim 20 wherein said internal item comprises a virtual method and said reference comprises an offset within said package to a class record of said virtual method and a method token.

26. A program storage device readable by a machine, embodying a program of instructions executable by the machine to perform a method for downloading code to a resource-constrained computer, the code being separable into at least one package having at least one referenceable item, the method comprising:
   forming the package;
   forming a mapping of the referencable item to a corresponding token having a token type, tokens belonging to the same token type representing the same kind of referenceable item, each kind of referenceable item in said package having its own independent scope of limited capacity for tokens of the corresponding token type; and
   providing the package and the mapping.

27. A program storage device readable by a machine, embodying a program of instructions executable by the machine to perform a method for linking code downloaded to a resource-constrained computer, the code being separable into at least one package having at least one referenceable item, the method comprising:
   receiving the package;
   receiving a mapping of the referenceable item to a corresponding token having a token type, tokens belonging to the same token type representing the same kind of referenceable item, each kind of referenceable item in said package having its own independent scope of limited capacity for tokens of the corresponding token type; and
   linking the package using the mapping.

28. A program storage device readable by a machine, embodying a program of instructions executable by the machine to perform a method for linking code downloaded to a computer, the computer comprising a first package that includes a mapping of tokens to externally referenceable items, the method comprising:
   receiving a second package comprising at least one reference to an item in said first package, wherein said reference is represented by one or more tokens having a token type, tokens belonging to the same token type representing the same kind of referenceable item, each kind of referenceable item in said package having its own independent scope of limited capacity for tokens of the corresponding token type; and
   linking said second package to said first package by resolving said one or more tokens.

29. A program storage device readable by a machine, embodying a program of instructions executable by the machine to perform a method for constructing an image of a first package of code on a computer, the code being separable into at least one package having at least one reference to an item in a second package of code, the method comprising:
   receiving a mapping of said item to at least one corresponding token having a token type, tokens belonging to the same token type representing the same kind of referenceable item, each kind of referenceable item in said package having its own independent scope of limited capacity for tokens of the corresponding token type;
   replacing said at least one reference with said at least one corresponding token; and
   forming said package.

30. A program storage device for constructing an image of a first package of code comprising at least one internally referenceable item, the method comprising:
   forming a mapping of said at least one internally referenceable item to an optimized numeric value having a type, optimized numeric values belonging to the same type representing the same kind of referenceable item, each kind of referenceable item in said package having its own independent scope of limited capacity for optimized numeric values of the corresponding type;
   replacing references to said at least one internally referenceable item with the corresponding numeric value; and
   forming the package.

31. The program storage device of claim 26 wherein said method further comprises recording in an image of said package a mapping between said token and said referenceable item.

32. The program storage device of claim 26 wherein said referenceable item comprises a class and said reference comprises a package token and a class token.

33. The program storage device of claim 26 wherein said referenceable item comprises a field and said reference comprises a package token, a class token, and a field token.

34. The program storage device of claim 26 wherein said referenceable item comprises a method and said reference comprises a package token, a class token, and a method token.

35. The program storage device of claim 28 wherein said method further comprises recording in an image of said package a mapping between said token and said referenceable item.

36. The program storage device of claim 28 wherein said referenceable item comprises a class and said reference comprises a package token and a class token.

37. The program storage device of claim 28 wherein said referenceable item comprises a field and said reference comprises a package token, a class token, and a field token.

38. The program storage device of claim 28 wherein said referenceable item comprises a method and said reference comprises a package token, a class token, and a method token.

39. The program storage device of claim 26 wherein said package further comprises interfaces and interface method definitions; and said method further comprises constructing at least one interface method table for a class.

40. The program storage device of claim 39 wherein said constructing comprises:
   obtaining said interfaces;
   constructing an ordered table of methods for each interface; and
   recording an indication of the implementation of the interface method for each table entry.

41. The program storage device of claim 40 wherein said ordered interface method table entries correspond to token values assigned to interface methods within the scope of said class.

42. The program storage device of claim 41 wherein said indication of said implementation of said interface method comprises an index into a virtual method table.

43. The program storage device of claim 28 wherein said method further comprises resolving interface method references during execution using interface method tables, said resolving comprising:

obtaining an associated instance;

obtaining a class description of said instance;

locating an interface table of said interface method in said class description;

locating an interface method entry within an interface table of a referenced method; and locating the implementation of said interface method based on the table entry content.

44. The program storage device of claim 43 wherein an indication of said implementation of said interface method comprises an index into a virtual method table.

45. The program storage device of claim 30 wherein said package further comprises at least one reference to an internal item.

46. The program storage device of claim 45 wherein said internal item comprises a class and said reference comprises an offset within said package to a class record associated with said class.

47. The program storage device of claim 45 wherein said internal item comprises a static field and said reference comprises an offset within said package to a value for said static field.

48. The program storage device of claim 45 wherein said internal item comprises a static method and said reference comprises an offset within said package to code associated with said static method.

49. The program storage device of claim 45 wherein said internal item comprises an instance field and said reference comprises an offset within said package to a class record of said instance field and a field token.

50. The program storage device of claim 45 wherein said internal item comprises a virtual method and said reference comprises an offset within said package to a class record of said virtual method and a method token.

51. An apparatus for downloading code to a resource-constrained computer, the code being separable into at least one package having at least one referenceable item, the apparatus comprising:

means for forming the package;

means for forming a mapping of the referencable item to a corresponding token having a token type, tokens belonging to the same token type representing the same kind of referenceable item, each kind of referenceable item in said package having its own independent scope of limited capacity for tokens of the corresponding token type; and means for providing the package and the mapping.

52. An apparatus for linking code downloaded to a resource-constrained computer, the code being separable into at least one package having at least one referenceable item, the apparatus comprising:

means for receiving the package;

means for receiving a mapping of the referenceable item to a corresponding token having a token type, tokens belonging to the same token type representing the same kind of referenceable item, each kind of referenceable item in said package having its own independent scope of limited capacity for tokens of the corresponding token type; and means for linking the package using the mapping.

53. An apparatus for linking code downloaded to a computer, the computer comprising a first package that includes a mapping of tokens to externally referenceable items, the apparatus comprising:

means for receiving a second package comprising at least one reference to an item in said first package, wherein said reference is represented by one or more tokens having a token type, tokens belonging to the same token type representing the same kind of referenceable item, each kind of referenceable item in said package having its own independent scope of limited capacity for tokens of the corresponding token type; and means for linking said second package to said first package by resolving said one or more tokens.

54. An apparatus for constructing an image of a first package of code on a computer, the code being separable into at least one package having at least one reference to an item in a second package of code, the apparatus comprising:

means for receiving a mapping of said item to at least one corresponding token having a token type, tokens belonging to the same token type representing the same kind of referenceable item, each kind of referenceable item in said package having its own independent scope of limited capacity for tokens of the corresponding token type;

means for replacing said at least one reference with said at least one corresponding token; and means for forming said package.

55. An apparatus for constructing an image of a first package of code comprising at least one internally referenceable item, the apparatus comprising;

means for forming a mapping of said at least one internally referenceable item to an optimized numeric value having a type, optimized numeric values belonging to the same type representing the same kind of referenceable item, each kind of referenceable item in said package having its own independent scope of limited capacity for optimized numeric values of the corresponding type;

means for replacing references to said at least one internally referenceable item with the corresponding numeric value; and means for forming the package.

56. The apparatus of claim 51, further means for comprising recording in an image of said package a mapping between said token and said referenceable item.

57. The apparatus of claim 51, wherein said referenceable item comprises a class and said reference comprises a package token and a class token.

58. The apparatus of claim 51, wherein said referenceable item comprises a field and said reference comprises a package token, a class token, and a field token.

59. The apparatus of claim 51, wherein said referenceable item comprises a method and said reference comprises a package token, a class token, and a method token.

60. The apparatus of claim 53, further comprising means for recording in an image of said package a mapping between said token and said referenceable item.

61. The apparatus of claim 53, wherein said referenceable item comprises a class and said reference comprises a package token and a class token.

62. The apparatus of claim 53 wherein said referenceable item comprises a field and said reference comprises a package token, a class token, and a field token.

63. The apparatus of claim 53 wherein said referenceable item comprises a method and said reference comprises a package token, a class token, and a method token.

64. The apparatus of claim 51 wherein said package further comprises interfaces and interface method definitions; and said apparatus further comprises means for constructing at least one interface method table for a class.

65. The apparatus of claim 64 wherein said constructing comprises:

means for obtaining said interfaces;

means for constructing an ordered table of methods for each interface; and means for recording an indication of the implementation of the interface method for each table entry.

66. The apparatus of claim 65 wherein said ordered interface method table entries correspond to token values assigned to interface methods within the scope of said class.

67. The apparatus of claim 66 wherein said indication of said implementation of said interface method comprises an index into a virtual method table.

68. The apparatus of claim 53, further comprises means for resolving interface method references during execution using interface method tables, said means for resolving comprising:

means for obtaining an associated instance;

means for obtaining a class description of said instance;

means for locating an interface table of said interface method in said class description;

means for locating an interface method entry within an interface table of a referenced method; and means for locating the implementation of said interface method based on the table entry content.

69. The apparatus of claim 68 wherein an indication of said implementation of said interface method comprises an index into a virtual method table.

70. The apparatus of claim 55 wherein said package further comprises at least one reference to an internal item.

71. The apparatus of claim 70 wherein said internal item comprises a class and said reference comprises an offset within said package to a class record associated with said class.

72. The apparatus of claim 70 wherein said internal item comprises a static field and said reference comprises an offset within said package to a value for said static field.

73. The apparatus of claim 70 wherein said internal item comprises a static method and said reference comprises an offset within said package to code associated with said static method.

74. The apparatus of claim 70 wherein said internal item comprises an instance field and said reference comprises an offset within said package to a class record of said instance field and a field token.

75. The apparatus of claim 70 wherein said internal item comprises a virtual method and said reference comprises an offset within said package to a class record of said virtual method and a method token.

* * * * *